US012049811B2

(12) United States Patent
Botnan et al.

(10) Patent No.: US 12,049,811 B2
(45) Date of Patent: Jul. 30, 2024

(54) INTEGRATED WELL CONSTRUCTION SYSTEM OPERATIONS

(71) Applicant: SCHLUMBERGER TECHNOLOGY CORPORATION, Sugar Land, TX (US)

(72) Inventors: Espen Botnan, Kristiansand (NO); Anstein Jorud, Kristiansand (NO); Njål Aarsland, Kristiansand (NO); Christian Doennestad Nilssen, Kristiansand (NO)

(73) Assignee: Schlumberger Technology Corporation, Sugar Land, TX (US)

( * ) Notice: Subject to any disclaimer, the term of this patent is extended or adjusted under 35 U.S.C. 154(b) by 533 days.

(21) Appl. No.: 16/979,439

(22) PCT Filed: Mar. 11, 2019

(86) PCT No.: PCT/US2019/021691
§ 371 (c)(1),
(2) Date: Sep. 9, 2020

(87) PCT Pub. No.: WO2019/173842
PCT Pub. Date: Sep. 12, 2019

(65) Prior Publication Data

US 2021/0002995 A1 Jan. 7, 2021

Related U.S. Application Data

(60) Provisional application No. 62/640,999, filed on Mar. 9, 2018, provisional application No. 62/640,976, filed
(Continued)

(51) Int. Cl.
*E21B 44/00* (2006.01)
*E21B 19/15* (2006.01)
(Continued)

(52) U.S. Cl.
CPC ............ *E21B 44/00* (2013.01); *E21B 19/155* (2013.01); *E21B 19/165* (2013.01); *E21B 19/20* (2013.01);
(Continued)

(58) Field of Classification Search
CPC ........ E21B 19/20; E21B 19/15; E21B 19/155; E21B 19/165; E21B 44/00
See application file for complete search history.

(56) References Cited

U.S. PATENT DOCUMENTS 4,794,534 A 12/1988 Millheim
5,842,149 A 11/1998 Harrell et al.
(Continued)

FOREIGN PATENT DOCUMENTS

CN 103324133 B 9/2013
WO 20150190934 A1 12/2015
(Continued)

OTHER PUBLICATIONS

Office Action issued in U.S. Appl. No. 16/979,397 dated Sep. 15, 2021, 30 pages.
(Continued)

*Primary Examiner* — Kristyn A Hall
(74) *Attorney, Agent, or Firm* — Jeffrey D. Frantz

(57) ABSTRACT

An integrated well construction system (IWCS) operable for constructing a well via integrated control of integrated control devices that collectively control integrated subsystems of the IWCS. The IWCS includes an IWCS communication network, the integrated control devices (each directly connected with the IWCS communication network), the integrated subsystems, and a control workstation (450, 452, 454) directly connected with the IWCS communication network and operable to control each of the integrated control devices to thereby control the integrated subsystems.

17 Claims, 11 Drawing Sheets

Related U.S. Application Data on Mar. 9, 2018, provisional application No. 62/641,021, filed on Mar. 9, 2018.

(51) Int. Cl.

| | |
|---|---|
| ***E21B 19/16*** | (2006.01) |
| ***E21B 19/20*** | (2006.01) |
| ***E21B 21/08*** | (2006.01) |
| ***E21B 44/02*** | (2006.01) |
| ***E21B 47/06*** | (2012.01) |
| ***E21B 47/117*** | (2012.01) |
| ***G08B 21/18*** | (2006.01) |

(52) U.S. Cl.

CPC .............. *E21B 21/08* (2013.01); *E21B 44/02* (2013.01); *E21B 47/06* (2013.01); *E21B 47/117* (2020.05); *G08B 21/18* (2013.01)

(56) References Cited

U.S. PATENT DOCUMENTS

| | | | |
|---|---|---|---|
| 6,382,331 | B1 | 5/2002 | Pinckard |
| 6,484,816 | B1 | 11/2002 | Koederitz |
| 6,662,110 | B1 | 12/2003 | Bargach et al. |
| 6,892,812 | B2 | 5/2005 | Niedermayr et al. |
| 6,896,055 | B2 | 5/2005 | Koithan |
| 6,931,621 | B2 | 8/2005 | Green et al. |
| 7,172,037 | B2 | 2/2007 | Dashevskiy et al. |
| 7,258,175 | B2 | 8/2007 | Veeningen et al. |
| 7,264,050 | B2 | 9/2007 | Koithan et al. |
| 7,357,196 | B2 | 4/2008 | Goldman et al. |
| 7,546,884 | B2 | 6/2009 | Veeningen et al. |
| 7,860,593 | B2 | 12/2010 | Boone |
| 7,895,220 | B2 | 2/2011 | Evans et al. |
| 7,938,197 | B2 | 5/2011 | Boone et al. |
| 7,945,488 | B2 | 5/2011 | Karr et al. |
| 8,103,493 | B2 | 1/2012 | Sagert et al. |
| 8,121,971 | B2 | 2/2012 | Edwards et al. |
| 8,131,510 | B2 | 3/2012 | Wingky |
| 8,145,464 | B2 | 3/2012 | Arnegaard et al. |
| 8,215,417 | B2 | 7/2012 | Annaiyappa et al. |
| 8,250,816 | B2 | 8/2012 | Donnally et al. |
| 8,386,059 | B2 | 2/2013 | Boone |
| 8,590,635 | B2 | 11/2013 | Koederitz |
| 8,718,802 | B2 | 5/2014 | Boone |
| 8,812,334 | B2 | 8/2014 | Givens et al. |
| 9,027,671 | B2 | 5/2015 | Koederitz |
| 9,223,594 | B2 | 12/2015 | Brown et al. |
| 9,285,794 | B2 | 3/2016 | Wang et al. |
| 9,410,417 | B2 | 8/2016 | Reckmann et al. |
| 9,429,009 | B2 | 8/2016 | Paulk et al. |
| 9,436,173 | B2 | 9/2016 | Wang et al. |
| 9,506,336 | B2 | 11/2016 | Orbell |
| 9,528,364 | B2 | 12/2016 | Samuel et al. |
| 9,593,567 | B2 | 3/2017 | Pink et al. |
| 9,598,947 | B2 | 3/2017 | Wang et al. |
| 9,784,089 | B2 | 10/2017 | Boone et al. |
| 9,828,845 | B2 | 11/2017 | Kpetehoto et al. |
| 9,896,925 | B2 | 2/2018 | Hernandez et al. |
| 9,946,445 | B2 | 4/2018 | Whalley et al. |
| 9,995,129 | B2 | 6/2018 | Dykstra et al. |
| 10,113,408 | B2 | 10/2018 | Pobedinski et al. |
| 10,138,722 | B2 | 11/2018 | Magnuson |
| 10,221,671 | B1 | 3/2019 | Zhang |
| 10,253,612 | B2 | 4/2019 | Dashevskiy et al. |
| 10,273,752 | B2 | 4/2019 | Mebane, III |
| 10,443,325 | B2 | 10/2019 | Zheng et al. |
| 10,487,641 | B2 | 11/2019 | Zheng et al. |
| 10,718,162 | B2 | 7/2020 | Van Duivendijk et al. |
| 10,753,169 | B2 | 8/2020 | Arefi et al. |
| 10,782,679 | B2 | 9/2020 | Zheng et al. |
| 2002/0103630 | A1 | 8/2002 | Aldred et al. |
| 2006/0104747 | A1 | 5/2006 | Zahn et al. |
| 2008/0289877 | A1 | 11/2008 | Nikolakis Mouchas et al. |
| 2014/0116776 | A1 | 5/2014 | Marx et al. |
| 2015/0369030 | A1 | 12/2015 | Hay et al. |
| 2016/0194950 | A1 | 7/2016 | Zheng et al. |
| 2016/0222775 | A1 | 8/2016 | Tunc et al. |
| 2016/0290046 | A1 | 10/2016 | Orban et al. |
| 2016/0290073 | A1 | 10/2016 | Zheng et al. |
| 2016/0290119 | A1 | 10/2016 | Tunc et al. |
| 2016/0290120 | A1 | 10/2016 | Zheng et al. |
| 2016/0291201 | A1 | 10/2016 | Tunc et al. |
| 2016/0369619 | A1 | 12/2016 | Parmeshwar et al. |
| 2017/0037691 | A1 | 2/2017 | Savage et al. |
| 2017/0101827 | A1 | 4/2017 | Orban |
| 2017/0114632 | A1 | 4/2017 | Orban et al. |
| 2017/0122092 | A1 | 5/2017 | Harmer |
| 2017/0159372 | A1 | 6/2017 | Zheng et al. |
| 2017/0167200 | A1 | 6/2017 | Zheng et al. |
| 2017/0167853 | A1 | 6/2017 | Zheng et al. |
| 2017/0292327 | A1* | 10/2017 | Reckmann .............. E21B 17/10 |
| 2017/0306710 | A1 | 10/2017 | Trydal et al. |
| 2017/0308802 | A1 | 10/2017 | Ramsøy et al. |
| 2017/0314369 | A1 | 11/2017 | Rosano et al. |
| 2017/0370204 | A1 | 12/2017 | Dahl |
| 2018/0094518 | A1 | 4/2018 | Kpetehoto et al. |
| 2018/0135401 | A1 | 5/2018 | Dykstra et al. |
| 2018/0149010 | A1 | 5/2018 | Zheng et al. |
| 2018/0152319 | A1 | 5/2018 | Rojas et al. |
| 2018/0156023 | A1 | 6/2018 | Dykstra et al. |
| 2018/0283137 | A1 | 10/2018 | Peyregne et al. |
| 2018/0283138 | A1 | 10/2018 | Peyregne et al. |
| 2018/0298693 | A1 | 10/2018 | Van Duivendijk et al. |
| 2018/0328159 | A1 | 11/2018 | Mandava et al. |
| 2018/0334887 | A1 | 11/2018 | Dashevskiy et al. |
| 2018/0351952 | A1 | 12/2018 | Rojas et al. |
| 2018/0355700 | A1 | 12/2018 | Zheng et al. |
| 2018/0359130 | A1 | 12/2018 | Zheng et al. |
| 2018/0359339 | A1 | 12/2018 | Zheng et al. |
| 2019/0018871 | A1 | 1/2019 | Zheng et al. |
| 2019/0032466 | A1 | 1/2019 | Wilson et al. |
| 2019/0048703 | A1 | 2/2019 | Samuel et al. |
| 2019/0048704 | A1 | 2/2019 | Kumaran |
| 2019/0078045 | A1 | 3/2019 | Khan |
| 2019/0078425 | A1 | 3/2019 | Gillan |
| 2019/0078426 | A1 | 3/2019 | Zheng et al. |
| 2019/0078427 | A1 | 3/2019 | Gillan |
| 2019/0078428 | A1 | 3/2019 | Fang et al. |
| 2019/0106978 | A1 | 4/2019 | Etaje et al. |
| 2019/0136650 | A1 | 5/2019 | Zheng et al. |
| 2019/0153848 | A1 | 5/2019 | Ng et al. |
| 2019/0234202 | A1 | 8/2019 | Orban et al. |
| 2020/0003046 | A1 | 1/2020 | Zheng et al. |
| 2020/0278193 | A1 | 9/2020 | Orban et al. |

FOREIGN PATENT DOCUMENTS

| | | | |
|---|---|---|---|
| WO | 2017116474 | A1 | 7/2017 |
| WO | 20170132297 | A2 | 8/2017 |
| WO | 2017160993 | A1 | 9/2017 |
| WO | 2017187368 | A1 | 11/2017 |
| WO | 2017204655 | A1 | 11/2017 |
| WO | 2018186745 | A1 | 10/2018 |
| WO | 2018213126 | A1 | 11/2018 |
| WO | 2019035848 | A1 | 2/2019 |
| WO | 2019066932 | A1 | 4/2019 |

OTHER PUBLICATIONS

Drillsoft : drilling software and automation, Sep. 25, 2017 (XP055595135) documentation accessed at https://www.youtube.com/watch?v=jgbs6KYGAWM [retrieved on Jun. 7, 2019] pp. 2-13.

Drillsoft : Create new well with Drillsoft, Feb. 24, 2017 (XP055595136) documentation accessed at https://www.youtube.com/watch?v=SG_7s5m76Q [retrieved on Jun. 7, 2019]pp. 2-11.

Office Action issued in U.S. Appl. No. 16/979,461 dated Jul. 20, 2023, 26 pages.

* cited by examiner

INTEGRATED WELL CONSTRUCTION SYSTEM OPERATIONS

CROSS-REFERENCE TO RELATED APPLICATIONS

This application is a National Stage Entry of International Application No. PCT/US2019/021691, entitled, "INTEGRATED WELL CONSTRUCTION SYSTEM OPERATIONS," filed Mar. 11, 2019, which claims priority to and the benefit of U.S. Provisional Application No. 62/640,999, titled "SYSTEM AND METHOD FOR REAL-TIME ANALYSIS OF DRILLING OPERATIONS", filed Mar. 9, 2018, U.S. Provisional Application No. 62/641,021, titled "SYSTEM AND METHOD FOR INTEGRATING MULTIPLE DRILLING EQUIPMENT INTO A SINGLE CONTROL NETWORK", filed Mar. 9, 2018, and U.S. Provisional Application No. 62/640,976, titled "SYSTEM AND METHOD FOR CONTROLLING DRILLING OPERATIONS", filed Mar. 9, 2018. Each of the above applications is hereby incorporated by reference in its entirety.

BACKGROUND OF THE DISCLOSURE

Wells are generally drilled into the ground or ocean bed to recover natural deposits of oil, gas, and other materials that are trapped in subterranean formations. Such wells are drilled into the subterranean formations at the wellsite utilizing a well construction system having various surface and subterranean wellsite equipment operating in a coordinated manner. The wellsite equipment may be grouped into various subsystems, wherein each subsystem performs a different operation controlled by a corresponding local and/or a remotely located controller. The subsystems may include a rig control system, a fluid control system, a managed pressure drilling control system, a gas monitoring system, a closed-circuit television system, a choke pressure control system, and a well pressure control system, among other examples.

The wellsite equipment is monitored and controlled from a control center located at a wellsite surface. A typical control center contains a wellsite control station utilized by several human wellsite operators (e.g., drillers) to monitor and control the wellsite equipment. Although the equipment subsystems may operate in a coordinated manner, there is little or no communication between the subsystems and their controllers. Accordingly, monitoring and control of the wellsite equipment or equipment subsystems may be performed via corresponding control panels of the wellsite control station. Each control panel comprises an associated video output device (e.g., a video monitor) and a plurality of input devices (e.g., buttons, switches, joysticks, etc.).

Because there is no communication between the equipment subsystems, interactions and coordination between the various wellsite equipment are typically initiated by the wellsite operators. For example, the wellsite operators may monitor the equipment subsystems to identify operational and safety events and manually implement processes to counteract such events. Accordingly, a typical wellsite control center may be manned by multiple wellsite operators, each monitoring and controlling different wellsite equipment or equipment subsystem via a corresponding control panel. Relying on multiple wellsite operators to monitor and manually control the wellsite equipment increases cost and limits speed, efficiency, and safety of well construction operations.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces an integrated well construction system (IWCS) operable for constructing a well via integrated control of integrated control devices that collectively control integrated subsystems of the IWCS. The IWCS includes an IWCS communication network; the integrated control devices, each directly connected with the IWCS communication network; the integrated subsystems; and a control workstation directly connected with the IWCS communication network and operable to control each of the integrated control devices to thereby control the integrated subsystems.

The present disclosure also introduces a control workstation directly connected with a communication network and operable to control each of multiple integrated control devices each directly connected with the communication network. Each integrated control device controls a corresponding component of an IWCS, whereby control of the integrated control devices, via operations of the control workstation, controls the IWCS.

The present disclosure also introduces a computer program product including a tangible, computer-readable, non-transitory medium having instructions stored thereon for: automatically controlling integrated control devices that control integrated subsystems of an IWCS to perform combinations of predetermined operational sequences for constructing a well; receiving, via operation of a control workstation by a human operator, a selection of one of the operational sequences to be performed by the IWCS; receiving, via operation of the control workstation by the human operator, settings for first machines of the IWCS to be operated during the selected operational sequence; and in response to receiving a single commencement input via operation of the control workstation by the human operator, automatically starting and controlling the first machines and second machines of the IWCS to perform the selected operational sequence using the received settings.

The present disclosure also introduces a method including operating an IWCS that includes a fiberoptic ring network. Nodes of the fiberoptic ring network include: programmable logic controllers (PLCs) of individual pieces of machinery forming the IWCS; video feed; drilling operator control; high-level supervisory control; and combinations thereof.

The present disclosure also introduces an apparatus that includes a communication network and integrated control devices each directly connected with the communication network. Each integrated control device controls a corresponding component of an IWCS. The IWCS is operable for constructing a well without other components not controlled by any of the integrated control devices. The apparatus also includes a control workstation directly connected with the communication network and operable to control each of the integrated control devices to thereby control the IWCS.

The present disclosure also introduces an apparatus including a communication network and integrated control devices each directly connected with the communication network. The integrated control devices control corresponding IWCS components. The IWCS components are collectively operable for constructing a well exclusive of any component not controlled by any of the integrated control devices. The apparatus also includes a control workstation directly connected with the communication network and operable to control each of the integrated control devices to thereby control the IWCS.

The present disclosure also introduces an apparatus including a communication network and integrated control devices each directly connected with the communication network. Each integrated control device controls a corresponding one or more of integrated well construction components. The integrated well construction components form an integrated well construction system operable for constructing a well without any other components. A control workstation is directly connected with the communication network and is operable to control each integrated control device to thereby control the integrated well construction components.

The present disclosure also introduces a method including causing a well construction system to perform a well construction operation, whereby data associated with the well construction operation is automatically collected and analyzed in real-time to determine parameters based on the data, and at least some of the determined parameters are used for controlling the well construction operation.

The present disclosure also introduces a method including causing a well construction system to perform a well construction operation, whereby data associated with the well construction operation is automatically collected and analyzed in real-time to determine parameters based on the data, and at least some of the determined parameters each provide a basis for triggering at least one real-time well construction operation alarm.

The present disclosure also introduces an apparatus that includes an analysis-while-drilling (AWD) control system utilized in conjunction with a well construction system during a well construction operation. Inputs for the AWD control system include: intended configuration of a well being constructed by the well construction system during the well construction operation; configuration of a drill string being used by the well construction system during the well construction operation; signals from drilling parameter sensors; and drilling equipment parameters. Outputs from the AWD control system include real-time determination of: depth and trajectory of the well; bit depth; number of drill string tubulars and/or stands in the well; drill string volume, displacements, and weight; drilling fluid tank volumes and tank selections; drilling fluid loss and/or gain; trip tank difference volume; trip tank accumulated volume; total and/or per-section strokes and/or strokes-to-go of drilling fluid pumping system; total stroke rate of drilling fluid pumping system; drilling fluid pumping system liner capacities and efficiencies; individual and total drilling fluid flow into the well; annular drilling fluid velocity; total and/or per-section drilling fluid volumes; total minutes and/or minutes-to-go per section; drilling fluid return flow; bit runtime and revolutions; weight-on-bit; rate of penetration; hook load; and standpipe pressure. The outputs from the AWD control system may further include a kick calculator and a kill sheet. The outputs from the AWD control system may further include sensors and calculations for storage in a historian associated with the well construction system. The outputs from the AWD control system may further include well construction operation warnings and alarms.

The present disclosure also introduces an apparatus that includes a control workstation directly connected with a communication network and operable to control multiple control devices each directly connected with the communication network. Each control device controls a corresponding component of an IWCS, whereby control of the control devices, via operations of the control workstation, controls the IWCS. The control workstation includes a display, a processor, and a memory storing: a construction program that, when executed by the processor, controls each control device; and an AWD program. Inputs for the AWD system include intended configuration of a well being constructed by the well construction system during the well construction operation, configuration of a drill string being used by the well construction system during the well construction operation, signals from drilling parameter sensors, and drilling equipment parameters. When executed by the processor, the AWD program generates in real-time, and displays in real-time in an AWD screen on the display, one or more of: a graphic display of the intended configuration and/or an actual configuration of the well, including depths; a graphic display of a shoe in the well; an animation of the intended and actual configurations of the well; an animation of the drill string in the well; value textual and/or graphic display of drilling fluid front tracking and/or depth; annular velocity per section; open hole volume; total strokes and minutes, strokes and minutes-to-go, and volume for one or more of: surface to bit; bit to shoe; bit to blow-out preventer; bit to surface; well circulation; full circulation; drill string displacement, open end and closed end; drill string weight; number of tubulars in the well; active volume; drilling fluid flow into the well; bit revolutions; and bit runtime.

The present disclosure also introduces an apparatus including a control workstation for use with an IWCS. The IWCS is operable for constructing a well via integrated control of integrated control devices that collectively control integrated subsystems of the IWCS. The control workstation includes a human-machine interface (HMI) that includes a display, a touchscreen, a joystick, and a processing system that includes a processor and a memory having a construction program thereon that, when executed by the processor: presents a human operator of the control workstation with a setup wizard guiding the operator through entering operating parameters for one or more well construction machines of the integrated subsystems to perform a well construction sequence; and controls the integrated control devices, and thus the integrated subsystems, to perform the well construction sequence based on the entered operating parameters.

The present disclosure also introduces an apparatus including an IWCS operable for constructing a well via integrated control of integrated control devices that collectively control integrated subsystems of the IWCS. The IWCS includes a processing system including a processor and a memory having a construction program thereon that, when executed by the processor: controls each integrated control device, and thus each integrated subsystem, during each of multiple predetermined operational sequences; and prevents collisions between machines of the IWCS.

The present disclosure also introduces a method including constructing a well utilizing each of multiple automatically controlled well construction machines, including: a drawworks; an iron roughneck; a tong-handling trolley; a tong-handling arm; a catwalk; a tubular delivery arm; a lower stabilizing arm; an upper tubular restraint; an intermediate tubular restraint; a lower tubular restraint; a top drive; a top drive elevator; a fingerboard; a transfer bridge racker; a setback guide arm; a mousehole; a mousehole; a drilling fluid pumping system; and a drilling fluid recondition system.

The present disclosure also introduces a system operable to completely control each of multiple predetermined operational sequences of a well construction operation. The sequences include: picking up single tubulars; making drilling connections; building tubular stands; tripping-in drill collar stands; tripping-out drill collar stands; tripping-out wet; backreaming; moving single tubulars from a well center to a catwalk using a top drive; moving tubular stands from the well center to the catwalk; moving casing from the catwalk to the well center using a casing tong; moving casing from the catwalk to the well center using a tubular delivery arm and a casing running tool; moving large diameter casing from the catwalk to the well center using the top drive and the casing running tool; building casing stands; and tripping-in casing stands without using the casing running tool.

These and additional aspects of the present disclosure are set forth in the description that follows, and/or may be learned by a person having ordinary skill in the art by reading the materials herein and/or practicing the principles described herein. At least some aspects of the present disclosure may be achieved via means recited in the attached claims.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

FIGS. 11-21 are example implementations of screens displayed by the apparatus shown in FIG. 7 according to one or more aspects of the present disclosure.

FIG. 22 is a schematic view of at least a portion of an example implementation of apparatus or a system according to one or more aspects of the present disclosure.

FIG. 23 is a schematic view of at least a portion of an example implementation of apparatus or a system according to one or more aspects of the present disclosure.

FIG. 24 is a schematic view of at least a portion of an example implementation of apparatus or a system according to one or more aspects of the present disclosure.

DETAILED DESCRIPTION

Figure 1:
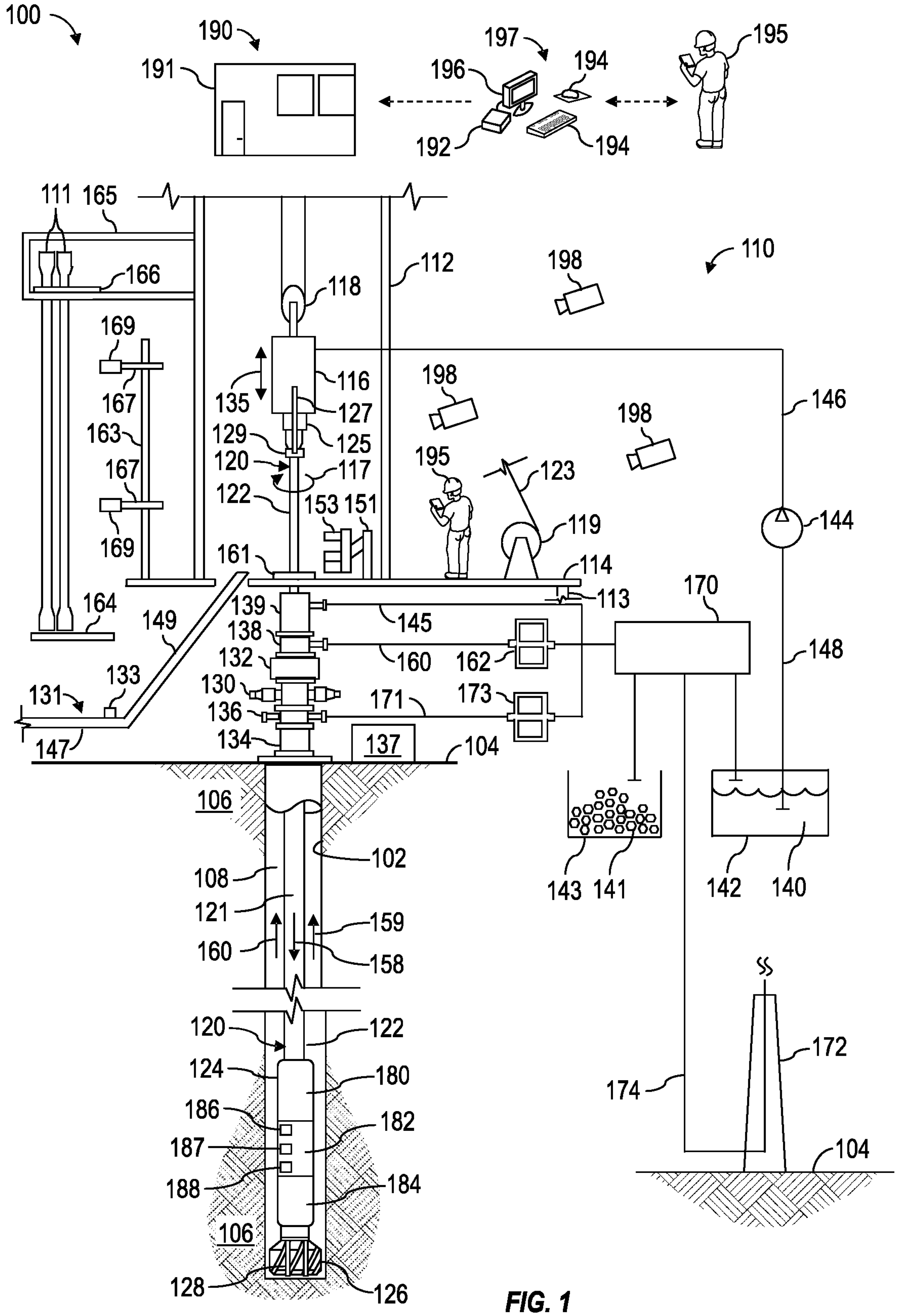
FIG. 1 is a schematic view of at least a portion of an example implementation of apparatus or a system according to one or more aspects of the present disclosure.

It is to be understood that the following disclosure describes many example implementations for different aspects introduced herein. Specific examples of components and arrangements are described below to simplify the present disclosure. These are merely examples, and are not intended to be limiting. In addition, the present disclosure may repeat reference numerals and/or letters in the various examples. This repetition is for simplicity and clarity, and does not in itself dictate a relationship between the various implementations described herein. Moreover, the formation of a first feature over or on a second feature in the description that follows may include implementations in which the first and second features are formed in direct contact, and may also include implementations in which additional features may be formed interposing the first and second features, such that the first and second features may not be in direct contact.

FIG. 1 is a schematic view of at least a portion of an example implementation of an integrated well construction system 100 (i.e., a drill rig) according to one or more aspects of the present disclosure. The well construction system 100 represents an example environment in which one or more aspects of the present disclosure described below may be implemented. Although the well construction system 100 is depicted as an onshore implementation, the aspects described below are also applicable to offshore implementations.

The well construction system 100 is depicted in relation to a wellbore 102 formed by rotary and/or directional drilling from a wellsite surface 104 and extending into a subterranean formation 106. The well construction system 100 includes surface equipment 110 located at the wellsite surface 104 and a drill string 120 suspended within the wellbore 102. The surface equipment 110 may include a mast, a derrick, and/or other support structure 112 disposed over a rig floor 114. The drill string 120 may be suspended within the wellbore 102 from the support structure 112. The support structure 112 and the rig floor 114 are collectively supported over the wellbore 102 by legs and/or other support structures 113.

The drill string 120 may comprise a bottom-hole assembly (BHA) 124 and means 122 for conveying the BHA 124 within the wellbore 102. The conveyance means 122 may comprise drill pipe, heavy-weight drill pipe (HWDP), wired drill pipe (WDP), and/or other means for conveying the BHA 124 within the wellbore 102. A downhole end of the BHA 124 may include or be coupled to a drill bit 126. Rotation of the drill bit 126 and the weight of the drill string 120 collectively operate to form the wellbore 102. The drill bit 126 may be rotated from the wellsite surface 104 and/or via a downhole mud motor (not shown) connected with the drill bit 126.

The BHA 124 may also include various downhole tools 180, 182, 184. One or more of such downhole tools 180, 182, 184 may be or comprise an acoustic tool, a density tool, a directional drilling tool, an electromagnetic (EM) tool, a formation sampling tool, a formation testing tool, a gravity tool, a monitoring tool, a neutron tool, a nuclear tool, a photoelectric factor tool, a porosity tool, a reservoir characterization tool, a resistivity tool, a rotational speed sensing tool, a sampling-while-drilling (SWD) tool, a seismic tool, a surveying tool, a torsion sensing tool, and/or other measuring-while-drilling (MWD) or logging-while-drilling (LWD) tools.

One or more of the downhole tools 180, 182, 184 may be or comprise an MWD or LWD tool comprising a sensor package 186 operable for the acquisition of measurement data pertaining to the BHA 124, the wellbore 102, and/or the formation 106. One or more of the downhole tools 180, 182, 184 and/or another portion of the BHA 124 may also comprise a telemetry device 187 operable for communication with the surface equipment 110, such as via mud-pulse telemetry. One or more of the downhole tools 180, 182, 184 and/or another portion of the BHA 124 may also comprise a downhole processing device 188 operable to receive, process, and/or store information received from the surface equipment 110, the sensor package 186, and/or other portions of the BHA 124. The processing device 188 may also store executable computer programs (e.g., program code instructions), including for implementing one or more aspects of the operations described herein.

The support structure 112 may support a driver, such as a top drive 116, operable to connect (perhaps indirectly) with an uphole end of the conveyance means 122, and to impart rotary motion 117 to the drill string 120 and the drill bit 126. However, another driver, such as a kelly and rotary table (neither shown), may be utilized instead of or in addition to the top drive 116 to impart the rotary motion 117. The top drive 116 and the connected drill string 120 may be suspended from the support structure 112 via hoisting equipment, which may include a traveling block 118, a crown block (not shown), and a draw works (DW) 119 storing a support cable or line 123. The crown block may be connected to or otherwise supported by the support structure 112, and the traveling block 118 may be coupled with the top drive 116, such as via a hook. The DW 119 may be mounted on or otherwise supported by the rig floor 114. The crown block and traveling block 118 comprise pulleys or sheaves around which the support line 123 is reeved to operatively connect the crown block, the traveling block 118, and the DW 119 (and perhaps an anchor). The DW 119 may thus selectively impart tension to the support line 123 to lift and lower the top drive 116, resulting in vertical motion 135. The DW 119 may comprise a drum, a frame, and a prime mover (e.g., an engine or motor) (not shown) operable to drive the drum to rotate and reel in the support line 123, causing the traveling block 118 and the top drive 116 to move upward. The DW 119 is also operable to reel out the support line 123 via a controlled rotation of the drum, causing the traveling block 118 and the top drive 116 to move downward.

The top drive 116 may comprise a grabber, a swivel (neither shown), tubular handling assembly links 127 terminating with an elevator 129, and a drive shaft 125 operatively connected with a prime mover (not shown), such as via a gear box or transmission (not shown). The drill string 120 may be mechanically coupled to the drive shaft 125 with or without a saver sub between the drill string 120 and the drive shaft 125. The prime mover of the top drive 116 is selectively operable to rotate the drive shaft 125 and the drill string 120 coupled with the drive shaft 125. Hence, the top drive 116 and the DW 119 cooperate to advance the drill string 120 into the formation 106 to form the wellbore 102. The tubular handling assembly links 127 and the elevator 129 of the top drive 116 may handle tubulars (e.g., drill pipes, drill collars, casing joints, etc.) that are not mechanically coupled to the drive shaft 125. For example, when the drill string 120 is being tripped into or out of the wellbore 102, the elevator 129 may grasp the tubulars of the drill string 120 such that the tubulars may be raised and/or lowered via the hoisting equipment mechanically coupled to the top drive 116. The grabber may include a clamp that clamps onto a tubular when making-up and/or breaking-out a connection of a tubular with the drive shaft 125. The top drive 116 may have a guide system (not shown), such as rollers that track up and down a guide rail on the support structure 112. The guide system may aid in keeping the top drive 116 aligned with the wellbore 102, and in preventing the top drive 116 from rotating during drilling by transferring reactive torque to the support structure 112.

The well construction system 100 may further include a well control system for maintaining well pressure control. For example, the drill string 120 may be conveyed within the wellbore 102 through various blowout preventer (BOP) equipment disposed at the wellsite surface 104 on top of the wellbore 102 and perhaps below the rig floor 114. The BOP equipment may be operable to control pressure within the wellbore 102 via a series of pressure barriers (e.g., rams) between the wellbore 102 and the wellsite surface 104. The BOP equipment may include a BOP stack 130, an annular preventer 132, and/or a rotating control device (RCD) 138 mounted above the annular preventer 132. The BOP equipment 130, 132, 138 may be mounted on top of a wellhead 134. The well control system may further include a BOP control unit 137 (i.e., a BOP closing unit) operatively connected with the BOP equipment 130, 132, 138 and operable to actuate, drive, operate, or otherwise control the BOP equipment 130, 132, 138. The BOP control unit 137 may be or comprise a hydraulic fluid power unit fluidly connected with the BOP equipment 130, 132, 138 and selectively operable to hydraulically drive various portions (e.g., rams, valves, seals) of the BOP equipment 130, 132, 138.

The well construction system 100 may further include a drilling fluid circulation system operable to circulate fluids between the surface equipment 110 and the drill bit 126 during drilling and other operations. For example, the drilling fluid circulation system may be operable to inject a drilling fluid from the wellsite surface 104 into the wellbore 102 via an internal fluid passage 121 extending longitudinally through the drill string 120. The drilling fluid circulation system may comprise a pit, a tank, and/or other fluid container 142 holding the drilling fluid (i.e., mud) 140, and a pump 144 operable to move the drilling fluid 140 from the container 142 into the fluid passage 121 of the drill string 120 via a fluid conduit 146 extending from the pump 144 to the top drive 116 and an internal passage extending through the top drive 116. The fluid conduit 146 may comprise one or more of a pump discharge line, a stand pipe, a rotary hose, and a gooseneck (not shown) connected with a fluid inlet of the top drive 116. The pump 144 and the container 142 may be fluidly connected by a fluid conduit 148, such as a suction line.

During drilling operations, the drilling fluid may continue to flow downhole through the internal passage 121 of the drill string 120, as indicated by directional arrow 158. The drilling fluid may exit the BHA 124 via ports 128 in the drill bit 126 and then circulate uphole through an annular space (annulus) 108 of the wellbore 102 defined between an exterior of the drill string 120 and the wall of the wellbore 102, such flow being indicated in FIG. 1 by directional arrows 159. In this manner, the drilling fluid lubricates the drill bit 126 and carries formation cuttings uphole to the wellsite surface 104. The returning drilling fluid may exit the annulus 108 via a bell nipple 139, the RCD 138, and/or a ported adapter 136 (e.g., a spool, a wing valve, etc.) located below one or more portions of the BOP stack 130.

The drilling fluid exiting the annulus 108 via the bell nipple 139 may be directed toward drilling fluid reconditioning equipment 170 via a fluid conduit 145 (e.g., gravity return line) to be cleaned and/or reconditioned, as described below, prior to being returned to the container 142 for recirculation. The drilling fluid exiting the annulus 108 via the RCD 138 may be directed into a fluid conduit 160 (e.g., a drilling pressure control line), and may pass through various wellsite equipment fluidly connected along the conduit 160 prior to being returned to the container 142 for recirculation. For example, the drilling fluid may pass through a choke manifold 162 (e.g., a drilling pressure control choke manifold) and then through the drilling fluid reconditioning equipment 170. The choke manifold 162 may include at least one choke and a plurality of fluid valves (neither shown) collectively operable to control the flow through and out of the choke manifold 162. Backpressure may be applied to the annulus 108 by variably restricting flow of the drilling fluid or other fluids flowing through the choke manifold 162. The greater the restriction to flow through the choke manifold 162, the greater the backpressure applied to the annulus 108. The drilling fluid exiting the annulus 108 via the ported adapter 136 may be directed into a fluid conduit 171 (e.g., rig choke line), and may pass through various equipment fluidly connected along the conduit 171 prior to being returned to the container 142 for recirculation. For example, the drilling fluid may pass through a choke manifold 173 (e.g., a rig choke manifold, well control choke manifold, etc.) and then through the drilling fluid reconditioning equipment 170. The choke manifold 173 may include at least one choke and a plurality of fluid valves (neither shown) collectively operable to control the flow through the choke manifold 173. Backpressure may be applied to the annulus 108 by variably restricting flow of the drilling fluid or other fluids flowing through the choke manifold 173.

Before being returned to the container 142, the drilling fluid returning to the wellsite surface 104 may be cleaned and/or reconditioned via the drilling fluid reconditioning equipment 170, which may include one or more of liquid gas separators, shale shakers, centrifuges, and other drilling fluid cleaning equipment. The liquid gas separators may remove formation gasses entrained in the drilling fluid discharged from the wellbore 102, and the shale shakers may separate and remove solid particles 141 (e.g., drill cuttings) from the drilling fluid. The drilling fluid reconditioning equipment 170 may further comprise equipment operable to remove additional gas and finer formation cuttings from the drilling fluid and/or modify physical properties or characteristics (e.g., rheology) of the drilling fluid. For example, the drilling fluid reconditioning equipment 170 may include a degasser, a desander, a desilter, a mud cleaner, and/or a decanter, among other examples. Intermediate tanks/containers (not shown) may be utilized to hold the drilling fluid while the drilling fluid progresses through the various stages or portions of the drilling fluid reconditioning equipment 170. The cleaned/reconditioned drilling fluid may be transferred to the fluid container 142, the solid particles 141 removed from the drilling fluid may be transferred to a solids container 143 (e.g., a reserve pit), and the removed gas may be transferred to a flare stack 172 via a conduit 174 (e.g., a flare line) to be burned or to a container (not shown) for storage and removal from the wellsite.

The surface equipment 110 may include tubular handling equipment operable to store, move, connect, and disconnect tubulars (e.g., drill pipes) to assemble and disassemble the conveyance means 122 of the drill string 120 during drilling operations. For example, a catwalk 131 may be utilized to convey tubulars from a ground level, such as along the wellsite surface 104, to the rig floor 114, permitting the tubular handling assembly links 127 to grab and lift the tubulars above the wellbore 102 for connection with previously deployed tubulars. The catwalk 131 may have a horizontal portion 147 and a ramp or inclined portion 149, wherein the inclined portion extends between the horizontal portion and the rig floor 114. The catwalk 131 may comprise a skate 133 movable along a groove (not shown) extending longitudinally along the horizontal and inclined portions of the catwalk 131. The skate 133 may be operable to convey (e.g., push) the tubulars along the catwalk 131 to the rig floor 114. The skate 133 may be driven along the groove by a drive system (not shown), such as a pulley system or a hydraulic system. Additionally, one or more racks (not shown) may adjoin the horizontal portion of the catwalk 131. The racks may be feeding tables (not shown), such as may have a spinner unit and/or other means for transferring tubulars to the groove of the catwalk 131.

An iron roughneck (RN) 151 may be positioned on the rig floor 114. The RN 151 may comprise a torqueing portion 153, such as may include a spinner and a torque wrench comprising a lower tong and an upper tong. The torqueing portion 153 of the RN 151 may be moveable toward and at least partially around the drill string 120, such as may permit the RN 151 to make-up and break-out connections of the drill string 120. The torqueing portion 153 may also be moveable away from the drill string 120, such as may permit the RN 151 to move clear of the drill string 120 during drilling operations. The spinner of the RN 151 may be utilized to apply low torque to make-up and break-out threaded connections between tubulars of the drill string 120, and the torque wrench may be utilized to apply a higher torque to tighten and loosen the threaded connections. The system 100 may include more than one instance of the RN 151.

Reciprocating slips 161 may be located on the rig floor 114, such as may accommodate therethrough the downhole tubulars during make-up and break-out operations and during the drilling operations. The reciprocating slips 161 may be in an open position during drilling operations to permit advancement of the drill string 120 therethrough, and in a closed position to clamp near an upper end of the conveyance means 122 (e.g., assembled tubulars) to thereby suspend and prevent advancement of the drill string 120 within the wellbore 102, such as during the make-up and break-out operations.

During drilling operations, the hoisting equipment lowers the drill string 120 while the top drive 116 rotates the drill string 120 to advance the drill string 120 within the wellbore 102 and into the formation 106. During the advancement of the drill string 120, the reciprocating slips 161 are in an open position, and the RN 151 is moved away or is otherwise clear of the drill string 120. When the upper portion of the tubular in the drill string 120 that is made up to the drive shaft 125 is near the reciprocating slips 161 and/or the rig floor 114, the top drive 116 ceases rotating and the reciprocating slips 161 close to clamp the tubular made up to the drive shaft 125. The grabber of the top drive 116 then clamps the upper portion of the tubular made up to the drive shaft 125, and the drive shaft 125 rotates in a direction reverse from the drilling rotation to break-out the connection between the drive shaft 125 and the made up tubular. The grabber of the top drive 116 may then release the tubular of the drill string 120.

Multiple tubulars may be loaded on the rack of the catwalk 131 and individual tubulars may be transferred from the rack to the groove in the catwalk 131. The tubular positioned in the groove may be conveyed along the groove by the skate 133 until an end of the tubular projects above the rig floor 114. The elevator 129 of the top drive 116 may then grasp the protruding end, and the DW 119 is operated to lift the top drive 116, the elevator 129, and the new tubular.

The hoisting equipment then raises the top drive 116, the elevator 129, and the tubular until the tubular is aligned with the upper portion of the drill string 120 clamped by the slips 161. The RN 151 is moved toward the drill string 120, and the lower tong of the torqueing portion 153 clamps onto the upper portion of the drill string 120. The spinning system rotates the new tubular into the upper portion of the drill string 120. The upper tong then clamps onto the new tubular and rotates with high torque to complete making-up the connection with the drill string 120. In this manner, the new tubular becomes part of the drill string 120. The RN 151 then releases and moves clear of the drill string 120.

The grabber of the top drive 116 may then clamp onto the drill string 120. The drive shaft 125 (or a saver sub or other device extending from the drive shaft 125) is brought into contact with the drill string 120 and rotated to make-up a connection between the drill string 120 and the drive shaft 125. The grabber then releases the drill string 120, and the reciprocating slips 161 are moved to the open position. The drilling operations may then resume.

The tubular handling equipment may further include a pipe handling manipulator (PHM) 163 disposed in association with a vertical pipe rack 165 for storing tubulars 111 (or stands of two or three tubulars). The vertical pipe rack 165 may comprise or support a fingerboard (FIB) 166 defining a plurality of slots configured to support or otherwise hold the tubulars 111 within or above a setback 164 (e.g., a platform or another area) located adjacent to, along, or below the rig floor 114. The FIB 166 may comprise a plurality of fingers (not shown), each associated with a corresponding slot and operable to close around and/or otherwise interpose individual tubulars 111 to maintain the tubulars 111 within corresponding slots of the setback 164. The vertical pipe rack 165 may be connected with and supported by the support structure 112 or another portion of the wellsite system 100. The FIB 166/setback 164 provide storage (e.g., temporary storage) of tubulars 111 during various operations, such as during and between tripping out and tripping of the drill string 120. The PHM 163 may be operable to transfer the tubulars 111 between the FIB 166/setback 164 and the drill string 120 (i.e., space above the suspended drill string 120). For example, the PHM 163 may include arms 167 terminating with clamps 169, such as may be operable to grasp and/or clamp onto one of the tubulars 111. The arms 167 of the PHM 163 may extend and retract, and/or at least a portion of the PHM 163 may be rotatable and/or movable toward and away from the drill string 120, such as may permit the PHM 163 to transfer the tubular 111 between the FIB 166/setback 164 and the drill string 120.

The surface equipment 110 of the well construction system 100 may also comprise a control center 190 from which various portions of the well construction system 100, such as the top drive 116, the hoisting system, the tubular handling system, the drilling fluid circulation system, the well control system, and the BHA 124, among other examples, may be monitored and controlled. The control center 190 may be located on the rig floor 114 or another location of the well construction system 100, such as the wellsite surface 104. The control center 190 may comprise a facility 191 (e.g., a room, a cabin, a trailer, etc.) containing a control workstation 197, which may be operated by a human wellsite operator 195 to monitor and control various wellsite equipment or portions of the well construction system 100. The control workstation 197 may comprise or be communicatively connected with a processing device 192 (e.g., a controller, a computer, etc.), such as may be operable to receive, process, and output information to monitor and/or control operations of one or more portions of the well construction system 100. For example, the processing device 192 may be communicatively connected with the various surface and downhole equipment described herein, and may be operable to receive signals from and transmit signals to such equipment to perform various operations described herein. The processing device 192 may store executable program code, instructions, and/or operational parameters or set-points, including for implementing one or more aspects of methods and operations described herein. The processing device 192 may be located within and/or outside of the facility 191.

The control workstation 197 may be operable for entering or otherwise communicating control commands to the processing device 192 by the wellsite operator 195, and for displaying or otherwise communicating information from the processing device 192 to the wellsite operator 195. The control workstation 197 may comprise a plurality of human-machine interface (HMI) devices, including one or more input devices 194 (e.g., a keyboard, a mouse, a joystick, a touchscreen, etc.) and one or more output devices 196 (e.g., a video monitor, a touchscreen, a printer, audio speakers, etc.). Communication between the processing device 192, the input and output devices 194, 196, and the various wellsite equipment may be via wired and/or wireless communication means. However, for clarity and ease of understanding, such communication means are not depicted, and a person having ordinary skill in the art will appreciate that such communication means are within the scope of the present disclosure.

Well construction systems within the scope of the present disclosure may include more or fewer components than as described above and depicted in FIG. 1. Additionally, various equipment and/or subsystems of the well construction system 100 shown in FIG. 1 may include more or fewer components than as described above and depicted in FIG. 1. For example, various engines, motors, hydraulics, actuators, valves, and/or other components not explicitly described herein may be included in the well construction system 100, and are within the scope of the present disclosure.

Figure 2:
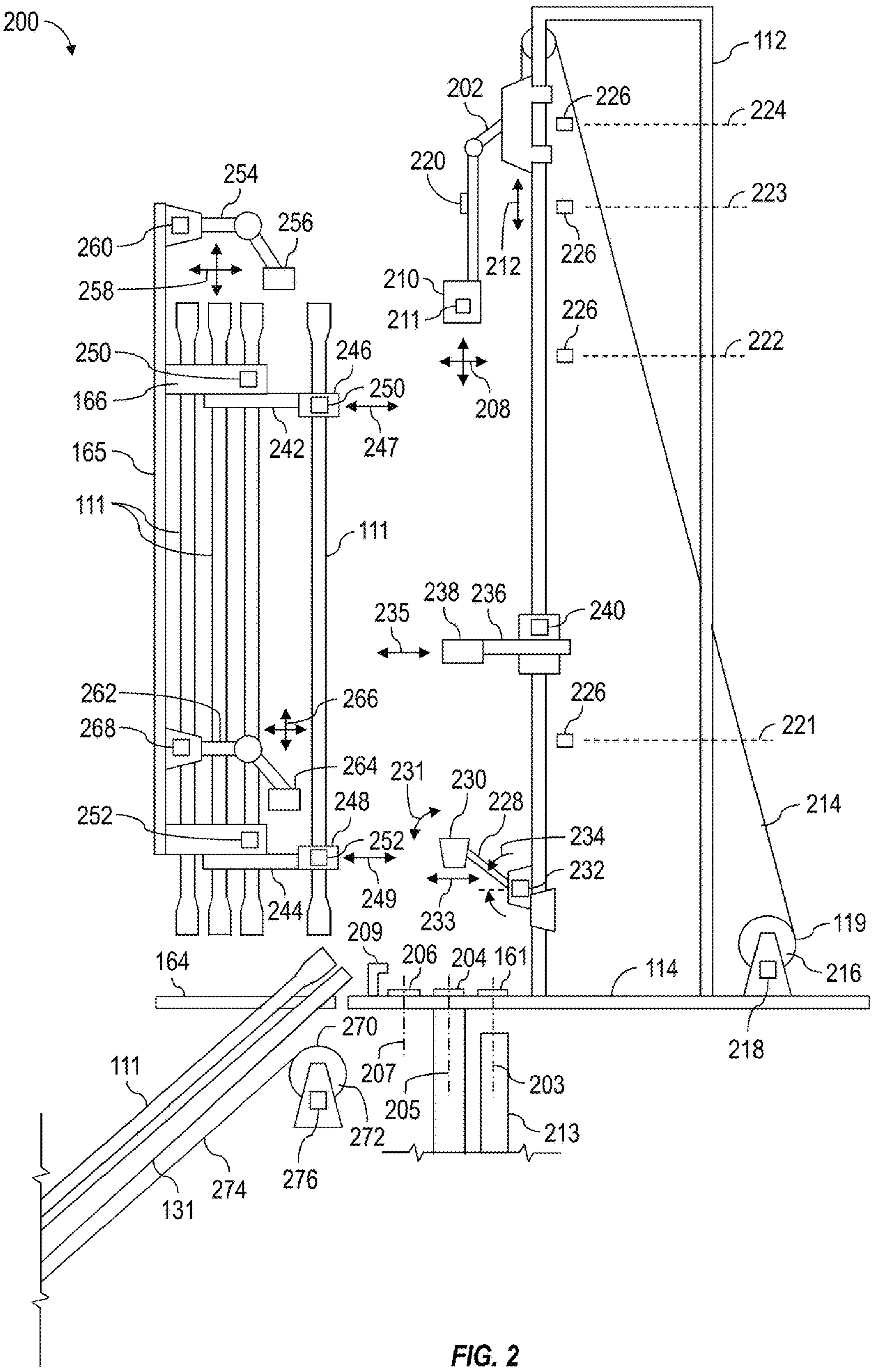
FIG. 2 is a schematic view of at least a portion of an example implementation of apparatus or a system according to one or more aspects of the present disclosure.

FIG. 2 is a schematic view of an example implementation of a wellsite system 200 comprising a plurality of pipe handling equipment, each comprising or carrying one or more sensors operable to generate sensor measurements indicative of corresponding operational parameters (e.g., position, speed, acceleration, etc.) of such equipment. According to one or more aspects of the present disclosure, the various pieces of equipment of the wellsite system 200 may be operable to move tubulars 111 between various positions of the wellsite system 200, to perform processes described herein, including assembly and disassembly of a drill string 120. The wellsite system 200 may form a portion of and/or operate in conjunction with the well construction system 100 shown in FIG. 1, including where indicated by the same numerals. Accordingly, the following description refers to FIGS. 1 and 2, collectively.

The wellsite system 200 may comprise a support structure 112 supporting various automated pipe handling equipment operable to transport tubulars 111 (e.g., drill pipes, stands of drill pipe, casing joints) between different areas of the wellsite system 200. The wellsite system 200 may further comprise a catwalk 131 operable to transport tubulars 111 from a storage area (not shown) at a ground level (e.g., wellsite surface 104) to a rig floor 114.

The support structure 112 or another portion of the wellsite system 200 may support a tubular delivery arm (TDA) 202 operable to grab the tubulars 111, one at a time, from an FIB 166 and/or the catwalk 131 and lift or otherwise move the tubulars 111 to predetermined positions. For example, the TDA 202 may move a tubular 111 over the wellbore 102, such that the tubular 111 is aligned with the wellbore center 203 above the reciprocating slips 161 and fluid control equipment 213 (e.g., BOP equipment 130, 132, 138 mounted on top of a wellhead 134, etc.) located below the rig floor 114. The TDA 202 may also move a tubular 111 over a mouse hole (MOH) 204, such that the tubular 111 is aligned with a mouse hole center 205, permitting one or more tubulars 111 to be disposed therein such that two or more tubulars 111 can be coupled together to form a stand.

The TDA 202 may also move a tubular 111 to a doping stand or area 206, such that the tubular 111 may be prepared for make-up operations by a washer/doper device (doper) 209. For example the doper 209 may apply dope to pin ends of tubulars 111 in preparation for being made-up, and/or may wash pin ends of tubulars 111 prior to transfer to the FIB 166/setback 164. Accordingly, the doper 209 may be positioned in conjunction with the doping area 206, the MOH 204, and/or other areas, such as for performing the washing/doping operations on a tubular 111 while the tubular 111 is engaged by the TDA 202. The doper 209 may also be positioned in conjunction with the TDA 202.

Portions of the TDA 202 may be operable to move horizontally and/or vertically, as indicated by arrows 208, such as may permit a grabber or clamp 210 of the TDA 202 to grab or otherwise receive a tubular 111 being transferred to the rig floor 114 by the catwalk 131. A DW 119 may be operable to move the TDA 202 vertically along the support structure 112, as indicated by arrows 212. The DW 119 may be operatively connected with the TDA 202 via a support line 214 extending between the TDA 202 and a drum 216 of the DW 119.

One or more sensors 211 may be disposed in association with the clamp 210, such as may permit the sensor 211 to generate sensor signals indicative of presence or proximity of a tubular 111 received by the clamp 210. One or more sensors 218 may be disposed in association with the DW 119, such as may permit the sensor 218 to generate sensor measurements (e.g., electrical sensor signals or data) indicative of rotational position of the drum 216. Such sensor measurements may be further indicative of vertical position of the TDA 202 along the support structure 112. The TDA 202 may carry or comprise one or more sensors 220 operable to generate sensor measurements indicative of tension applied to and, thus, weight supported by the TDA 202. The support structure 112 may further support a plurality of sensors 226, each located at a predetermined or otherwise known reference position 221-224 (i.e., height) along the support structure 112. Such known reference positions 221-224 may be known in the oil and gas industry as flags or targets. Each sensor 226 may be operable to generate a sensor signal indicative of presence or proximity of the TDA 202 when the TDA 202 passes the sensor 226, thereby indicating a corresponding known position 221-224 of the TDA 202 at such time.

The support structure 112 or another portion of the wellsite system 200 may further support a lower stabilization arm (LSA) 228 operable to receive (e.g., catch) and stabilize via a holding device 230 a tubular 111 supported by the TDA 202 after the tubular 111 is lifted off of the catwalk 131 and swings toward the support structure 112. The LSA 228 may then pivot 231 to horizontally move 233 the tubular 111 to align the tubular 111 with the mouse hole center 205 or the doping area 206. The holding device 230 may be extended around (at least partially) a tubular 111 to provide additional stability, such as during stabbing prior to make-up operations. The LSA 228 may carry or comprise one or more sensors 232 operable to generate sensor measurements indicative of stabilization arm extension (i.e., length) and/or angle 234 between the LSA 228 and the support structure 112 or a reference plane.

The support structure 112 or another portion of the wellsite system 200 may support a vertical rack 165 comprising or supporting the FIB 166 defining a plurality of slots configured to support or otherwise hold the tubulars 111 within or above a setback 164 located adjacent to, along, of below the rig floor 114. The support structure 112, the vertical rack 165, or another portion of the wellsite system 200, such as the PHM 163, may support an upper tubular constraint (UTC) 242 and a lower tubular constraint (LTC) 244, each operable to grab a corresponding upper and lower portion of a tubular 111 via a corresponding grabber or clamp 246, 248. The UTC 242 and LTC 244 may stabilize the tubular 111 and/or horizontally move the corresponding upper and/or lower portions of the tubular 111, as indicated by arrows 247, 249, to align the tubular 111 with the mouse hole center 205 or the doping area 206. The UTC 242 and LTC 244 may also horizontally move the corresponding upper and/or lower portions of the tubular 111, as indicated by arrows 247, 249, to position the tubular 111 along a tubular handoff position (THP) 207, at which the TDA 202 can grab and align the tubular 111 with the wellbore center 203 for connection with the drill string 120 or align the tubular 111 with a portion of the catwalk 131, permitting the tubular 111 to be lowered onto the catwalk 131, which may then move the tubular 111 from the rig floor 114 to the ground level (e.g., the wellsite surface 104). The THP 207 may be horizontally aligned with the doping area 206, such as may permit a tubular 111 to be doped and/or washed by the doper 209 before the TDA 202 aligns the tubular along the wellbore center 203 for connection with the drill string 120 or positions the tubular 111 to be lowered by the catwalk 131. The UTC 242 and LTC 244 may each carry or comprise one or more corresponding sensors 250, 252 operable to generate sensor measurements indicative of extension or horizontal positions 247, 249 of the corresponding clamps 246, 248.

The support structure 112, the vertical rack 165, or another portion of the wellsite system 200 may further support an intermediate tubular constraint (ITC) 236 operable to grab a tubular 111 supported by the TDA 202 via a grabber or clamp 238, stabilize the tubular 111, and/or horizontally move 235 the tubular 111 to align the tubular 111 with the mouse hole center 205 or the doping area 206. The ITC 236 may carry or comprise one or more sensors 240 operable to generate sensor measurements indicative of extension or horizontal position 235 of the clamp 238.

The support structure 112, the vertical rack 165, or another portion of the wellsite system 200 may further support a transfer bridge racker (TBR) 254 and a setback guide arm (SGA) 262, a collectively operable to store (e.g., hang, rack) the tubulars 111 in the FIB 166 of the vertical rack 165 within or above the setback 164. For example, the TBR 254 may be operable to grab an upper portion of a tubular 111 via a grabber or clamp 256 and move the tubular 111 horizontally and/or vertically between the FIB 166 and the THP 207, as indicated by arrows 258. The TBR 254 may carry or comprise one or more corresponding sensors 260 operable to generate sensor measurements indicative of the horizontal and/or vertical position 258 of the clamp 256. The SGA 262 may be operable to grab a lower portion of the tubular 111 via a grabber or clamp 264 and guide the lower portion of the tubular 111 horizontally and/or vertically between the setback 164 and the THP 207, as indicated by arrows 266, in unison (i.e., synchronously) with the TBR 254. The SGA 262 may carry or comprise one or more corresponding sensors 268 operable to generate sensor measurements indicative of the horizontal and/or vertical position 266 of the clamp 264. When the tubular 111 is aligned with the THP 207, the TDA 202 can grab and align the tubular 111 with the wellbore center 203 for connection with the drill string 120 or align the tubular with a portion of the catwalk 131, permitting the tubular 111 to be lowered onto the catwalk 131.

The UTC 242, the ITC 236, and the LTC 244 may temporarily grasp a tubular 111 while in the THP 207, such as while the TBR 254, the SGA 262, and the TDA 202 are performing other operations. One or more of the UTC 242, the ITC 236, and the LTC 244 may also be extendable to grasp a tubular 111 in (or move the tubular 111 to) the MOH 204. For example, the tubular 111 may be temporarily stored in the MOH 204 while awaiting addition to the drill string 120 or while awaiting transfer to the THP 207 and/or the FIB 166/setback 164.

The catwalk 131 may comprise a skate 133 movable along a groove (not shown) extending longitudinally along the catwalk 131. The skate 133 may be driven along the groove by a drive system 270, such as a winch system comprising a spool 272 driven by a motor (not shown). The drive system 270 may be selectively operable to pull the skate 133 in opposing directions along the catwalk 131 via a line 274 extending between the spool 272 and the skate 133. Actuated by the drive system 270, the skate 133 may be operable to convey (e.g., push) a tubular 111 along the catwalk 131 to the rig floor 114. The skate 133 may move the box end of the tubular 111 into the clamp 210 of the TDA 202, such that the tubular 111 can be lifted by the TDA 202. The drive system 270 may carry or comprise one or more corresponding sensors 276 operable to generate sensor measurements indicative of rotational position of the spool 272 and, thus, position of the skate 133 along the catwalk 131.

The sensors 218, 276 may be or comprise, for example, encoders, rotary potentiometers, and/or rotary variable-differential transformers (RVDTs). The sensors 220 may be or comprise, for example, strain gauges and/or load cells. The sensors 211, 226 may be or comprise, for example, proximity sensors and Hall effect sensors. The sensors 232, 240, 250, 252, 260, 268 may be or comprise, for example, encoders, rotary potentiometers, linear potentiometers, or rotary variable-differential transformers (RVDTs).

Figure 3:
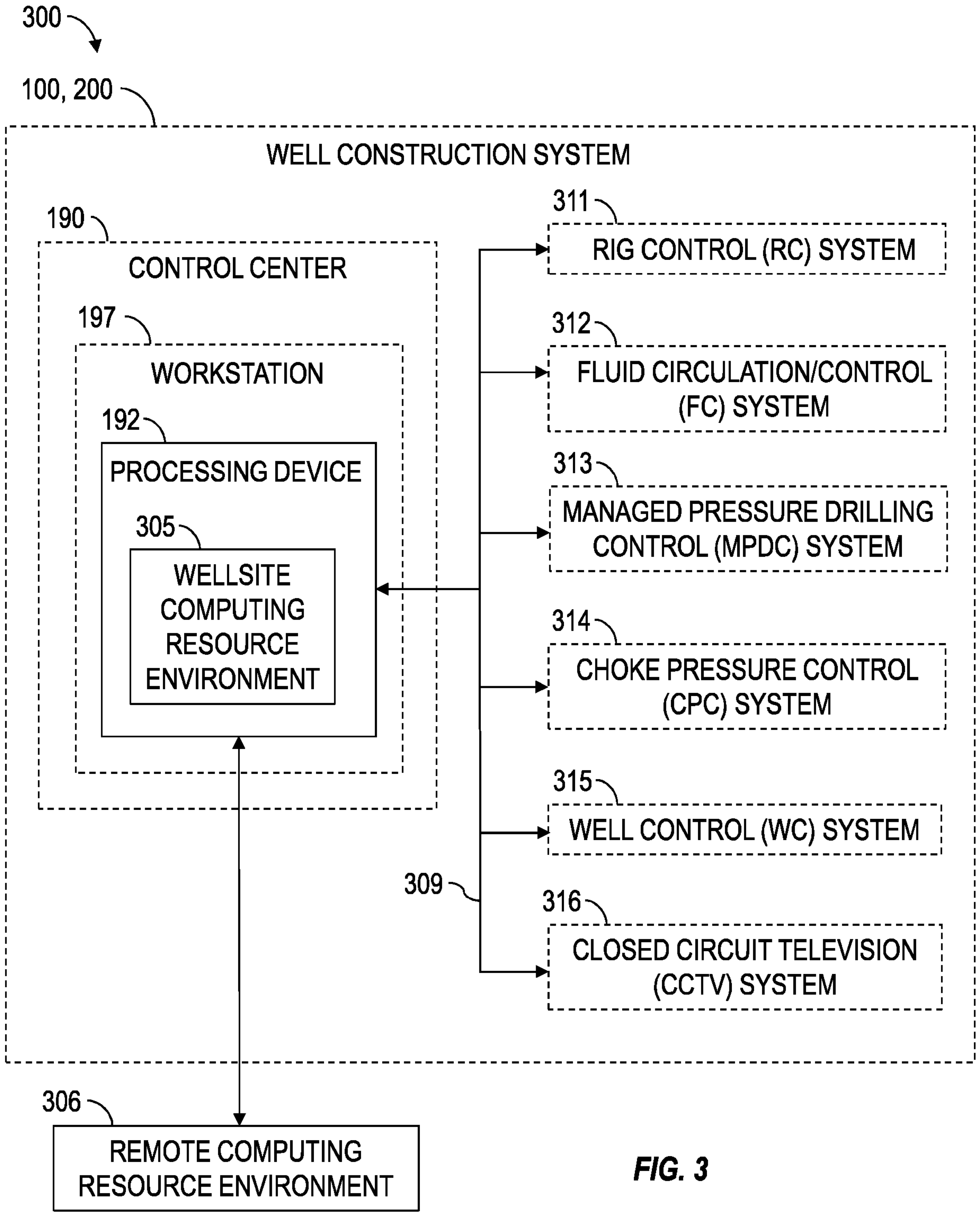
FIG. 3 is a schematic view of at least a portion of an example implementation of apparatus or a system according to one or more aspects of the present disclosure.

The present disclosure further provides various implementations of systems and/or methods for controlling one or more portions of the well construction system 100 and the wellsite system 200. Because the wellsite system 200 may form a portion of and/or operate in conjunction with the well construction system 100, the well construction system 100 and the wellsite system 200 are hereinafter referred to collectively as a well construction system 100, 200. FIG. 3 is a schematic view of at least a portion of an example implementation of a monitoring and control system 300 for monitoring and controlling various equipment, portions, and subsystems of the well construction system 100, 200 according to one or more aspects of the present disclosure. The following description refers to FIGS. 1-3, collectively.

The control system 300 may be in real-time communication with the well construction system 100, 200 and may be utilized to monitor and/or control various portions, components, and equipment of the well construction system 100, 200. The equipment of the well construction system 100, 200 may be grouped into several subsystems, each operable to perform a corresponding operation and/or a portion of the well construction operations described herein. The subsystems may include a rig control (RC) system 311, a fluid circulation (FC) system 312, a managed pressure drilling control (MPDC) system 313, a choke pressure control (CPC) system 314, a well pressure control (WC) system 315, and a closed-circuit television (CCTV) system 316, among other examples. The control workstation 197 may be utilized to monitor, configure, control, and/or otherwise operate one or more of the well construction subsystems 311-316.

The RC system 311 may include the support structure 112, the drill string hoisting system or equipment (e.g., the DW 119), the drill string rotational system (e.g., the top drive 116 and/or the rotary table and kelly), the reciprocating slips 161, the drill pipe handling system or equipment (e.g., the catwalk 131, the TDA 202, the setback 164, the FIB 166, the TBR 254, the SGA 262, the LTC 244, the ITC 236, the UTC 242, the LSA 228, and the RN 151), electrical generators, and other equipment. Accordingly, the RC system 311 may perform power generation and/or distribution, and may control drill pipe handling, hoisting, and rotation operations. The RC system 311 may also serve as a support platform for drilling equipment and staging ground for rig operations, such as connection make-up and break-out operations described above.

The FC system 312 may include the drilling fluid 140, the pumps 144, drilling fluid loading and/or mixing equipment, the drilling fluid reconditioning equipment 170, the flare stack 172, and/or other fluid control equipment. Accordingly, the FC system 312 may perform fluid operations of the well construction system 100.

The MPDC system 313 may include the RCD 138, the choke manifold 162, downhole pressure sensors 186, and/or other equipment. The CPC system 314 may comprise the choke manifold 173 and/or other equipment. The WC system 315 may comprise the BOP equipment 130, 132, 138, the BOP control unit 137, and a BOP control station (not shown) for controlling the BOP control unit 137.

The CCTV system 316 may include the video cameras 198 and corresponding actuators (e.g., motors) for moving or otherwise controlling direction of the video cameras 198. The CCTV system 316 may be utilized to capture real-time video of various portions or subsystems 311-315 of the well construction system 100 and display video signals from the video cameras 198 on the video output devices 196 to display in real-time the various portions or subsystems 311-315.

Each of the well construction subsystems 311-316 may further comprise various communication equipment (e.g., modems, network interface cards/circuits, etc.) and communication conductors (e.g., cables), communicatively connecting the equipment (e.g., sensors and actuators) of each subsystem 311-316 with the control workstation 197 and/or other equipment. Although the wellsite equipment listed above and shown in FIGS. 1 and 2 is associated with certain wellsite subsystems 311-316, such associations are merely examples that are not intended to limit or prevent such wellsite equipment from being associated with two or more wellsite subsystems 311-316 and/or different wellsite subsystems 311-316.

The control system 300 may include a wellsite computing resource environment 305, which may be located at the wellsite 104 as part of the well construction system 100, 200. The control system 300 may also include a remote computing resource environment 306, which may be located offsite (i.e., not at the wellsite 104). The control system 300 may also include various local controllers (e.g., controllers 341-346 shown in FIG. 4) associated with the subsystems 311-316 and/or individual components or equipment of the well construction system 100, 200. As described above, each subsystem 311-316 of the well construction system 100, 200 may include actuators (e.g., actuators 331-336 shown in FIG. 4) and sensors (e.g., sensors 321-326 shown in FIG. 4) for performing operations of the well construction system 100, 200. These actuators and sensors may be monitored and/or controlled via the wellsite computing resource environment 305, the remote computing resource environment 306, and/or the corresponding local controllers. For example, the wellsite computing resource environment 305 and/or the local controllers may be operable to monitor the sensors of the wellsite subsystems 311-316 in real-time, and to provide real-time control commands to the subsystems 311-316 based on the received sensor data. Data may be generated by sensors and/or computation and may be utilized for coordinated control among two or more of the subsystems 311-316.

The control system 300 may be in real-time communication with the various components of the well construction system 100, 200. For example, the local controllers may be in communication with various sensors and actuators of the corresponding subsystems 311-316 via local communication networks (not shown), and the wellsite computing resource environment 305 may be in communication with the subsystems 311-316 via a data bus or network 309. As described below, data or sensor signals generated by the sensors of the subsystems 311-316 may be made available for use by processes (e.g., processes 374, 375 shown in FIG. 4) and/or devices of the wellsite computing resource environment 305. Similarly, data or control signals generated by the processes and/or devices of the wellsite computing resource environment 305 may be automatically communicated to various actuators of the subsystems 311-316, perhaps pursuant to predetermined programming, such as to facilitate well construction operations and/or other operations described herein.

The remote computing resource environment 306, the wellsite computing resource environment 305, and the subsystems 311-316 of the well construction system 100, 200 may be communicatively connected with each other via a network connection, such as via a wide-area-network (WAN), a local-area-network (LAN), and/or other networks also within the scope of the present disclosure. A "cloud" computing environment is one example of a remote computing resource environment 306. The wellsite computing resource environment 305 may be or form at least a portion of the processing device 192 and, thus, may form a portion of or be communicatively connected with the control workstation 197.

Figure 4:
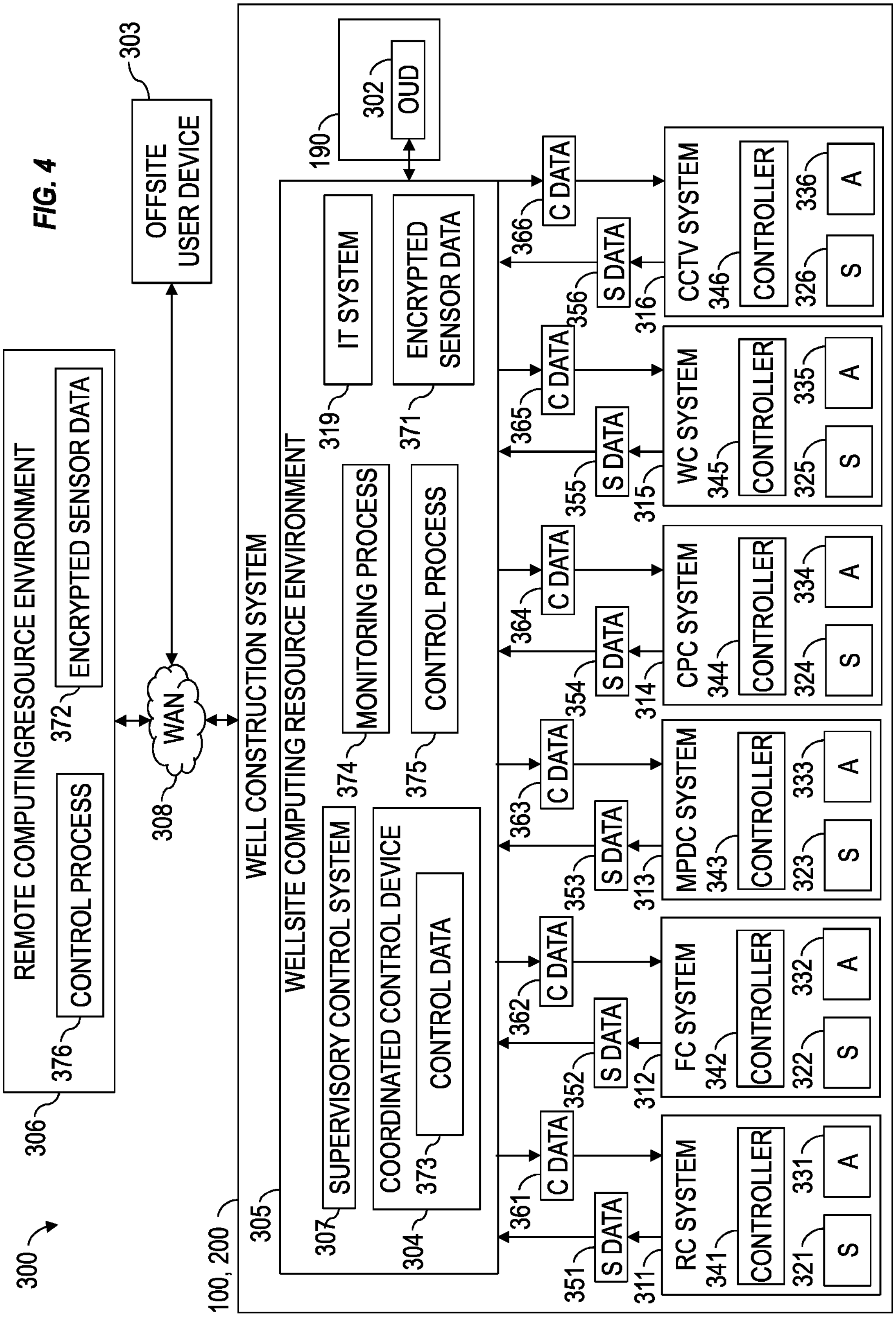
FIG. 4 is a schematic view of at least a portion of an example implementation of apparatus or a system according to one or more aspects of the present disclosure.

FIG. 4 is a schematic view of an example implementation of the control system 300 shown in FIG. 3 communicatively connected with the subsystems 311-316 of the well construction system 100, 200, including the RC system 311, the FC system 312, the MPDC system 313, the CPC system 314, the WC system 315, and the CCTV system 316. The following description refers to FIGS. 1-4, collectively.

The well construction system 100, 200 may include one or more onsite user devices (OUD) 302 communicatively connected with the wellsite computing resource environment 305. The onsite user devices 302 may be or comprise stationary user devices intended to be stationed at the well construction system 100, 200 and/or portable user devices. For example, the onsite user devices 302 may include a desktop computer, a laptop computer, a smartphone and/or other portable smart device, a personal digital assistant (PDA), a tablet/touchscreen computer, a wearable computer, and/or other devices. The onsite user devices 302 may be operable to communicate with the wellsite computing resource environment 305 of the well construction system 100, 200 and/or the remote computing resource environment 306. At least one of the onsite user devices 302 may be or comprise at least a portion of the control workstation 197 shown in FIG. 1 and/or the processing device 192 shown in FIGS. 1 and 3, which may be located within the facility 191.

The wellsite computing resource environment 305 and/or other portions of the well construction system 100, 200 may further comprise an information technology (IT) system 319 operable to communicatively interconnect various portions of the wellsite computing resource environment 305 and/or to communicatively connect the wellsite computing resource environment 305 with other portions of the well construction system 100, 200. The IT system 319 may include communication conduits, software, computers, and/or other IT equipment facilitating communication among one or more portions of the wellsite computing resource environment 305 and/or between the wellsite computing resource environment 305 and another portion of the well construction system 100, 200, such as the remote computing resource environment 306, the onsite user device 302, and the subsystems 311-316.

The control system 300 may include (or otherwise be utilized in conjunction with) one or more offsite user devices 303. The offsite user devices 303 may be or comprise a desktop computer, a laptop computer, a smartphone and/or other portable smart device, a PDA, a tablet/touchscreen computer, a wearable computer, and/or other devices. The offsite user devices 303 may be operable to receive and/or transmit information (e.g., for monitoring functionality) from and/or to the well construction system 100, 200, such as by communication with the wellsite computing resource environment 305 via the network 308. The offsite user devices 303 may be utilized just for monitoring functions. However, one or more of the offsite user devices 303 may be utilized to provide control processes for controlling operation of the various subsystems 311-316 of the well construction system 100, 200. The offsite user devices 303 and/or the wellsite computing resource environment 305 may also be operable to communicate with the remote computing resource environment 306 via the network 308. The network 308 may be a WAN, such as the internet, a cellular network, a satellite network, other WANs, and/or combinations thereof.

The subsystems 311-316 of the well construction system 100, 200 and the control system 300 may include sensors 321-326, actuators 331-336, and local controllers 341-346. The controllers 341-346 may be programmable logic controllers (PLCs) and/or other controllers having aspects similar to the example processing device 1000 shown in FIG. 23. The RC system 311 may include one or more sensors 321, one or more actuators 331, and one or more controllers 341. The FC system 312 may include one or more sensors 322, one or more actuators 332, and one or more controllers 342. The MPDC system 313 may include one or more sensors 323, one or more actuators 333, and one or more controllers 343. The CPC system 314 may include one or more sensors 324, one or more actuators 334, and one or more controllers 344 (e.g., a BOP control station 470 shown in FIG. 6). The WC system 315 may include one or more sensors 325, one or more actuators 335, and one or more controllers 345. The CCTV system 316 may include one or more sensors 326, one or more actuators 336, and one or more controllers 346.

The sensors 321-326 may include sensors utilized for operation of the various subsystems 311-316 of the well construction system 100, 200. For example, the sensors 321-326 may include cameras, position sensors, pressure sensors, temperature sensors, flow rate sensors, vibration sensors, current sensors, voltage sensors, resistance sensors, gesture detection sensors or devices, voice actuated or recognition devices or sensors, and/or other examples.

The sensors 321-326 may be operable to provide sensor data to the wellsite computing resource environment 305, such as to the coordinated control device 304. For example, the sensors 321-326 may provide sensor data 351-356, respectively. The sensor data 351-356 may include signals or information indicative of equipment operation status (e.g., on or off, up or down, set or release, etc.), drilling parameters (e.g., depth, hook load, torque, etc.), auxiliary parameters (e.g., vibration data of a pump), flow rate, temperature, operational speed, position, and pressure, among other examples. The acquired sensor data 351-356 may include or be associated with a timestamp (e.g., date and/or time) indicative of when the sensor data 351-356 was acquired. The sensor data 351-356 may also or instead be aligned with a depth, time, and/or other drilling parameter.

Acquiring the sensor data 351-356 at the coordinated control device 304 may facilitate measurement of the same physical properties at different locations of the well construction system 100, 200, wherein the sensor data 351-356 may be utilized for measurement redundancy to permit continued well construction operations. Measurements of the same physical properties at different locations may also be utilized for detecting equipment conditions among different physical locations at the wellsite surface 104 or within the wellbore 102. Variation in measurements at different wellsite locations over time may be utilized to determine equipment performance, system performance, scheduled maintenance due dates, and the like. For example, slip status (e.g., set or unset) may be acquired from the sensors 321 and communicated to the wellsite computing resource environment 305. Acquisition of fluid samples may be measured by a sensor, such as the sensors 186, 323, and related with bit depth and time measured by other sensors. Acquisition of data from the video cameras 198, 325 may facilitate detection of arrival and/or installation of materials or equipment at the well construction system 100, 200. The time of arrival and/or installation of materials or equipment may be utilized to evaluate degradation of material, scheduled maintenance of equipment, and other evaluations.

The coordinated control device 304 may facilitate control of one or more of the subsystems 311-316 at the level of each individual subsystem 311-316. For example, in the FC system 312, sensor data 352 may be fed into the controller 342, which may respond to control the actuators 332. However, for control operations that involve multiple systems, the control may be coordinated through the coordinated control device 304. For example, coordinated control operations may include the control of downhole pressure during tripping. The downhole pressure may be affected by each of the FC system 312 (e.g., pump rate), the MPDC 313 (e.g., choke position of the MPDC), and the RC system 311 (e.g., tripping speed). Thus, when it is intended to maintain certain downhole pressure during tripping, the coordinated control device 304 may be utilized to direct the appropriate control commands to two or more (or each) of the participating subsystems.

Control of the subsystems 311-316 of the well construction system 100, 200 may be provided via a three-tier control system that includes a first tier of the local controllers 341-346, a second tier of the coordinated control device 304, and a third tier of the supervisory control system 307. Coordinated control may also be provided by one or more controllers 341-346 of one or more of the subsystems 311-316 without the use of a coordinated control device 304. In such implementations of the control system 300, the wellsite computing resource environment 305 may provide control processes directly to these controllers 341-346 for coordinated control.

The sensor data 351-356 may be received by the coordinated control device 304 and utilized for control of the subsystems 311-316. The sensor data 351-356 may be encrypted to produce encrypted sensor data 371. For example, the wellsite computing resource environment 305 may encrypt sensor data from different types of sensors and systems to produce a set of encrypted sensor data 371. Thus, the encrypted sensor data 371 may not be viewable by unauthorized user devices (either offsite user devices 303 or onsite user devices 302) if such devices gain access to one or more networks of the well construction system 100, 200. The encrypted sensor data 371 may include a timestamp and an aligned drilling parameter (e.g., depth), as described above. The encrypted sensor data 371 may be communicated to the remote computing resource environment 306 via the network 308 and stored as encrypted sensor data 372.

The wellsite computing resource environment 305 may provide the encrypted sensor data 371, 372 available for viewing and processing offsite, such as via the offsite user devices 303. Access to the encrypted sensor data 371, 372 may be restricted via access control implemented in the wellsite computing resource environment 305. The encrypted sensor data 371, 372 may be provided in real-time to offsite user devices 303 such that offsite personnel may view real-time status of the well construction system 100, 200 and provide feedback based on the real-time sensor data. For example, different portions of the encrypted sensor data 371, 372 may be sent to the offsite user devices 303. The encrypted sensor data 371, 372 may be decrypted by the wellsite computing resource environment 305 before transmission, and/or decrypted on the offsite user device 303 after encrypted sensor data is received. The offsite user device 303 may include a thin client (not shown) configured to display data received from the wellsite computing resource environment 305 and/or the remote computing resource environment 306. For example, multiple types of thin clients (e.g., devices with display capability and minimal processing capability) may be utilized for certain functions or for viewing various sensor data 351-356.

The wellsite computing resource environment 305 may include various computing resources utilized for monitoring and controlling operations, such as one or more computers having a processor and a memory. For example, the coordinated control device 304 may include a processing device (e.g., processing device 1000 shown in FIG. 23) having a processor and memory for processing the sensor data, storing the sensor data, and issuing control commands responsive to the sensor data. As described above, the coordinated control device 304 may control various operations of the subsystems 311-316 via analysis of sensor data 351-356 from one or more of the wellsite subsystems 311-316 to facilitate coordinated control between the subsystems 311-316. The coordinated control device 304 may generate control data 373 (e.g., signals, commands, coded instructions) to execute control of the subsystems 311-316. The coordinated control device 304 may transmit the control data 373 to one or more subsystems 311-316. For example, control data 361 may be sent to the RC system 311, control data 362 may be sent to the FC system 312, control data 363 may be sent to the MPDC system 313, control data 364 may be sent to the CPC system 314, control data 365 may be sent to the WC system 315, and control data 366 may be sent to the CCTV system 316. The control data 361-366 may include, for example, wellsite operator commands (e.g., turn on or off a pump, switch on or off a valve, update a physical property set-point, etc.). The coordinated control device 304 may include a fast control loop that directly obtains sensor data 351-356 and executes, for example, a control algorithm. The coordinated control device 304 may include a slow control loop that obtains data via the wellsite computing resource environment 305 to generate control commands.

The coordinated control device 304 may intermediate between the supervisory control system 307 and the local controllers 341-346 of the subsystems 311-316, such as may permit the supervisory control system 307 to control the subsystems 311-316. The supervisory control system 307 may include, for example, devices for entering control commands to perform operations of the subsystems 311-316. The coordinated control device 304 may receive commands from the supervisory control system 307, process such commands according to a rule (e.g., an algorithm based upon the laws of physics for drilling operations), and provide control data to one or more subsystems 311-316. The supervisory control system 307 may be provided by the wellsite operator 195 and/or process monitoring and control program. In such implementations, the coordinated control device 304 may coordinate control between discrete supervisory control systems and the subsystems 311-316 while utilizing control data 361-366 that may be generated based on the sensor data 351-356 received from the subsystems 311-316 and analyzed via the wellsite computing resource environment 305. The coordinated control device 304 may receive the control data 351-356 and then dispatch control data 361, including interlock commands, to each subsystem 311-316. The coordinated control device 304 may also or instead just monitor the control data 351-356 being dispatched to each subsystem 321-326 and then initiate the machine interlock commands to the relevant local controller 341-346.

The coordinated control device 304 may run with different levels of autonomy. For example, the coordinated control device 304 may operate in an advice mode to inform the wellsite operators 195 to perform a specific task or take specific corrective action based on sensor data 351-356 received from the various subsystems 311-316. While in the advice mode, the coordinated control device 304 may, for example, advise or instruct the wellsite operator 195 to perform a standard work sequence when gas is detected on the rig floor 114, such as to close the annular BOP 132. Furthermore, if the wellbore 102 is gaining or losing drilling fluid 140, the coordinated control device 304 may, for example, advise or instruct the wellsite operator 195 to modify the density of the drilling fluid 140, modify the pumping rate of the drilling fluid 140, and/or modify the pressure of the drilling fluid within the wellbore 102.

The coordinated control device 304 may also operate in a system/equipment interlock mode, whereby certain operations or operational sequences are prevented based on the received sensor data 351-356. While operating in the interlock mode, the coordinated control device 304 may manage interlock operations among the various equipment of the subsystems 311-316. For example, if a pipe ram of the BOP stack 130 is activated, the coordinated control device 304 may issue an interlock command to the RC system controller 341 to stop the DW 119 from moving the drill string 120. However, if a shear ram of the BOP stack 130 is activated, the coordinated control device 304 may issue an interlock command to the controller 341 to operate the DW 119 to adjust the position of the drill string 120 within the BOP stack 130 before activating the shear ram, so that the shear ram does not align with a shoulder of the tubulars forming the drill string 120.

The coordinated control device 304 may also operate in an automated sequence mode, whereby certain operations or operational sequences are automatically performed based on the received sensor data 351-356. For example, the coordinated control device 304 may automatically activate an alarm and/or stop or reduce operating speed of the pipe handling equipment when a wellsite operator 195 is detected close to a moving RN 151, the TDA 202, the LSA 228, the LTC 244, or the catwalk 131. As another example, if the wellbore pressure increases rapidly, the coordinated control device 304 may automatically close the annular BOP 132, close one or more rams of the BOP stack 130, and/or adjust the choke manifold 162.

The wellsite computing resource environment 305 may comprise or execute a monitoring process 374 (e.g., an event detection process) that may utilize the sensor data 351-356 to determine information about status of the well construction system 100, 200 and automatically initiate an operational action, a process, and/or a sequence of one or more of the subsystems 311-316. The monitoring process 374 may initiate the operational action to be caused by the coordinated control device 304. Depending on the type and range of the sensor data 351-356 received, the operational actions may be executed in the advice mode, the interlock mode, or the automated sequence mode.

For example, the monitoring process 374 may determine a drilling state, equipment health, system health, a maintenance schedule, or combination thereof, and initiate an advice to be generated. The monitoring process 374 may also detect abnormal drilling events, such as a wellbore fluid loss and gain, a wellbore washout, a fluid quality issue, or an equipment event based on job design and execution parameters (e.g., wellbore, drilling fluid, and drill string parameters), current drilling state, and real-time sensor information from the surface equipment 110 (e.g., presence of hazardous gas at the rig floor, presence of wellsite operators in close proximity to moving pipe handling equipment, etc.) and the BHA 124, initiating an operational action in the automated mode. The monitoring process 374 may be connected to the real-time communication network 309. The coordinated control device 304 may initiate a counteractive measure (e.g., a predetermined action, process, or operation) based on the events detected by the monitoring process 374.

The term “event” as used herein may include, but not be limited to, an operational and/or safety related event described herein and/or another operational and safety related event that can take place at a well construction system 100, 200. The events described herein may be detected by the monitoring process 374 based on the sensor data 351-356 (e.g., sensor signals or information) received and analyzed by the monitoring process 374.

The wellsite computing resource environment 305 may also comprise or execute a control process 375 that may utilize the sensor data 351-356 to optimize drilling operations, such as the control of drilling equipment to improve drilling efficiency, equipment reliability, and the like. For example, the acquired sensor data 352 may be utilized to derive a noise cancellation scheme to improve electromagnetic and/or mud-pulse telemetry signal processing. The remote computing resource environment 306 may comprise or execute a control process 376 substantially similar to the control process 375 that may be provided to the wellsite computing resource environment 305. The monitoring and control processes 374, 375, 376 may be implemented via, for example, a control algorithm, a computer program, firmware, or other hardware and/or software.

The wellsite computing resource environment 305 may include various computing resources, such as a single computer or multiple computers. The wellsite computing resource environment 305 may further include a virtual computer system and a virtual database or other virtual structure for collected data, such as may include one or more resource interfaces (e.g., web interfaces) that facilitate the submission of application programming interface (API) calls to the various resources through a request. In addition, each of the resources may include one or more resource interfaces that facilitate the resources accessing each other (e.g., to facilitate a virtual computer system of the computing resource environment to store data in or retrieve data from the database or other structure for collected data). The virtual computer system may include a collection of computing resources configured to instantiate virtual machine instances. A wellsite operator 195 may interface with the virtual computer system via the offsite user device 303 or the onsite user device 302. Other computer systems or computer system services may be utilized in the wellsite computing resource environment 305, such as a computer system or computer system service that provides computing resources on dedicated or shared computers/servers and/or other physical devices. The wellsite computing resource environment 305 may include a single server (in a discrete hardware component or as a virtual server) or multiple servers (e.g., web servers, application servers, or other servers). The servers may be, for example, computers arranged in physical and/or virtual configuration.

The wellsite computing resource environment 305 may also include a database that may be or comprise a collection of computing resources that run one or more data collections. Such data collections may be operated and managed by utilizing API calls. The data collections, such as the sensor data 351-356, may be made available to other resources in the wellsite computing resource environment 305, or to user devices (e.g., onsite user device 302 and/or offsite user device 303) accessing the wellsite computing resource environment 305. The remote computing resource environment 306 may include computing resources similar to those described above, such as a single computer or multiple computers (in discrete hardware components or virtual computer systems).

Figure 5:
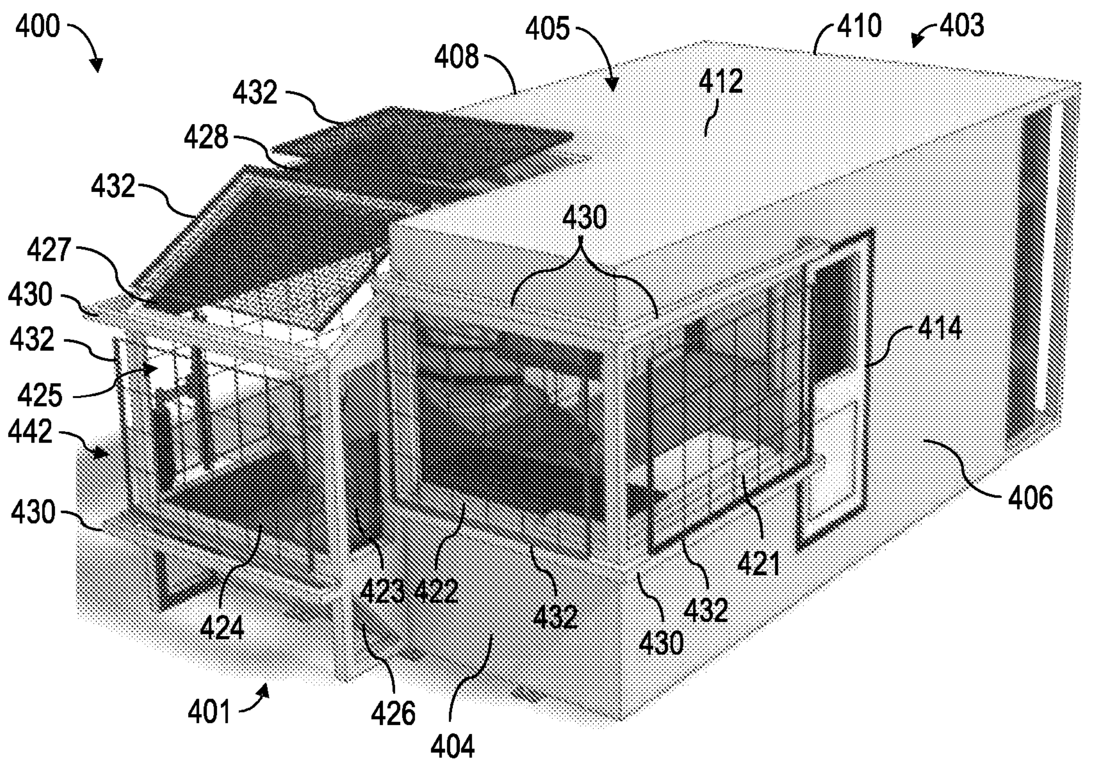
FIG. 5 is a perspective view of at least a portion of an example implementation of apparatus according to one or more aspects of the present disclosure.
Figure 6:
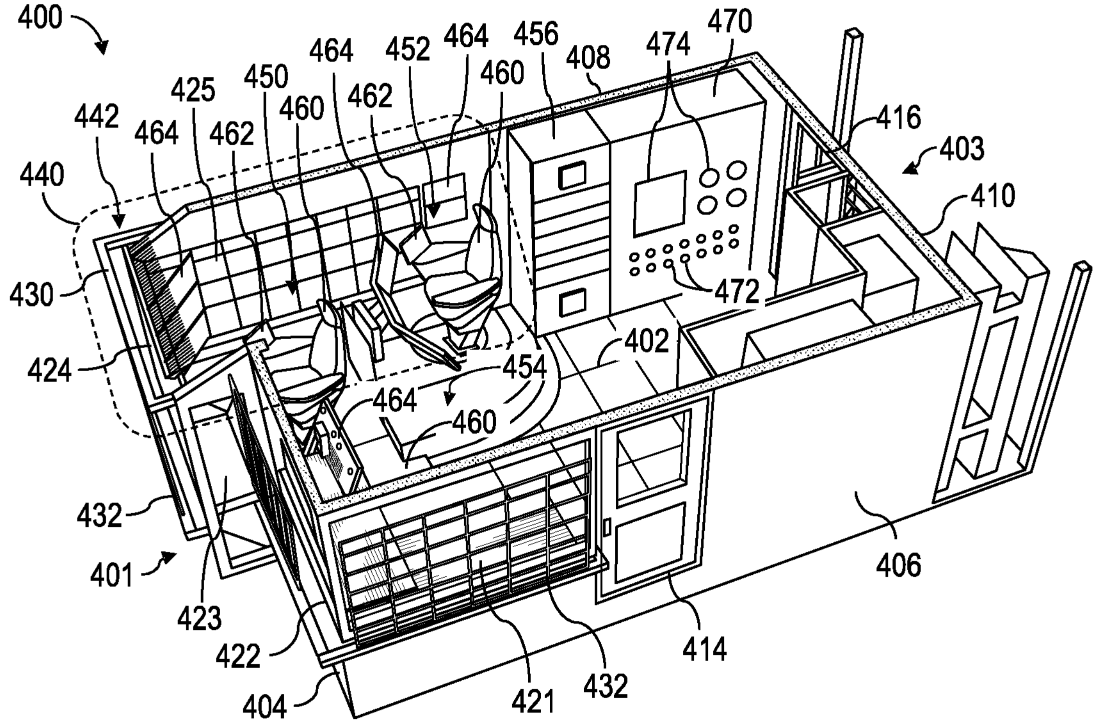
FIG. 6 is a perspective view of a portion of the apparatus shown in FIG. 5 according to one or more aspects of the present disclosure.

FIGS. 5 and 6 are perspective and sectional views of at least a portion of an example implementation of a control center 400 according to one or more aspects of the present disclosure. The control center 400 may be or form at least a portion of the control center 190 shown in FIG. 1. The following description refers to FIGS. 1-6, collectively.

The control center 400 comprises a facility 405 (e.g., a room, a cabin, a trailer, etc.) containing various control devices for monitoring and controlling the subsystems 311-316 and other portions of the well construction system 100, 200. The facility 405 may comprise a front side 401 and a rear side 403. The front side 401 may be directed toward or located closest to the drill string 120 being constructed by the well construction system 100, 200. The rear side 403 may be directed away from the drill string 120. The facility 405 may comprise a floor 402, a front wall 404, a left wall 406, a right wall 408, a rear wall 410, and a roof 412. The facility 405 may also have a side door 414, a rear door 416, and a plurality of windows 421-428 in one or more of the walls 404, 406, 408, 410 and/or the roof 412. Each of the windows 421-428 may be surrounded by structural framing 430 connected with the walls and supporting window safety guards 432 (e.g., bars, grills) in front of or along the windows 421-428.

The facility 405 may have an observation area 440 at the front side 401 of the facility 405 from which a wellsite operator 195 may have a direct view of the drill string 120, the rig floor 114, and/or other portions of the well construction system 100, 200. The observation area 440 may be surrounded or defined by windows 423-428 on several sides to increase the wellsite operator's 195 horizontal and vertical angle of view of the well constriction system 100. A portion 442 of the observation area 440 (e.g., windows 423-427) may protrude or extend out past other portions of the facility 405 (e.g., front wall 404) to facilitate the view of the well construction system 100, 200 by the wellsite operators 195. The observation area 440 may be located on a side of the facility 405. The observation area 440 may be surrounded by or at least partially defined by a front window 424 permitting the wellsite operator 195 to look forward, two side windows 423, 425 permitting the wellsite operator 195 to look sideways (i.e., left and right), a lower window 426 permitting the wellsite operator 195 to look downwards, and one or more upper windows 427, 428 permitting the wellsite operator 195 to look upwards. The lower window 426 and/or at least one upper window 427 may extend diagonally with respect to the front window 424.

The control center 400 may comprise one or more wellsite operator control workstations within the facility 405. The workstations may be utilized by the wellsite operators 195 to monitor and control the subsystems 311-316 and other portions of the well construction system 100, 200. For example, the observation area 440 may contain a first control workstation 450 located adjacent the windows 423, 424, 425, 426, 428 and at least partially within the extended portion 442 of the observation area 440, such as may permit the wellsite operator 195 utilizing the control workstation 450 to have an unobstructed view of the drill string 120, the rig floor 114, and/or other portions of the well construction system 100, 200. The observation area 440 may also contain a second control workstation 452 located adjacent (e.g., behind) the first control workstation 450 and adjacent the window 425, but perhaps not within the extended portion 442 of the observation area 440. The control workstation 452 may be elevated at least partially above the control workstation 450 to reduce the obstruction of view caused by the control workstation 450 and, thus, permit the wellsite operator 195 utilizing the control workstation 452 to view the drill string 120, the rig floor 114, and/or other portions of the well construction system 100, 200 over the control workstation 450 via the front window 424. The control center 400 may also comprise a third control workstation 454 located adjacent the control workstations 450, 452 and adjacent the windows 421, 422, but not within the observation area 440.

The control center 400 may further comprise a processing device 456 (e.g., a controller, a computer, a server, etc.) operable to provide control to one or more portions of the well construction system 100, 200 and/or operable to monitor operations of one or more portions of the well construction system 100, 200. For example, the processing device 456 may be communicatively connected with the various surface and downhole equipment described herein, and may be operable to receive signals from and transmit signals to such equipment to perform various operations described herein or otherwise within the scope of the present disclosure. The processing device 456 may store executable programs, instructions, and/or operational parameters or set-points, including for implementing one or more aspects of the operations described herein. The processing device 456 may be communicatively connected with the control workstations 450, 452, 454. Although the processing device 456 is shown located within the facility 405, the processing device 456 may be located outside of the facility 405. Furthermore, although the processing device 456 is shown as a single device that is separate and distinct from the control workstations 450, 452, 454, one or more of the control workstations 450, 452, 454 may comprise a corresponding processing device 456 disposed in association with or forming at least a portion of such corresponding processing device 456.

The control workstations 450, 452, 454 may be operable to enter or otherwise communicate commands to the processing device 456 by the wellsite operator 195 and to display or otherwise communicate information from the processing device 456 to the wellsite operator 195. One or more of the control workstations 450, 452, 454 may comprise an operator chair 460 and an HMI system comprising one or more input devices 462 (e.g., a keyboard, a mouse, a joystick, a touchscreen, a microphone, etc.) and one or more output devices 464 (e.g., a video monitor, a printer, audio speakers, a touchscreen, etc.). The input and output devices 462, 464 may be disposed in association with and/or integrated with the operator chair 460 to permit the wellsite operator 195 to enter commands or other information to the processing device 456, and to view, hear, and/or otherwise receive information from the processing device 456 and other portions of the well construction system 100, 200. One or more of the control workstations 450, 452, 454 may be or form at least a portion of the control workstation 197 shown in FIG. 1, and the processing device 456 may be or form at least a portion of the processing device 192 shown in FIG. 1.

The control center 400 may further contain a BOP control station 470 (e.g., control panel) of the WC system 315 operable to monitor and control one or more portions of the WC system 315. For example, the BOP control station 470 may be communicatively connected with the BOP control unit 137 and the BOP equipment 130, 132, and may be operable to monitor and control operations of the BOP control unit 137 and the BOP equipment 130, 132.

The BOP control station 470 may be operable communicate to the BOP control unit 137 control commands entered by the wellsite operator 195 for controlling the BOP equipment 130, 132 and to display or otherwise communicate information indicative of operational status of the BOP equipment 130, 132 and the BOP control unit 137 to the wellsite operator 195. The BOP control station 470 may comprise a processing device (e.g., processing device 1000 shown in FIG. 23) operable to store executable programs, instructions, and/or operational parameters or set-points, including for implementing one or more BOP operations described herein. The BOP control station 470 may further comprise an HMI system comprising one or more input devices 472 (e.g., buttons, keys, a touchscreen, etc.) and one or more output devices 474 (e.g., a video monitor, gauges, audio speakers, a touchscreen, etc.). The input and output devices 472, 474 may be disposed in association with and/or integrated with a housing or enclosure of the BOP control station 470 to permit the wellsite operator 195 to enter commands or other information to the BOP control station 470 to control the BOP equipment 130, 132 and receive information from the BOP control station 470 to monitor operational status of the BOP equipment 130, 132.

The BOP control unit 470 may be communicatively connected with one or more of the control workstations 450, 452, 454, such as may permit monitoring and control of one or more portions of the WC system 315 via the control workstations 450, 452, 454. For example, one or more of the control workstations 450, 452, 454 or the processing device 456 may be communicatively connected directly with the processing device of the BOP control station 470 or indirectly, such as via the input and output devices 472, 474 of the BOP control station 470. Such connection may permit the control workstations 450, 452, 454 to receive information indicative of operational status of the BOP control unit 137 and the BOP equipment 130, 132 via the BOP control station 470. Such connection may further permit the control workstations 450, 452, 454 to transmit control commands to the BOP control unit 137 and the BOP equipment 130, 132 via the BOP control station 470. Such connection may also or instead facilitate control of the BOP control station 470 via the control workstations 450, 452, 454, such as may cause the BOP control station 470 to control the BOP control unit 137 and the BOP equipment 130, 132 as directed by or from the control workstations 450, 452, 454.

The control workstations 450, 452, 454 may be operable to display the information indicative of operational status of the BOP control unit 137 and the BOP equipment 130, 132 to the wellsite operator 195 via the output devices 464 to permit the wellsite operator to monitor the operational status of the BOP control unit 137 and the BOP equipment 130, 132 while sitting in the corresponding operator chair 460. The control workstations 450, 452, 454 may be further operable to receive the control commands from the wellsite operator 195 via the input devices 462 while sitting in the corresponding operator chair 460 for transmission to the BOP control station 470 to control the BOP control unit 137 and the BOP equipment 130, 132.

Figure 7:
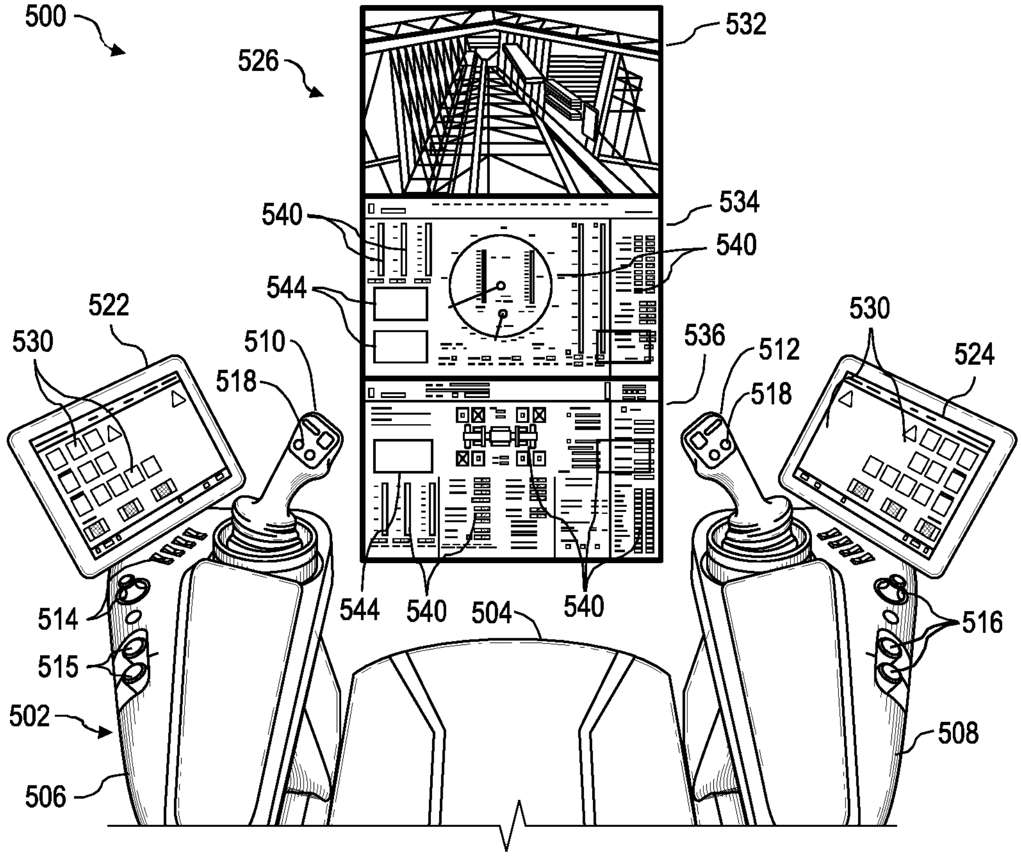
FIG. 7 is a top view of a portion of an example implementation of the apparatus shown in FIG. 6 according to one or more aspects of the present disclosure.

FIG. 7 is a top view of a portion of an example implementation of a wellsite operator control workstation 500 communicatively connected with and operable to control the well construction system 100, 200 according to one or more aspects of the present disclosure. The control workstation 500 depicted in FIG. 7 is an example implementation of the control workstations 450, 452, 454 described above. The control workstation 500 may facilitate receiving and displaying various information, such as sensor signals or information (e.g., sensor data 351-356), control commands (e.g., control data 361-366), processes taking place, events being detected, and operational status of various equipment of the subsystems 311-316 of the well construction system 100, 200. The following description refers to FIGS. 1-7, collectively.

The control workstation 500 comprises an operator chair 502 (e.g., driller's chair) and an HMI system comprising a plurality of input and output devices integrated with, supported by, or otherwise disposed in association with the operator chair 502. The input devices permit the wellsite operator 195 to enter commands or other information to control the wellsite equipment of the well construction system 100, 200, and the output devices permit the wellsite operator 195 to receive sensor signals and other information indicative of operational status of the wellsite equipment. The operator chair 502 may include a seat 504, a left armrest 506, and a right armrest 508.

The input devices of the control workstation 500 may include a plurality of physical controls, such as a left joystick 510, a right joystick 512, and/or other physical controls 514, 515, 516, 518, such as buttons, keys, switches, knobs, dials, slider bars, a mouse, a keyboard, and a microphone. One or more of the joysticks 510, 512 and/or the physical controls 514, 515, 516 may be integrated into or otherwise supported by the corresponding armrests 506, 508 of the operator chair 502 to permit the wellsite operator 195 to operate these input devices from the operator chair 502. Furthermore, one or more of the physical controls 518 may be integrated into the corresponding joysticks 510, 512 to permit the wellsite operator 195 to operate these physical controls 518 while operating the joysticks 510, 512. The physical controls may comprise emergency stop (E-stop) buttons 515, which may be electrically connected to E-stop relays of one or more pieces of wellsite equipment (e.g., the RN 151, the TDA 202, the DW 119, the LSA 228, the LTC 244, the SGA 262, the top drive 116, etc.), such that the wellsite operator 195 can shut down the wellsite equipment during emergencies and other situations.

The output devices of the control workstation 500 may include one or more video output devices 526 (e.g., video monitors), printers, speakers, and other output devices disposed in association with the operator chair 502 and operable to display to the wellsite operator 195 sensor signals and other information indicative of operational status of the well construction system 100, 200. The video output devices 526 may be implemented as one or more LCD displays, LED displays, plasma displays, cathode ray tube displays, and/or other types of displays.

The video output devices 526 may be disposed in front of or otherwise adjacent the operator chair 502. The video output devices 526 may include a plurality of video output devices 532, 534, 536, each dedicated to displaying predetermined information in a predetermined (e.g., programmed) manner. Although the video output devices 526 are shown comprising three video output devices 532, 534, 536, the video output devices 526 may be or comprise one, two, four, or more video output devices.

The video output devices 532, 534, 536 may each display in a predetermined manner selected sensor signals or information indicative of operational status of a selected portion of the well construction system 100, 200. For example, the video output devices 534, 536 may display sensor signals or information 540 (e.g., sensor data 351-356) generated by the various sensors (e.g., sensors 321-326) of the well construction system 100, 200 to permit the wellsite operator 195 to monitor operational status of the subsystems 311-316. The information 540 may be displayed in the form of virtual or computer-generated lists, menus, tables, graphs, bars, gauges, lights, and schematics, among other examples.

One or more of the video output devices 526 may be configured to display video signals (i.e., video feeds) generated by one or more of the video cameras 198. For example, the video output device 532 may be dedicated for displaying the video signals generated by one or more of the video cameras 198. When displaying the video signals from multiple video cameras 198, the video output device 532 may display multiple video windows, each displaying a corresponding video signal. Furthermore, one or more of the other video output devices 534, 536 may also display the video signals from one or more of the video cameras 198. For example, one or both of the video output devices 534, 536 may display one or more picture-in-picture (PIP) video windows 544, each displaying a video signal from a corresponding one of the video cameras 198. The PIP video windows 544 may be embedded or inset along or adjacent the sensor information 540. Sourcing (i.e., selection) of the video cameras 198 whose video signals are to be displayed on the video output devices 526 may be selected manually by the wellsite operator 195 or automated via the control system 300, such as based on operational events (e.g., drilling events, well construction operation stage, etc.) at the well construction system 100, 200, such that video signals relevant to an event currently taking place are displayed.

The control workstation 500 may further comprise combination devices operable as both input and output devices to display information to the wellsite operator 195 and receive commands or information from the wellsite operator 195. Such devices may be or comprise touchscreens 522, 524 operable to display a plurality of software (e.g., virtual, computer generated) buttons, switches, knobs, dials, icons, and/or other software controls 530 permitting the wellsite operator 195 to operate (e.g., click, select, move) the software controls 530 via finger contact with the touchscreens 522, 524 to control the various wellsite equipment of the subsystems 311-316. The software controls 530 may also be operated by the physical controls 514, 516, the joysticks 510, 512, or other input devices of the control workstation 500. The software controls 530 and/or other features displayed on the touchscreens 522, 524 may also display sensor signals or information (e.g., sensor data 351-356), operational settings, set-points, and/or status of selected wellsite equipment for viewing by the wellsite operator 195. For example, the software controls 530 may change color, move in position or direction, and/or display the sensor information, set-points, and/or operational values (e.g., temperature, pressure, position). The touchscreens 522, 524 may be disposed on, supported by, or integrated into the armrests 506, 508 or other parts of the operator chair 502 to permit the wellsite operator 195 to operate the software controls 530 displayed on the touchscreens 522, 524 from the operator chair 502.

Each video output device 526 and touchscreen 522, 524 may display (i.e., generate) a plurality of display screens (i.e., an integrated display system), each displaying to the wellsite operator 195 selected sensor signals or information 540 indicative of operational status of the well construction system 100, 200 and software controls 530 for controlling selected portions of the well construction system, respectively. Each display screen may integrate the software controls 530 and/or sensor information 540 from one or more pieces of wellsite equipment (e.g., subsystems 311-316) with information generated by the control system 300 (e.g., the monitoring process 374, the control process 375, and the control data 361-366, 373) for viewing and/or operating by the wellsite operator 195. The display screens may be shown or displayed alternately on one or more of the video output devices 526 and/or the touchscreens 522, 524 or simultaneously on one or more of these devices. The display screens intended to be displayed on the video output devices 526 and/or the touchscreens 522, 524 may be selected by the wellsite operator 195 via the physical controls 514, 516, 518 and/or software controls 530. The display screens intended to be displayed on the video output devices 526 and/or the touchscreens 522, 524 may also or instead be selected automatically by the control system 300 based on operational events detected (e.g., equipment failures, hazardous drilling conditions) or planned (e.g., changing phases or stages of the well construction operations) at the well construction system 100, 200, such that information relevant to the event currently taking place is displayed. Each display screen generated by the touchscreens 522, 524 may display software controls 530 operable by the wellsite operator 195 to control the wellsite equipment associated with the software controls 530, and each display screen generated by the video output devices 526 may display information 540 indicative of operational status of the wellsite equipment associated with the information 540. Accordingly, the display screens displayed on the touchscreens 522, 524 may be referred to hereinafter as control screens, and the display screens displayed on the video output devices 526 may be referred to hereinafter as status screens.

Figure 8:
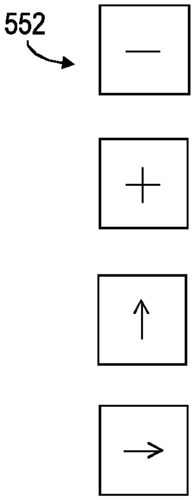
FIGS. 8-10 are example implementations of software controls displayed by the apparatus shown in FIG. 7 according to one or more aspects of the present disclosure.
Figure 9:
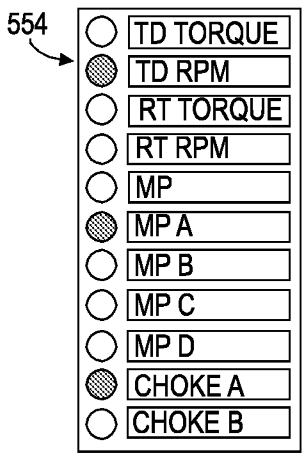
Figure 10:
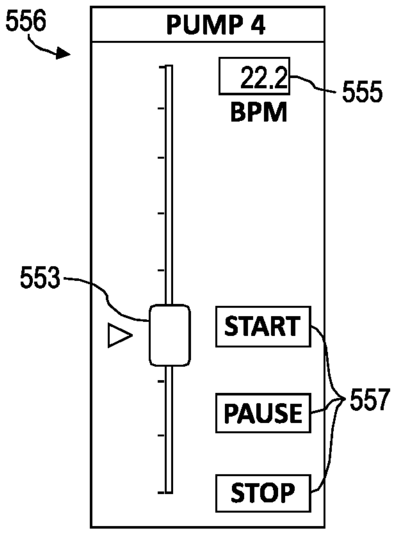

The touchscreens 522, 524 may be operable to display one or more control screens (e.g., configuration screens), which may be utilized to operate, set, adjust, configure, or otherwise control the subsystems 311-316 or other wellsite equipment. Each control screen may display one or more software controls 530, such as may permit the wellsite operator 195 to operate, set, adjust, configure, or otherwise control the subsystems 311-316 or other wellsite equipment via finger contact with the touchscreens 522, 524 from the operator chair 502. FIGS. 8-10 are example implementations of software controls 552, 554, 556 that may be displayed on the touchscreens 522, 524 and operated by the wellsite operator 195 to operate, set, adjust, configure, or otherwise control the subsystems 311-316 or other wellsite equipment of the well construction system 100, 200. The following description refers to FIGS. 7-10, collectively.

The software controls 552, 554, 556 may be pressed, clicked, selected, moved, or otherwise operated via the physical controls 514, 516 and/or via finger contact by the wellsite operator 195 to increase, decrease, change, or otherwise enter operational parameters, set-points, and/or instructions for controlling one or more pieces of wellsite equipment of the well construction system 100, 200. The software controls 552, 554, 556 may also display the entered and/or current operational parameters on or in association with the software controls 552, 554, 556 for viewing by the wellsite operator 195. The operational parameters, set-points, and/or instructions associated with the software controls 552, 554, 556 may include equipment operational status (e.g., on or off, up or down, set or release, position, speed, temperature, etc.), drilling parameters (e.g., depth, hook load, torque, etc.), auxiliary parameters (e.g., vibration data of a pump), and fluid parameters (e.g., flow rate, pressure, temperature, etc.), among other examples.

The software controls 552 may be or comprise software buttons, which may be operated to increase, decrease, change, or otherwise enter different operational parameters, set-points, and/or instructions for controlling one or more portions of the well construction system 100, 200 associated with the software controls 552. The software controls 554 may be or comprise a list or menu of items (e.g., equipment, processes, operational stages, equipment subsystems, etc.) related to one or more aspects of the well construction system 100, 200, which may be operated to select one or more items on the list. The selected items may be highlighted, differently colored, or otherwise indicated, such as via a checkmark, a circle, a dot, or other characters/icons appearing in association with the selected items. The software controls 556 may be or comprise a combination of different software controls, which may be operated to increase, decrease, change, or otherwise enter different operational parameters, set-points, and/or instructions for controlling one or more portions of the well construction system 100, 200 associated with the software controls 556, such as a pump of the well construction system 100, 200. The software controls 556 may include a slider 553, which may be moved or otherwise operated along a graduated bar to increase, decrease, or otherwise change pump speed or another operational parameter associated with the slider bar 553. The entered pump speed may be shown in a display window 555. The software controls 556 may also include software buttons 557, such as may be operated to start, pause, and stop operation of the pump or another portion of the well construction system 100, 200 associated with the software buttons 557.

FIGS. 11-15 are example implementations of control screens 601-605 (e.g., configuration screens or menus) that may be displayed on the touchscreens 522, 524 according to one or more aspects of the present disclosure. Each control screen 601-605 may be operated via finger contact with the touchscreens 522, 524 (and/or other input means) by the wellsite operator 195 to operate, set, adjust, configure, or otherwise control the subsystems 311-316 or other wellsite equipment of the well construction system 100, 200 associated with or displayed on the control screen 601-605. The following description refers to FIGS. 11-15, collectively.

Each control screen, including the control screens 601-605, may display a selection bar 610 for switching between or selecting which control screen is to be displayed on the corresponding touchscreen 522, 524 and/or which status screen is to be displayed on each of the video output devices 526. Each control screen may also comprise an equipment control area 618 for displaying software controls for controlling well construction operations and/or wellsite equipment associated with the control screen. The selection bar 610 may comprise an equipment menu button 612, which when operated by the wellsite operator 195, may cause a control screen selection menu 614 (e.g., a dropdown or pop-up menu) to appear. The selection menu 614 may contain a plurality of buttons 616, each associated with and listing a corresponding well construction operation or wellsite equipment to be controlled. The wellsite operator 195 may operate (e.g., click on, touch, and/or otherwise select) one of the buttons 616 to select a well construction operation or wellsite equipment, thereby causing a corresponding control screen for controlling the associated well construction operation or wellsite equipment to be displayed.

Figure 11:
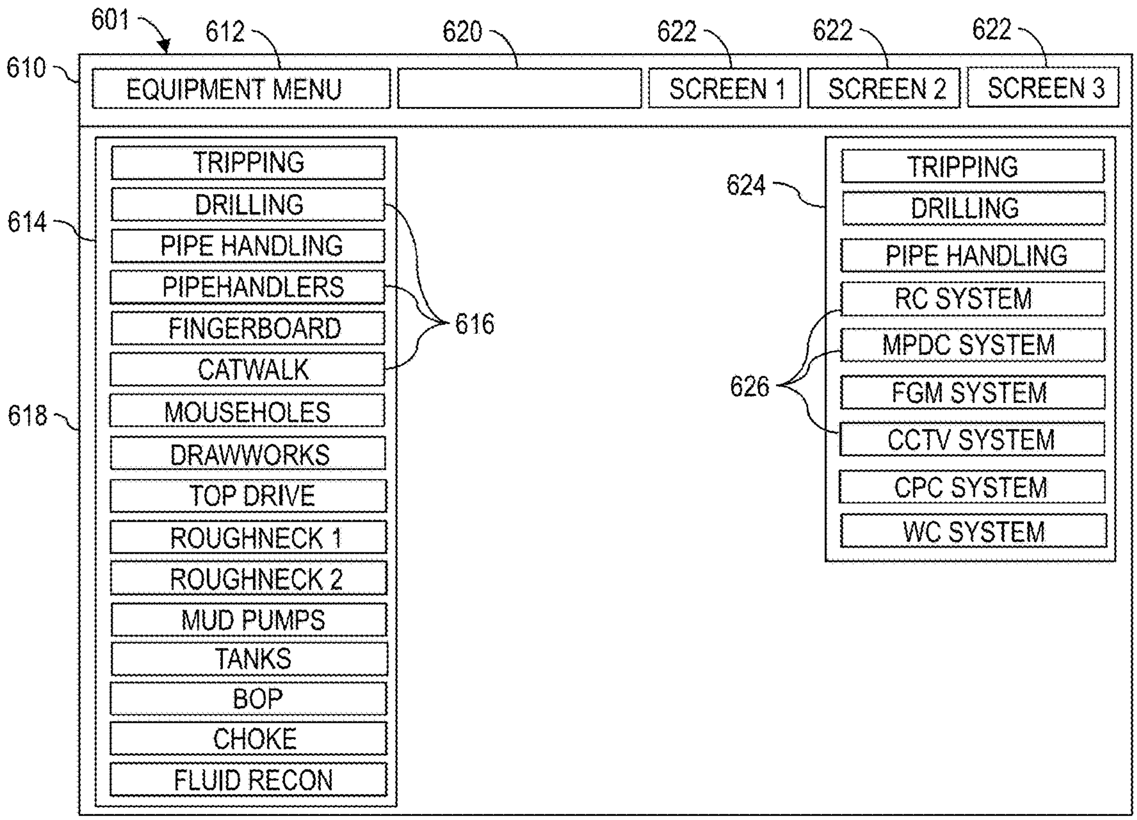

After one of the buttons 616 is selected, a plurality of software controls 630 (shown in FIGS. 12-15) may appear in the equipment control area 618, and the well construction operation or wellsite equipment that is selected may be listed or otherwise identified in a control screen identification area 620. The software controls 630 or other information displayed in the equipment control area 618 will change when the wellsite operator 195 switches between the various control screens by selecting different buttons 616. As shown in FIG. 11, example control screens that may be selected for display on the touchscreens 522, 524 may include a tripping control screen displaying software controls for controlling automatic operation of wellsite equipment collectively operable to perform tripping operations, a drilling control screen displaying software controls for controlling automatic operation of wellsite equipment collectively operable to perform drilling operations, a drill pipe handling control screen displaying software controls for controlling automatic operation of wellsite equipment collectively operable to move drill pipes at the wellsite, and a plurality of individual equipment control screens each displaying software controls for automatically and/or manually controlling operation of individual wellsite equipment, such as the catwalk 131, the TDA 202, the setback 164, the FIB 166, the TBR 254, the SGA 262, the LTC 244, the ITC 236, the UTC 242, the LSA 228, the setback 164, the catwalk 131, the top drive 116, the RN 151, the choke 162, and fluid reconditioning equipment 170, among other examples. Although not described herein, the control screens within the scope of the present disclosure may include control screens displaying software controls of other individual wellsite equipment and/or wellsite equipment subsystems (e.g., subsystems 311-316).

Each control screen, including the control screens 601-605, may also be utilized to switch between or select which status screen is to be displayed on which video output device 532, 534, 536. For example, the selection bar 610 may comprise status screen selection buttons 622, each associated with a corresponding one of the video output devices 532, 534, 536 and, when operated by the wellsite operator 195, operable to cause a corresponding status screen selection menu 624 (e.g., a dropdown or pop-up menu) to appear. Each selection menu 624 may contain a plurality of buttons 626, each associated with and listing a corresponding well construction operation, wellsite equipment, and/or subsystem (e.g., subsystem 311-316) of the well construction system 100, 200 to be displayed. The wellsite operator 195 may operate (e.g., click on, touch, and/or otherwise select) one of the buttons 622 and buttons 626 to select one of the video output devices 532, 534, 536 and a well construction operation, wellsite equipment, or subsystem, thereby causing a corresponding status screen displaying sensor signals or information 540 indicative of operational status of the selected well construction operation, wellsite equipment, or subsystem to be displayed on the selected video output device 532, 534, 536. The status screens that may be displayed on the video output devices 532, 534, 536 are described in more detail below.

When operated, the software controls 630 may activate, deactivate, start, stop, configure, or otherwise control operation of the wellsite equipment associated with the software controls 630. The software controls 630 may initiate automatic operation of the wellsite equipment associated with the control screen, such as by operating an "AUTO" software button. The software controls 630 may also cause manual control of the wellsite equipment associated with the control screen to be given to the wellsite operator 195, such as by operating a "MANUAL" software button. The software controls 630 may be grouped by related equipment and/or related operations, which may be identified by text 632 associated with each group of software controls 632.

Furthermore, each software control 630 may list or otherwise identify the piece of equipment or operation that is controlled or otherwise associated with the software control 630. One or more of the software controls 630 may list or otherwise indicate the operational status (i.e., feedback) of the wellsite equipment or operation associated with the software control 630. For example, one or more of the software controls 630 may change color, text, shape, or otherwise change to indicate that a piece of wellsite equipment associated with the software control 630 is activated, deactivated, or in a predetermined position, or that an operation associated with the software control 630 has commenced, stopped, or is in a particular stage.

Figure 12:
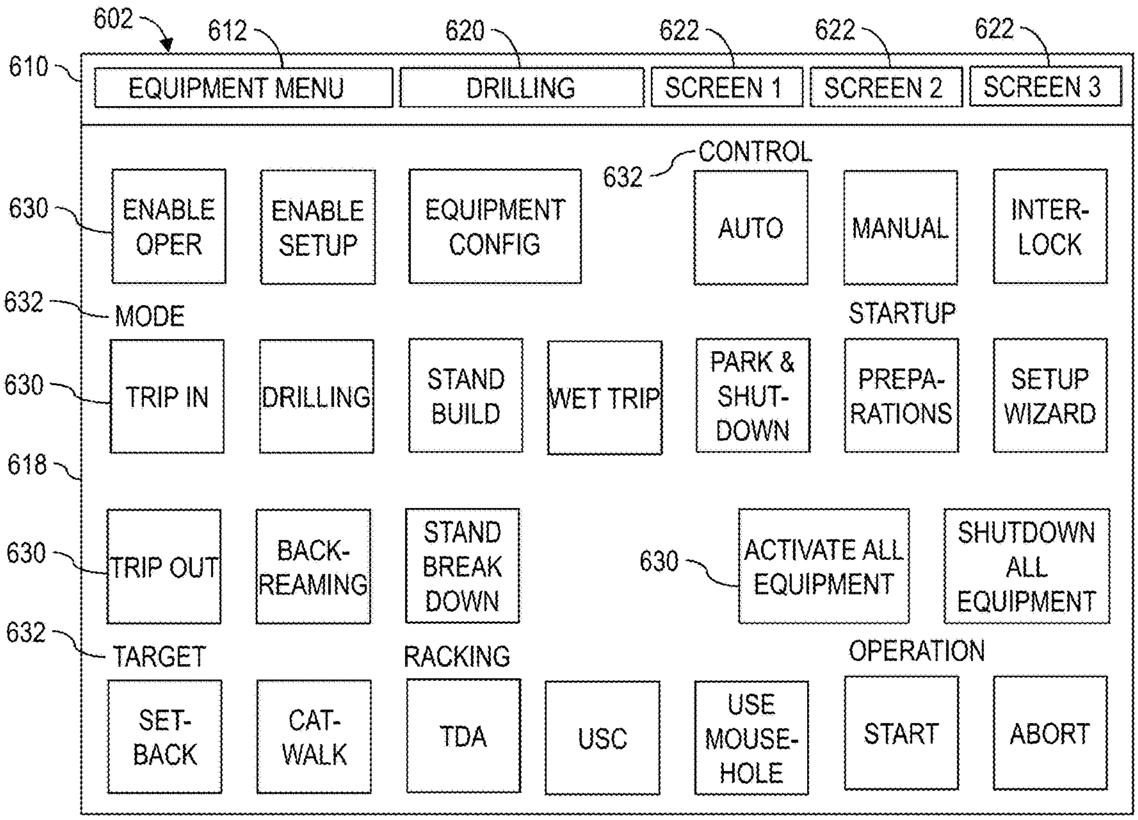

FIG. 12 is an example implementation of a "DRILLING" control screen 602 that may be utilized to control automated, semi-automated, and/or manual operation of wellsite equipment associated with and/or collectively operable to perform drilling operations according to one or more aspects of the present disclosure. The control screen 602 may display in the equipment control area 618 various software controls 630 for controlling various wellsite equipment and/or operational parameters of the drilling operations performed by well construction system 100, 200. For example, when operated, the software controls 630 may activate, deactivate, start, stop, configure, or otherwise control automated, semi-automated, and/or manual operation of the wellsite equipment associated with the drilling operations. Such wellsite equipment may include the top drive 116, the DW 119, the pump 144, and the BOP equipment 130, 132, among other examples.

Figure 13:
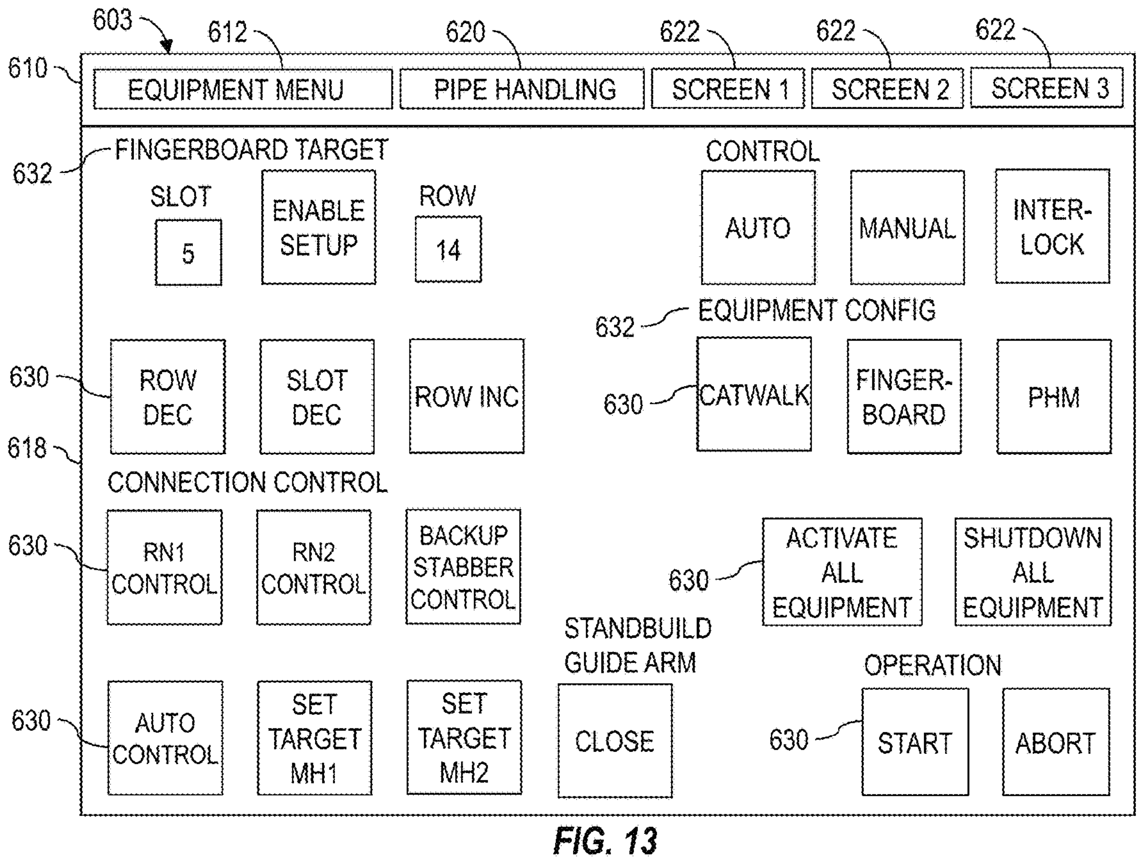

FIG. 13 is an example implementation of an "PIPE HANDLING" control screen 603 that may be utilized to control automated, semi-automated, and/or manual operation of wellsite equipment associated with and/or collectively operable to perform drill pipe handling (e.g., moving, storing) operations according to one or more aspects of the present disclosure. The control screen 603 may display in the equipment control area 618 various software controls 630 for controlling various wellsite equipment and/or operational parameters of the drill pipe handling operations performed by well construction system 100, 200. For example, when operated, the software controls 630 may activate, deactivate, start, stop, configure, or otherwise control automated, semi-automated, and/or manual operation of the wellsite equipment associated with the drill pipe handling operations. Such wellsite equipment may include the catwalk 131, the TDA 202, the setback 164, the FIB 166, the TBR 254, the SGA 262, the LTC 244, the ITC 236, the UTC 242, the LSA 228, the RN 151, and the reciprocating slips 161, among other examples.

Figure 14:
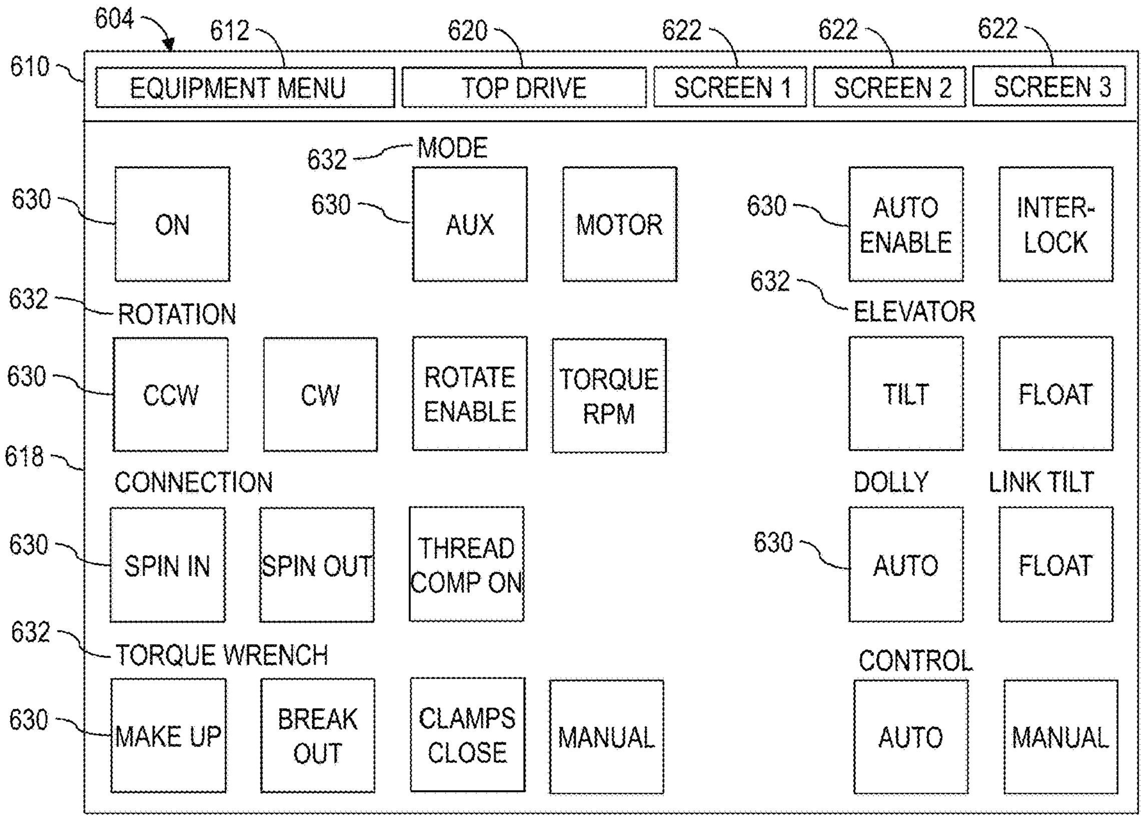

FIG. 14 is an example implementation of a "TOP DRIVE" control screen 604 that may be utilized to control automated, semi-automated, and/or manual operation of the top drive 116 according to one or more aspects of the present disclosure. The control screen 604 may display in the equipment control area 618 various software controls 630 for configuring and/or controlling automated, semi-automated, and/or manual operations performed by the top drive 116 and/or operational parameters associated with the top drive 116. For example, when operated, the software controls 630 may activate, deactivate, start, stop, configure, or otherwise control operation of one or more portions of the top drive 116, such as the drive shaft 125, the grabber, the swivel, the tubular handling assembly 127, and other portions of the top drive 116. The software controls 630 may also be utilized to control other wellsite equipment that may be directly or closely associated with or operate in close association with the top drive 116, such as the RN 151.

Figure 15:
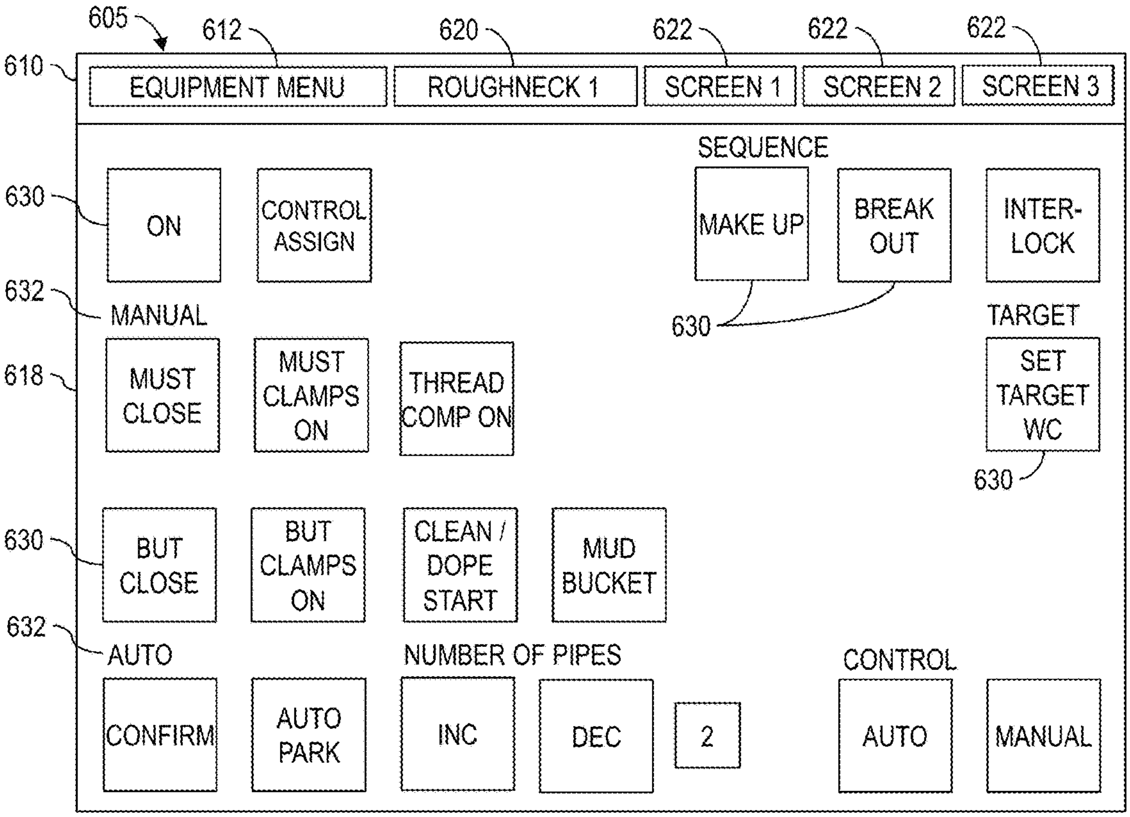

FIG. 15 is an example implementation of a "ROUGHNECK 1" control screen 605 that may be utilized to control automated, semi-automated, and/or manual operation of one of the RNs 151 according to one or more aspects of the present disclosure. The control screen 605 may display in the equipment control area 618 various software controls 630 for configuring or controlling automated, semi-automated, and/or manual operations performed by the RN 151 and/or operational parameters associated with the RN 151. For example, when operated, the software controls 630 may activate, deactivate, start, stop, configure, or otherwise control operation of one or more portions of the RN 151, such as the spinner and the torque wrench, including the upper and lower tongs and the associated clamps. The software controls 630 may also be utilized to control other wellsite equipment that may be directly or closely associated with or operate in close association with the RN 151.

The video output devices 126 and/or the touchscreens 522, 524 may also display manual control guide menus or screens utilized by the wellsite operator 195 to guide or assist the wellsite operator 195 to manually control selected operations of the well construction system 100, 200 or an individual piece of wellsite equipment. The guide screens may display control functions of a selected one of the joysticks 510, 512, the associated physical controls 518, and/or other physical controls 514, 516 with respect to a selected operation or a piece of wellsite equipment. Manual control may be initiated, for example, when the "MANUAL" software control 630 button is selected on one of the control screens displayed on one of the touchscreens 522, 524. Thereafter, the control system 300 may abort automatic operation of the associated wellsite equipment, transfer operational control to a predetermined joystick 510, 512 and/or other physical controls 514, 516, and display a corresponding manual control guide listing the control functions for manually controlling the wellsite equipment associated with the control screen.

Figure 16:
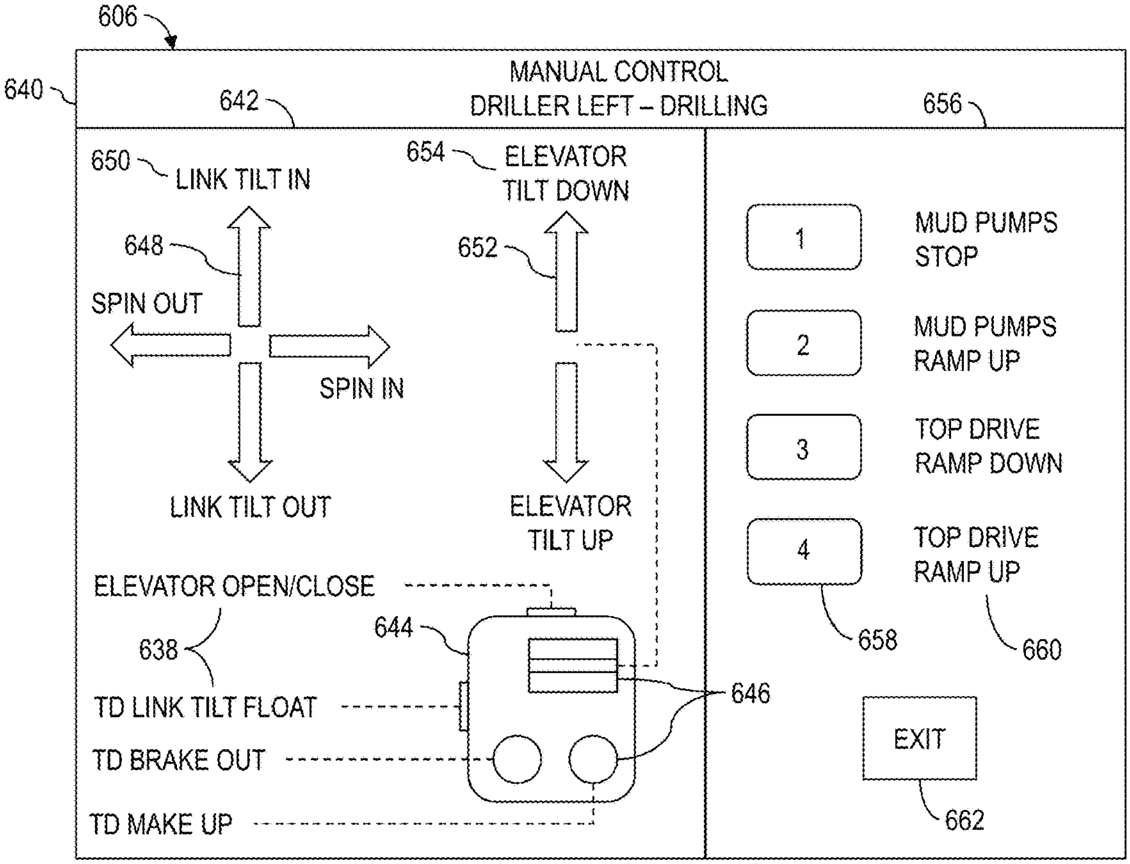

FIG. 16 is an example implementation of a manual control guide screen 606 displaying control functions for controlling drilling operations via the left joystick 510 and physical controls 514. The guide screen 606 may display a title bar 640 identifying an operation or wellsite equipment to be controlled and the joystick 510 and/or physical controls 514 for controlling such operation or wellsite equipment. The guide screen 606 may comprise a joystick control area 642 displaying a schematic view 644 of the joystick 510 and a schematic view 646 of the associated physical controls 518 (e.g., joystick buttons and thumb lever). Each schematic button 646 is associated with text 638 describing control functions of each corresponding physical button 518 of the joystick 510. The joystick control area 642 may further display arrows 648 and corresponding text 650 describing control functions associated with movements of the joystick 510, and arrows 652 and corresponding text 654 describing control functions associated with movement of the joystick thumb lever 518. The guide screen 606 may also comprise a button control area 656 displaying schematic views 658 of the corresponding physical controls 514. The button control area 656 may further display text 660 describing control functions associated with operation of each of the corresponding physical controls 514. The guide screen 606 may further display an "EXIT" software control 662, which may be operated to abort manual control of the drilling operations and close the guide screen 606. As described above with respect to FIG. 7, an operator workstation within the scope of the present disclosure may display on one or more of the video output devices 526 a plurality of status screens, each displaying selected sensor signals or information (e.g., sensor data 351-356) generated by various sensors (e.g., sensors 321-326) of the wellsite construction system 100, such as may permit the wellsite operator to monitor operations, wellsite equipment, and/or equipment subsystems (e.g., subsystems 311-316) described herein. FIGS. 17-21 are views of example implementations of status screens 701-706 displayed on one or more of the video output devices 526 according to one or more aspects of the present disclosure. The following description refers to FIGS. 1-4, 7, and 17-21, collectively.

The status screens, including the status screens 701-706, may be displayed alternatingly on one of the video output devices 526. Some of the status screens may display operational status of a well construction operation (e.g., tripping, drilling, pipe handling, etc.) involving a plurality of pieces of wellsite equipment operating in a coordinated manner to perform such operation, which may permit the wellsite operator 195 to monitor operational status or parameters of such operation on a single status screen. Some of the status screens may display operational status of a single piece of wellsite equipment or a subsystem (e.g., subsystem 311-316) of wellsite equipment, such as may also permit the wellsite operator 195 to monitor operational status or parameters of a single piece of equipment or an equipment subsystem. As described above, the status screen and the corresponding operation, wellsite equipment, or equipment subsystem may be selected via the touchscreens 522, 524. As shown in FIG. 11, example status screens that may be selected for display may include a tripping status screen displaying information indicative of operational status of the tripping operations, a drilling status screen displaying information indicative of operational status of the drilling operations, a pipe handing status screen displaying information indicative of operational status of the drill pipe handling operations, and a plurality of subsystem status screens each displaying information indicative of operational status of the corresponding subsystem of the well construction system 100, 200. Although not described herein, the status screens within the scope of the present disclosure may also or instead include status screens displaying information indicative of operational status of individual pieces of wellsite equipment described herein.

The status screens, including the status screens 701-706, may comprise a wellsite status screen indicator and alarm window or area 710, which may visually indicate which operation or wellsite equipment is being displayed on a selected video output device 526 and if safety or operational alarms associated with an operation or wellsite equipment are active. For example, the area 710 may include a plurality of indicators 712 (e.g., text, icons, graphics, etc.) listing operations, wellsite equipment, and/or equipment subsystems that may be displayed via corresponding status screens. The indicator 712 corresponding to the operation, wellsite equipment, or equipment subsystem of the currently displayed status screen may appear or become lit, highlighted, or otherwise marked to indicate to the wellsite operator 195 which status screen is displayed. The area 710 may further include a plurality of alarm or event indicators 714 (e.g., lights), each associated with a corresponding operation, wellsite equipment, or equipment subsystem indicator 712. One or more of the indicators 714 may activate (e.g., light up, change color, etc.), such as via operation of the control system 300 (shown in FIG. 4), to visually inform the wellsite operator 195 of an alarm or operational event taking place at or associated with a corresponding operation, wellsite equipment, or equipment subsystem. Responsive to the event indicator 714 being activated, the wellsite operator 195 may switch to a status screen corresponding to the activated event indicator 714 to assess the event and/or implement appropriate counteractive measures or actions. Instead of manually changing between the status screens, the status screens may change automatically to show the status screen corresponding to the operation, wellsite equipment, or equipment subsystem experiencing the event.

The status screens, including the status screens 701-706, may further comprise a primary operational status window or area 716, displaying selected sensor signals or information indicative of operational status of the operation, wellsite equipment, or equipment subsystem associated with the displayed status screen. The information displayed in the primary operational status area 716 may be generated by the actual wellsite equipment performing the operation or forming the equipment subsystem associated with the displayed status screen. The information displayed in the primary operational status area 716 may change when a different display screen is displayed. The information in the primary operational status area 716 may be displayed in the form of lists, menus, tables, graphs, bars, gauges, lights, and/or schematics, among other examples.

The status screens, including the status screens 701-706, may further comprise a secondary operational status window or area 718, displaying selected sensor signals or information indicative of operational status of drilling operations and/or general status of the well construction operations, such as may permit the wellsite operator to monitor progress of the drilling operations and/or other well construction operations while monitoring a specific operation, wellsite equipment, or equipment subsystem displayed in the primary operational status area 716. The secondary operational status area 718 may also display sensor signals or information indicative of operational status of other wellsite equipment that is related to, but not necessarily performing, the drilling operations. The information that is displayed in the secondary operational status area 718 may remain unchanged or change partially when a different status screen is displayed, such as may permit the wellsite operator 195 to monitor progress of the drilling operations and/or other well construction operations while monitoring different operations, wellsite equipment, or equipment subsystems associated with the different status screens.

However, the information that is displayed in the secondary operational status area 718 may change when a different status screen is displayed. The changing information may permit the wellsite operator 195 to monitor operational status of other wellsite equipment that is related to, but not necessarily directly performing, the operation displayed in the primary operational status area 716, and/or to monitor operational status of other wellsite equipment that is related to the wellsite equipment or equipment subsystem displayed in the primary operational status area 716. The information in the secondary operational status area 718 may be displayed in the form of lists, menus, tables, graphs, bars, gauges, lights, and/or schematics, among other examples.

Figure 17:
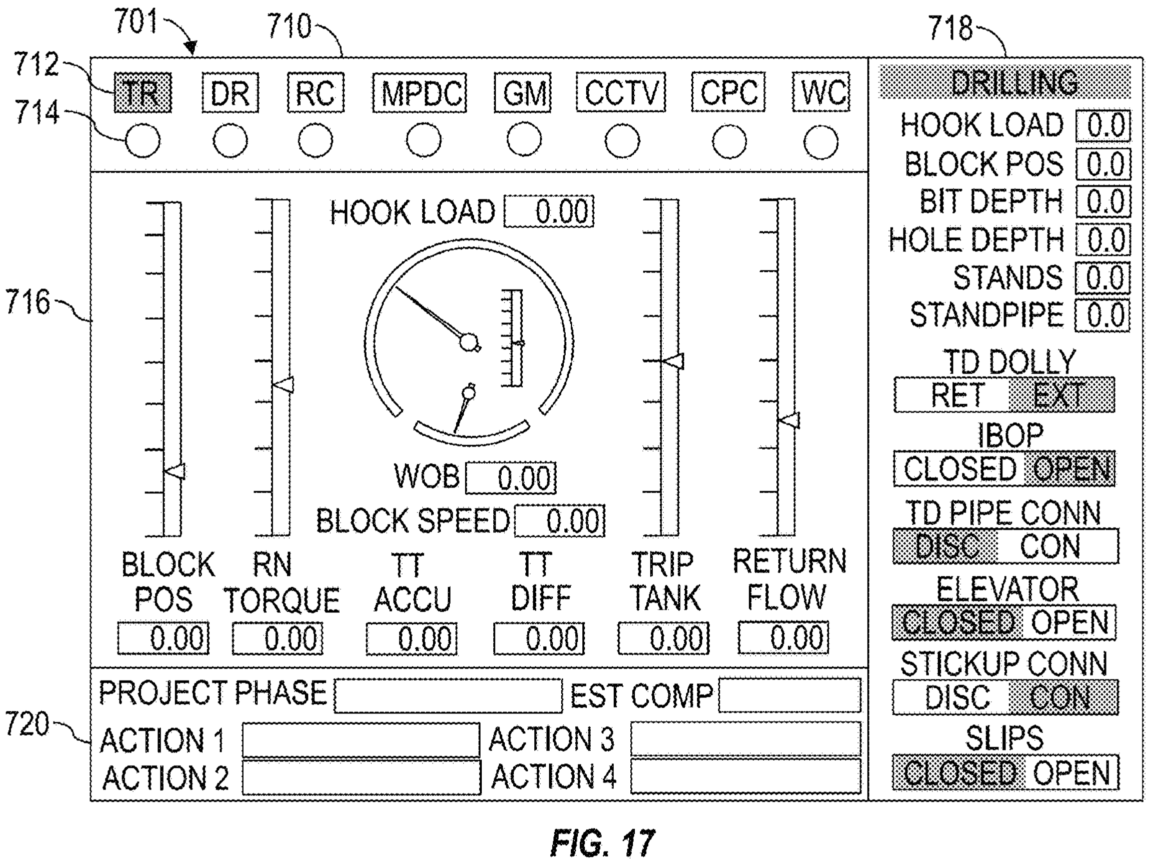
Figure 18:
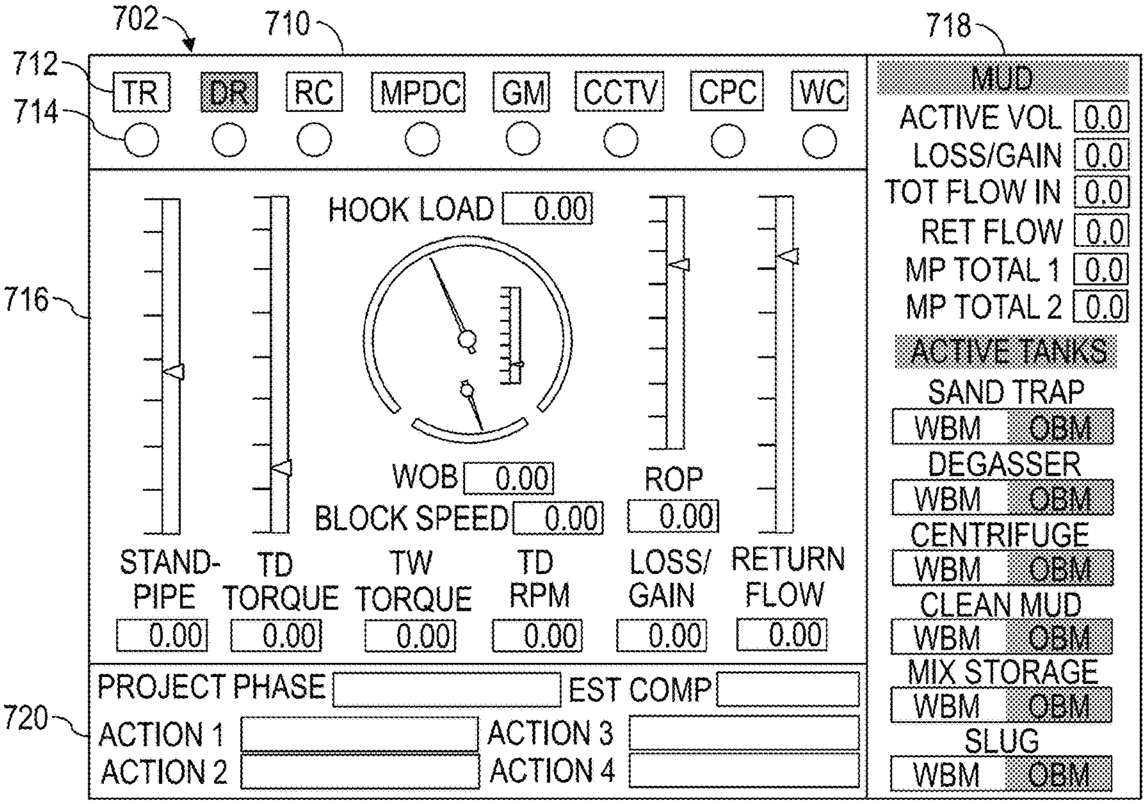

Each status screen, including the status screens 701-706, may also comprise a detailed description window or area 720 listing and/or describing one or more aspects related to the operation, wellsite equipment, or equipment subsystem displayed in the primary operational status area 716 or another aspect of the well construction operations. For example, as shown in FIGS. 17 and 18, the description area 720 may display general and/or detailed description of work or activities (e.g., a construction or job plan) that was, is, or will be performed or overseen at the wellsite by the wellsite operator 195. The description area 720 may display proactive information regarding the work and/or call-to-actions guiding future work. The description of work may include a title or name of the project stage or phase, an estimated completion date (i.e., deadline) for completing the project stage, and/or a list of operational steps or actions to be implemented by the wellsite operator 195 during the project stage. However, the control system 300 may automatically operate the wellsite equipment or subsystem to automatically implement such steps or actions pursuant to the construction or job plan, such as by transmitting predetermined control commands to a corresponding piece of wellsite equipment or subsystem. Such automated operations may be initiated, for example, by operating an "AUTO" software button 630 on an associated control screen, as described above.

Figure 19:
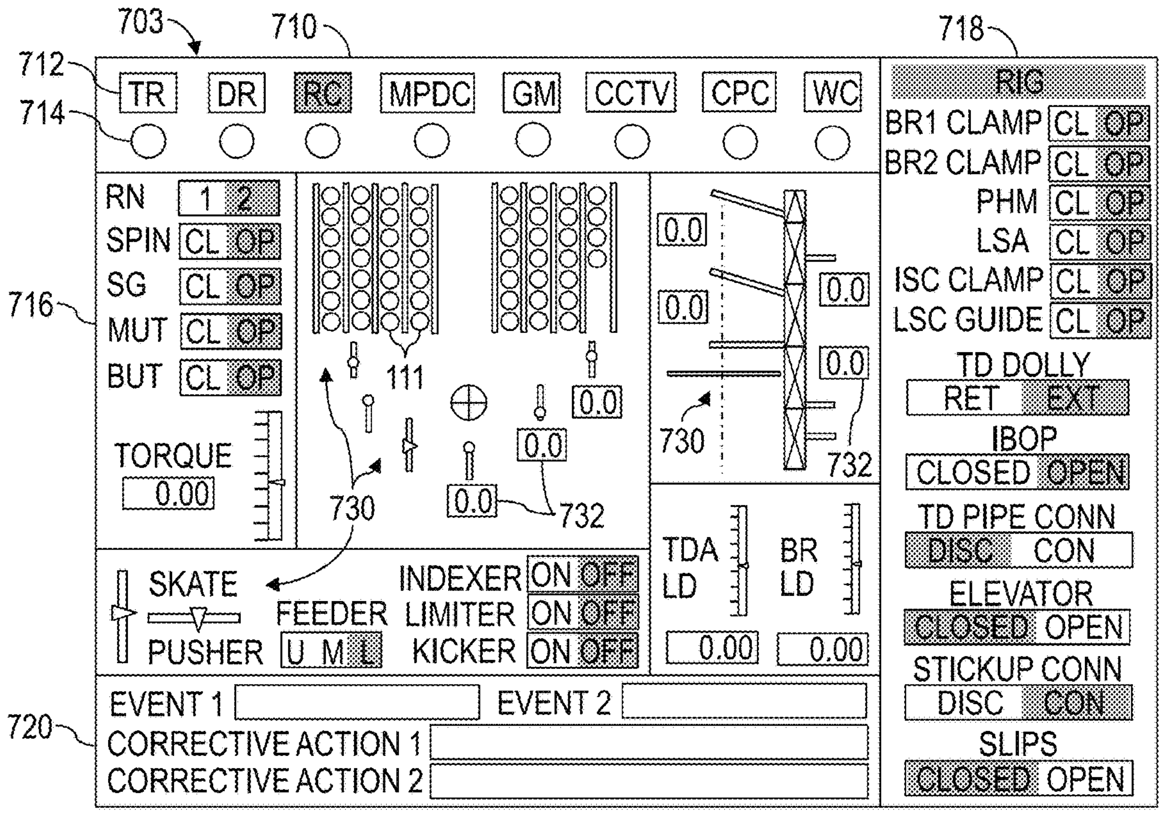
Figure 20:
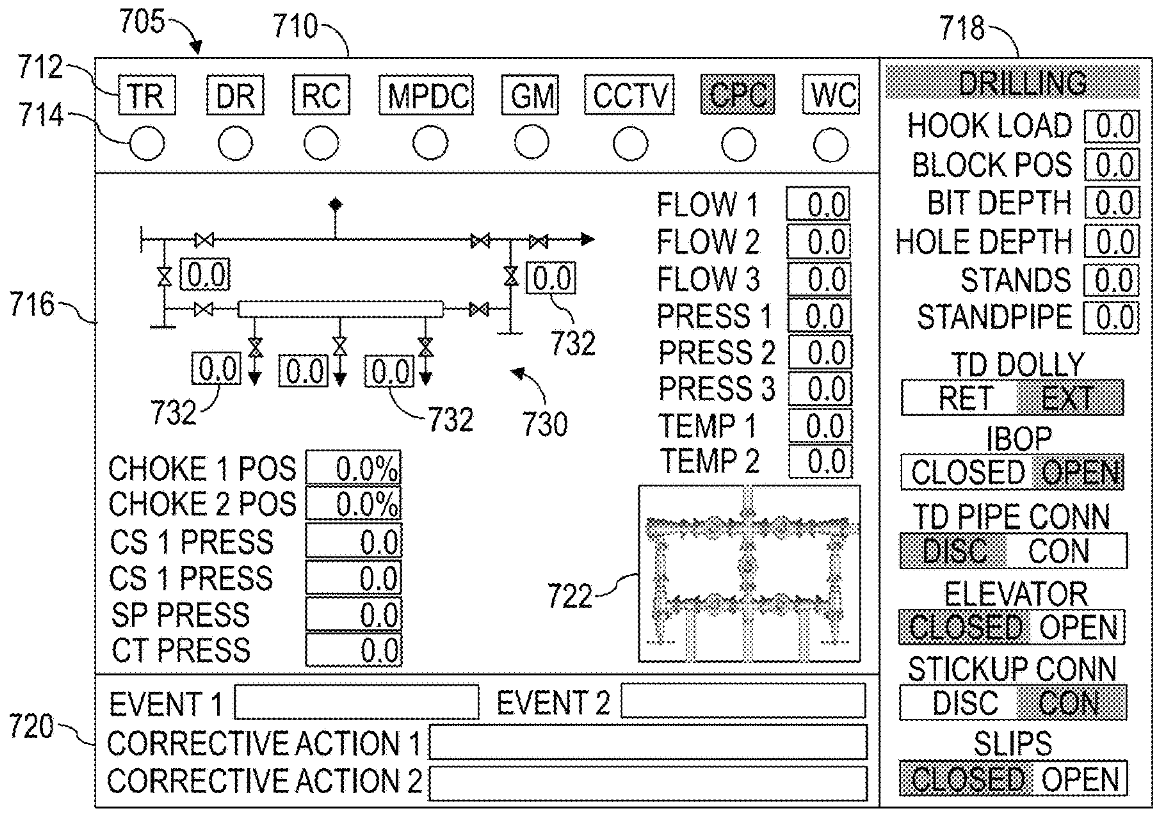

As shown in FIGS. 19-21, the description area 720 may also or instead display detailed description or information related to the events detected or otherwise taking place at the well construction system 100, 200. The description area 720 may also list and/or describe one or more counteractive measures (e.g., corrective actions, operational sequences) related to the event that may be performed or otherwise implemented in response to the event. Depending on the event and/or mode (e.g., advice, interlock, automated) in which the control system 300 (e.g., the computing resource environment 305) is operating, the description area 720 may describe the corrective action to be initiated or otherwise implemented by the wellsite operator 195. However, the control system 300 may automatically implement the corrective action, or cause the corrective action to be automatically implemented, such as by transmitting predetermined control commands to a corresponding piece of wellsite equipment or subsystem. The information displayed in the description area 720 may just display events and/or corrective actions related to the operation, wellsite equipment, or equipment subsystem shown in the primary operational status area 716 and, thus, change when switching between the status screens. However, the information displayed in the description area 720 may not change when switching between the status screens, and may list each detected event and/or corresponding corrective action, such as in chronological order or in the order of importance. As described above, the control system 300 may automatically change the status screen to show the operation, wellsite equipment, or equipment subsystem experiencing the event.

Each status screen, including the status screens 701-706, may further include one or more PIP video windows 722 (shown in FIGS. 20 and 21), each displaying in real-time a video signal from a predetermined video camera 198 to display wellsite equipment associated with the operation, wellsite equipment, or equipment subsystem displayed in the primary operational status area 716. The PIP video windows 722 may be embedded or inset on the corresponding status screens, such as within the primary operational status area 716. The view shown in the PIP video window 722 may be manually or automatically switched between different video cameras 198 to show different wellsite equipment or different views of the wellsite equipment.

As described above, the status screens to be displayed on the video output devices 526 may be selected via the touchscreens 522, 524. However, the status screens, including the sensor signals or information displayed in the indicator and alarm area 710, the primary operational status area 716, the secondary operational status area 718, the detailed description area 720, and/or the PIP windows 722, may automatically change based on successive stages of the well construction operations. For example, while the well construction operations progress through successive stages (e.g., tripping, drilling, pipe handling, etc.), the control system 300 may cause the video output devices 526 to automatically change and display a status screen comprising information indicative of operational status of wellsite equipment performing or otherwise associated with a current stage of the well construction operations.

Each status screen, including the status screens 701-706, may be adjusted or otherwise configured by the wellsite operator 195 to display one or more of the various information areas 710, 716, 718, 720 in a chosen position on each status screen. For example, the indicator and alarm area 710 may be displayed at the top of the status screens, the detailed description area 720 may be displayed at the bottom of the status screens, the primary operational status area 716 may be displayed in the middle on the left side of the status screens, and the secondary operational status area 718 may be displayed on the right side of the status screens. Furthermore, the location and/or size (i.e., dimensions) of the PIP video windows 722 displayed on each status screen may also be adjusted or otherwise selected. The relative location of the information areas 710, 716, 718, 720 and the PIP video windows 722 on the status screens may also be selected, for example, via one or more of the physical controls 514, 516, 518, such as by dragging and dropping the information areas 710, 716, 718, 720 and/or the PIP video windows 722 to a chosen location on the status screens.

FIG. 17 is an example implementation of a status screen 701 displaying sensor signals or information indicative of operational status of various wellsite equipment associated with and collectively operable to perform drill pipe tripping operations according to one or more aspects of the present disclosure. When the wellsite operator 195 or the control system 300 causes the tripping operations status screen 701 to be displayed on one of the video output devices 526, the indicator 712 associated with the tripping operations, such as letters "TR," may appear or become highlighted to visually indicate to the wellsite operator 195 that the tripping operations status screen is being displayed. The primary operational status area 716 may display information, such as hook load, weight-on-bit, travelling block position, roughneck torque, trip tank accumulation or volume, and return flow, among other examples. The secondary operational status area 718 may display information related to drilling operations, such as hook load, traveling block position, drill bit depth, wellbore depth, number of stands or tubulars in the wellbore, standpipe pressure, top drive dolly location, inside BOP position, top drive pipe connection status, elevator status, stick-up connection status, and slips status, among other examples. The description area 720 may display a work plan (i.e., well construction plan) related to the tripping operations, including actions or steps that will be performed or overseen at the wellsite by the wellsite operator 195 during the tripping operations. However, the description area 720 may also or instead display information indicative of operational events, as described above.

FIG. 18 is an example implementation of a status screen 702 displaying sensor signals or information indicative of operational status of various wellsite equipment associated with and collectively operable to perform drilling operations according to one or more aspects of the present disclosure. When the wellsite operator 195 or the control system 300 causes the drilling operations status screen 702 to be displayed on one of the video output devices 526, the indicator 712 associated with the drilling operations, such as letters "DR," may appear or become highlighted to visually indicate to the wellsite operator 195 that the drilling operations status screen is being displayed. The primary operational status area 716 may display information, such as hook load, travelling block speed, weight-on-bit, rate of penetration, standpipe pressure, top drive torque, torque wrench torque, top drive rotational speed, drilling fluid loss/gain, and drilling fluid return flow, among other examples. The secondary operational status area 718 may display information related to drilling operations, such as information related to or indicative of drilling fluid (i.e., mud) operational status and/or active tank operational status. The description area 720 may display a work plan (i.e., well construction plan) related to the drilling operations, including actions or steps that will be performed or overseen at the wellsite by the wellsite operator 195 during the drilling operations. However, the description area 720 may also or instead display information indicative of operational events, as described above.

As described above, the status screens may display sensor signals or information indicative of operational status of wellsite equipment subsystems (e.g., subsystems 311-316). FIG. 19 is an example implementation of an RC system status screen 703 displaying sensor signals or information indicative of operational status of the RC system 311 according to one or more aspects of the present disclosure. When the wellsite operator 195 or the control system 300 causes the RC system status screen 703 to be displayed on one of the video output devices 526, the indicator 712 associated with the RC system 311, such as letters "RC," may appear or become highlighted to visually indicate to the wellsite operator 195 that the RC system status screen 703 is being displayed. The primary operational status area 716 may display sensor signals or information related to various pieces of wellsite equipment forming the RC system 311, such as the catwalk 131, the TDA 202, the setback 164, the FIB 166, the TBR 254, the SGA 262, the LTC 244, the ITC 236, the UTC 242, the LSA 228, and the RN 151, among other examples. The primary operational status area 716 may also display schematic representations 730 of such wellsite equipment to visually display to the wellsite operator 195 operational status (e.g., position) of such wellsite equipment. For example, the schematic representations 730 of the drill floor 114, catwalk 131, the setback 164, the FIB 166, the RN 151, and the TDA 202 may visually indicate to the wellsite operator 195 in real-time movements and positions of various portions of such wellsite equipment. The RC system status screen 703 may include schematic representations 730 of the skate 133 of the catwalk 131, the TDA 202, the LSA 228, the SGA 262, the ITC 236, and the LTC 244, and of the vertical pipe rack assembly 165 (e.g., setback 164 and FIB 166) containing the tubulars 111, among other examples. Portions of the schematic representations 730 (e.g., various arms of the TDA 202) may change position and/or color to visually indicate to the wellsite operator 195 various positions and movements of the represented wellsite equipment. The primary operational status area 716 may also display sensor signals or information indicative of operational status of the wellsite equipment within text boxes 732 located in association with the schematic representations 730 of the wellsite equipment. The secondary operational status area 718 may display information related to drilling operations and/or additional information related to operational status of the RC system 311, such as additional information that is not displayed in the primary operational status area 716. The description area 720 may display information indicative of operational events, as described above. However, the description area 720 may also or instead display a work plan related to tripping, drilling, or other wellsite construction operations.

FIG. 20 is an example implementation of a CPC system status screen 705 displaying sensor signals or information indicative of operational status of the CPC system 314 according to one or more aspects of the present disclosure. When the wellsite operator 195 or the control system 300 causes the CPC system status screen 705 to be displayed on one of the video output devices 526, the indicator 712 associated with the CPC system 314, such as letters "CPC," may appear or become highlighted to visually indicate to the wellsite operator 195 that the CPC system status screen 705 is being displayed. The primary operational status area 716 may display sensor signals or information related to various pieces of wellsite equipment forming the CPC system 314, such as the choke manifold 162 and related wellsite equipment. The primary operational status area 716 may also display schematic representations 730 of the wellsite equipment to visually display to the wellsite operator 195 operational status of such wellsite equipment. The schematic representations 730 may include, for example, various fluid control valves (e.g., ball valves, adjustable chokes) of the choke manifold 162 and a plurality of fluid control valves fluidly connected with the choke manifold 162. The primary operational status area 716 may visually indicate to the wellsite operator 195 in real-time operational status, fluid flow rates, fluid pressures, and valve positions of the wellsite equipment forming the CPC system 314. Portions of the schematic representations 730 (e.g., fluid valves) may change position and/or color to indicate to the wellsite operator 195 operational status (e.g., positions) of such wellsite equipment. The primary operational status area 716 may also display sensor signals or information indicative of operational status of the wellsite equipment within text boxes 732 located in association with the schematic representations 730 of the wellsite equipment. The secondary operational status area 718 may display information related to drilling operations and/or additional information related to operational status of the CPC system 314, such as additional information that is not displayed in the primary operational status area 716. The description area 720 may display information indicative of operational events, as described above. However, the description area 720 may also or instead display a work plan related to tripping, drilling, or other wellsite construction operations. A PIP video window 722 showing a real-time view of the choke manifold 162 or another portion of the CPC system 314 may be displayed in the primary operational status area 716 or another area of the CPC system status screen 705.

FIG. 21 is an example implementation of a WC system status screen 706 displaying sensor signals or information indicative of operational status of the WC system 315 according to one or more aspects of the present disclosure. When the wellsite operator 195 or the control system 300 causes the WC system status screen 706 to be displayed on one of the video output devices 526, the indicator 712 associated with the WC system 315, such as letters "WC," may appear or become highlighted to visually indicate to the wellsite operator 195 that the WC system status screen 706 is being displayed. The primary operational status area 716 may display sensor signals or information related to various pieces of wellsite equipment forming the WC system 315, such as the BOP equipment 130, 132. Information displayed in the primary operational status area 716 may include, for example, information related to risers/diverters, POD controls, POD regulators, analog sensor values (e.g., pressure, position), BOP event alarm signals, and inclination sensors. The primary operational status area 716 may visually indicate to the wellsite operator 195 in real-time operational status, fluid pressures, and operational positions of the wellsite equipment forming the CPC system 314. The primary operational status area 716 may also display schematic representations 730 of the wellsite equipment to visually display to the wellsite operator 195 operational status of such wellsite equipment. The schematic representations 730 may include, for example, the BOP stack 130 and the annular fluid control device 132, and visually indicate to the wellsite operator 195 operational status (e.g., position) of the various rams and valves of the BOP stack 130 and the annular fluid control device 132. Portions of the schematic representations 730 (e.g., fluid valves, rams) may change position and/or color to indicate to the wellsite operator 195 operational status (e.g., positions) of such wellsite equipment. The primary operational status area 716 may also display sensor signals or information indicative of operational status of the wellsite equipment within text boxes 732 located in association with the schematic representations 730 of the wellsite equipment. The secondary operational status area 718 may display information related to drilling operations and/or additional information related to operational status of the WC system 315, such as additional information that is not displayed in the primary operational status area 716. The description area 720 may display information indicative of operational events, as described above. However, the description area 720 may also or instead display a work plan related to tripping, drilling, or other wellsite construction operations. A PIP video window 722 showing a real-time view of the BOP equipment 130, 132 or another portion of the WC system 315 may be displayed in the primary operational status area 716 or another area of the WC system status screen 706.

FIG. 22 is a schematic view of at least a portion of an example implementation of a system (or processing device) 800 according to one or more aspects of the present disclosure. The system 800 may form at least a portion of one or more electronic devices utilized at the well construction system 100, 200. For example, the system 800 may be or form at least a portion of the processing devices 188, 192, 456, and the control workstations 450, 452, 454, 500. The system 800 may form at least a portion of the control system 300, including the wellsite computing resource environment 305, the coordinated control device 304, the supervisory control system 307, the local controllers 341-346, the onsite user devices 302, and the offsite user devices 303. The following description refers to FIGS. 1-7 and 22, collectively.

The well construction system 100, 200 also includes stationary and/or mobile video cameras 198 disposed or utilized at various locations within the well construction system 100, 200. The video cameras 198 capture videos of various portions, equipment, or subsystems of the well construction system 100, 200, and perhaps the wellsite operators 195 and the actions they perform, during or otherwise in association with the wellsite operations, including while performing repairs to the well construction system 100, 200. For example, the video cameras 198 may capture digital images (or video frames) of the entire well construction system 100, 200 and/or specific portions of the well construction system 100, 200, such as the top drive 116, the RN 151, the TDA 202, the FIB 166, the setback 164, the catwalk 131, and/or the areas through which tubulars 111 are transferred between components of the well construction system 100, 200, among other examples. The video cameras 198 generate corresponding video signals (i.e., feeds) comprising or otherwise indicative of the captured digital images. The video cameras 198 may be in signal communication with the processing device 192, such as may permit the video signals to be processed and transmitted to the control workstation 197 and, thus, permit the wellsite operators 195 to view various portions or components of the well construction system 100, 200 on one or more of the output devices 196. The processing device 192 or another portion of the control workstation 197 may be operable to record the video signals generated by the video cameras 198.

The system 800 may include a network ring 900 that electronically interconnects multiple drilling/analysis apparatus and/or control mechanisms for at least partially automating such apparatus. On the network ring 900, there may be a plurality of ring network nodes 801 that electronically connect various elements of the well construction system 100, 200 or the control system 300 to each other. For example, a first control workstation 850 (e.g., which may include or be the first control workstation 450 shown in FIGS. 5 and 6 and/or the wellsite operator control workstation 500 shown in FIG. 7) and optionally a second control workstation 852 (e.g., which may include or be the second control workstation 452 shown in FIGS. 5 and 6 and/or the wellsite operator control workstation 500 shown in FIG. 7) may be electronically connected to the network ring 900 through one or more of the plurality of ring network nodes 801. Optionally, the network ring 900 may be electronically interconnected, via one or more ring network nodes 801, to a phone system comprising one or more phone lines. For example, five VOIP (Voice over Internet Protocol) lines 881-885 are represented in FIG. 22, but there may be more or fewer phone lines to accommodate various numbers of users, workstations, or the like.

Programmable logic controllers (PLCs) 901, 911, 921, 931, 941, 951, 961, 971, 981, 991 are also connected to the network ring 900, each through a corresponding ring network node 801, thus facilitating communication between the first and second control workstations 850, 852 and the well construction and/or control subsystems (e.g., the RC subsystem 311, the FC subsystem 312, the MPDC subsystem 313, the CPC subsystem 314, the WC subsystem 315, and the CCTV subsystem 316, inter alia). Each PLC 901, 911, 921, 931, 941, 951, 961, 971, 981, 991 may be electronically connected to its own subsystem network ring 909, 919, 929, 939, 949, 959, 969, 979, 989, 999, each of which electronically connect to its corresponding PLC and/or to one or more other pieces of equipment via subsystem ring network nodes 809, 819, 829, 839, 849, 859, 869, 879, 889, 899. For example, programmable logic subsystem controllers, processing devices, and/or sensors 902, 903, 904, 905 may be electronically connected, each through a corresponding subsystem ring network node 809, to the subsystem network ring 909 that is also electronically connected to the PLC 901 through its own subsystem ring network node 809, thereby forming a ring network subsystem. Although four PLCs/sensors/processing devices 902-905 are represented as being connected to PLC 901 via the subsystem network ring 909 in FIG. 22, it should be understood that more or fewer such devices may be electronically connected thereto and/or that there may be more than one class of such devices electronically connected thereto in a given ring network subsystem. Similar ring network subsystems are shown in FIG. 22 as being connected to the network ring 900, each via a corresponding ring network node 801 electronically connecting additional PLCs 911, 921, 931, 941, 951, 961, 971, 981, 991 and additional PLCs/sensors/processing devices 912-915, 922-925, 932-935, 942-945, 952-955, 962-965, 972-975, 982-924, 992-995, through corresponding subsystem ring network nodes 819, 829, 839, 849, 859, 869, 879, 889, 899 via their corresponding subsystem network rings 919, 929, 939, 949, 959, 969, 979, 989, 999. Again, although four workstations 992-995 are represented as being connected to PLC 991 via subsystem network ring 999 and although three cameras 982-984 are represented as being connected to PLC 981 via subsystem network ring 989 in FIG. 22, it should be understood that more or fewer such devices may be electronically connected thereto and/or that there may be more than one class of such devices electronically connected thereto in any given ring network subsystem.

FIG. 23 is a schematic view of at least a portion of an example implementation of a processing device 1000 according to one or more aspects of the present disclosure. One or more electronic devices utilized at the well construction system 100, 200 may each be, comprise, or be formed by at least a portion of the processing device 1000. For example, the processing devices 188, 192, 456, the BOP control station 470, the control workstations 450, 452, 454, 500, 850, 852, 992, and the CPUs 901-981, may each be, comprise, or be formed by at least a portion of an instance the processing device 1000. Instances of the processing device 1000, or portions thereof, may form at least a portion of the control system 300, including the wellsite computing resource environment 305, the coordinated control device 304, the supervisory control system 307, the local controllers 341-346, the onsite user devices 302, and the offsite user devices 303.

The processing device 1000 may be in communication with various sensors, actuators, controllers, and other devices of the subsystems 311-316 and/or other portions of the well construction system 100, 200. The processing device 1000 may be operable to receive coded instructions 1032 from the wellsite operators 195 via the wellsite control workstation 500, 850, 852 and the sensor data 351-356 generated by the sensors 321-326, process the coded instructions 1032 and the sensor data 351-356, and communicate the control data 361-366 to the local controllers 341-346 and/or the actuators 331-336 of the subsystems 311-316 to execute the coded instructions 1032 to implement at least a portion of one or more example methods and/or operations described herein, and/or to implement at least a portion of one or more of the example systems described herein.

The processing device 1000 may be or comprise, for example, one or more processors, special-purpose computing devices, servers, personal computers (e.g., desktop, laptop, and/or tablet computers), personal digital assistants, smartphones, internet appliances, and/or other types of computing devices. The processing device 1000 may comprise a processor 1012, such as a general-purpose programmable processor. The processor 1012 may comprise a local memory 1014, and may execute coded instructions 1032 present in the local memory 1014 and/or another memory device. The processor 1012 may execute, among other things, the machine-readable coded instructions 1032 and/or other instructions and/or programs to implement the example methods and/or operations described herein. The programs stored in the local memory 1014 may include program instructions or computer program code that, when executed by the processor 1012 of the processing device 1000, may cause the subsystems 311-316 and/or individual pieces of wellsite equipment of the well construction system 100, 200 to perform the example methods and/or operations described herein. The processor 1012 may be, comprise, or be implemented by one or more processors of various types suitable to the local application environment, and may include one or more of general-purpose computers, special-purpose computers, microprocessors, digital signal processors (DSPs), field-programmable gate arrays (FPGAs), application-specific integrated circuits (ASICs), and processors based on a multi-core processor architecture, as non-limiting examples. Of course, other processors from other families are also appropriate.

The processor 1012 may be in communication with a main memory 1016, such as may include a volatile memory 1018 and a non-volatile memory 1020, perhaps via a bus 1022 and/or other communication means. The volatile memory 1018 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 1020 may be, comprise, or be implemented by read-only memory, flash memory, and/or other types of memory devices. One or more memory controllers (not shown) may control access to the volatile memory 1018 and/or non-volatile memory 1020.

The processing device 1000 may also comprise an interface circuit 1024. The interface circuit 1024 may be, comprise, or be implemented by various types of standard interfaces, such as an Ethernet interface, a universal serial bus (USB), a third generation input/output (3GIO) interface, a wireless interface, a cellular interface, and/or a satellite interface, among others. The interface circuit 1024 may also comprise a graphics driver card. The interface circuit 1024 may also comprise a communication device, such as a modem or network interface card to facilitate exchange of data with external computing devices via a network (e.g., Ethernet connection, digital subscriber line (DSL), telephone line, coaxial cable, cellular telephone system, satellite, etc.). One or more of the local controllers 341-346, the sensors 321-326, and the actuators 331-336 may be connected with the processing device 1000 via the interface circuit 1024, such as may facilitate communication between the processing device 1000 and the local controllers 341-346, the sensors 321-326, and/or the actuators 331-336.

One or more input devices 1026 may also be connected to the interface circuit 1024. The input devices 1026 may permit the wellsite operators 195 to enter the coded instructions 1032, such as control commands, processing routines, and/or operational settings and set-points. The input devices 1026 may be, comprise, or be implemented by a keyboard, a mouse, a joystick, a touchscreen, a track-pad, a trackball, an isopoint, and/or a voice recognition system, among other examples. One or more output devices 1028 may also be connected to the interface circuit 1024. The output devices 1028 may be, comprise, or be implemented by video output devices (e.g., an LCD, an LED display, a touchscreen, etc.), printers, and/or speakers, among other examples. The processing device 1000 may also communicate with one or more mass storage devices 1030 and/or a removable storage medium 1034, such as may be or include floppy disk drives, hard drive disks, compact disk (CD) drives, digital versatile disk (DVD) drives, and/or USB and/or other flash drives, among other examples.

The coded instructions 1032 may be stored in the mass storage device 1030, the main memory 1016, the local memory 1014, and/or the removable storage medium 1034. Thus, the processing device 1000 may be implemented in accordance with hardware (perhaps implemented in one or more chips including an integrated circuit, such as an ASIC), or may be implemented as software or firmware for execution by the processor 1012. In the case of firmware or software, the implementation may be provided as a computer program product including a non-transitory, computer-readable medium or storage structure embodying computer program code (i.e., software or firmware) thereon for execution by the processor 1012. The coded instructions 1032 may include program instructions or computer program code that, when executed by the processor 1012, may cause the various subsystems 311-316 or individual pieces of wellsite equipment of the well construction system 100, 200 to perform intended methods, processes, and/or operations disclosed herein.

In the example operations sequences described below, among others within the scope of the present disclosure, the pipe handling equipment may be operated automatically via the Construction Program, and the step execution of the pipe handling equipment may be controlled automatically by one or two operators 195 at the associated workstation(s) 450, 452, 454. The Construction Program may also feature configurable step confirmations. Each sequence controlled by the Construction Program may be stopped or interrupted at any time, and some or all functions may be operated manually by the one or two operators 195 at the associated workstation(s) 450, 452, 454.

Various well construction operations may be performed utilizing different combinations of the aspects described above. For example, when a tripping-in operation is to be performed, an operator 195 on the rig floor 114 may verify that various pieces of equipment are properly shut down and locked out, and then perhaps perform other preparations such as the examples set forth below in Table 1A.

TABLE 1A

| Tripping-In Preparations | | |
|---|---|---|
| Equipment | Responsible | Verifications |
| FIB 166<br>Setback 164 | Operator 195 on rig floor 114. | Tubulars 111 exist per HMI/tally.<br>Fingers are closed.<br>Travel path is unobstructed. |
| TBR 254<br>SGA 262 | Operator 195 on rig floor 114. | Travel path is unobstructed.<br>Gripper inserts/dies are clean, not worn. |
| LTC 244<br>ITC 236<br>UTC 242 | Operator 195 on rig floor 114. | Travel path is unobstructed.<br>Gripper inserts/dies are clean, not worn.<br>ITC 236 is open and retracted. |
| THP<br>Doper 209 | Operator 195 on rig floor 114. | Travel path is unobstructed.<br>Water, correct dope available for doper 209. |
| LSA 228 | Operator 195 on rig floor 114. | Travel path is unobstructed. |
| TDA 202 | Operator 195 on rig floor 114. | Travel path is unobstructed.<br>Correct dope available for doper 209.<br>Correct inserts/dies in gripper/elevator.<br>Inserts/dies are clean, not worn. |

TABLE 1A-continued

| Tripping-In Preparations | | |
|---|---|---|
| Equipment | Responsible | Verifications |
| RN 151 | Operator 195 on rig floor 114. | Drill pipe tong (DPT) is connected. Gripper dies are clean, not worn. Travel path is unobstructed. |
| Slips 161 | Operator 195 on rig floor 114; and/or "Driller" 195 at workstation 452. | Correct inserts/dies. Inserts/dies are clean, not worn. |
| TD 116 | Operator 195 on rig floor 114; and/or "Driller" 195 at workstation 452. | Correct inserts/dies in elevator. Correct saver sub status. Travel path is unobstructed. |
| DW 119 | Operator 195 on rig floor 114; and/or "Driller" 195 at workstation 452. | Checked. |

The well construction system 100, 200 can then be set-up for the trip-in sequence. Examples of such set-up may be as set forth below in Table 1B.

TABLE 1B

| Tripping-In Set-Up | | | |
|---|---|---|---|
| Equipment | Responsible | Set-Up | HMI |
| Pipe handling: TBR 254, SGA 262, UTC 242, LTC 244, ITC 236, THP 207, TDA 202, LSA 228, RN 151 | Driller/ Pipe Handler | Verify operator 195 on rig floor 114 completed pre-checks and deactivated emergency stop for all pipe handling equipment. Open Construction Program screen on touchscreen 522, 524. Select Trip In mode. Select setup wizard to open pop-up on front screen 532, 534, 536. Verify settings: Select slot, direction for picking pipe. Select Pipe type. Select RN 151 to use in the operations. RN 151 MU torque. Select pin/box doping. Stick-up target. Select "activate all machines" to startup and prepare all machines. | Verify Setback screen. Construction Program setup wizard. After startup: Check for green light in Construction Program status header on front screen 532, 534, 536. |
| TD 116, DW 119, MP 144, Trip tank | Driller | Verify operator 195 on rig floor 114 completed pre-checks and deactivated emergency stop for all pipe handling equipment. Open Construction Program screen on touchscreen 522, 524. Select Trip In mode. Select setup wizard to open pop-up on front screen 532, 534, 536. Verify settings: Stick-up target. Set DW 119 upper/lower stops. Set maximum lowering speed. Set minimum slack off weight. Trip tank 1/2/auto. Trip tank low/high levels. Select "activate all machines" to startup and prepare all machines. | Verify Setback screen. Construction Program setup wizard. After startup: Check for green light in Construction Program status header on front screen 532, 534, 536. |
| TD 116 | Driller | Verify operator 195 on rig floor 114 completed pre-checks. Activate TD 116 from touchscreen 522, 524. Select Operation screen on touchscreen 522, 524. | Verify operator screen, system status/alarms. |
| DW 119 | Driller | Activate DW 119 from touchscreen 522, 524. | Verify operator screen, system status/alarms. |
| All machines | Driller | Verify all relevant machines are enabled in zone management system and tubular interlock system. | Verify operator screen, system status/alarms. |

After such preparations and set-up, the operator 195 may vacate the rig floor 114, and the equipment may be configured to be ready for remote control (e.g., by deactivating emergency stops). The tripping-in sequence starts with the top drive 116 in a lower position with the elevator 129 closed, with the slips 161 closed, and with a portion (e.g., about one meter) of the drill string 120 (referred to as "stick-up") protruding above the slips 161. A tubular 111 has been lifted by the TDA 202 (and perhaps the LSA 228) from the THP 207 to stick-up level above the MOH 204. The THP 207 is empty, and the UTC 242 and the LTC 244 are open and retracted. The TBR 254 and the SGA 262 may also be empty and perhaps moving to pick up a new tubular 111 from the vertical pipe rack assembly 165. The top drive elevator 129 is then opened and retracted from the stick-up.

The top drive 116 is then moved to an upper stop via operation of the DW 119. The TDA 202 (perhaps with cooperation from the LSA 228) then moves the new tubular 111 to over the well center 203 (WC). The RN 151 also moves toward the WC 203. During this time, the TBR 254 and the SGA 262 operate to remove another tubular 111 from the setback 164 and the FIB 166. The position from which this additional tubular 111 is removed may be selected automatically or via input from the operator 195 at a control workstation 450, 452, 454. For example, a "Pipe Handler" operator 195 seated at control workstation 450 may generally control/monitor pipe handling equipment (e.g., equipment that is handling tubulars 111 that not connected to the drill string 120), while a "driller" operator 195 seated at control workstation 452 may generally control/monitor the remaining equipment (or at least the equipment that is handling the drill string 120).

The TBR 254 and the SGA 262 then cooperate to move the currently held tubular 111 to the THP 207. The UTC 242 and the LTC 244 then close to hold the new tubular 111. The doper 209 may be integrated in or otherwise associated with the THP 207 may then wash and dope the pin end of the new tubular 111. The TBR 254 and the SGA 262 may then return to select the next tubular 111 from the vertical pipe rack assembly.

A stabbing guide and/or back up tong (BUT) of the RN 151 may then be closed to assist stabbing. The TDA 202 then lowers the new tubular 111 to stab into the stick-up, perhaps continuing a short distance (e.g., about one meter) after stabbing to provide room for the top drive elevator 129. The LSA 228 may then open and retract from WC 203. The RN 151 then performs low-torque spinning and subsequent high-torque "wrenching" to make-up the tubular 111 to the drill string 120.

The top drive 116, which during this time was hoisted to an elevation generally near the top end of the new tubular 111, then extends to WC 203 and closes the elevator 129 around the new tubular 111. At the same time, the TDA 202 and (perhaps) the LSA 228 move to the THP 207 for the next tubular 111, and the RN 151 opens and retracts away from the WC 203 to a standby position.

The DW 119 then lifts the top drive 116 to pick up the now-extended drill string 120 and open the slips 161, and then lowers the top 116 to lower the drill string 120 into the wellbore 102. The slips 161 are closed again, leaving a stick-up ready for the next tubular 111. During this time that the drill string 120 is being lowered into the wellbore, the TDA 202 and (perhaps) the LSA 228 extend and latch onto another new tubular 111 currently in the THP 207, and then the UTC 242 and the LTC 244 and opened and retracted. The new tubular 111 is lifted from setback level to drill (rig) floor level (e.g., about 9 meters), perhaps guided by the LSA 228. The box (top) end of the new tubular 111 can be doped by another washing/doping device, if selected.

This trip-in sequence is summarized in Table 1C set forth below.

TABLE IC

Tripping-In Operation

| | Operator 195 | Operation | Line of Sight | Equipment Precondition | Equipment Functionality | HMI |
|---|---|---|---|---|---|---|
| 1. | Driller | Open elevator 129: Verify slips 161 are closed. Open elevator 129. | Visual/ CCTV | Slips 161 closed. | Elevator open is not selectable if slips 161 are not closed. | Elevator 129 to Open state. |
| 1.1. | Pipe Handler | TBR 254 and SGA 262 pick up new tubular 111: Move TBR 254 and SGA 262 to selected finger/slot in FIB 166. Close guides and clamp on tubular 111. | Visual/ CCTV | TBR 254 and SGA 262 are open. Position selected in FIB 166 is "valid." | TBR 254 will move above open latches. TBR 254 and SGA 262 grip/guide will close. | TBR 254 and SGA 262 grip/ guide to Closed state. |
| 2. | Driller | Retract and move TD 116 to latching height: Verify elevator 129 is open. Retract TD 116 to clear tool joint (TJ). Hoist elevator 129 to tubular latch height (upper stop or calculated stop point). | Visual/ CCTV | TD 116 pipe handler position facing TDA 202. | | DW 119 upper stop setting. |

TABLE IC-continued

| | Tripping-In Operation | | | | | |
|---|---|---|---|---|---|---|
| | Operator 195 | Operation | Line of Sight | Equipment Precondition | Equipment Functionality | HMI |
| 2.1. | Pipe Handler | Move RN 151 to WC 203:<br>Verify TD 116 is hoisted above working area of RN 151.<br>Start RN 151 make-up sequence to move RN 151 to WC 203. | Visual/ CCTV | Only possible with tong handling trolley (THT). If tong handling arm (THA) is used, then wait for tubular 111 located above stick-up.<br>RN 151 tongs are open.<br>WC 203 is selected. | RN 151 will move to WC 203.<br>Elevate to stick-up. | TJ (stick-up) assist indication. |
| 2.2 | Pipe Handler | TDA 202 moves tubular 111 to WC 203:<br>TDA 202 moves tubular 111 to WC 203.<br>LSA 228 guides to WC 203. | Visual/ CCTV | TD 116 is retracted. | Tilt towards WC 203.<br>TDA 202 dope top box if preselected (automatic). | TDA 202 load indication. |
| 2.3. | Pipe Handler | Guide tubular 111 with RN 151 in WC 203:<br>Verify tubular 111 is over WC 203.<br>Adjust elevation if needed.<br>Continue RN 151 sequence. | CCTV | Tubular 111 is held by TDA 202/LSA 228 above stick-up at WC 203. | Close RN 151 BUT.<br>Close stabbing guide. | Stabbing guide Closed indication.<br>BUT Closed indication. |
| 2.4. | Pipe Handler | TDA 202 stabs tubular 111 in stick-up:<br>Lower tubular 111 to stab into stick-up.<br>Continue lowering to permit room for elevator 129.<br>LSA 228 opens and retracts when RB 151 stabbing guide is closed on tubular 111. | Visual/ CCTV | RN 151 is at WC 203 with stabbing guide closed. | Continue lowering (e.g., about two meters) after verify set of weight. | TDA 202 load indication (unloading). |
| 2.5. | Pipe Handler | RN 151 spin-in and make-up:<br>Verify RN 151 is in correct elevation.<br>Continue RN 151 sequence to spin-in and make-up. | Visual/ CCTV | Tubular 111 is stabbed in stick-up.<br>TDA 202 is unloaded. | Spin-in and make-up connection.<br>Open spinner, guide, and clamps.<br>RN 151 returns to park position. | Torque log updated.<br>Make-up (MU) torque presented to driller. |
| 2.6. | Pipe Handler | TBR 254 and SGA 262 move tubular 111 to THP 207:<br>Open FIB 166 latches for selected row.<br>Verify latches open.<br>TBR 254 and SGA 262 move tubular 111 to THP 207.<br>FIB 166 latches will close as the tubular 111 is moved out.<br>Wash and/or dope pin of tubular 111 if preselected. | Visual/ CCTV | THP 207 is empty.<br>UTC 242 and LTC 244 are open.<br>Correct pipe detected in TBR 254 and SGA 262. | TBR 254 cannot open with weight.<br>TBR 254 opens when unloaded.<br>FIB 166 latches will not open with TBR 254 in low position. | Indicate FIB 166 latches Open.<br>TBR 254 load indication. |
| 2.7. | Pipe Handler | UTC 242 and LTC 244 extend to THP 207 and then close. | Visual/ CCTV | TBR 254 and SGA 262 have tubular 111 in THP 207. | UTC 242 and LTC 244 extend and close. | UTC 242 and LTC 244 to Closed state. |
| 2.8. | Pipe Handler | TBR 254 and SGA 262 open and move towards FIB 166:<br>Open TBR 254 and SGA 262 clamps/ guides.<br>Move TBR 254 and SGA 262 toward FIB 166 (next tubular 111).<br>Continue step 1.1. | Visual/ CCTV | UTC 242 and LTC 244 closed on tubular 111. | | |

TABLE IC-continued

| | | | | | | |
|---|---|---|---|---|---|---|
| Tripping-In Operation | | | | | | |
| | Operator 195 | Operation | Line of Sight | Equipment Precondition | Equipment Functionality | HMI |
| 3. | Driller | Extend TD 116 and latch elevator 129:<br>Extend TD 116 to WC 203.<br>Latch elevator 129 (automatic close on impact). | Visual/ CCTV | TDA 202 below TJ. | | Elevator 129 to Closed state.<br>Indicate TD 116 at WC 203. |
| 3.1. | Pipe Handler | TDA 202 opens and moves to THP 207:<br>Verify elevator 129 is closed.<br>Move TDA 202 to tubular 111 in THP 207. | Visual/ CCTV | TD elevator 129 is closed. | TDA 202 will rotate and lower when vertical until facing toward THP 207. | TDA 202 to Open state. |
| 4. | Driller | Open slips 161:<br>Open slips 161 (command).<br>Hoist to open slips 161. | Visual | TD elevator 129 is closed.<br>RN 151 has completed the make-up sequence with correct torque. | | Slips 161 to Open state.<br>DW 119 load. |
| 5. | Driller | Lower drill string 120:<br>Verify slips 161 are open before lowering drill string 120. | Visual | Slips 161 are open. | | Settings: DW 119 lowering speed and minimum slack-off weight. |
| 5.1. | Pipe Handler | TDA 202 and LSA 228 extend to tubular 111 in THP 207:<br>Move TDA 202 until contact with tubular 111 in THP 207, below TJ. | Visual/ CCTV | TDA 202 is open.<br>LSA 228 guide funnel is open. | TDA 202 moves until contact with tubular 111 in THP 207. | |
| 5.2. | Pipe Handler | TDA 202 and LSA 228 latch onto tubular 111 in THP 207:<br>Close TDA 202.<br>Close LSA 228 guide funnel. | Visual/ CCTV | TDA 202 is at THP 207. | The closing sequence is verified to assure proper grip on tubular 111. | Confirm TDA 202 is closed on tubular 111.<br>LSA 228 guide is closed. |
| 5.3. | Pipe Handler | UTC 242 and LTC 244 open and retract. | Visual/ CCTV | TDA 202 is closed. | UTC 242 and LTC 244 open and retract. | UTC 242 and LTC 244 to Open state. |
| 5.4. | Pipe Handler | TDA 202 moves tubular 111 to THP 207:<br>TDA 202 lifts tubular 111, guided by LSA 228, to THP 207.<br>Continue step 2.2. | Visual/ CCTV | UTC 242 and LTC 244 are open. | TDA 202 hoists, tilts to vertical, rotates 180 degrees to face TD 116.<br>TDA 202 dopes top box if preselected (automatic). | TDA 202 load indication. |
| 6. | Driller | Set slips 161:<br>Set slips 161 at correct stick-up height.<br>Set off weight. | Visual | Stick-up at correct height. | | Slips 161 to Closed state.<br>DW 119 load indicator.<br>Tally update. |
| 7. | Driller | Check trip tank volume, gain/loss:<br>Determine trip tank gain/loss.<br>Repeat all steps for next tubular 111. | Visual | Slips 161 are closed. | Trip tank gain/loss is calculated and displayed. | Trip sheet/ volume control. |

When a tripping-out operation is to be performed, an operator 195 on the rig floor 114 may verify that various pieces of equipment are properly shut down and locked out, and then perhaps perform other preparations such as the examples set forth above in Table 1A. The well construction system 100, 200 can then be set-up for the trip-out sequence. Examples of such set-up may be as set forth below in Table 2A.

TABLE 2A

| Tripping-Out Set-Up | | | |
|---|---|---|---|
| Equipment | Responsible | Set-Up | HMI |
| Pipe handling: TBR 254, SGA 262, UTC 242, LTC 244, ITC 236, THP 207, TDA 202, LSA 228, RN 151 | Driller/ Pipe Handler | Verify operator 195 on rig floor 114 completed pre-checks and deactivated emergency stop for all pipe handling equipment.<br>Select Trip Out mode.<br>Select setup wizard to open pop-up on front screen 532, 534, 536. Verify settings:<br>Select slot, direction for picking pipe.<br>Select pipe type.<br>Select RN 151 to use in the operations.<br>Select pin/box doping.<br>Stick-up target.<br>Select "activate all machines" to startup and prepare all machines. | Verify Setback screen.<br>Construction Program setup wizard.<br>After startup: Check for green light in Construction Program status header on front screen 532, 534, 536. |
| TD 116, DW 119, MP 144, Trip tank | Driller | Verify operator 195 on rig floor 114 completed pre-checks and deactivated emergency stop for all pipe handling equipment.<br>Open Construction Program screen on touchscreen 522, 524.<br>Select Trip Out mode.<br>Select setup wizard to open pop-up on front screen 532, 534, 536. Verify settings:<br>Stick-up target.<br>Set DW 119 upper/lower stops.<br>Set maximum lowering speed.<br>Set over pull.<br>Trip tank 1/2/auto.<br>Trip tank low/high levels.<br>Select "activate all machines" to startup and prepare all machines. | Verify Setback screen.<br>Construction Program setup wizard.<br>After startup: Check for green light in Construction Program status header on front screen 532, 534, 536. |
| TD 116 | Driller | Verify operator 195 on rig floor 114 completed pre-checks.<br>Activate TD 116 from touchscreen 522, 524.<br>Select Operation screen on touchscreen 522, 524. | Verify operator screen, system status/alarms. |
| DW 119 | Driller | Activate DW 119 from touchscreen 522, 524. | Verify operator screen, system status/alarms. |
| All machines | Driller | Verify all relevant machines are enabled in zone management system and tubular interlock system. | Verify operator screen, system status/alarms. |

After such preparations and set-up, the operator 195 may vacate the rig floor 114, and the equipment may be configured to be ready for remote control (e.g., by deactivating emergency stops). An example trip-out sequence may start with the TD 116 in lower position over WC 203 with closed slips 161 and elevator 129, with a stick-up of about one meter. The TDA 202 and LSA 228 are open in THP position 207 (tubular 111 delivered from WC 203 to THP 207). The UTC 242 and LTC 244 are closed on the tubular 111 in the THP 207. The TBR 254 and SGA 262 are empty, on the way from the FIB 166 to get a new tubular 111 in the THP 207. Example steps of the trip-out sequence may be as set forth below in Table 2B.

TABLE 2B

| Tripping-Out Operation | | | | | | |
|---|---|---|---|---|---|---|
| | Operator 195 | Operation | Line of Sight | Equipment precondition | Equipment Functionality | HMI |
| 1. | Driller | Open slips 161 and hoist to upper stop:<br>Verify that elevator 129 is closed.<br>Open slips 161 (command).<br>Hoist to take weight and verify slips 161 opening. | Visual/ CCTV | Elevator 129 must be closed before opening slips 161. | Slips 161 Open is not selectable if elevator 129 is not closed.<br>The slips 161 Open command is reset after a set time if the slips 161 are not opened. | Slips 161 to Open state.<br>Settings:<br>DW 119 hoisting speed and maximum overpull. |

TABLE 2B-continued

| | Operator 195 | Operation | Line of Sight | Equipment precondition | Equipment Functionality | HMI |
|---|---|---|---|---|---|---|
| | | Tripping-Out Operation | | | | |
| 1.1. | Pipe Handler | TBR 254 and SGA 262 pick up next tubular 111 from THP 207: TBR 254 and SGA 262 move to tubular 111 in THP 207. Close TBR 254 and SGA 262 guides/clamps on tubular 111. | Visual/ CCTV | TBR 254 and SGA 262 open. | | TBR 254 and SGA 262 grips/ guides to Closed state. |
| 1.2. | Pipe Handler | UTC 242 and LTC 244 open and retract: UTC 242 and LTC 244 open. UTC 242 and LTC 244 retract from THP 207. | Visual/ CCTV | TBR 254 and SGA 262 closed on tubular 111 in THP 207. | UTC 242 and LTC 244 open and retract. | UTC 242 and LTC 244 to Open state-retracted. |
| 1.3. | Pipe Handler | TBR 254 and SGA 262 move toward FIB 166 with tubular 111: Lift tubular 111 from THP 207. Move to selected position in FIB 166. | Visual/ CCTV | Valid FIB 166 position selected. | TBR 254 and SGA 262 will follow predefined path. FIB 166 latches will open when tubular 111 is outside selected FIB 166 row. FIB 166 latches will close prior to setting down the tubular 111. Set down tubular 111 on selected position. | TBR 254 load. |
| 1.4. | Pipe Handler | TDA 202 and LSA 228 move to WC 203: TDA 202 move to WC 203. LSA 228 move to WC 203. | Visual/ CCTV | | TDA 202 retract to vertical, hoist, and rotate, extend to WC 203 at about two meters below stick-up. TDA 202 and LSA 228 will stop/wait outside WC 203 area if TD 116 is moving. | TDA 202 load indication. |
| 1.5. | Pipe Handler | Move RN1 51 to WC 203: Verify TD 116 is hoisted above RN 151 working area. Start 151 RN break-out sequence to move RN 151 to WC 203. | | RN 151 tongs open. WC 203 selected. | RN 151 will move to WC 203. Elevate RN 151 to stick-up. RN 151 will stop/ wait outside WC 203 area if TD 116 is moving. | TJ (Stick-up) assist indication. |
| 2. | Driller | Set slips 161: Verify required stick-up height. Set slips 161 (command). Set off weight. | Visual/ CCTV | | | DW 119 upper stop setting. |
| 2.1. | Pipe Handler | TDA 202 close and LSA 228 guide close: Verify TDA 202 and LSA 228 at WC 203. Close TDA 202. Close LSA 228 guide funnel. | Visual/ CCTV | Slips 161 closed. | TDA 202 and LSA 228 will not close in WC 203 if slips 161 are not closed. | TDA 202 to Closed state. TDA 202 and LSA 228 in WC 203. LSA 228 guide funnel to Closed state. |
| 2.2. | Pipe Handler | RN 151 break-out and spin-out: Verify slips 161 closed and weight set off. Adjust RN 151 elevation if required. Continue RN 151 sequence. | CCTV | Slips 161 closed. | Break-out and spin out. Double break-out available if required. Open RN 151 spinner, guide, and clamps. Return RN 151 to park position. RN 151 may wait in WC 203 until TDA 202 has lifted tubular 111. | RN 151 indication. |

TABLE 2B-continued

Tripping-Out Operation

| | Operator 195 | Operation | Line of Sight | Equipment precondition | Equipment Functionality | HMI |
|---|---|---|---|---|---|---|
| 3. | Driller | Open TD elevator 129, retract, and lower: Verify TDA 202 is closed. Open TD elevator 129 and retract. Lower TD 116 (e.g., to rig floor 114. | Visual/ CCTV | TDA 202 closed. Slips 161 closed. | | TD elevator 129 to Closed state. TD 116 retracted position. |
| 3.1. | Pipe Handler | TDA 202 lift tubular 111 out of stick-up: Hoist TDA 202 to pick up weight. LSA 228 centralizer will close on tubular 111 above stick-up. RN 151 may return to park position when tubular1 11 is lifted. | Visual/ CCTV | RN 151 finished spin-out, RN 151 BUT is open. TD 116 retracted. | TDA 202 will hoist about two meters before lifting tubular 111. Tubular 111 is lifted carefully. Lifting is stopped if tubular 111 is catching on threads in TJ. LSA 228 centralizer closes after lifted above the box. | TDA 202 load indication. LSA 228 centralizer. |
| 3.2. | Pipe Handler | TDA 202 and LSA 228 move tubular 111 to THP 207: TDA 202 and LSA 228 move toward THP 207. LTC 244 extends to THP 207 and closes guide when tubular is close to THP 207. Set down tubular at THP 207. Wash and dope pin if preselected. | Visual/ CCTV | TDA 202 closed. LTC 244 closed tubular 111 is below LTC 244. | TDA 202 will retract when to vertical position above MOH (or rig floor 114), then rotate, lower, and extend to THP 207. TDA 202 will slow down above THP 207. LTC 244 is extended and closed. LSA 228 is open. | TDA 202 load indication. TDA 202 and LSA 228 position. LSA 228 extend. LTC 244 to Closed state. |
| 3.3. | Pipe Handler | UTC 242 extend to THP 207 and close. | Visual/ CCTV | TDA 202 and LSA 228 in THP 207 with tubular 111. | UTC 242 extend to THP 207. UTC 242 guide close. | UTC 242 and LTC 244 to closed state. |
| 4. | Driller | Extend TD 116 and latch elevator 129: Extend TD 116 to WC 203. Latch elevator 129 (automatic close on impact). | Visual | RN 151 parked. | | Elevator 129 Closed state. Indicate TD 116 in WC 203. |
| 5. | Driller | Check trip tank volume, Gain/Loss: Determine trip tank gain/loss. Repeat all steps for next tubular 111. Continue on step 1. | Visual | | Trip tank gain/loss is determined and displayed. | Trip sheet/ volume control. |
| 5.1. | Pipe Handler | TDA 202 open and retract from THP 207: Verify UTC 242 and LTC 244 are closed. Open TDA 202. Open LSA 228 guide funnel. Continue on step 1.4. | Visual/ CCTV | UTC 242 closed. | | TDA 202 to Open state. |
| 5.2. | Pipe Handler | TBR 254 and SGA 262 move to THP 207: Open TBR 254 and SGA 262. Move TBR 254 and SGA 262 toward THP 207/ next tubular. Continue step 1.1. | | UTC 242 and LTC 244 closed on tubular 111. | TBR 254 clamp and guide and SGA 262 guide will open. TBR 254 will hoist before it retracts out of FIB 166. | TBR 254 clamp and guide and SGA 262 guide to Open state. |

When a drilling connection is to be made, an operator 195 on the rig floor 114 may verify that various pieces of equipment are properly shut down and locked out, and then perhaps perform other preparations such as the examples set forth above in Table 1A. The well construction system 100, 200 can then be set-up for making the drilling connection. Examples of such set-up may be as set forth below in Table 3A.

TABLE 3A

| Drilling Connection Set-Up | | | |
|---|---|---|---|
| Equipment | Responsible | Set-Up | HMI |
| Pipe handling: TBR 254, SGA 262, UTC 242, LTC 244, ITC 236, THP 207, TDA 202, LSA 228, RN 151 | Driller/ Pipe Handler | Verify operator 195 on rig floor 114 completed pre-checks and deactivated emergency stop for all pipe handling equipment. Open Construction Program screen on touchscreen 522, 524. Select Drilling Connection mode. Select setup wizard to open pop-up on front screen 532, 534, 536. Verify settings: Select slot, direction for picking pipe. Select pipe type. Select RN 151 to use in the operations. Select RN 151 as back-up only (only selectable for THT). RN 151 MU torque. Select pin/box doping. Stick-up target. Select "activate all machines" to startup and prepare all machines. | Verify Setback screen. Construction Program setup wizard. After startup: Check for green light in Construction Program status header on front screen 532, 534, 536. |
| TD 116, DW 119, MP 144 | Driller | Verify operator 195 on rig floor 114 completed pre-checks and deactivated emergency stop for all pipe handling equipment. Open Construction Program screen on touchscreen 522, 524. Select Drilling mode. Select setup wizard to open pop-up on front screen 532, 534, 536. Verify settings: Stick-up target. Set DW 119 upper/lower stops. Set relevant Autodriller parameters (ROP, WOB, delta-P, torque, etc.) Verify correct TD 116 make-up torque setting. Assign TD 116 rotation to armrest control 514, 515, 516. Verify/set TD 116 ramp parameters. Verify correct drilling torque setting. Verify liner size setting and pump efficiency. Verify MP 144 pressure limit setting. Assign pumps to MP 144 master slider. Verify/set MP 144 ramp-up parameters. Verify active tanks are selected and lined up. Select "activate all machines" to startup and prepare all machines. | Verify Setback screen. Construction Program setup wizard. After startup: Check for green light in Construction Program status header on front screen 532, 534, 536. |
| All machines | Driller | Verify all relevant machines are enabled in zone management system and tubular interlock system. | Verify operator screen, system settings. |

After such preparations and set-up, the operator 195 may vacate the rig floor 114, and the equipment may be configured to be ready for remote control (e.g., by deactivating emergency stops). An example drilling connection sequence may start with the drill string 120 drilled all the way down, reaming, survey, up/down weights, etc., performed according to drilling program. A tubular 111 to be added to the drill string 120 and in the TDA 202/LSA 228 is lifted from stick-up level above the MOH 204. The THP 207 is empty, and the UTC 242 and LTC 244 are open and retracted. The TBR 254 and SGA 262 are empty, on the way to pick a new tubular 111 from the FIB 166. Example steps of the drilling connection sequence may be as set forth below in Table 3B.

TABLE 3B

Drilling Connection Operation

| | Operator 195 | Operation | Line of Sight | Equipment precondition | Equipment Functionality | HMI |
|---|---|---|---|---|---|---|
| 1. | Driller | Set slips 161: Verify MPs 144 are stopped and torque is released from drill string 120. Set slips 161 at required stick-up height. Set off weight. | Visual | | | Slips 161 to Closed state. DW 119 hook load. TD 116 torque release. |
| 2. | Driller | TD 116 break-out connection: Verify slips 161 are closed. Break-out connection (joystick button + joystick). Deactivate break-out button when connection is broken (torque dropping and shaft rotating). | Visual | Slips 161 must be closed before TD 116 BUT Break-Out function is available. | TD 116 Break-Out function will activate the clamp and increase the torque to break the connection. TD 116 break-out will activate the TD 116 thread compensator and pipe handler lock. When connection is broken, release button. The torque will be released and backup clamp (BUC) opened. DW 119 is interlocked from hoisting when the BUC is closed. | TD 116 thread compensator indication. TD 116 not connected. TD 116 Break-Out function-joystick button-push and hold. Clamp on/ break-out may be operated separately on touch screen 522, 524. TD 116 torque dropping and shaft rotating. |
| 3. | Driller | TD 116 spin-out: Verify break-out is completed. Spin-out. (Direct continue from break-out). Hoist out of stick-up. | Visual | Slips 161 must be closed. Break-Out not active. BUC open. | Spin-Out will activate the TD 116 thread compensator system. Spin-Out function will spin-out per settings. Deactivate TD 116 thread compensator. | TD 116 thread compensator indication. |
| 4. | Driller | Retract and move TD 116 to connection height: Verify TD 116 is above stick-up. Retract TD 116 and activate link tilt float. Hoist TD 116 to tubular 111 connection height (upper stop). | Visual/ CCTV | Hoisting will be stopped if TD 116 is retracted and links tilted to parked position. | TD 116 pipe handler has pre-set position facing TDA 202. | Indicate upper stop position. Link tilt position. |
| 4.1. | Pipe Handler | Move RN 151 to WC 203: Verify TD 116 is hoisted above RN 151 working area. Start RN 151 make-up sequence to move RN 151 to WC 203. | | Only possible with THT. If THA is used, then wait for tubular 111 located above stick-up. RN 151 tongs open. WC 203 selected. | RN 151 will move to WC 203. Elevate to stick-up. | TJ assist indication. |
| 4.2. | Pipe Handler | TDA 202 move tubular 111 to WC 203: Continue to lift TDA 202 and extend to WC 203 (above stick-up). LSA 228 guide to WC 203 when pin end above rig floor 114. | Visual/ CCTV | TD 116 retracted. | Tilt towards WC 203. TDA 1613 dope top box. | TDA 202 Load indication. |
| 4.3. | Pipe Handler | Guide tubular 111 with RN 151 in WC 203: Verify tubular 111 is located in WC 203. Adjust RN 151 elevation if required. Continue RN 151 sequence. | CCTV | Tubular 111 held by TDA 202/LSA 228 above stick-up in WC 203. | Close RN 151 BUT. Close stabbing guide. | Stabbing guide closed indication. BUT closed indication. |
| 4.4. | Pipe Handler | TDA 202 lower to stab tubular 111 in stick-up: Lower tubular 111 to | Visual/ CCTV | RN 151 in WC 203 with stabbing guide closed. | Continue lowering about two meters after verifying set of | TDA load indication (unloading). |

TABLE 3B-continued

| | Operator 195 | Operation | Line of Sight | Equipment precondition | Equipment Functionality | HMI |
|---|---|---|---|---|---|---|
| | | Drilling Connection Operation | | | | |
| | | stab into stick-up. Continue lowering about two meters after stabbing complete. LSA 228 open and retract when RN 151 stabbing guide closed on tubular 111. | | | weight (to allow room for TD 116 to latch on top). | |
| 4.5. | Pipe Handler | RN 151 back-up (pre-selected): Option: Spin-in and make-up with RN 151: RN 151 BUT will stay on for back-up. Option: Make-Up with RN 151: Continue RN 151 sequence to spin-in and make-up. | Visual/ CCTV | Tubular 111 stabbed in stick-up. TDA 202 unloaded. | Option: Spin-in and make-up connection. Open spinner, guide, and clamps. Return to park position. | Torque log updated. MU torque presented to driller. |
| 5. | Driller | Extend TD 116 to WC 203: Extend TD 116 to WC 203. Deactivate link tilt float. Tilt elevator 129 to parked position. | Visual/ CCTV | TDA 202 below TJ. | | Indicate TD 116 in WC 203. Link tilt. |
| 6. | Driller | TD 116 spin-in (both connections): Verify RN 151/THT BUT closed. Activate TD 116 spin-in. Lower TD 116 to stab and spin-in. Optional: Lower connection made-up by RN 151: See step 7. | Visual/ CCTV | TD 116 in WC 203. THT/DPT BUC on. | Spin-in with spin-in settings (RPM/ torque). Spin-in will activate the TD 116 thread compensator system. | Thread compensator indication (mid stroke). |
| 7. | Driller | TD 116 make-up (both connections): Verify TD 116 spin-in function is finished. Make-up the connection(s) (joystick button + joystick). Release button when make-up torque is reached. | Visual/ CCTV | TD 116 spin-in completed. THT BUT closed. | TD 116 Make-up function will change TD 116 torque to set make-up torque. Release torque when button is released and joystick to center. DW 119 is interlocked from hoisting when RN 151 BUC is closed. (Rig tong or slips 161 may be used as backup per setting). TD 116 thread compensator system is deactivated. | RN 151 BUC on. TD 116 make-up torque. TD 116/ RN 151 torque log updated (both connections). TD 116 connected state when make-up torque is reached. Make-up function may be operated manually from touchscreen 522, 524. |
| 8. | Driller | Option: TD 116 spin-in upper connection (lower connection made-up by RN 151): Verify RN 151/THT finished (tubular 111 connected). Activate TD 116 Spin-in. Lower TD 116 to stab and spin-in. | Visual/ CCTV | TD 116 in WC 203. RN 151 finished/ open (retracted). | Spin-in with spin-in settings (RPM/ torque). Spin-in will activate the TD 116 thread compensator system. | Thread compensator (mid stoke). |
| 9. | Driller | Option: TD 116 make-up upper connection (lower connection made-up by RN 151): Verify TD 116 spin-in is finished. | Visual/ CCTV | RN 151 make-up finished. TD 116 spin-in finished. Clamp on make-up available from | TD 116 make-up will automatically activate pipe handler lock, close the TD 116 BUC, and increase TD 116 torque to set | TD 116 BUC on. TD 116 MU torque. TD 116 torque updated. |

TABLE 3B-continued

Drilling Connection Operation

| | Operator 195 | Operation | Line of Sight | Equipment precondition | Equipment Functionality | HMI |
|---|---|---|---|---|---|---|
| | | Make-up connection (joystick button + joystick). Release button when make-up torque is reached. | | touch panel 522, 524 without spin-in. | make-up torque. Release button (and joystick to center) to open BUC and release torque. DW 119 is interlocked from moving when BUC is closed. TD thread compensator system is deactivated. | TD 116 Connected state when MU torque is reached. TD 116 MU may be operated manually on touchscreen 522, 524. |
| 9.1. | Pipe Handler | TDA 202 open and move to THP 207: Verify TD 116 is connected. Open TDA 202. Retract and rotate TDA 202 towards THP 207. | | TD 116 spin-in finished. | TDA 202 will tilt to vertical, rotate to face toward THP 207, and lower to pick up next tubular 111. | TDA 202 to Open state. |
| 10. | Driller | Open slips 161: Open slips 161. Hoist to open slips 161. | Visual/ CCTV | TD 116 connected. | | Slips 161 to Open state. DW 119 hook load. |
| 11. | Driller | Continue drilling per drilling program: Open IBOP. Continue drilling per drilling program. | Visual | Slips 161 open. | | IBOP to Open status. TD 116 RPM. TD 116 torque. MP 144 strokes per minute (SPM). Standpipe pressure. |
| 11.1. | Pipe Handler | TBR 254 and SGA 262 pick up new tubular 111: Move TBR 254 and SGA 262 to selected finger/slot in FIB 166. Close guides and clamp on tubular 111. | Visual/ CCTV | TBR 254 and SGA 262 grip/guide open. Selected FIB 166 position is "valid." | TBR 254 will move into FIB 166 elevated above open latches. Adjustments available. TBR 254 and SGA 262 grip/guide will close. | TBR 254 and SGA 262 grip/ guide to Closed state. |
| 11.2. | Pipe Handler | TBR 254 and SGA 262 move tubular 111 to THP 207: Open FIB 166 latches for selected row. Verify latches open (visual/CCTV). TBR 254 lifts tubular 111 and moves to THP 207. FIB 166 latches will close as the tubular 111 moves out of FIB 166. Set down tubular in THP 207. Wash and dope pin if preselected. | Visual/ CCTV | THP 207 empty. UTC 242 and LTC 244 are open. Correct pipe detected in TBR 254 and SGA 262. | TBR 254 cannot open with weight. TBR 254 gripper open when unloaded. FIB 166 latches will not open with TBR 254 head in low position. | Indicate open FIB 166 latches. TBR 254 load indication. |
| 11.3. | Pipe Handler | UTC 242 and LTC 244 extend to THP 207 and close. | Visual/ CCTV | TBR 254 and SGA 262 with tubular in THP 207. | UTC 242 and LTC 244 extend and close. | UTC 242 and LTC 244 to Closed state. |
| 11.4. | Pipe Handler | TBR 254 and SGA 262 open and move toward FIB 166: Open TBR 254 clamps and guide and SGA 262 guide. Move toward FIB 166/ next tubular 111. | | UTC 242 and LTC 244 closed on tubular 111. | | |

It is noted that the example drilling connection sequence set forth above describes the RN 151 and THT used as the BUT for the TD 116 during make-up, as well as the option of making-up the lower connection with the RN 151 and the upper connection with the TD 116.

Different combinations of the aspects described above may also be utilized for building stands of two or more tubulars 111. Such stand building may be performed during drilling and other operations performed at WC 203. Such simultaneous operations, however, are coordinated to avoid conflicts and obstructions between the different machines and systems. For example, the elevator of the TDA 202 may have two different sizes of inserts to permit building casing stands while drilling. The change of head size may be done remote from the Pipe Handler's workstation 450 (or 452 or 454). When a stand building operation is to be performed, an operator 195 on the rig floor 114 may verify that various pieces of equipment are properly shut down and locked out, and then perhaps perform other preparations such as the examples set forth below in Table 4A.

TABLE 4A

| Stand Building Preparations | | |
|---|---|---|
| Equipment | Responsible | Verifications |
| Catwalk (CW) 131 | Operator 195 on rig floor 114. | Travel path is unobstructed. Feeding table (FT) indexer pins. |
| FIB 166 | Pipe Handler | Stands in FIB 166 slots per HMI. Fingers closed. Travel path is unobstructed. |
| TBR 254 | Pipe Handler | Travel path is unobstructed. |
| SGA 262 | Pipe Handler | Travel path is unobstructed. |
| LTC 244 ITC 236 UTC 242 | Operator 195 on rig floor 114. | Travel path is unobstructed. Dies are clean and not worn. |
| THP Doper 209 | Operator 195 on rig floor 114. | Travel path is unobstructed. Water and correct dope available for doper 209. |
| LSA 228 | Operator 195 on rig floor 114. | Travel path is unobstructed. |
| TDA 202 | Operator 195 on rig floor 114. | Travel path is unobstructed. Correct dope is available for associated doper 209. Correct inserts installed. |
| RN 151: THA-DPT | Operator 195 on rig floor 114. | DPT is assembled. Dies are clean and not worn. Travel path is unobstructed. |
| Tubulars 111 | Operator 195 on rig floor 114. | Tubular 111 to be loaded on FT. Tubulars 111 to be cleaned and doped, protectors removed. |

The well construction system 100, 200 can then be set-up for the stand building operation. Examples of such set-up may be as set forth below in Table 4B.

TABLE 4B

| Stand Building Set-Up | | | |
|---|---|---|---|
| Equipment | Responsible | Set-Up | HMI |
| Pipe handling: TBR 254, SGA 262, UTC 242, LTC 244, ITC 236, THP 207, TDA 202, LSA 228, RN 151, CW 131 | Pipe Handler | Verify operator 195 on rig floor 114 completed pre-checks and deactivated emergency stop for all pipe handling equipment. Open Construction Program screen on touchscreen 522, 524. Select Stand Building mode. Select setup wizard to open pop-up on front screen 532, 534, 536. Verify settings: Select slot, direction for racking stands 111. Select pipe size/type. Select RN 151 (with THA) to use in the operations. RN 151 MU torque. Perform pin/box doping. Stick-up target. Select "activate all machines" to startup and prepare all machines. | Verify Setback screen. Construction Program setup wizard. After startup: Check for green light in Construction Program status header on front screen 532, 534, 536. |
| All machines | Pipe Handler | Verify all relevant machines are enabled in zone management system and tubular interlock system. | |
| Tubulars 111 | Pipe Handler | All tubulars 111 to be registered in electronic tally system. | |

After such preparations and set-up, the operator 195 may vacate the rig floor 114, and the equipment may be configured to be ready for remote control (e.g., by deactivating emergency stops). An example stand building sequence may start with the MOH 204 and THP 207 empty, the ITC 236 retracted, and the CW 131 feeding table pre-loaded with tubulars (perhaps already cleaned and doped). Example steps of the stand building sequence may be as set forth below in Table 4C. In such example, among others within the scope of the present disclosure, the pipe handling equipment may be operated automatically via the Construction Program, and the step execution of the pipe handling equipment may be controlled automatically by one or two operators 195 at the associated workstation(s) 450, 452, 454. The Construction Program may also feature configurable step confirmations. The stand building sequence controlled by the Construction Program may be stopped or interrupted at any time, and some or all functions may be operated manually by the one or two operators 195 at the associated workstation(s) 450, 452, 454.

TABLE 4C

| Stand Building Operation | | | | | | |
|---|---|---|---|---|---|---|
| | Operator 195 | Operation | Line of Sight | Equipment precondition | Equipment Functionality | HMI |
| 1. | Pipe Handler | Load tubular 111 into the CW 131: Verify that CW 131 is empty and in position. Use FT of CW 131 to load tubular 111 into CW 131. | Visual/ CCTV | FT pre-loaded with pipe (cleaned and doped). CWM in loading position. | | |
| 2. | Pipe Handler | Run tubular 111 in CW 131 to pick-up position: Verify tubular 111 is loaded in ramp 149. Move skate 133 to move tubular 111 toward pick-up position. | Visual/ CCTV | Tubular 111 loaded in ramp 149. | Ramp 149 will tilt to rig floor 114 tubular position. Skate 133 will move towards rig floor 114. Skate 133 will stop with tubular 111 box on ramp 149. | |
| 3. | Pipe Handler | Move TDA 202 to pick-up position: Tilt TDA 202. Lower and extend TDA 202 to CW 131 pick-up position (above THP 207). | Visual | TDA 202 open. | | |
| 4. | Pipe Handler | Present tubular 111 for TDA 202: Run skate 133 until tubular 111 is positionedf or TDA 202. | Visual | Ramp 149 in pick-up position. TDA 202 in pipe-receive position. | Skate 133 will move forward a defined distance depending on pipe size. | CW 131 position. |
| 5. | Pipe Handler | Latch TDA 202: Hoist TDA 202 to latch onto tubular 111. Close TDA 202. | Visual | Tubular 111 is positioned correctly for TDA 202. | Tubular interlock prevents hoisting without closed TDA 202 (above preset height). | TDA 202 to Closed state. |
| 6. | Pipe Handler | Lift tubular 111 to vertical position above MOH 204: Verify TDA 202 is closed. Hoist TDA 202 to pick up single tubular joint from CW 131. Move LSA 228 to preset position to prepare for guiding. Before the tubular 111 lower end leaves CW 131, close LSA 228 funnel. Dope box when pipe is vertical (If selected). Continue hoisting TDA 202 until tubular 111 is above MOH 204. | Visual | TDA 202 closed. Verify LSA 228 is positioned to receive pipe bottom before hoisting. TDA 202 above LSA 228 operating area. | Hoisting will stop prior to lifting tubular 111 out of CW 131 without guiding. LSA 228 centralizer closes when tubular 111 nears vertical. TDA 202 and LSA 228 will position tubular 111 above MOH 204/ITC 236. | LSA 228 guide to Closed state. LSA 228 centralizer to Closed state. Indicate TDA 202/LSA 228 in MOH 204 position. |
| 6.1. | Pipe Handler | Skate 133 retract to loading position: Verify tubular 111 pin end is clear of ramp 149. Move skate 133 toward FT loading position. | Visual/ CCTV | | Skate 133 will move to loading position. Ramp 149 will tilt to loading position. | |

TABLE 4C-continued

| | Stand Building Operation | | | | | |
|---|---|---|---|---|---|---|
| | Operator 195 | Operation | Line of Sight | Equipment precondition | Equipment Functionality | HMI |
| 6.2. | Pipe Handler | CW 131 load and present next tubular 111: Pick up next tubular 111 per steps 1 and 2. | Visual/ CCTV | | See steps 1 and 2. | |
| 7. | Pipe Handler | Stab/position first tubular 111 in MOH 204/ITC 236: If THP 207 (pin) doping is selected: Move single 111 to THP 207. Extend and close LSC 228 for guiding. Open and retract LSA 228. Wash and dope pin. TDA 202 move single 111 to ITC 236/MOH 204. LSC 228 guide open and retract. Verify TDA 202/LSA 228 is above MOH 204. Lower single 111 into LSC 228. Open LSA 228 and retract. Close LSC 228 guide when pin end below guide. Continue lowering tubular 111 inside MOH 204 until stick-up of about one meter. | Visual | Pipe bottom clear of CW 131. LSA 228 close when tubular 111 nears vertical. | TDA 202 is rotated when the single 111 is lowered into the MOH 204 to permit open and retract outside WC 203 area. | Indicate LSA 228, ITC 236, LTC 244 guide/ grip states. Indicated LSA 228, ITC 236, LTC 244 positions. |
| 8. | Pipe Handler | Close ITC 236 on tubular 111: Verify tubular 111 inside ITC 236/LTC 244. Extend ITC 236 head. Close ITC 236 guide and clamps. Open and retract LTC 244 (if doping next pin). | Visual/ CCTV | | | ITC 236 head extend. ITC 236/LTC 244 Closed state. |
| 9. | Pipe Handler | Transfer weight to ITC 236 and open TDA 202: Lower TDA 202 to transfer tubular 111 weight to ITC 236. Open TDA 202 and retract from stick-up. Move TDA 202 to CW 131 pick-up position. | Visual/ CCTV | ITC 236 closed. | Verify weight transferred prior to open TDA 202. | TDA 202 load indicator. TDA 202 to Open state. |
| 10. | Pipe Handler | Present second tubular 111 above TDA 202: Verify TDA 202 open and below tubular 111 pick-up position. Move skate 133 until tubular 111 is positioned above TDA 202 elevator. | Visual | Ramp 149 in tubular 111 pick-up position. TDA 202 in tubular 111 pick-up position. | Skate 133 will move forward a predetermined distance depending on tubular 111 size (see step 4). | |
| 11. | Pipe Handler | Latch TDA 202 on second tubular 111: Hoist TDA 202 to latch onto tubular 111. Close TDA 202. | Visual | Tubular 111 is positioned correctly for TDA 202. | Tubular interlock to prevent hoisting without closed TDA 202 (above preset height). | TDA 202 to Closed state. |

TABLE 4C-continued

Stand Building Operation

| | Operator 195 | Operation | Line of Sight | Equipment precondition | Equipment Functionality | HMI |
|---|---|---|---|---|---|---|
| 12. | Pipe Handler | Lift tubular 111 to vertical above MOH 204: Verify TDA 202 is closed. Hoist TDA 202 to pick-up single 111 from CW 131. Move LSA 228 to preset position to prepare for guiding. Before the tubular 111 lower end leaves CW 131, close LSA 228 funnel. Dope box when tubular 111 is vertical (if selected). Continue hoisting TDA 202 until tubular 111 is above MOH 204. | Visual | TDA 202 closed. Verify LSA 228 is positioned to receive tubular 111 bottom before hoisting. TDA 202 above LSA 228 operating area. | Hoisting will stop prior to lifting tubular 111 out of CW 131 without guiding. LSA 228 centralizer closes when tubular 111 nears vertical. TDA 202 and LSA 228 will position tubular 111 above MOH 204/ITC 236. | Indicate LSA 228 guide position. Indicate TDA 202/LSA 228 in MOH 204 position. |
| 13. | Pipe Handler | CW 131 retract to loading position: Verify tubular 111 pin end is clear of ramp 149. Move CW 131 toward FT loading position. | Visual/ CCTV | | Skate 133 will move to loading position. Ramp 149 will tilt to loading position. | |
| 14. | Pipe Handler | CW 131 load and present third tubular 111 (if needed): Pick up next tubular 111 per steps land 2. | Visual/ CCTV | | Reference steps 1 and 2. | |
| 15. | Pipe Handler | Move RN 151 to MOH 204 position: Activate RN 151 sequence. Activate RN 151 stabbing guide. | Visual | TDA 202/LSA 228 in move to MOH 204 position. | RN 151 (THA) will MOH 204 and elevate to selected stick-up height. | |
| 16. | Pipe Handler | Stab second tubular 111 in MOH 204 stick-up: Open and retract LSA 228. Lower single 111 into MOH 204 stick-up. Continue lowering (e.g., at least about 0.2 meters to permit spin-in). | Visual | Tubular 111 bottom clear of CW 131. LSA 228 open, RN 151 stabbing guide active. | | Indicate weight transfer. |
| 17. | Pipe Handler | RN 151 spin-in and make-up: Verify pin is stabbed in the box. Activate RN 151 sequence to continue make-up sequence. | Visual/ CCTV | Single 111 stabbed in stick-up (TDA 202 unloaded, elevator below TJ). | RN 151 will automatically spin-in and make-up to preset torque. Open RN 151 spinner, guide, and clamps. Return RN 151 to park position. | Torque log updated. |
| 18. | Pipe Handler | Lower double 111 into MOH 204 (if needed): Verify connection is made-up. Hoist TDA 202 to pick up weight. Open ITC 236 guide and clamps. Lower double 111 to correct stick-up. LTC 244 in position for guiding if doping not selected (else, LTC 244 retracted). | Visual/ CCTV | RN 151 has completed MU sequence with correct torque. | | TDA 202/LSA 228 Closed/ Open status. TDA 202 load. LTC 244/ITC 236 status. |

TABLE 4C-continued

Stand Building Operation

| | Operator 195 | Operation | Line of Sight | Equipment precondition | Equipment Functionality | HMI |
|---|---|---|---|---|---|---|
| | | Stop at selected stick-up (e.g., about one meter).<br>Close ITC 236 guide and clamps.<br>Lower TDA 202 to transfer tubular 111 weight to ITC 236.<br>Open TDA 202 and retract from stick-up. | | | | |
| 19. | Pipe Handler | Repeat steps 10-17 for third single 111 (if needed) | | | | |
| 20. | Pipe Handler | Move stand 111 to THP 207:<br>LTC 244 extends to stand 111 in MOH 204 position and closes guide.<br>Hoist TDA 202 to pick up stand 111 weight.<br>Open ITC 236 guide and clamps.<br>ITC 236 head retracted.<br>TDA 202 will lift stand 111 from MOH 204 until pin end above THP doper 209.<br>TDA 202 and LTC 244 move stand 111 above THP 207.<br>Stab stand 111 in THP 207 and initiate wash and dope, if selected.<br>UTC 242 extends to stand 111 and closes guide.<br>TDA 202 opens and retracts from stand 111. | Visual/ CCTV | RN 151 has completed MU sequence with correct torque.<br>Complete stand 111 in MOH 204. | | Weight transfer.<br>ITC 236 Retracted.<br>LTC 244 Extended.<br>LTC 244 Closed.<br>ITC 236 Open.<br>UTC 242 Extended.<br>UTC 242 Closed.<br>TDA 202 Open. |
| 21. | Pipe Handler | Set back stand 111:<br>TBR 254 and SGA 262 move to THP 207 and close guide and clamps on stand 111.<br>UTC 242 and LTC 244 open and retract.<br>TBR 254 and SGA 262 set back stand 111 to selected position in FIB 166. | Visual/ CCTV | UTC 242 and LTC 244 closed on stand 111 in THP 207.<br>TDA 202 retracted from stand 111 in THP 207. | | TBR 254/SGA 262 status.<br>TBR 254 load. |

To lay down stands (offline), an operator 195 on the rig floor 114 may verify that various pieces of equipment are properly shut down and locked out, and then perhaps perform other preparations such as the examples set forth above in Table 4A. The well construction system 100, 200 can then be set-up for performing the lay-down operation. Examples of such set-up may be as set forth below in Table 5A.

TABLE 5A

Stand Lay-Down Set-Up

| Equipment | Responsible | Set-Up | HMI |
|---|---|---|---|
| Pipe handling: TBR 254, SGA 262, | Pipe Handler | Verify operator 195 on rig floor 114 completed pre-checks and deactivated emergency stop for all pipe handling equipment. | Verify Setback screen. Construction Program setup |

TABLE 5A-continued

Stand Lay-Down Set-Up

| Equipment | Responsible | Set-Up | HMI |
|---|---|---|---|
| UTC 242, LTC 244, ITC 236, THP 207, TDA 202, LSA 228, RN 151, CW 131 | | Open Construction Program screen on touchscreen 522, 524. Select Stand Building mode. Select setup wizard to open pop-up on front screen 532, 534, 536. Verify settings: Select slot, direction for racking stands 111. Select Pipe size/type. Select RN 151 (with THA) to use in the operations. Select pin/box doping. Stick-up target. Select "activate all machines" to startup and prepare all machines. | wizard. After startup: Check for green light in Construction Program status header on front screen 532, 534, 536. |
| All machines | Pipe Handler | Verify all relevant machines are enabled in zone management system and tubular interlock system. | |
| Tubulars 111 | Pipe Handler | Electronic tally system to be updated. | |

After such preparations and set-up, the operator 195 may vacate the rig floor 114, and the equipment may be configured to be ready for remote control (e.g., by deactivating emergency stops). An example stand lay-down sequence may start with all machines empty, the ITC 236 retracted, and the CW 131 FT empty and ready to receive single tubulars 111. Example steps of the stand lay-down sequence may be as set forth below in Table 5B.

TABLE 5B

Stand Lay-Down Operation

| | Operator 195 | Operation | Line of Sight | Equipment precondition | Equipment Functionality | HMI |
|---|---|---|---|---|---|---|
| 1. | Pipe Handler | TBR 254 and SGA 262 pick up new stand 111: Move TBR 254 and SGA 262 to selected finger/slot in FIB 166. Close guides and clamp on stand 111. | Visual/ CCTV | TBR 254 and SGA 262 grip/guide open. Selected FIB 166 position "valid." | TBR 254 will move into FIB 166 elevated above open latches. Adjustments available, TBR 254 and SGA 262 grip/guide will close. | TBR 254 and SGA 262 grip/ guide to Closed state. |
| 2. | Pipe Handler | TBR 254 and SGA 262 move stand 111 to THP 207: Open FIB 166 latches for selected row. Verify latches open (Visual/CCTV). TBR 254 lift stand 111 and move out of FIB 166 to THP 207. FIB 166 latches will close as the stand 111 moves out of FIB 166. Set stand 111 on THP 207. Wash and dope pin if preselected. | Visual/ CCTV | THP 207 empty. UTC 242 and LTC 244 open. Correct pipe detected in TBR 254 and SGA 262. | TBR 254 cannot open with weight. TBR 254 grip open when unloaded, FIB 166 latches will not open with TBR 254 head in low position. | Indicate open latches. TBR 254 load indication. |
| 3. | Pipe Handler | UTC 242 and LTC 244 extend to THP 207 and close: UTC 242 and LTC 244 extend to THP 207. UTC 242 and LTC 244 close. | Visual/ CCTV | TBR 254 and SGA 262 with stand 111 in THP 207. | UTC 242 and LTC 244 extend and close. | UTC 242 and LTC 244 to Closed state. |
| 4. | Pipe Handler | TBR 254 and SGA 262 open and move toward FIB 166: Open TBR 254 clamps and guide and SGA 262 guide. Move toward FIB 166 (next stand 111). Continue step 1. | | UTC 242 and LTC 244 closed on stand 111. | | |

TABLE 5B-continued

Stand Lay-Down Operation

| | Operator 195 | Operation | Line of Sight | Equipment precondition | Equipment Functionality | HMI |
|---|---|---|---|---|---|---|
| 5. | Pipe Handler | TDA 202 extend to stand 111 in THP 207: Tilt/extend TDA 202 until contact with stand 111 in THP 207, below TJ. Note: LSA 228 used for guiding pin end. | Visual/ CCTV | TDA 202 must be open. | TDA 202 tilt/extend until contact with stand 111 in THP 207. | |
| 6. | Pipe Handler | TDA 202 latch onto stand 111 in THP 207: Close TDA 202. | Visual/ CCTV | TDA 202 must be in THP 207 position. | The closing sequence is verified to assure proper grip. | Confirm TDA 202 closed on tubular 111. |
| 7. | Pipe Handler | UTC 242 open and retract: UTC 242 opens. UTC 242 retracts. LSA 228 to guide mode. | Visual/ CCTV | TDA 202 must be closed. | UTC 242 open and retract. | UTC 242 to Open state. LSA 228 to Guide mode. |
| 8. | Pipe Handler | TDA 202 and LSA 228 move stand 111 to MOH 204: TDA 202 lift stand 111 guided by the LSA 228 to MOH 204. | Visual/ CCTV | UTC 242 open. | TDA 202 hoist, tilt to vertical. TDA 202 dope top box if preselected (automatic). | TDA 202 Load indication. |
| 9. | Pipe Handler | Lower stand 111 in MOH 204/ITC 236: Verify LSA 228 is guiding above MOH 204. TDA 202 lowers stand 111 into MOH 204. Stop with one single 111 above rig floor 114 and stick-up of about one meter. | Visual/ CCTV | LSA 228 guide mode. | | Indicate ITC 236 and LSA 228 position and guide/grip states. |
| 10. | Pipe Handler | Close ITC 236 on stand 111: Verify stand 111 inside ITC 236. Extend ITC 236. Close ITC 236. | Visual/ CCTV | | | ITC 236 Extended. ITC 236 in Closed state. |
| 11. | Pipe Handler | Transfer stand 111 weight to ITC 236: Lower TDA 202 to transfer stand 111 weight to ITC 236. | Visual/ CCTV | ITC 236 closed. | | TDA 202 load indicator. TDA 202 to Open state. |
| 12. | Pipe Handler | Open and retract LTC 244: Open and retract LTC 244 to THP 207. | Visual/ CCTV | | | LTC 244 in Open and Retracted state. |
| 13. | Pipe Handler | Move second RN 151 to MOH 204 (stand): Verify TDA 202 unloaded in MOH 204. Move second RN 151 to MOH 204. | Visual | ITC 236 closed. | Second RN 151 (with THA) will move to MOH 204 and elevate to selected stick-up height. | |
| 14. | Pipe Handler | Move LSA 228 to MOH 204 (stand): Move LSA 228 to MOH 204. Close LSA 228 guide funnel. | Visual | ITC 236 closed. | | |
| 15. | Pipe Handler | Tilt CW 131 ramp 149 and move skate 133 to rig floor 114 lay-down position: Verify tubular 111 is unloaded from ramp 149 (CW 131 ready). Activate CW 131 sequence. | Visual/ CCTV | Tubular 111 loaded onto ramp 149. | | |

TABLE 5B-continued

Stand Lay-Down Operation

| | Operator 195 | Operation | Line of Sight | Equipment precondition | Equipment Functionality | HMI |
|---|---|---|---|---|---|---|
| 16. | Driller | RN 151 break-out and spin-out (upper single 111): Verify ITC 236 is closed and TDA 202 unloaded, Activate RN 151 sequence to continue break-out sequence. | Visual/ CCTV | ITC 236 closed (TDA 202 unloaded, gripper below TJ). | RN 151 will automatically break-out and spin-out the upper single 111. Open RN 151 spinner, guide, and clamps. Return RN 151 to park position. | |
| 17. | Pipe Handler | TDA 202 and LSA 228 move upper single 111 from MOH 204 to CW 131: Verify connection is spun-out. Hoist TDA 202 to lift upper tubular 111 from stick-up and above CW 131, guided by LSA 228. Rotate TDA 202 to face CW 131. Tilt TDA 202 toward CW 131. | Visual/ CCTV | RN 151 has completed break-out sequence. CW 131 in lay-down position. | | |
| 18. | Pipe Handler | LSA 228 guide upper tubular 111 pin to CW 131: Verify pin is above CW 131. Guide pin above skate 133. | Visual/ CCTV | CW 131 in lay-down position. | | LSA 228 position. |
| 19. | Pipe Handler | Lay down upper single 111 on CW131: Verify TDA 202 is rotated and tilted toward CW 131. Lower TDA 202 and set upper tubular 111 pin on skate 133. Continue lowering until upper tubular 111 rests on CW 131. | Visual/ CCTV | CW 131 in lay-down position. | | |
| 20. | Pipe Handler | Open and retract LSA (upper single 111): Verify pin rests on CW 131. Open and retract LSA 228. | Visual/ CCTV | | | LSA 228 to Open state. |
| 21. | Pipe Handler | Lay down upper single 111 on CW 131 and open TDA 202: Verify TDA 202 is tilted toward CW 131 and LSA 228 is out of TDA 202 area. Lower TDA 202 until upper single 111 rests on ramp 149. | Visual/ CCTV | | Skate 133 will move out synchronized with TDA 202. | |
| 22. | Pipe Handler | Open TDA 202: Verify upper single 111 is resting on CW 131. Open TDA 202. Tilt TDA 202 to vertical above MOH 204 stick-up. Rotate TDA 202 (e.g., 90 degrees). | Visual | | | TDA 202 to Open state. |

TABLE 5B-continued

| | Operator 195 | Operation | Line of Sight | Equipment precondition | Equipment Functionality | HMI |
|---|---|---|---|---|---|---|
| | | Stand Lay-Down Operation | | | | |
| 23. | Pipe Handler | Move upper tubular 111 to FT and unload: Activate CW 131 sequence to move out and unload upper tubular 111. | Visual/ CCTV | TDA 202 open. | Skate 133 will pull upper tubular 111 to unloading position. Ramp 149 will tilt to unloading position. FT will unload upper tubular 111. | Skate 133 to unloading position. CW 131 to unloading position. FT unloading active. |
| | | Second Single 111 of Stand: | | | | |
| 24. | Pipe Handler | Lower TDA 202 to stick-up and close: Lower TDA 202 to stick-up. Close TDA 202 on stick-up. | Visual | | | TDA 202 to Closed state. |
| 25. | Pipe Handler | Hoist double in MOH 204 (not applicable for tripe stands): Hoist TDA 202 to pick up weight. Open ITC 236 guide and clamps. Stop at selected stick-up (e.g., about one meter). Close ITC 236 guide and clamps. Lower TDA 202 to transfer weight to ITC 236. | Visual/ CCTV | | | TDA 202/LSA 228 close/open status. TDA 202 load. LTC 244/ITC 236 status. |
| 26. | Driller | Move second RN 151 to MOH 204: Verify TDA 202 unloaded in MOH 204. Move second RN2 to MOH 204. | Visual | ITC 236 closed. | Second RN 151 (with THA) will move to MOH 204 and elevate to selected stick-up height. | |
| 27. | Pipe Handler | Move LSA 228 to MOH 204: Move LSA 228 to MOH 204. Close LSA 228 guide funnel. | Visual | ITC 236 closed. | | |
| 28. | Pipe Handler | Tilt ramp 149 and move skate 133 to lay-down position: Verify tubular 111 is unloaded from ramp 149 (CW 131 ready). Activate CW 131 sequence. | Visual/ CCTV | Tubular 111 loaded onto ramp 149. | Skate 133 will move to lay-down position. | CW 131 lay-down ready. |
| 29. | Driller | RN 151 break-out and spin-out: Verify ITC 236 is closed and TDA 202 is unloaded. Activate RN 151 sequence to continue break-out sequence. | Visual/ CCTV | ITC 236 closed (TDA 202 unloaded, gripper below TJ). | RN 151 will automatically break-out and spin-out the single 111. Open RN 151 spinner, guide, and clamps. Return RN 151 to park position. | |
| 30. | Pipe Handler | TDA 202 and LSA 228 move pipe from MOH 204 to CW 131: Verify connection is spun-out. Hoist TDA 202 to lift tubular 111 from stick-up and above CW 131 (guided by LSA 228). Rotate TDA 202 to face CW 131. Tilt TDA 202 toward CW 131. | Visual/ CCTV | RN 151 has completed break-out sequence. CW 131 in lay-down position. | | |

TABLE 5B-continued

Stand Lay-Down Operation

| | Operator 195 | Operation | Line of Sight | Equipment precondition | Equipment Functionality | HMI |
|---|---|---|---|---|---|---|
| 31. | Pipe Handler | LSA 228 will guide pin to CW 131: Verify pin end is above CW 131. Guide pin to above skate 133. | Visual/ CCTV | CW 131 in lay-down position. | | LSA 228 position. |
| 32. | Pipe Handler | Lay down pipe on CW 131: Verify TDA 202 is rotated and tilted toward CW 131. Lower TDA 202 and set pin on skate 133. Continue lowering until pipe rests on CW 131. | Visual/ CCTV | CW 131 in lay-down position. | | |
| 33. | Pipe Handler | Open and retract LSA 228: Verify pin is resting on CW 131. Open and retract LSA 228. | Visual/ CCTV | | | LSA 228 to Open state. |
| 34. | Pipe Handler | Move pipe to FT and unload: Activate CW 131 sequence to move out and unload the pipe. | Visual/ CCTV | TDA 202 open. | Skate 133 will pull the pipe to unloading position. Ramp 149 will tilt to unloading position. FT will unload the pipe. | Skate 133 to unloading position. CW 131 to unloading position. FT unloading active. |
| | | Third Single 111 of Stand (If Applicable): | | | | |
| 35. | Pipe Handler | Lower TDA 202 to stick-up and close: Lower TDA 202 to stick-up. Close TDA 202 on stick-up. | Visual | | | TDA to Closed state. |
| 36. | Pipe Handler | Hoist single 111 from MOH 204: Hoist TDA 202 to pick up weight. Open ITC 236 guide and clamps. Retract ITC 236 (Note: pipe not guided). | Visual/ CCTV | | | TDA 202/LSA 228 close/open status. TDA 202 load. LTC 244 and ITC 236 status. |
| 37. | Pipe Handler | Move LSA 228 to MOH 204: Verify TDA 202 above LSA 228 working height. Move LSA 228 to MOH 204. Close LSA 228 guide funnel. | Visual | ITC 236 closed. | | |
| 38. | Pipe Handler | Tilt ramp 149 and move skate 133 to lay-down position: Verify tubular 111 is unloaded from ramp 149 (CW 131 ready). Activate CW 131 sequence. | Visual/ CCTV | Tubular 111 loaded onto ramp 149. | Skate 133 will move to lay-down position. | CW 131 lay-down ready. |
| 39. | Pipe Handler | TDA 202 and LSA 228 move pipe from MOH 204 to CW 131: Verify ITC 236 is open. Hoist TDA 202 to lift tubular 111 above CW 131 (guided by LSA 228). | Visual/ CCTV | CW 131 in lay-down position. | | |

TABLE 5B-continued

Stand Lay-Down Operation

| | Operator 195 | Operation | Line of Sight | Equipment precondition | Equipment Functionality | HMI |
|---|---|---|---|---|---|---|
| | | Rotate TDA 202 to face CW 131. Tilt TDA 202 toward CW 131. | | | | |
| 40. | Pipe Handler | LSA228 will guide pin to CW 131: Verify pin end is above CW 131. Guide pin end to above skate 133. | Visual/ CCTV | CW 131 in lay-down position. | | LSA 228 position. |
| 41. | Pipe Handler | Lay down tubular 111 on CW 131: Verify TDA 202 is rotated and tilted toward CW 131. Lower TDA 202 and set pin on skate 133. Continue lowering until tubular 111 rests on CW 131. | Visual/ CCTV | CW 131 in lay-down position. | | |
| 42. | Pipe Handler | Open and retract LSA 228: Verify pin is resting on CW 131. Open and retract LSA 228. | Visual/ CCTV | | | LSA 228 to Open state. |
| 43. | Pipe Handler | Move tubular 111 to FT and unload: Activate CW 131 sequence to move out and unload tubular 111. Continue step 1. | Visual/ CCTV | TDA 202 open. | Skate 133 will pull tubular 111 to unloading position. Ramp 149 will tilt to unloading position. FT will unload the tubular 111. | Skate 133 to unloading position. CW 131 to unloading position. FT unloading active. |

Different combinations of the aspects described above may also be utilized for picking up single tubulars 111 before assembly into stands of two or more tubulars. Such operations may be performed during drilling and other operations performed at WC 203. Such simultaneous operations, however, are coordinated to avoid conflicts and obstructions between the different machines and systems. Preparations for picking up single tubulars 111 may include the examples set forth below in Table 6A.

TABLE 6A

Singles Pick-Up Preparations

| Equipment | Responsible | Verifications |
|---|---|---|
| CW 131 | Operator 195 on rig floor 114. | Travel path is unobstructed. Feeding table (FT) indexer pins adjusted for pipe size. Prepare to pick up pipe. |
| RN 151 (THT + DPT as primary, THA + DPT as backup) | Operator 195 on rig floor 114. | DPT is rigged up in THT. Travel path is unobstructed. Dies are clean and not worn. |
| LSA 228 | Operator 195 on rig floor 114. | Travel path is unobstructed. |
| Slips 161 Rotary Table | Operator 195 on rig floor 114. | Correct inserts in slips 161. Dies are clean and not worn. Rotary table rotation lock activated. |
| TD 116 | Operator 195 on rig floor 114. | Correct inserts in elevator 129. Elevator rotator (tilt) installed. Operator screen, system status. Travel path is unobstructed. |
| DW 119 | Operator 195 on rig floor 114. | Checked. |
| Tubulars 111 | Operator 195 on rig floor 114. | Tubular 111 to be loaded on FT. Tubulars 111 to be cleaned and doped, protectors removed. |

The well construction system 100, 200 can then be set-up for the pick-up operation. Examples of such set-up may be as set forth below in Table 6B.

TABLE 6B

| Singles Pick-Up Set-Up | | | |
|---|---|---|---|
| Equipment | Responsible | Set-Up | HMI |
| Pipe handling: LSA 228, RN 151, CW 131 | Pipe Handler | Verify operator 195 on rig floor 114 completed pre-checks and deactivated emergency stop for all pipe handling equipment.<br>Open Construction Program screen on touchscreen 522, 524.<br>Select Trip In mode.<br>Select target: CW 131<br>Select setup wizard to open pop-up on front screen 532, 534, 536. Verify settings:<br>Select pipe size/type.<br>Select RN 151 to use in the operations.<br>RN 151 MU torque.<br>Stick-up target.<br>Select "activate all machines" to startup and prepare all machines. | Verify Setback screen.<br>Construction Program setup wizard.<br>After startup: Check for green light in Construction Program status header on front screen 532, 534, 536. |
| TD 116, DW 119, MP 144, Trip tank | Driller | Verify operator 195 on rig floor 114 completed pre-checks and deactivated emergency stop for all pipe handling equipment.<br>Open Construction Program screen on touchscreen 522, 524.<br>Select Trip In mode.<br>Select setup wizard to open pop-up on front screen 532, 534, 536. Verify settings:<br>Stick-up target.<br>Set DW 119 upper/lower stops.<br>Set maximum lowering speed.<br>Set minimum slack off weight.<br>Trip tank 1/2/auto.<br>Trip tank low/high levels.<br>Select "activate all machines" to startup and prepare all machines. | Verify Setback screen.<br>Construction Program setup wizard.<br>After startup: Check for green light in Construction Program status header on front screen 532, 534, 536. |
| TD 116 | Driller | Verify operator 195 on rig floor 114 completed pre-checks.<br>Activate TD 116 from touchscreen 522, 524.<br>Verify correct elevator 129 setting (manual/remote).<br>Select Operation screen on touchscreen 522, 524. | Verify operator screen, system status/alarms. |
| DW 119 | Driller | Activate DW 119 from touchscreen 522, 524.<br>Set maximum lowering speed.<br>Set minimum slack off weight. | Verify operator screen, system status/alarms. |
| Slips 161, Rotary table | Driller | Verify correct setting for slips 161 (manual/remote). | Verify operator screen, system status/alarms. |
| All machines | Driller | Verify all relevant machines are enabled in zone management system and tubular interlock system. | |
| Tubulars 111 | Pipe Handler | All types of tubulars 111 are registered. | |

After such preparations and set-up, the operator 195 may vacate the rig floor 114, and the equipment may be configured to be ready for remote control (e.g., by deactivating emergency stops). An example singles pick-up sequence may start with a stick-up at WC 203, and the CW 131 FT pre-loaded with a tubular 111, perhaps cleaned and doped. Example steps of the stand building sequence may be as set forth below in Table 6C.

TABLE 6C

Singles Pick-Up Operation

| | Operator 195 | Operation | Line of Sight | Equipment precondition | Equipment Functionality | HMI |
|---|---|---|---|---|---|---|
| 1. | Pipe Handler | Load tubular 111 to ramp 149: Use FT to load tubular to ramp 149. | Visual/ CCTV | FT pre-loaded with tubular 111 (e.g., cleaned and doped). CW 131 in loading position. | | |
| 1.1. | Pipe Handler | Move ramp 149 to rig floor 114/WC 203: Verify tubular 111 is loaded in ramp 149 and run skate 133 towards WC 203. | Visual/ CCTV | Tubular 111 loaded to ramp 149. | | CW 131 animated. |
| 2. | Driller | Open TD 116 elevator 129: Verify slips 161 are closed. Open elevator 129. | Visual/ CCTV | Slips 161 must be closed before opening elevator 129. | Elevator 129 Open not selectable if slips 161 are not closed. | Elevator 129 to Open state. |
| 3. | Driller | Move TD 116 to pick-up position: Tilt links back to clear TJ. Hoist elevator 129 above stick-up. Tilt out elevator 129 and move TD 116 to pick-up position. | Visual | Elevator 129 is open. Elevator 129 is rotated to receive tubular 111. | TD 116 pipe handler has pre-set position facing CW 131. | |
| 3.1. | Pipe Handler | Push tubular 111 to pick-up position: Run skate 133 until tubular 111 is positioned above elevator 129. | Visual | Ramp 149 in rig floor 114 position. | CW 131 will push tubular 111 a preset distance forward (up ramp 149). | CW 131 in pick-up position. |
| 4. | Driller | Latch elevator 129: Hoist/tilt TD 116 to latch elevator 129. | Visual | Tubular 111 is positioned correctly above elevator 129. | Tubular interlock will prevent hoisting without closed elevator 129 (above preset height). | Elevator 129 to Closed state. |
| 5. | Driller | Lift tubular 111: Hoist TD 116 to pick up single 111 from CW 131. Activate TD 116 to move elevator 129 to vertical position. | Visual | Elevator 129 closed. Link tilt float: elevator 129 above RN 151 working area. | Hoisting will stop prior to lifting tubular 111 out of CW 131 without guiding. | |
| 5.1. | Pipe Handler | LSA 228 extend to guide tubular 111 above CW 131: Move LSA 228 to preset position to receive tubular 111 above CW 131. Before tubular 111 lower end leaves CW 131, close LSA 228 funnel. | Visual/ CCTV | TD 116 above LSA 228 operating area. | | LSA 228 funnel to Closed state. |
| 5.2. | Pipe Handler | Move RN 151 to WC 203: Verify TD 116 above RN 151 working area. Start RN 151 sequence to move RN 151 to WC 203. | | Only possible with THT. If THA is used, wait for stand located above stick-up. RN 151 clamps open. WC 203 selected. | RN 151 will move to WC 203. Elevate RN 151 to stick-up. ZMS will prevent RN 151 start if TD 116 is too low. | |

TABLE 6C-continued

| Singles Pick-Up Operation | | | | | | |
|---|---|---|---|---|---|---|
| | Operator 195 | Operation | Line of Sight | Equipment precondition | Equipment Functionality | HMI |
| 5.3. | Pipe Handler | LSA 228 tail in tubular 111 to WC 203: TD 116 continue hoisting. LSA 228 guide closes and tails in tubular 111 toward WC 203 when pin end is above stick-up. | Visual | Tubular 111 bottom clear of CW 131 and elevated above stick-up. LSA 228 centralizer close: Tubular 111 near vertical. | LSA 228 centralizer will close when tubular 111 nears WC 203. | LSA 228 centralizer to Closed state. |
| 5.4. | Pipe Handler | Guide single 111 with RN 111 in WC 203: Verify single 111 is located in WC 203. Continue RN 151 sequence. | Visual/ CCTV | RN 151 in WC 203. LSA 228 in WC 203. | Close RN 151 BUT. Close RN 151 stabbing guide. | |
| 6. | Driller | Stab tubular 111: Lower TD 116 to stab tubular 111. | Visual/ CCTV | TD 116 link tilt float. RN 151 in WC 203 with stabbing guide closed. | | |
| 6.1. | Pipe Handler | Open and retract LSA 228. | Visual/ CCTV | RN 151 stabbing guide closed. | | LSA 228 to Open status. |
| 6.2. | Pipe Handler | RN 151 spin-in and make-up: Continue RN 151 sequence. | Visual/ CCTV | Single 111 stabbed in stick-up. TD 116 unloaded, elevator 129 below TJ to permit spinning. | RN 151 will automatically spin-in and make-up. Open RN 151 spinner, guide, and clamps. Return RN 151 to park position. | Tally update. Torque log updated. MU torque presented to Driller. |
| 7. | Driller | Opening slips 161: Open slips 161 (command). Hoist to open slips 161. | Visual | Elevator 129 must be closed. RN 151 has completed MU sequence with correct torque. | | Slips 161 to Open state. DW 119 load. |
| 8. | Driller | Lower drill string 120: Verify slips 161 are open before lowering drill string 120. | Visual | Slips 161 open. | | |
| 9. | Driller | Set slips 161: Set slips 161 at correct stick-up height. Set-off weight. | Visual | Stick-up at correct height. | | Slips 161 to Closed state. DW 119 load indicator. Tally update. |
| 10. | Driller | Check trip tank volume, gain/loss. | Visual | | Trip tank gain is determined and displayed. | Volume control. |
| 11. | | Repeat sequence for next single 111. | | | | |

Different combinations of the aspects described above may also be utilized for laying down single tubulars 111 from WC 203 using the top drive 116. Such operations may be performed during drilling and other operations performed at WC 203. Such simultaneous operations, however, are coordinated to avoid conflicts and obstructions between the different machines and systems. Preparations for this lay-down operation may include the examples set forth below in Table 7A.

TABLE 7A

| Preparations for Singles Lay-Down from WC to CW with TD | | |
|---|---|---|
| Equipment | Responsible | Verifications |
| CW 131 | Operator 195 on rig floor 114. | Travel path is unobstructed. Feeding table (FT) indexer pins adjusted for pipe size. Prepare for lay-down tubulars 111. Adjust skate 133 and other aspects of CW 131 for tubulars 111. |

TABLE 7A-continued

| Preparations for Singles Lay-Down from WC to CW with TD | | |
|---|---|---|
| Equipment | Responsible | Verifications |
| RN 151 (THT + DPT) | Operator 195 on rig floor 114. | DPT is rigged up in THT. Travel path is unobstructed. Dies are clean and not worn. |
| THT + Mud bucket (MB) | Operator 195 on rig floor 114. | MB is connected. Inserts are correct size, not worn or damaged. Travel path is unobstructed. |
| LSA 228 | Operator 195 on rig floor 114. | Travel path is unobstructed. |
| Slips 161 | Operator 195 on rig floor 114. | Correct inserts in slips 161. Dies are clean and not worn. Rotary table rotation lock activated. Pipe viper mounted inside or on top of slips 161. |
| TD 116 | Operator 195 on rig floor 114. | Correct inserts in elevator 129. Elevator rotator (tilt) installed. Operator screen, system status. Travel path is unobstructed. |
| DW 119 | Operator 195 on rig floor 114. | Checked. |
| Tubulars 111 | Operator 195 on rig floor 114. | Tubular 111 to be loaded on FT. |

The well construction system 100, 200 can then be set-up for the pick-up operation. Examples of such set-up may be as set forth below in Table 7B.

TABLE 7B

| Set-Up for Singles Lay-Down from WC to CW with TD | | | |
|---|---|---|---|
| Equipment | Responsible | Set-Up | HMI |
| Pipe handling: LSA 228, RN 151, CW 131 | Pipe Handler | Verify operator 195 on rig floor 114 completed pre-checks and deactivated emergency stop for all pipe handling equipment. Open Construction Program screen on touchscreen 522, 524. Select Trip Out mode. Select target: CW 131 Select setup wizard to open pop-up on front screen 532, 534, 536. Verify settings: Select pipe size/type. Select MB (THA), if applicable. Select RN 151 to use in the operations. RN 151 MU torque. Stick-up target. Select "activate all machines" to startup and prepare all machines. | Verify Setback screen. Construction Program setup wizard. After startup: Check for green light in Construction Program status header on front screen 532, 534, 536. |
| TD 116, DW 119, MP 144, Trip tank | Driller | Verify operator 195 on rig floor 114 completed pre-checks and deactivated emergency stop for all pipe handling equipment. Open Construction Program screen on touchscreen 522, 524. Select Trip Out mode. Select setup wizard to open pop-up on front screen 532, 534, 536. Verify settings: Stick-up target. Set DW 119 upper/lower stops. Set maximum hoisting speed. Set maximum pull/overpull. Trip tank 1/2/auto. Trip tank low/high levels. Select "activate all machines" to startup and prepare all machines. | Verify Setback screen. Construction Program setup wizard. After startup: Check for green light in Construction Program status header on front screen 532, 534, 536. |
| TD 116 | Driller | Verify operator 195 on rig floor 114 completed pre-checks. Activate TD 116 from touchscreen 522, 524. Verify correct elevator 129 setting (manual/remote). Select Operation screen on touchscreen 522, 524. | Verify operator screen, system status/alarms. |

TABLE 7B-continued

| Set-Up for Singles Lay-Down from WC to CW with TD | | | |
|---|---|---|---|
| Equipment | Responsible | Set-Up | HMI |
| DW 119 | Driller | Activate DW 119 from touchscreen 522, 524. | Verify operator screen, system status/alarms. |
| Slips 161, Rotary table | Driller | Verify correct setting for slips 161 (manual/remote). | Verify operator screen, system status/alarms. |
| All machines | Driller | Verify all relevant machines are enabled in zone management system and tubular interlock system. | |
| Tubulars 111 | Pipe Handler | All types of tubulars 111 are registered. | Verify operator screen, system settings. |

After such preparations and set-up, the operator 195 may vacate the rig floor 114, and the equipment may be configured to be ready for remote control (e.g., by deactivating emergency stops). This sequence may start with the top drive 116 in lower position at WC 203 with the elevator 129 closed, with the slips 161 closed, and with the catwalk ramp 149 empty and in rig floor 114 loading position (ready to move to the rig floor 114). The catwalk feeding table may be unloaded and ready to receive tubulars 111, and the TDA 202 may be parked outside of the potential collision area. Example steps of the sequence may be as set forth below in Table 7C.

TABLE 7C

| Sequence for Set-Up for Singles Lay-Down from WC to CW with TD | | | | | | |
|---|---|---|---|---|---|---|
| | Operator 195 | Operation | Line of Sight | Equipment precondition | Equipment Functionality | HMI |
| 1. | Driller | Open slips 161 and hoist drill string 120: Verify elevator 129 is closed. Open slips 161 (command). Hoist to take weight and verify slips 161 opening. Hoist one single 111. Stop with required stick-up. | Visual/ CCTV | Elevator 129 must be closed before opening slips 161. | Slips 161 Open not selectable if elevator 129 is not closed. Slips 161 Open command is reset after a preset time if slips 161 are not opened. | Slips 161 to Open state. Settings: DW 119 hoisting speed and maximum overpull. |
| 1.1. | Pipe Handler | Tilt ramp 149 and move skate 133 to lay-down position: Verify tubular 111 is unloaded from ramp 149 (CW 131 ready). Activate CW 131 sequence. | Visual/ CCTV | Tubular 111 loaded onto Ramp 149. | Skate 133 will tilt to WC 203 (straight). CW 131 will move to lay-down position. | CW 131 lay-down ready. |
| 2. | Driller | Set slips 161: Verify required stick-up height. Set slips 161 (command). Set-off weight. | Visual/ CCTV | | | DW 119 upper stop setting. Slips 161 to Closed state. |
| 2.1. | Pipe Handler | Move RN 151 to WC 203: Verify TD 116 is hoisted above RN 151 working area. Start RN 151 break-out sequence to move RN 151 to WC 203. | | RN 151 tongs open. WC 203 selected. LSA 228 outside working area. | RN 151 will move to WC 203. Elevate RN 1515 to stick-up. Activate RN 151 BUC and position tong (when slips 161 closed). RN 151 will stop/wait outside WC 203 area if TD 116 is moving. | TJ (stick-up) assist indication. RN 151 in WC 203. RN 151 BUC to Closed state. |

TABLE 7C-continued

| | Sequence for Set-Up for Singles Lay-Down from WC to CW with TD | | | | | |
|---|---|---|---|---|---|---|
| | Operator 195 | Operation | Line of Sight | Equipment precondition | Equipment Functionality | HMI |
| 2.2. | Pipe Handler | LSA 228 move to WC 203: Verify TD 116 is hoisted above LSA 228 working area. LSA 228 move to WC 203. LSA 228 guide funnel closes. | Visual/ CCTV | TD 116 above working area. RN 151 outside working area. | LSA 228 will stop/wait outside WC 203 area if TD 116 is moving. | LSA 228 funnel to Closed state. |
| 2.3. | Pipe Handler | RN 151 break-out and spin-out: Verify slips 161 closed and weight set-off. Adjust RN 151 elevation if required. Continue RN 151 sequence. | CCTV | Slips 161 closed. | Break-out and spin-out. Double break-out available if required (per set-up). Open RN 151 spinner, guide, and clamps. Return RN 151 to park position. Option: RN 151 will wait in WC 203 until TDA 202 has lifted the stand. | RN 151 operation status. |
| 2.4. | Pipe Handler | Option: Wet tubular 111: Verify RN 151 is out of working area. Extend MB to WC 203. Close MB. | Visual | RN 151 sequence finished. LSA 228 above THA/MB working area. | | MB to WC 203. |
| | Driller | DW 119 hoist to drain tubular 111. | | | | MB to Closed state. |
| | Pipe Handler | Open and retract MB. | | | | MB to Open state |
| 3. | Driller | TD 116 and LSA 228 move tubular 111 from WC 203 to CW 131: Verify connection is spun-out. Hoist TD 116 to lift tubular 111 from stick-up to above CW 131. Tilt TD 116 links toward CW131 (guided by LSA 228). | Visual/ CCTV | Elevator 129 closed. Slips 161 closed. | | TD 116 retracted position. |
| 3.1. | Pipe Handler | LSA 228 will guide tubular 111 pin to CW 131: Verify pin end is above CW 131. Guide pin end to above skate 133. | Visual/ CCTV | CW 131 in lay-down position. | | LSA 228 position. |
| 4. | Driller | Set tubular 111 on CW 131: Verify elevator 129 is tilted toward CW 131. Lower TD 116 and set tubular 111 pin on skate 133. Continue lowering until tubular 111 rests on CW 131. | Visual/ CCTV | CW 131 in lay-down position. | Skate 133 will move out as TD 116 lowers. | |
| 4.1. | Pipe Handler | Open and retract LSA 228: Verify tubular 111 pin is resting in CW 131. Open and retract LSA 228. | Visual/ CCTV | | | LSA 228 to Open state. |
| 5. | Driller | Lay down tubular 111 on CW 131 and open elevator 129: Verify elevator 129 is tilted toward CW 131 and LSA 228 is out of TD 116 area. | Visual/ CCTV | | Skate 133 will move out as TD 116 lowers. | |

TABLE 7C-continued

| | Operator 195 | Operation | Line of Sight | Equipment precondition | Equipment Functionality | HMI |
|---|---|---|---|---|---|---|
| | | Sequence for Set-Up for Singles Lay-Down from WC to CW with TD | | | | |
| | | Lower TD 116 until tubular 111 rests on ramp 149. | | | | |
| 6. | Driller | Open elevator 129: Verify tubular 111 is resting on CW 131. Open elevator 129. Tilt TD 116 links back (link tilt float). | Visual | | | Elevator 129 to Open state. |
| 6.1. | Pipe Handler | Move tubular 111 to FT and unload: Activate CW 131 sequence to move out and unload tubular 111. Continue step 1.1. | Visual/ CCTV | Elevator 129 open. | Skate 133 will pull tubular 111 to unloading position. Ramp 149 will tilt to unloading position. FT will unload tubular 111. | Skate 133 to unloading position. CW 131 to unloading position. FT unloading active. |
| 7. | Driller | Lower TD 116 to stick-up and close elevator 129: TD 116 links are tilted back to clear stick-up (or retract TD 116 with vertical links). Lower TD 116 to stick-up. Tilt links (or extend TD 116) to close elevator 129. | Visual | | | Elevator 129 to Closed state. |
| 8. | Driller | Check trip tank volume, gain/loss: Trip tank gain/loss. Repeat all steps for next tubular 111. Continue on step 1. | Visual | | Trip tank gain/loss is determined and displayed. | Trip Sheet/ Volume control. |

Different combinations of the aspects described above may also be utilized for running casing from the CW 131 with a casing tong (CTO). Preparations for such operation may include the examples set forth below in Table 8A.

TABLE 8A

| Equipment | Responsible | Verifications |
|---|---|---|
| | | Preparations for Running Casing from CW with CTO |
| CW 131 | Operator 195 on rig floor 114. | Travel path is unobstructed. Casings are laid out correct with aft end in line with skate 133 for correct loading. Prepare to pick up casing. |
| CTO: THA + CTO as primary, THT + CTO as backup | Operator 195 on rig floor 114. | CTO is rigged up in THA (or THT). Correct adapters and stabbing guide funnel installed. Dies are correct, clean, and not worn. Travel path is unobstructed. |
| LSA 228 | Operator 195 on rig floor 114. | Travel path is unobstructed. |
| Slips 161 Rotary Table | Operator 195 on rig floor 114. | Correct inserts in slips 161. Dies are clean and not worn. Rotary table rotation lock activated. |
| TD 116 | Operator 195 on rig floor 114. | Correct inserts in elevator 129. Elevator rotator (tilt) installed. Operator screen, system status. Travel path is unobstructed. |
| DW 119 | Operator 195 on rig floor 114. | Checked. |
| Tubulars 111 | Operator 195 on rig floor 114. | Tubulars 111 to be laid out on CW 131. Tubulars 111 to be cleaned and doped, protectors removed (other implementations may be used for casing with protectors). Casings measured, marked, and tally updated. |

The well construction system 100, 200 can then be set-up for the operation. Examples of such set-up may be as set forth below in Table 8B.

TABLE 8B

Set-Up for Running Casing from CW with CTO

| Equipment | Responsible | Set-Up | HMI |
|---|---|---|---|
| Pipe handling: LSA 228, CTO, CW 131 | Pipe Handler | Verify operator 195 on rig floor 114 completed pre-checks and deactivated emergency stop for all pipe handling equipment. Open Construction Program screen on touchscreen 522, 524. Select Running Casing from CW with CTO mode. Select setup wizard to open pop-up on front screen 532, 534, 536. Verify settings: Select casing type and verify casing data (size, weight, MU loss, torque settings, weight, etc.). Select CTO to use in the operations. Stick-up target. Select “activate all machines” to startup and prepare all machines. | Verify Setback screen. Construction Program setup wizard. After startup: Check for green light in Construction Program status header on front screen 532, 534, 536. |
| TD 116, DW 119, MP 144 | Driller | Verify operator 195 on rig floor 114 completed pre-checks and deactivated emergency stop for all pipe handling equipment. Open Construction Program screen on touchscreen 522, 524. Select Running Casing from CW with CTO mode. Select setup wizard to open pop-up on front screen 532, 534, 536. Verify settings: Stick-up target. Set DW 119 upper/lower stops. Set maximum lowering speed. Set minimum slack off weight. Trip tank 1/2/auto. Trip tank low/high levels. Verify active tanks are selected and lined up. Select MP 144 (to fill casing, optional). Verify MP 144 pressure limit setting. Assign pumps to master slider. Set number of strokes and SPM to fill casing (optional). Set ramp-up parameters. Select “activate all machines” to startup and prepare all machines. | Verify Setback screen. Construction Program setup wizard. After startup: Check for green light in Construction Program status header on front screen 532, 534, 536. |
| TD 116 | Driller | Verify operator 195 on rig floor 114 completed pre-checks. Activate TD 116 from touchscreen 522, 524. Verify correct elevator 129 setting (manual/remote). Select Operation screen on touchscreen 522, 524. | Verify operator screen, system status/alarms. |
| DW 119 | Driller | Activate DW 119 from touchscreen 522, 524. Set maximum lowering speed. Set minimum slack off weight. | Verify operator screen, system status/alarms. |
| Slips 161, Rotary table | Driller | Verify correct setting for slips 161 (manual/remote). | Verify operator screen, system status/alarms. |
| All machines | Driller | Verify all relevant machines are enabled in zone management system and tubular interlock system. | |
| Tubulars 111 | Pipe Handler | All types of tubulars 111 are registered. | |

After such preparations and set-up, the operator 195 may vacate the rig floor 114, and the equipment may be configured to be ready for remote control (e.g., by deactivating emergency stops). An example of this sequence may start with a casing stick-up at WC 203, with the slips 161 and the TD 116 elevator 129 closed. Casing may be laid out on the CW 131 casing side (e.g., Driller's side), having been cleaned, doped, and tallied, and with protectors removed. The catwalk ramp 149 may be empty and in the loading position. Example steps of the sequence may be as set forth below in Table 8C.

TABLE 8C

Sequence for Running Casing from CW with CTO

| | Operator 195 | Operation | Line of Sight | Equipment precondition | Equipment Functionality | HMI |
|---|---|---|---|---|---|---|
| 1.1. | Pipe Handler | Load casing into ramp 149: Use loading fingers to load casing into ramp 149. | Visual/ CCTV | Casing ready in loading position. CW 131 in loading position. | | |
| 1.2. | Pipe Handler | Run ramp 149 to rig floor 114: Verify casing is loaded in ramp 149. Move ramp 149 toward pick-up position. | Visual/ CCTV | Casing loaded onto ramp 149. | Ramp 149 will tilt to rig floor 114 casing position. Skate 133 will move towards rig floor 114. Skate 133 will stop with casing box inside ramp. | CW 131 animated. |
| 2. | Driller | Open elevator 129: Verify slips 161 are closed. Open elevator 129. | Visual/ CCTV | Slips 161 must be closed before opening elevator 129. | Elevator 129 Open not selectable if slips 161 are not closed. | Elevator 129 to Open state. |
| 3. | Driller | Move TD 116 to CW 131 pick-up position: Tilt links to clear TJ. Hoist elevator 129 above stick-up. Tilt out elevator 129 and run TD 116 to CW 131 pick-up position. | Visual | Elevator 129 open. Elevator 129 rotated to receive casing. | TD 116 pipe handler has pre-set position facing CW 131. | |
| 3.1. | Pipe Handler | Push casing to pick-up position: Run skate 133 until casing is positioned above elevator 129. | Visual | Ramp 149 in rig floor 114 position. | Skate 133 will push casing a defined distance forward. | CW 131 in pick-up position. |
| 4. | Driller | Latch elevator 129: Hoist/tilt TD 116 to latch elevator 129. | Visual | Casing is positioned correctly above elevator 129. | Elevator 129 close on mechanical impact. Tubular interlock prevents hoisting without closed elevator 129 (above certain height). | Elevator 129 to Closed state. |
| 5. | Driller | Lift casing: Hoist TD 116 to pick up casing from CW 131. Activate link tilt float to move elevator 129 to vertical position. | Visual | Elevator 129 closed. Link tilt float: Elevator 129 above RN 151 working area. | Hoisting will stop prior to lifting casing out of CW 131 without guiding. | |
| 5.1. | Pipe Handler | LSA 228 extend to guide casing above CW 131: Move LSA 228 to preset position to receive casing above CW 131. Before casing lower end leaves CW 131, close LSA 228 funnel. | Visual/ CCTV | TD 116 above LSA 228 operating area. | | LSA 228 funnel to Closed state. |
| 5.2. | Pipe Handler | Option: Move THT/CTO to WC 203: Verify TD 116 hoisted above CTO working area. Start CTO sequence to move THT to WC 203. | | Only possible with THT. If THA is used, wait for stand located above stick-up. CTO open. WC 203 selected. | CTO will move to WC 203. Elevate to stick-up. ZMS will prevent CTO start if TD 116 is too low. | THT in WC 203. |
| 5.3. | Pipe Handler | LSA 228 tail in casing to WC 203: TD 116 continues hoisting. | Visual | Casing bottom clear of CW 131 and elevated above stick-up. | LSA 228 centralizer will close when casing nears WC 203. | LSA 228 centralizer to Closed state. |

TABLE 8C-continued

| Sequence for Running Casing from CW with CTO | | | | | | |
|---|---|---|---|---|---|---|
| | Operator 195 | Operation | Line of Sight | Equipment precondition | Equipment Functionality | HMI |
| | | LSA 228 guide closes and tail in casing towards WC 203 when pin end is above stick-up. | | LSA 228 centralizer closes when casing nears vertical. | | |
| 5.4. | Pipe Handler | Move THA/CTO to WC 203: Verify casing is in WC 203 and LSA 228 is above CTO working area. Start CTO sequence to move THT to WC 203. | | CTO open. WC 203 selected. LSA 228 in WC 203. | CTO will move to WC 203. Elevate to stick-up. ZMS will prevent CTO start if TD 116 or LSA 228 is too low. | THA/CTO in WC 203. |
| 5.5. | Pipe Handler | Close CTO BUT: Adjust/verify correct CTO elevation. Continue CTO sequence. | Visual/ CCTV | CTO in WC 203. | Close CTO BUT. Close stabbing guide. | CTO to closed state. |
| 5.6. | Pipe Handler | Optional: Close make-up spinning tong (MUST) for soft stabbing: Adjust CTO elevation and TD 116 elevation if required. Continue CTO sequence. | Visual/ CCTV | CTO in WC 203. | Close MUST. MUST will take some load if closed prior to stabbing casing. | MUST to Closed state. |
| 6. | Driller | Stab casing: Lower TD 116 to stab casing (soft stab). Open CTO stabbing guide. | Visual/ CCTV | TD 116 link tilt float. CTO in WC 203 with stabbing guide closed. | Weight transferred to MUST per casing data input. | CTO to open state. |
| 6.1. | Pipe Handler | Open and retract LSA 228: Open and retract LSA 228 when casing has entered stabbing guide. | Visual/ CCTV | CTO stabbing guide closed. | | LSA 228 Open status. |
| 6.2. | Pipe Handler | CTO spin-in and make-up: Verify casing is stabbed. Continue CTO sequence. Accept or reject make-up. | Visual/ CCTV | Single casing stabbed in stick-up. TD 116 unloaded, elevator 129 below TJ to permit spinning. | CTO will automatically spin-in and make-up per casing data settings. If Accept: Open spinner, guide, and clamps. Return to park position. | Casing connected state. |
| 7. | Driller | Open slips 161: Open slips 161 (command). Hoist to open slips 161. | Visual | Elevator 129 must be closed. CTO has completed MU sequence with accepted connection. | | Slips 161 to Open state. DW 119 load. |
| 8. | Driller | Lower casing string: Verify slips 161 are open before lowering drill string 120. Optional: Fill casing volume if selected. Extend fill-up tool, if mounted. Open IBOP. Start MP 144. Close IBOP. | Visual | Slips 161 open. Optional: MP 144 ready. | Optional: Selected MP 144 will pump a set number of strokes at set rate with selected MP 144 and stop. | MP 144 strokes. MP 144 pressure. IBOP to Open state. |
| 9. | Driller | Set slips: Set slips 161 at correct stick-up height. Set-off weight. | Visual | Stick-up at correct height. | | Slips 161 to Closed state. DW 119 load indicator. |
| 10. | Driller | Check gain/loss: Check trip tank gain/ loss or active gain/loss depending on selected operation. | Visual | | Trip tank or active tank gain is determined and displayed. | Volume control. |
| 11. | | Repeat sequence for next casing single. | | | | |

When a tripping-out "wet" (while the drill string 120 is full of mud) operation is to be performed, an operator 195 on the rig floor 114 may verify that various pieces of equipment are properly shut down and locked out, and then perhaps perform other preparations such as the examples set forth below in Table 9A.

TABLE 9A

Tripping-In Wet Preparations

| Equipment | Responsible | Verifications |
|---|---|---|
| FIB 166<br>Setback 164 | Operator 195 on rig floor 114. | Tubulars 111 exist per HMI/tally.<br>Fingers are closed.<br>Travel path is unobstructed. |
| TBR 254<br>SGA 262 | Operator 195 on rig floor 114. | Travel path is unobstructed.<br>Gripper inserts/dies are clean, not worn. |
| LTC 244<br>ITC 236<br>UTC 242 | Operator 195 on rig floor 114. | Travel path is unobstructed.<br>Gripper inserts/dies are clean, not worn.<br>ITC 236 is open and retracted. |
| THP<br>Doper 209 | Operator 195 on rig floor 114. | Travel path is unobstructed.<br>Water, correct dope available for doper 209. |
| LSA 228 | Operator 195 on rig floor 114. | Travel path is unobstructed. |
| TDA 202 | Operator 195 on rig floor 114. | Travel path is unobstructed.<br>Correct dope available for doper 209.<br>Correct inserts/dies in gripper/elevator.<br>Inserts/dies are clean, not worn. |
| RN 151<br>(THT + DPT) | Operator 195 on rig floor 114. | Drill pipe tong (DPT) is connected.<br>Gripper dies are clean, not worn.<br>Travel path is unobstructed. |
| THA + MB | Operator 195 on rig floor 114; and/or "Driller" 195 at workstation 452. | MB is connected.<br>Inserts correct size, not worn or damaged.<br>Travel path is unobstructed. |
| Slips 161,<br>Rotary<br>Table | Operator 195 on rig floor 114; and/or "Driller" 195 at workstation 452. | Correct inserts/dies.<br>Inserts/dies are clean, not worn.<br>Pipe viper mounted inside or on top of slips 161. |
| TD 116 | Operator 195 on rig floor; and/or "Driller" 195 at workstation 452. | Correct inserts/dies in elevator 129.<br>Correct saver sub status.<br>Travel path is unobstructed. |
| DW 119 | Operator 195 on rig floor; and/or "Driller" 195 at workstation 452. | Checked. |

The well construction system 100, 200 can then be set-up for the trip-out wet sequence. Examples of such set-up may be as set forth below in Table 9B.

TABLE 9B

Tripping-Out Wet Set-Up

| Equipment | Responsible | Set-Up | HMI |
|---|---|---|---|
| Pipe handling:<br>TBR 254,<br>SGA 262,<br>UTC 242,<br>LTC 244,<br>THP 207,<br>TDA 202,<br>LSA 228,<br>RN 151 | Driller/<br>Pipe<br>Handler | Verify operator 195 on rig floor 114 completed pre-checks and deactivated emergency stop for all pipe handling equipment.<br>Open Construction Program screen on touchscreen 522, 524.<br>Select Trip Out Wet mode.<br>Select setup wizard to open pop-up on front screen 532, 534, 536. Verify settings:<br>Select slot, direction for storing tubulars 111.<br>Select pipe type.<br>Select RN 151 (THT) to use, check MU torque.<br>Select MB (THA).<br>Select pin/box doping.<br>Stick-up target.<br>Select "activate all machines" to startup and prepare all machines. | Verify Setback screen.<br>Construction Program setup wizard.<br>After startup: Check for green light in Construction Program status header on front screen 532, 534, 536. |

TABLE 9B-continued

| Tripping-Out Wet Set-Up | | | |
|---|---|---|---|
| Equipment | Responsible | Set-Up | HMI |
| TD 116, DW 119, MP 144, Trip tank | Driller | Verify operator 195 on rig floor 114 completed pre-checks and deactivated emergency stop for all pipe handling equipment. Open Construction Program screen on touchscreen 522, 524. Select Trip Out Wet mode. Select setup wizard to open pop-up on front screen 532, 534, 536. Verify settings: Stick-up target. Set DW 119 upper/lower stops. Set maximum lowering speed. Set over pull. Trip tank 1/2/auto. Trip tank low/high levels. Select "activate all machines" to startup and prepare all machines. | Verify Setback screen. Construction Program setup wizard. After startup: Check for green light in Construction Program status header on front screen 532, 534, 536. |
| TD 116 | Driller | Verify operator 195 on rig floor 114 completed pre-checks. Activate TD 116 from touchscreen 522, 524. Select Operation screen on touchscreen 522, 524. | Verify operator screen, system status/alarms. |
| DW 119 | Driller | Activate DW 119 from touchscreen 522, 524. | Verify operator screen, system status/alarms. |
| All machines | Driller | Verify all relevant machines are enabled in zone management system and tubular interlock system. | Verify operator screen, system status/alarms. |

After such preparations and set-up, the operator 195 may vacate the rig floor 114, and the equipment may be configured to be ready for remote control (e.g., by deactivating emergency stops). An example trip-out wet sequence may start with the TD 116 in lower position over WC 203 with closed slips 161 and elevator 129, with a stick-up of about one meter. The TDA 202 and LSA 228 are open in THP 207 position (tubular 111 delivered from WC 203 to THP 207). The UTC 242 and LTC 244 are closed on the tubular 111 in the THP 207, and the ITC 236 is open and retracted. The TBR 254 and SGA 262 are empty, on the way from the FIB 166 to get a new tubular 111 in the THP 207. Example steps of the trip-out wet sequence may be as set forth below in Table 9C.

TABLE 9C

| Tripping-Out Wet Operation | | | | | | |
|---|---|---|---|---|---|---|
| | Operator 195 | Operation | Line of Sight | Equipment precondition | Equipment Functionality | HMI |
| 1. | Driller | Open slips 161 and hoist to upper stop: Verify elevator 129 is closed. Open slips 161 (command). Hoist to take weight and verify slips 161 opening. | Visual/ CCTV | Elevator 129 must be closed before opening slips 161. | Slips 161 Open is not selectable if elevator 129 is not closed. Slips 161 Open command is reset after a set time if the slips 161 are not opened. | Slips 161 to Open state. Settings: DW 119 hoisting speed and maximum overpull. |
| 1.1. | Pipe Handler | TBR 254 and SGA 262 pick up next tubular 111 from THP 207: TBR 254 and SGA 262 move to tubular 111 in THP 207. Close TBR 254 and SGA 262 guides/clamps on tubular 111. | Visual/ CCTV | TBR 254 and SGA 262 open. | | TBR 254 and SGA 262 grips/ guides to Closed state. |
| 1.2. | Pipe Handler | UTC 242 and LTC 244 open and retract: UTC 242 and LTC 244 open. UTC 242 and LTC 244 retract from THP 207. | Visual/ CCTV | TBR 254 and SGA 262 closed on tubular 111 in THP 207. | UTC 242 and LTC 244 open and retract. | UTC 242 and LTC 244 to Open state-retracted. |

TABLE 9C-continued

| Tripping-Out Wet Operation | | | | | | |
|---|---|---|---|---|---|---|
| | Operator 195 | Operation | Line of Sight | Equipment precondition | Equipment Functionality | HMI |
| 1.3. | Pipe Handler | TBR 254 and SGA 262 move toward FIB 166 with tubular 111: Lift tubular 111 from THP 207. Move to selected position in FIB 166. | Visual/ CCTV | Valid FIB 166 position selected. | TBR 254 and SGA 262 will follow predefined path. FIB 166 latches will open when tubular 111 is outside selected FIB 166 row. FIB 166 latches will close prior to setting down tubular 111. Set down tubular 111 on selected position. | THP load. |
| 1.4. | Pipe Handler | TDA 202 and LSA 228 move to WC 203: TDA 202 moves to WC 203. LSA 228 moves to WC 203. | Visual/ CCTV | | TDA 202 retracts to vertical, hoists, and rotates, extending to WC 203 at about two meters below stick-up. TDA 202 and LSA 228 will stop/wait outside WC 203 area if TD 116 is moving. | TDA 202 load indication. |
| 1.5. | Pipe Handler | Move RN 151 to WC 203: Verify TD 116 is hoisted above RN 151 working area. Start 151 RN break-out sequence to move RN 151 to WC 203. | | RN 151 tongs open. WC 203 selected. | RN 151 will move to WC 203. Elevate RN 151 to stick-up. RN 151 will stop/ wait outside WC 203 area if TD 116 is moving. | TJ (Stick-up) assist indication. |
| 2. | Driller | Set slips 161: Verify required stick-up height. Set slips 161 (command). Set off weight. | Visual/ CCTV | | | DW 119 upper stop setting. |
| 2.1. | Pipe Handler | TDA 202 close and LSA 228 guide close: Verify TDA 202 and LSA 228 at WC 203. Close TDA 202. Close LSA 228 guide funnel. | Visual/ CCTV | Slips 161 closed. | TDA 202 and LSA 228 will not close in WC 203 if slips 161 are not closed. | TDA 202 to Closed state. TDA 202 and LSA 228 in WC 203. LSA 228 guide funnel to Closed state. |
| 2.2. | Pipe Handler | RN 151 break-out and spin-out: Verify slips 161 closed and weight set off. Adjust RN 151 elevation if required. Continue RN 151 sequence. | CCTV | Slips 161 closed. | Break-out and spin-out. Double break-out available if required. Open RN 151 spinner, guide, and clamps. Return RN 151 to park position. RN 151 may wait in WC 203 until TDA 202 has lifted tubular 111. | RN 151 indication. |
| 3. | Driller | Open TD elevator 129, retract, and lower: Verify TDA 202 is closed. Open TD elevator 129 and retract. Lower TD 116 (e.g., to rig floor 114. | Visual/ CCTV | TDA 202 closed. Slips 161 closed. | | TD elevator 129 to Closed state. TD 116 retracted position. |
| 3.1. | Pipe Handler | MB (THA) extend to WC 203: Verify THT is out of the area. Continue MB sequence. | Visual/ CCTV | RN 151/THT retracted. MB open. | MB will extend to WC 203 and close. | MB in WC 203. MB to Closed state. |

TABLE 9C-continued

| Tripping-Out Wet Operation | | | | | | |
|---|---|---|---|---|---|---|
| | Operator 195 | Operation | Line of Sight | Equipment precondition | Equipment Functionality | HMI |
| 3.2. | Pipe Handler | TDA 202 lift tubular 111 out of stick-up: Hoist TDA 202 to pick up weight. LSA 228 centralizer will close on tubular 111 above stick-up. Hold stand above stick-up until drained, | Visual/ CCTV | RN 151 in parked position. MB in WC 203. TD 116 retracted. | TDA 202 will hoist about two meters before lifting tubular 111. Tubular 111 is lifted carefully. Lifting is stopped if tubular 111 is catching on threads in TJ. LSA 228 centralizer closes after lifted above the box. | TDA 202 load indication. TDA 202 position indicator. LSA 228 centralizer. |
| 3.3. | Pipe Handler | MB open and retract: Verify tubular 111 is drained. Continue MB sequence. | Visual/ CCTV | | MB will open and retract. | MB to Closed state. MB parked. |
| 3.4. | Pipe Handler | TDA 202 and LSA 228 move tubular 111 to THP 207: TDA 202 and LSA 228 move toward THP 207. LTC 244 extends to THP 207 and closes guide when tubular 111 is close to THP 207. Set down tubular 111 at THP 207. Wash and dope pin if preselected. | Visual/ CCTV | TDA 202 closed. | TDA 202 will retract to vertical position above MOH 204 (or rig floor 114), then rotate, lower, and extend to THP 207. TDA 202 will slow down above THP 207. LTC 244 is extended and closed. LSA 228 is open. | TDA 202 load indication. TDA 202 position indicator. LSA 228 extend. LTC 244 to Closed state. |
| 3.5. | Pipe Handler | UTC 242 extend to THP 207 and close. UTC 242 extends to THP 207. UTC 242 and LTC 244 close. | Visual/ CCTV | TDA 202 and LSA 228 in THP 207 with tubular 111. | UTC 242 extend and close. LTC 244 continue close. | UTC 242 and LTC 244 to Closed state. |
| 4. | Driller | Extend TD 116 and latch elevator 129: Extend TD 116 to WC 203. Latch elevator 129 (automatic close on impact). | Visual | RN 151 parked. | | Elevator 129 to Closed state. Indicate TD 116 in WC 203. |
| 5. | Driller | Check trip tank volume, gain/loss: Determine trip tank gain/loss. Repeat all steps for next tubular 111. Continue on step 1. | Visual | | Trip tank gain/loss is determined and displayed. | Trip sheet/ volume control. |
| 5.1. | Pipe Handler | TDA 202 open and retract from THP 207: Verify UTC 242 and LTC 244 are closed. Open TDA 202. Open LSA 228 guide funnel. Continue on step 1.4. | Visual/ CCTV | UTC 242 closed. | | TDA 202 to Open state. LSA 228 open. |
| 5.2. | Pipe Handler | TBR 254 and SGA 262 move to FIB 166: Open TBR 254 and SGA 262. Move TBR 254 and SGA 262 toward THP 207/next tubular 111. Continue step 1.1. | | UTC 242 and LTC 244 closed on tubular 111. | | |

When a back-reaming operation is to be performed, an operator 195 on the rig floor 114 may verify that various pieces of equipment are properly shut down and locked out, and then perhaps perform other preparations such as the examples set forth above in Table 9A. The well construction system 100, 200 can then be set-up for the back-reaming sequence. Examples of such set-up may be as set forth below in Table 10A.

TABLE 10A

| Back-Reaming Set-Up | | | |
|---|---|---|---|
| Equipment | Responsible | Set-Up | HMI |
| Pipe handling: TBR 254, SGA 262, UTC 242, LTC 244, ITC 236, THP 207, TDA 202, LSA 228, RN 151 | Driller/ Pipe Handler | Verify operator 195 on rig floor 114 completed pre-checks and deactivated emergency stop for all pipe handling equipment.<br>Open Construction Program screen on touchscreen 522, 524.<br>Select Back-Reaming mode.<br>Select setup wizard to open pop-up on front screen 532, 534, 536. Verify settings:<br>Select slot, direction for setting back pipe.<br>Select pipe type.<br>Select RN 151 (THT) and MB (THA).<br>Check RN 151 MU torque.<br>Select pin/box doping.<br>Stick-up target.<br>Select "activate all machines" to startup and prepare all machines. | Verify Setback screen.<br>Construction Program setup wizard.<br>After startup: Check for green light in Construction Program status header on front screen 532, 534, 536. |
| TD 116, DW 119, MP 144 | Driller | Verify operator 195 on rig floor 114 completed pre-checks and deactivated emergency stop for all pipe handling equipment.<br>Open Construction Program screen on touchscreen 522, 524.<br>Select Drilling mode.<br>Select setup wizard to open pop-up on front screen 532, 534, 536. Verify settings:<br>Stick-up target.<br>Set DW 119 upper/lower stops.<br>Set relevant Autodriller parameters (ROP, WOB, delta-P, torque, etc.)<br>Set maximum pull.<br>Verify correct TD 116 MU torque setting.<br>Verify correct drilling torque setting.<br>Verify spin-in speed and torque setting.<br>Verify spin-out time.<br>Verify MP 144 liner size setting and efficiency.<br>Verify MP 144 pressure limit setting.<br>Assign pumps to MP 144 master slider.<br>Verify/set MP 144 ramp-up parameters.<br>Verify active tanks are selected and lined up.<br>Select "activate all machines" to startup and prepare all machines. | Verify Setback screen.<br>Construction Program setup wizard.<br>After startup: Check for green light in Construction Program status header on front screen 532, 534, 536. |
| All machines | Driller | Verify all relevant machines are enabled in zone management system and tubular interlock system. | Verify operator screen, system settings. |

After such preparations and set-up, the operator 195 may vacate the rig floor 114, and the equipment may be configured to be ready for remote control (e.g., by deactivating emergency stops). An example back-reaming sequence may start with the top drive 116 in lower position and retracted (with elevator links vertical), the slips 161 closed, and the TDA 202 and LSA 228 open in the THP 207. The UTC 242 and LTC 244 may be closed on a tubular 111 in the THP 207, with the ITC 236 being open and retracted, and the TBR 254 and SGA 262 empty (on the way from the FIB 166 to get the next tubular 111 in the THP 207). Example steps of the back-reaming sequence may be as set forth below in Table 10B.

TABLE 10B

| Back-Reaming Operation | | | | | | |
|---|---|---|---|---|---|---|
| | Operator 195 | Operation | Line of Sight | Equipment precondition | Equipment Functionality | HMI |
| 1. | Driller | Extend TD 116, tilt up links:<br>Verify tubular 111 is out of WC 203. | Visual | | | TD 116 to WC 203.<br>Links to parked position. |

TABLE 10B-continued

| Back-Reaming Operation | | | | | | |
|---|---|---|---|---|---|---|
| | Operator 195 | Operation | Line of Sight | Equipment precondition | Equipment Functionality | HMI |
| | | Extend TD 116 to WC 203. Tilt elevator 129 to parked position. | | | | |
| 2. | Driller | TD 116 spin-in: Apply dope on saver sub (manual). Start spin-in. Lower TD 116 and spin to stick-up. | Visual | Slips 161 closed. | Spin-in will activate TD 116 thread compensator system. Spin-in with spin-in settings (e.g., RPM/ torque). Spin-in will stop at set torque and release the spin-in torque. | TD 116 to WC 203. Links to parked position. Thread compensator. |
| 3. | Driller | TD 116 make-up: Activate TD 116 MU (joystick button and joystick) (may be operated manually on touchscreen 522, 524). Release button when MU torque is reached. | Visual | TD 116 spin-in finished. | TD 116 MU will automatically close BUC and increase TD 116 torque to set MU torque. Release torque and open BUC when button is released. DW 119 is interlocked from moving when BUC is closed. TD 116 thread compensator system is deactivated. | TD 116 BUC close. TD 116 MU torque. TD 116 torque log updated. TD 116 connected state when MU torque is reached. TD thread compensator deactivated. |
| 3.1. | Pipe Handler | TDA 202 and LSA 228 move from THP 207 to rig floor 114: Verify UTC 242 and LTC 244 are closed, TDA 202 and LSA 228 move to rig floor 114 standby. | Visual/ CCTV | UTC 242 closed. TDA 202 open. LSA 228 open. ITC 236 open and retracted. | TDA 202 will retract, hoist, and rotate when moving from THP 207 to rig floor 114 standby. | TDA 202 to Open state. LSA 228 to Open state. |
| 3.2. | Pipe Handler | TBR 254 and SGA 262 get tubular 111 from THP 207: TBR 254 and SGA 262 move to tubular 111 in THP 207. Close TBR 254 and SGA 262 on tubular 111. | Visual/ CCTV | TBR 254 and SGA 262 open. | | TBR 254 and SGA 262 to Closed states. |
| 3.3. | Pipe Handler | UTC 242 and LTC 244 open and retract: UTC 242 and LTC 244 open. UTC 242 and LTC 244 retract from THP 207. | Visual/ CCTV | TBR 254 and SGA 262 closed on tubular 111 in THP 207. | UTC 242 and LTC 244 open and retract. | UTC 242 and LTC 244 to Open state-retracted. |
| 3.4. | Pipe Handler | TBR 254 and SGA 262 move toward FIB 166 with tubular 111: Lift tubular 111 from THP 207. Move to selected position in FIB 166. | Visual/ CCTV | Valid FIB 166 position selected. | TBR 254 and SGA 262 will follow predefined path. FIB 166 latches will open when tubular 111 is outside selected FIB 166 row. FIB 166 latches will close prior to setting down tubular 111. Set down tubular 111 in selected position. | THP load. |

TABLE 10B-continued

| | Operator 195 | Operation | Line of Sight | Equipment precondition | Equipment Functionality | HMI |
|---|---|---|---|---|---|---|
| Back-Reaming Operation | | | | | | |
| 4. | Driller | Open slips 161 and ream out tubular 111: Verify TD 116 is connected. Open slips 161. Open IBOP. Continue to ream out tubular 111 per drilling program. | Visual/ CCTV | TD 116 connected. TD thread compensator deactivated. | | Slips 161 to Open state. IBOP to Open state. TD 116 RPM. TD 116 torque. MP 144 SPM. Standpipe pressure. |
| 5. | Driller | Set slips 161: Stop rotation and release torque. Stop MP 144 and close IBOP. Set slips 161 at required stick-up (e.g., about 1-2 meters). | Visual | | | Slips 161 to Closed state. |
| 5.1. | Pipe Handler | TDA 202 and LSA 228 move to WC 203 (from rig floor 114 standby). | Visual/ CCTV | TDA 202 open. LSA 228 open. | TDA 202 retract to vertical, hoist, rotate, and extend to WC 203 about two meters below stick-up. TDA 202 and LSA 228 will stop/wait outside WC 203 area if TD 116 is moving. | TDA 202 Load indication. |
| 5.2. | Pipe Handler | Move RN 151 to WC 203: Start RN 151 break-out sequence to move RN 151 to WC 203. | | RN 151 clamps open. WC 203 selected. | RN 151 will move to WC 203. Elevate RN 151 to stick-up. RN 151 will stop/ wait outside WC 203 area if TD 116 is moving. | TJ (stick-up) assist indication. |
| 5.3. | Pipe Handler | TDA 202 and LSA 228 guide close. Verify TDA 202 and LSA 228 in WC 203. Close TDA 202. Close LSA 228 guide funnel. | Visual/ CCTV | Slips 161 closed. | TDA 202 and LSA 228 will not close in WC 203 if slips 161 are not closed. | TDA 202 to Closed state. TDA 202 and LSA 228 in WC 203. LSA 228 guide funnel to Closed state. |
| 6. | Driller | TD 116 break-out connection: Verify slips 161 are closed, Activate TD 116 break-out function (joystick button + joystick). (Clamp on/ break-out may be operated manually on touchscreen 522, 524). Deactivate break-out button when connection is broken (torque dropping and shaft rotating). | Visual | Slips 161 must be closed before TD 116 BUT/Break-Out function is available. | TD 116 Break-Out function will activate clamp and increase torque to break connection. TD 116 break-out will activate TD 116 thread compensator and TD 116 pipe handler lock. When connection is broken, release button. Torque will be released and TD 116 BUC opened. DW 119 is interlocked from hoisting when TD 116 BUC is closed. | TD 116 thread compensator. TD 116 not connected. TD116 BUC. |
| 7. | Driller | TD 116 spin-out: Verify break-out is completed. Spin-out. Hoist out of stick-up. | Visual | Slips 161 must be closed. Break-Out not active, TD 116 BUC open. | Spin-Out will activate TD 116 thread compensator system. Spin-Out function will spin-out per settings. TD 116 thread compensator is deactivated. | TD 116 thread compensator. |

TABLE 10B-continued

| Back-Reaming Operation | | | | | | |
|---|---|---|---|---|---|---|
| | Operator 195 | Operation | Line of Sight | Equipment precondition | Equipment Functionality | HMI |
| 8. | Driller | Retract and lower TD 116 to stick-up: Verify TD 116 is above tubular 111. Retract TD 116 and tilt links down (float). Lower TD 116 to stick-up (lower stop). | Visual/ CCTV | Lowering will be stopped if TD 116 is retracted and links are tilted to parked position. | Links will tilt down when TD 116 is retracted. TD 116 pipe handler has preset position facing TDA 202. | TD 116 retracted. Indicate TD 116 lower stop position. Link tilt position. |
| 8.1. | Pipe Handler | RN 151 break-out and spin-out: TD 116 disconnected and hoisted above tubular 111. Adjust RN 151 elevation if required. Continue RN 151 sequence. | CCTV | Slips 161 closed. | Break-out and spin-out. Double break-out available if required. Open RN 151 spinner, guide, and clamps. Return RN 151 to park position. | RN 151 indication. |
| 8.2. | Pipe Handler | MB (THA) extend to WC 203: Verify THT is out of the area. Continue the MB sequence. | Visual/ CCTV | RN 151/THT retracted. MB open. | MB will extend to WC 203 and close. | MB in WC 203. MB to Closed state. |
| 8.3. | Pipe Handler | TDA 202 lift tubular from stick-up: Hoist TDA 202 to pick up weight. LSA 228 centralizer closed on tubular 111 in WC 203. Hold tubular 111 above stick-up until drained. | Visual/ CCTV | RN 151 in parked position. MB in WC 203. TD 116 retracted. | TDA 202 will hoist about two meters before lifting tubular 111. Tubular 111 is lifted carefully. Lifting is stopped if tubular 111 catches on TJ threads. LSA 228 centralizer closes after lifted above box. | TDA 202 load indication. TDA 202 position indicator. LSA 228 centralizer. |
| 8.4. | Pipe Handler | MB open and retract: Verify tubular 111 is drained. Continue MB sequence. | Visual/ CCTV | | MB will open and retract. | MB to Open state. MB parked. |
| 8.5. | Pipe Handler | TDA 202 and LSA 228 move tubular 111 to THP 207: TDA 202 and LSA 228 will move towards THP 207. LTC 244 extends to THP 207 and closes guide when tubular 111 is close to THP 207. Set down tubular 111 on THP 207. Wash and dope pin if preselected. | Visual/ CCTV | TD 116 elevator 129 closed. | TDA 202 will retract to vertical position above MOH 204 (rig floor 114 standby), then rotate, lower, and extend to THP 207. TDA 202 will slow down above THP 207. LTC 244 is extended and closed. LSA 228 open. | TDA 202 load indication. TDA 202 position indicator. LSA 228 extend. LTC 244 to Closed state. Wash and dope (if selected). |
| 8.6. | Pipe Handler | UTC 242 extend THP 207 and close: UTC 242 extends to THP 207. UTC 242 and LTC 244 close. | Visual/ CCTV | TDA 202 and LSA 228 in THP 207 with tubular 111. | UTC 242 extend and close. LTC 244 continue close. | UTC 242 and LTC 244 to Closed states. |
| 8.7. | Pipe Handler | TDA 202 open and retract from THP 207: Verify UTC 242 and LTC 244 are closed. Open TDA 202. Open LSA 228 guide funnel. Continue on step 3.1. | Visual/ CCTV | UTC 242 closed. | | TDA 202 to Open state. LSA 228 open. |

TABLE 10B-continued

| Back-Reaming Operation | | | | | | |
|---|---|---|---|---|---|---|
| | Operator 195 | Operation | Line of Sight | Equipment precondition | Equipment Functionality | HMI |
| 8.8. | Pipe Handler | TBR 254 and SGA 262 move toward THP 207: Open TBR 254 clamps and guide and SGA 262 guide (in FIB 166). Move toward THP 207/next tubular 111. Continue step 3.2. | | FIB 166 latches closed. | | FIB 166 latches closed. TBR 254 and SGA 262 open. |

For tripping-in drill collar stands, an operator 195 on the rig floor 114 may verify that various pieces of equipment are properly shut down and locked out, and then perhaps perform other preparations such as the examples set forth below in Table 11A.

TABLE 11A

| Preparations for Tripping-In Drill Collar Stands | | |
|---|---|---|
| Equipment | Responsible | Verifications |
| FIB 166 Setback 164 | Operator 195 on rig floor 114. | Tubulars 111 exist in FIB 166 slots per HMI/tally. Fingers are closed. Travel path is unobstructed. |
| TBR 254 SGA 262 | Operator 195 on rig floor 114. | Travel path is unobstructed. Gripper inserts/dies are clean, not worn. |
| LTC 244 ITC 236 UTC 242 | Operator 195 on rig floor 114. | Travel path is unobstructed. Gripper inserts/dies are clean, not worn. |
| THP Doper 209 | Operator 195 on rig floor 114. | Travel path is unobstructed. Water, correct dope available for doper 209. |
| LSA 228 | Operator 195 on rig floor 114. | Travel path is unobstructed. |
| TDA 202 | Operator 195 on rig floor 114. | TDA 202 is parked outside collision area. |
| RN 151 THT-DPT THA-DPT | Operator 195 on rig floor 114. | DPT is connected. Gripper dies are clean, not worn. Travel path is unobstructed. |
| Slips 161 | Operator 195 on rig floor 114; and/or "Driller" 195 at workstation 452. | Correct inserts/dies. Inserts/dies are clean, not worn. |
| TD 116 | Operator 195 on rig floor; and/or "Driller" 195 at workstation 452. | Correct inserts/dies in elevator 129. Correct saver sub status. Travel path is unobstructed. |
| DW 119 | Operator 195 on rig floor; and/or "Driller" 195 at workstation 452. | Checked. |

The well construction system 100, 200 can then be set-up for the trip-in sequence. Examples of such set-up may be as set forth below in Table 11B.

TABLE 11B

| Set-Up for Tripping-In Drill Collar Stands | | | |
|---|---|---|---|
| Equipment | Responsible | Set-Up | HMI |
| Pipe handling: TBR 254, SGA 262, UTC 242, | Driller/ Pipe Handler | Verify operator 195 on rig floor 114 completed pre-checks and deactivated emergency stop for all pipe handling equipment. Open Construction Program screen on | Verify Setback screen. Construction Program setup wizard. After startup: Check for green light in |

TABLE 11B-continued

| Set-Up for Tripping-In Drill Collar Stands | | | |
|---|---|---|---|
| Equipment | Responsible | Set-Up | HMI |
| LTC 244, THP 207, LSA 228, RN 151 | | touchscreen 522, 524. Select Trip In mode. Select setup wizard to open pop-up on front screen 532, 534, 536. Verify settings: Select slot, direction for picking pipe. Select pipe type. Select RN 151 to use. RN 151 MU torque. Select pin/box doping. Stick-up target. Select "activate all machines" to startup and prepare all machines. | Construction Program status header on front screen 532, 534, 536. |
| TD 116, DW 119, MP 144, Trip tank | Driller | Verify operator 195 on rig floor 114 completed pre-checks and deactivated emergency stop for all pipe handling equipment. Open Construction Program screen on touchscreen 522, 524. Select Trip In mode. Select setup wizard to open pop-up on front screen 532, 534, 536. Verify settings: Stick-up target. Set DW 119 upper/lower stops. Set maximum lowering speed. Set minimum slack off weight. Trip tank 1/2/auto. Trip tank low/high levels. Select "activate all machines" to startup and prepare all machines. | Verify Setback screen. Construction Program setup wizard. After startup: Check for green light in Construction Program status header on front screen 532, 534, 536. |
| TD 116 | Driller | Verify operator 195 on rig floor 114 completed pre-checks. Activate TD 116 from touchscreen 522, 524. Select Operation screen on touchscreen 522, 524. | Verify operator screen, system status/alarms. |
| DW 119 | Driller | Activate DW 119 from touchscreen 522, 524. | Verify operator screen, system status/alarms. |
| All machines | Driller | Verify all relevant machines are enabled in zone management system and tubular interlock system. | Verify operator screen, system status/alarms. |

After such preparations and set-up, the operator 195 may vacate the rig floor 114, and the equipment may be configured to be ready for remote control (e.g., by deactivating emergency stops). The sequence for tripping-in drill collar stands may start with a drill collar stand 111 stick-up at WC 203, with the top drive 116 elevator 129 closed on the stick-up and the slips 161 closed. The UTC 242 and LTC 244 may be closed on another drill collar stand 111 in the THP 207, with washing and doping of the pin already completed. The TDA 202, LSA 228, TBR 254, and SGA 262 may each be empty. Example steps of the drill collar stand tripping-in sequence may be as set forth below in Table 11C.

TABLE 11C

| Tripping-In Drill Collar Stands Operation | | | | | | |
|---|---|---|---|---|---|---|
| | Operator 195 | Operation | Line of Sight | Equipment precondition | Equipment Functionality | HMI |
| 1. | Driller | Open elevator 129: Verify slips 161 are closed. Open elevator 129. | Visual/ CCTV | Slips 161 must be closed before opening elevator 129. | Elevator 129 Open is not selectable if slips 161 are not closed. | Elevator 129 to Open state. |
| 1.1. | Pipe Handler | TBR 254 and SGA 262 pick up new stand 111: Move TBR 254 and SGA 262 to selected finger/slot in FIB 166. Close guides and clamp on stand 111. | Visual/ CCTV | TBR 254 and SGA 262 grip/guide open. Selected FIB 166 position "valid." | TBR 254 will move into FIB 166 elevated above open latches. Adjustments available, TBR 254 and SGA 262 grip/guide will close. | TBR 254 and SGA 262 grip/ guide to Closed state. |

TABLE 11C-continued

Tripping-In Drill Collar Stands Operation

| | Operator 195 | Operation | Line of Sight | Equipment precondition | Equipment Functionality | HMI |
|---|---|---|---|---|---|---|
| 2. | Driller | Tilt back elevator 129 and move TD 116 to latching height: Verify elevator 129 is open. Tilt back (or retract) TD 116 to clear TJ. Hoist elevator 129 to stand 111 latch height (upper stop). | Visual/ CCTV | TD 116 pipe handler positioned facing UTC 242. | Elevator 129 will be tilted back and then slide back to vertical position (float). | DW 119 upper stop setting. |
| 2.1. | Pipe Handler | UTC 242 and LTC 244 tilt stand 111 to drill collar handover position (DCH): UTC 242 and LTC 244 extend to tilt stand 111 toward WC 203. | Visual/ CCTV | | UTC 242 and LTC 244 will stop at correct angle, DCH. | UTC 242 and LTC 244 closed. UTC 242 and LTS 244 to DCH. |
| 2.2. | Pipe Handler | LSA 228 extend to stand 111 in THP 207: Extend LSA 228 to stand 111 in THP 207 (tilted). Close LSA 228 funnel. | Visual/ CCTV | LSA 228 guide funnel must be open. UTC 242 and LTC 244 in DCH. | | LSA 228 funnel to Closed state. |
| 3. | Driller | Extend TD 116 and latch elevator 129: Extend TD 116 to WC 203. Latch elevator 129 (automatic close on impact). | Visual/ CCTV | UTC 242 and LTC 244 in DCH. | | Elevator 129 to Closed state. TD 116 in WC 203. UTC 242 and LTC 244 in DCH. |
| 3.1. | Pipe Handler | UTC 242 and LTC 244 open and retract. | Visual/ CCTV | TD 116 elevator 129 must be closed. LSA 228 funnel must be closed. | UTC 242 and LTC 244 open and retract. | UTC 242 and LTC 244 to Open states. |
| 3.2. | Pipe Handler | Move RN 151 to WC 203: Start RN 151 MU sequence to move RN 151 to WC 203. | | Only possible with THT. If THA is used, wait for stand 111 located above stick-up. RN 151 tongs open. WC 203 selected. | RN 151 will move to WC 203. Elevate RN 151 to stick-up. | TJ (stick-up) assist indication. |
| 4. | Driller | TD 116 hoist stand 111 from THP 207: TD 116/DW 119 lift stand 111 guided by LSA 228 (e.g., about nine meters). Stop when above stick-up. Note: Drill collar stand 111 to be lifted carefully to avoid damage to equipment. Links tilt to WC 203 (float). | Visual/ CCTV | UTC 242 or LTC 244 open. | Slips 161 Open will be blocked with elevator 129 closed in WC 203 until stand 111 is connected. | TD 116 at WC 203. |
| 4.1. | Pipe Handler | LSA 228 guide stand 111 to WC 203: LSA 228 guides stand 111 to WC 203 when pin is above stick-up height. LSA 228 centralizer closes when stand 111 is close to vertical above stick-up. | Visual/ CCTV | | | LSA 228 centralizer to Closed state. LSA 228 adjustment available. |
| 4.2. | Pipe Handler | Guide stand 111 with RN 151 in WC 203: Verify stand 111 is located in WC 203. Adjust RN 151 elevation if required. Continue RN 151 sequence. | CCTV | Stand 111 positioned by TD 116/LSA 228 above stick-up in WC 203. | Close RN 151 BUT. Close stabbing guide. | Stabbing guide to Closed state. RN 151 BUT to Closed state. |

TABLE 11C-continued

Tripping-In Drill Collar Stands Operation

| | Operator 195 | Operation | Line of Sight | Equipment precondition | Equipment Functionality | HMI |
|---|---|---|---|---|---|---|
| 5. | Driller | TD 116 lower to stab stand 111 in stick-up. | Visual/ CCTV | RN 151 in WC 203 with stabbing guide closed. | | |
| 5.1. | Pipe Handler | LSA 228 open and retract: LSA 228 opens and retracts when RN 151 stabbing guide closed on stand 111. | Visual/ CCTV | RN 151 stabbing guide closed on stand 111. | | LSA 228 guide to Open state. |
| 5.2. | Pipe Handler | RN 151 spin-in and MU: Continue RN 151 sequence to spin-in and MU. | Visual/ CCTV | Stand 111 stabbed in stick-up. TDA 202 unloaded. | Spin-in and MU connection. Open RN 151 spinner and tongs. Return RN 151 to park position. | Torque log updated. MU torque presented to Driller. |
| 5.3. | Pipe Handler | TBR 254 and SGA 262 move stand 111 to THP 207: Open FIB 166 latches for selected row. Verify latches open. TBR 254 lifts and moves stand 111 out of FIB 166 to THP 207. FIB 166 latches will close as stand 111 moves out of FIB 166. Set stand 111 on THP 207. Wash and dope pin if preselected. | Visual/ CCTV | THP 207 empty. UTC 242 and LTC 244 open. Correct pipe detected in TBR 254 and SGA 262. | TBR 254 cannot open with weight. TBR 254 grip open when unloaded. FIB 166 latches will not open with TBR 254 head in low position. | Indicate FIB 166 open latches. TBR 254 load indication. |
| 5.4. | Pipe Handler | UTC 242 and LTC 244 extend to THP 207 and close. | Visual/ CCTV | TBR 254 and SGA 262 with stand 111 in THP 207. | UTC 242 and LTC 244 extend and close. | UTC 242 and LTC 244 to Closed states. |
| 5.5. | Pipe Handler | TBR 254 and SGA 262 open and move toward FIB 166: Open TBR 254 clamps and guide and SGA 262 guide. Move toward FIB 166/ next stand 111. Continue step 1. | | UTC242 and LTC 244 closed on stand 111. | | |
| 6. | Driller | Opening slips: Open slips 161 (command). Hoist to open slips 161. | Visual | TD 116 elevator 129 closed. RN 151 MU sequence finished. Stand 111 connected state. | | Slips 161 to Open state. DW 119 load. |
| 7. | Driller | Lower drill string 120: Verify slips 161 are open before lowering drill string 120. | Visual | Slips 161 open. | | Settings: DW 119 lowering speed and minimum slack-off weight. |
| 8. | Driller | Set slips 161: Set slips 161 at correct stick-up height. Set off weight. | Visual | Stick-up at correct height. | | Slips 161 to Closed state. DW 119 load indicator. |
| 9. | Driller | Check trip tank volume, gain/loss: Trip tank gain/loss. Repeat all steps for next stand 111. | Visual | Slips 161 closed. | Trip tank gain/loss is determined and displayed. | Trip sheet/ volume control. |

Different combinations of the aspects described above may also be utilized for running casing from the CW 131 with the TDA 202 and a casing running tool (CRT). Preparations for such operation may include the examples set forth below in Table 12A.

TABLE 12A

Preparations for Running Casing from CW with TDA and CRT

| Equipment | Responsible | Verifications |
|---|---|---|
| CW 131 | Operator 195 on rig floor 114. | Travel path is unobstructed.<br>Casings are laid out correct with aft end in line with skate 133 for correct loading.<br>Prepare to pick up casing. |
| CTO: THA + CTO as primary, THT + CTO as backup | Operator 195 on rig floor 114. | CTO is rigged up in THA (or THT).<br>CTO adjusted for casing size.<br>Dies are correct, clean, and not worn.<br>Travel path is unobstructed. |
| LSA 228 | Operator 195 on rig floor 114. | Travel path is unobstructed. |
| Slips 161 Rotary Table | Operator 195 on rig floor 114. | Correct inserts in slips 161.<br>Dies are clean and not worn.<br>Rotary table rotation lock activated. |
| TD 116, CRT | Operator 195 on rig floor 114. | Correct inserts in elevator 129 (or elevator 129 removed, if required).<br>Operator screen, system status.<br>Travel path is unobstructed.<br>CRT installed and tested. |
| DW 119 | Operator 195 on rig floor 114. | Checked. |
| Tubulars 111 | Operator 195 on rig floor 114. | Tubulars 111 to be laid out on CW 131.<br>Tubulars 111 to be cleaned and doped, protectors removed (other implementations may be used for casing with protectors).<br>Casings measured, marked, and tally updated. |

The well construction system 100, 200 can then be set-up for the operation. Examples of such set-up may be as set forth below in Table 12B.

TABLE 12B

Set-Up for Running Casing from CW with TDA and CRT

| Equipment | Responsible | Set-Up | HMI |
|---|---|---|---|
| Pipe handling: LSA 228, CTO, CW 131 | Pipe Handler | Verify operator 195 on rig floor 114 completed pre-checks and deactivated emergency stop for all pipe handling equipment.<br>Open Construction Program screen on touchscreen 522, 524.<br>Select Running Casing from CW with TDA and CRT mode.<br>Select setup wizard to open pop-up on front screen 532, 534, 536. Verify settings:<br>Select casing type and verify casing data (size, weight, MU loss, torque settings, weight, etc.).<br>Select CTO to use in the operations.<br>Stick-up target.<br>Select "activate all machines" to startup and prepare all machines. | Verify Setback screen.<br>Construction Program setup wizard.<br>After startup: Check for green light in Construction Program status header on front screen 532, 534, 536. |
| TD 116, DW 119, MP 144 | Driller | Verify operator 195 on rig floor 114 completed pre-checks and deactivated emergency stop for all pipe handling equipment.<br>Open Construction Program screen on touchscreen 522, 524.<br>Select Running Casing from CW with TDA and CRT mode.<br>Select setup wizard to open pop-up on front screen 532, 534, 536. Verify settings:<br>Stick-up target.<br>Set DW 119 upper/lower stops.<br>Set maximum lowering speed. | Verify Setback screen.<br>Construction Program setup wizard.<br>After startup: Check for green light in Construction Program status header on front screen 532, 534, 536. |

TABLE 12B-continued

| Set-Up for Running Casing from CW with TDA and CRT | | | |
|---|---|---|---|
| Equipment | Responsible | Set-Up | HMI |
| | | Set minimum slack of weight.<br>Trip tank 1/2/auto.<br>Trip tank low/high levels.<br>Verify active tanks are selected and lined up.<br>Select MP 144 (to fill casing, optional).<br>Verify MP 144 pressure limit setting.<br>Assign pumps to master slider.<br>Set number of strokes and SPM to fill casing (optional).<br>Set ramp-up parameters.<br>Select "activate all machines" to startup and prepare all machines. | |
| TD 116 | Driller | Verify operator 195 on rig floor 114 completed pre-checks.<br>Activate TD 116 from touchscreen 522, 524.<br>Verify correct elevator 129 setting (manual/remote).<br>Select Operation screen on touchscreen 522, 524. | Verify operator screen, system status/alarms. |
| DW 119 | Driller | Activate DW 119 from touchscreen 522, 524.<br>Set maximum lowering speed.<br>Set minimum slack off weight. | Verify operator screen, system status/alarms. |
| Slips 161, Rotary table | Driller | Verify correct setting for slips 161 (manual/remote). | Verify operator screen, system status/alarms. |
| All machines | Driller | Verify all relevant machines are enabled in zone management system and tubular interlock system. | |
| Tubulars 111 | Pipe Handler | All types of tubulars 111 are registered. | |

After such preparations and set-up, the operator 195 may vacate the rig floor 114, and the equipment may be configured to be ready for remote control (e.g., by deactivating emergency stops). An example of this sequence may start with a casing stick-up at WC 203, with the slips 161 closed and the CRT engaged. Casing may be laid out on the CW 131 casing side (e.g., Driller's side), having been cleaned, doped, and tallied, and with protectors removed. The TDA 202 and LSA 228 may hold a casing 111 in the rig floor 114 standby position. Example steps of the sequence may be as set forth below in Table 12C.

TABLE 12C

| Sequence for Running Casing from CW with CTO | | | | | | |
|---|---|---|---|---|---|---|
| | Operator 195 | Operation | Line of Sight | Equipment precondition | Equipment Functionality | HMI |
| 1. | Driller | Release CRT from stick-up:<br>Verify slips 161 are closed, MP 144 stopped, and IBOP closed.<br>Release CRT from stick-up.<br>Hoist CRT above stick-up.<br>Retract and hoist to casing stabbing position. | Visual/ CCTV | Slips 161 must be closed before releasing CRT. | | CRT to Disconnect state. |
| 1.1. | Pipe Handler | Move THT/CTO to WC 203 (optional):<br>Verify TD 116 hoisted above CTO working area.<br>Start CTO sequence to move THT/CTO to WC 203. | | CTO open.<br>WC 203 selected. | CTO will move to WC 203.<br>Elevate to stick-up.<br>ZMS will prevent CTO start if TD 116 is too low. | THT in WC 203. |

TABLE 12C-continued

Sequence for Running Casing from CW with CTO

| | Operator 195 | Operation | Line of Sight | Equipment precondition | Equipment Functionality | HMI |
|---|---|---|---|---|---|---|
| 1.2. | Pipe Handler | TDA 202 and LSA 228 extend casing to WC 203: Verify TD 116 is retracted. TDA 202 and LSA 228 will extend casing to WC 203 above stick-up. | | CTO open. | | TDA 202 and LSA 228 in WC 203. |
| 1.3. | Pipe Handler | Guide single casing with CTO in WC 203: Verify casing at WC 203. Continue CTO sequence. | Visual/ CCTV | CTO in WC 203. LSA 228 in WC 203. | Close CTO BUT. Close stabbing guide. | |
| 1.4. | Pipe Handler | Close MUST for soft stabbing (optional): Adjust CTO elevation and TD 116 elevation if required. Continue CTO sequence. | Visual/ CCTV | CTO in WC 203. | Close MUST. Must will take some load if closed prior to stabbing casing. | MUST to Closed state. |
| 1.5. | Pipe Handler | Stab casing: Lower TDA 202 to stab casing in stick-up. | Visual/ CCTV | TDA 202 in WC 203. CTO in WC 203 with stabbing guide closed. | TDA 202 will lower to stab casing and continue lowering (e.g., about one meter). | TDA 202 unloaded. |
| 1.6. | Pipe Handler | Open and retract LSA 228: Open and retract LSA 228 when casing has entered stabbing guide. | Visual/ CCTV | CTO stabbing guide closed. | | LSA 228 Open status. |
| 1.7. | Pipe Handler | CTO spin-in and MU: Verify casing is stabbed in box. Continue CTO sequence. Accept or reject MU. | Visual/ CCTV | Single casing stabbed in stick-up. TD 116 unloaded, elevator 129 below TJ to permit spinning. | CTO will spin-in and MU automatically per casing data settings. If Accept: Open spinner, guide, and clamps. Return to park position. | Casing Connected state. |
| 1.8. | Pipe Handler | Load casing into ramp 149: Use CW 131 loading fingers to load casing single into ramp 149. | Visual/ CCTV | Casing ready in loading position. CW 131 in loading position. | | |
| 1.9. | Pipe Handler | Run ramp 149 to rig floor 114: Verify casing is loaded in ramp 149. Move ramp toward pipe pick-up position. | Visual/ CCTV | Casing loaded onto ramp 149. | Ramp 149 will tilt to rig floor 114 tubular position. Skate 133 will move toward rig floor 114. Skate 133 will stop with casing box inside ramp 149. | CW 131 animated. |
| 2. | Driller | Stab and engage CRT: Verify casing is stabbed and MU accepted. Stab and engage CRT. | Visual/ CCTV | Single casing stabbed in stick-up. TDA 202 unloaded, elevator (or gripper 169) below TJ to permit spinning. CTO open. | | CRT Connected state. |
| 2.1. | Pipe Handler | Open TDA 202 and move to pick up next casing single: Open TDA 202 and move to CW 131 pick-up position. | | Casing connected. CRT connected. | Open CTO BUT and move THT to parked position. | TDA 202 Open. |
| 3. | Driller | Open slips 161: Open slips 161 (command). Hoist to open slips 161. | Visual | CRT connected. Casing connected. | | Slips 161 to Open state. DW 119 load. |

TABLE 12C-continued

Sequence for Running Casing from CW with CTO

| | Operator 195 | Operation | Line of Sight | Equipment precondition | Equipment Functionality | HMI |
|---|---|---|---|---|---|---|
| 4. | Driller | Lower drill string 120: Verify slips 161 are open before lowering drill string 120. Optional: Fill casing volume, if selected. Open IBOP. Start MP 144. Close IBOP. | Visual | Slips 161 open. Optional: MP 144 ready. | Optional: The selected MP 144 will pump a set number of strokes at set rate with selected MP 144 and stop. | MP 144 SPM and pressure. |
| 4.1. | Pipe Handler | Push casing to pick-up position: Verify TDA 116 elevator 129 is positioned in CW 131 pick-up position. Run skate 133 until casing is positioned above elevator 129. | Visual | Ramp 149 in rig floor 114 position. TDA 202 in CW 131 pick-up position. TDA 202 open. | Skate 133 will push casing a defined distance forward. | CW 131 in pick-up position. TDA 202 in CW 131 pick-up position. |
| 4.2. | Pipe Handler | Close TDA 202: Hoist/tilt TDA 202 and close. | Visual | Casing in CW 131 pick-up position, above TDA 202 elevator. | Tubular interlock will prevent hoisting without closed elevator (above certain height). | TD 202 to Closed state. |
| 5. | Pipe Handler | Lift casing to rig floor 114 DF standby position: Verify TDA 202 is closed. Hoist TDA 202 to pick up single from CW 131. Move LSA 228 to preset position to prepare for guiding. Before casing lower end leaves CW 131, close LSA 228 funnel. Continue hoisting and rotate TDA 202 until casing is above MOH 204 (rig floor 114 standby position). Continue step. 1.1. | Visual | TDA 202 closed. Verify LSA 228 is positioned to receive casing bottom before hoisting. TDA 202 above LSA 228 operating area. | Hoisting will stop prior to lifting casing out of CW 131 without guiding. LSA 228 centralizer close when casing is close to vertical. TDA 202 and LSA 228 will position casing above MOH 204/ITC 236 with TDA 202 elevator facing TD 116. | LSA 228 guide to Closed state. LSA 228 centralizer to Closed state. Indicate TDA 202/LSA 228 in MOH 204 position. |
| 6. | Pipe Handler | CW 131 retract to loading position: Verify casing pin end is clear of ramp 149. Move CW 131 toward FT loading position. Continue step 1.6. | Visual/ CCTV | | Skate 133 will move to loading position. Ramp 149 will tilt to loading position. | |
| 7. | Driller | Set slips 161: Set slips 161 at correct stick-up height. Set off weight. | Visual | Stick-up at correct height. | | Slips 161 to Closed state. DW 119 load indicator. |
| 8. | Driller | Check gain/loss: Check trip tank gain/ loss or active gain/loss depending on selected operation. | Visual | | Trip tank or active tank gain/loss is determined and displayed. | Volume control. |
| 9. | | Repeat sequence for next casing. | | | | |

Different combinations of the aspects described above may also be utilized for building stands of two or more casing singles. Such casing stand building may be performed during drilling and other operations performed at WC 203. Such simultaneous operations, however, are coordinated to avoid conflicts and obstructions between the different machines and systems. For example, the elevator of the TDA 202 may have two different sizes of inserts to permit building casing stands while drilling. The change of head size may be done remote from the Pipe Handler's workstation 450 (or 452 or 454). When a casing stand building operation is to be performed, an operator 195 on the rig floor 114 may verify that various pieces of equipment are properly shut down and locked out, and then perhaps perform other preparations such as the examples set forth below in Table 13A.

TABLE 13A

| Casing Stand Building Preparations | | |
|---|---|---|
| Equipment | Responsible | Verifications |
| CW 131 | Operator 195 on rig floor 114. | Travel path is unobstructed.<br>Prepare for casing pick-up.<br>Casings are laid out correctly with aft end in line with skate 133 for correct loading. |
| FIB 166 | Pipe Handler | Stands in FIB 166 slots per HMI.<br>Fingers closed.<br>Travel path is unobstructed. |
| TBR 254 | Pipe Handler | Travel path is unobstructed. |
| SGA 262 | Pipe Handler | Travel path is unobstructed. |
| LTC 244<br>ITC 236<br>UTC 242 | Operator 195 on rig floor 114. | Travel path is unobstructed.<br>Dies are clean and not worn. |
| THP<br>Doper 209 | Operator 195 on rig floor 114. | Travel path is unobstructed.<br>Water and correct dope available for doper 209. |
| LSA 228 | Operator 195 on rig floor 114. | Travel path is unobstructed. |
| TDA 202 | Operator 195 on rig floor 114. | Travel path is unobstructed.<br>Correct dope is available for associated doper 209.<br>Correct inserts installed. |
| CTO:<br>THA-CTO | Operator 195 on rig floor 114. | CTO is rigged up in THA.<br>Correct adaptors and stabbing guide funnel are installed.<br>Dies are correct, clean, and not worn.<br>Travel path is unobstructed. |
| Tubulars 111 | Operator 195 on rig floor 114. | Tubular 111 to be loaded on FT.<br>Tubulars 111 to be cleaned and doped, protectors removed. |

The well construction system 100, 200 can then be set-up for the casing stand building operation. Examples of such set-up may be as set forth below in Table 13B.

TABLE 13B

| Casing Stand Building Set-Up | | | |
|---|---|---|---|
| Equipment | Responsible | Set-Up | HMI |
| Pipe handling: TBR 254, SGA 262, UTC 242, LTC 244, ITC 236, THP 207, TDA 202, LSA 228, RN 151, CW 131 | Pipe Handler | Verify operator 195 on rig floor 114 completed pre-checks and deactivated emergency stop for all pipe handling equipment.<br>Open Construction Program screen on touchscreen 522, 524.<br>Select Casing Stand Building mode.<br>Select setup wizard to open pop-up on front screen 532, 534, 536. Verify settings:<br>Select slot, direction for racking stands.<br>Select casing size/type.<br>Select CTO (with THA) to use.<br>CTO MU torque.<br>Perform pin/box doping.<br>Stick-up target.<br>Select "activate all machines" to startup and prepare all machines. | Verify Setback screen.<br>Construction Program setup wizard.<br>After startup: Check for green light in Construction Program status header on front screen 532, 534, 536. |
| All machines | Pipe Handler | Verify all relevant machines are enabled in zone management system and tubular interlock system. | |
| Tubulars 111 | Pipe Handler | All tubulars 111 to be registered in electronic tally system. | |

After such preparations and set-up, the operator 195 may vacate the rig floor 114, and the equipment may be configured to be ready for remote control (e.g., by deactivating emergency stops). An example casing stand building sequence may start with the MOH 204 and THP 207 empty, the ITC 236 retracted, and the CW 131 feeding table pre-loaded with casing singles (perhaps already cleaned and doped). Example steps of the casing stand building sequence may be as set forth below in Table 13C. In such example, among others within the scope of the present disclosure, the pipe handling equipment may be operated automatically via the Construction Program, and the step execution of the pipe handling equipment may be controlled automatically by one or two operators 195 at the associated workstation(s) 450, 452, 454. The Construction Program may also feature configurable step confirmations. The casing stand building sequence controlled by the Construction Program may be stopped or interrupted at any time, and some or all functions may be operated manually by the one or two operators 195 at the associated workstation(s) 450, 452, 454.

TABLE 13C

Casing Stand Building Operation

| | Operator 195 | Operation | Line of Sight | Equipment precondition | Equipment Functionality | HMI |
|---|---|---|---|---|---|---|
| 1. | Pipe Handler | Load casing single into ramp 149: Verify ramp 149 is empty and in position. Use loading fingers to load casing single into ramp 149. | Visual/ CCTV | Casing ready in loading position. CW 131 in loading position. | | |
| 2. | Pipe Handler | Run ramp 149 to pick-up position: Verify casing is loaded in ramp 149. Move ramp 149 toward pipe pick-up position. | Visual/ CCTV | Casing loaded on ramp 149. | Ramp 149 will tilt to rig floor 114 tubular position. Skate 133 will move toward rig floor 114. Skate 133 will stop with casing box on ramp 149. | |
| 3. | Pipe Handler | Move TDA 202 to pick-up position: Tilt TDA 202. Lower and extend TDA 202 to CW 131 pick-up position (above THP 207). | Visual | TDA 202 open. | | |
| 4. | Pipe Handler | Present casing above TDA 202: Run skate 133 until casing positioned above the TDA 202 elevator (e.g., gripper 169). | Visual | Ramp 149 in pick-up position. 202 TDA in receive position. | Skate 133 will move forward a defined distance depending on casing size. | CW 131 position. |
| 5. | Pipe Handler | Latch TDA 202: Hoist TDA 202 to latch onto casing. Close TDA 202. | Visual | Casing is positioned correctly above TDA 202 elevator, | Tubular interlock will prevent hoisting without closed elevator (above certain height). | TDA 202 to Closed state. |
| 6. | Pipe Handler | Lift casing to vertical position above MOH 204: Verify TDA 202 is closed. Hoist TDA 202 to pick-up casing single from CW 131. Move LSA 228 to preset position to prepare for guiding. Before casing lower end leaves CW 131, close LSA 228 funnel. Continue hoisting TDA 202 until the casing is above MOH 204. | Visual | TDA 202 closed. Verify LSA 228 is positioned to receive casing bottom before hoisting. TDA 202 above LSA 228 operating area. | Hoisting will stop prior to lifting casing out of CW 131 without guiding. LSA 228 centralizer close when casing is close to vertical. TDA 202 and LSA 228 will position casing above MOH 204/ITC 236. | LSA 228 guide to Closed state. LSA 228 centralizer to Closed state. Show TDA 202/ LSA 228 in MOH 204 position. |
| 6.1. | Pipe Handler | CW 131 retract to loading position: Verify casing pin end is clear of ramp149. Move CW 131 toward FT loading position. | Visual/ CCTV | | Skate 133 will move to loading position. Ramp 149 will tilt to loading position. | Animate position. |
| 6.2. | Pipe Handler | CW 131 load and present next casing single: Pick up next casing single per steps 1 and 2. | Visual/ CCTV | | See steps 1 and 2. | |
| 7. | Pipe Handler | Stab/position first casing in MOH 204/ ITC 236: Verify TDA 202/LSA 228 are above MOH 204. Lower casing single into ITC 236/LSA 228. Extend ITC 236 when pin end below guide. | Visual | Casing bottom clear of CW 131. LSA 228 close when casing close to vertical. LTC 244 open above MOH 204. | TDA 202 is rotated when casing single is lowered into MOH 204 with elevator opening facing Pipe Handler Operator 195 (permits open and retract outside WC 203 area). | Indicate LSA 228, ITC 236, and LTC 244 guide/grip states. Indicate LSA 228, ITC 236, and LTC 244 positions. |

TABLE 13C-continued

Casing Stand Building Operation

| | Operator 195 | Operation | Line of Sight | Equipment precondition | Equipment Functionality | HMI |
|---|---|---|---|---|---|---|
| | | Close ITC 236 guide. Open and retract LSA 228. Close LTC 244 guide when pin end above MOH 204. Continue lowering casing inside MOH 204. Stop with stick-up of about one meter. | | | | |
| 8. | Pipe Handler | Close ITC 236 clamp on casing: Verify correct stick-up. Close ITC 236 guide and clamps. Open and retract LTC 244. | Visual/ CCTV | | | ITC 236 and LTC 244 to Closed state. |
| 9. | Pipe Handler | Transfer weight to ITC 236 and open TDA 202: Lower TDA 202 to transfer casing weight to ITC 236. Open TDA 202 and retract from stick-up. Move TDA 202 to CW 131 pick-up position. | Visual/ CCTV | ITC 236 closed. Weight transferred. | Verify weight transferred prior to opening TDA 202. | TDA 202 load indicator. TDA to Open state. |
| 10. | Pipe Handler | Present second casing single above TDA 202 elevator: Verify TDA 202 elevator open and below tubular pick-up position. Run skate 133 until casing is positioned above TDA 202 elevator. | Visual | Ramp 149 in tubular pick-up position. TDA 202 in tubular pickup position. | Skate 133 will move forward a defined distance depending on casing size (see step 4). | |
| 11. | Pipe Handler | Latch TDA 202 on second casing single: Hoist TDA 202 to latch onto second casing single. Close TDA 202. | Visual | Second casing single is positioned correctly above TDA 202 elevator. | Tubular interlock will prevent hoisting without TDA 202 elevator closed (above certain height). | TDA 202 to Closed state. |
| 12. | Pipe Handler | Lift casing to vertical position above MOH 204: Verify TDA 202 is closed. Hoist TDA 202 to pick up casing single from CW 131. Move LSA 228 to preset position to prepare for guiding. Before casing single lower end leaves CW 131, close LSA 228 funnel. Continue hoisting TDA 202 until casing single is above MOH 204. | Visual | TDA 202 closed. Verify LSA 228 is positioned to receive casing bottom before hoisting. TDA 202 above LSA 228 operating area. | Hoisting will stop prior to lifting casing single out of CW 131 without guiding. LSA 228 centralizer close when casing single is close to vertical. TDA 202 and LSA 228 will position casing single tubular above MOH 204/ITC 236. | Indicate LSA 228 guide position. Indicate TDA 202/LSA 228 in MOH 204 position. |
| 13. | Pipe Handler | CW 131 retract to loading position: Verify casing pin end is clear of ramp 149. Move CW 131 toward FT loading position. | Visual/ CCTV | | CWM 131 pipe feeder will move to loading position. Ramp 149 will tilt to loading position. | Indicate positions. |

TABLE 13C-continued

Casing Stand Building Operation

| | Operator 195 | Operation | Line of Sight | Equipment precondition | Equipment Functionality | HMI |
|---|---|---|---|---|---|---|
| 14. | Pipe Handler | CW 131 load and present third casing single (if applicable): Pick up next casing single per steps 1 and 2. | Visual/ CCTV | | See steps 1 and 2. | |
| 15. | Pipe Handler | Move THA/CTO to MOH 204: Verify that casing is located above MOH 204 and LSA 228 above CTO working area. Start CTO sequence to move THT to MOH 204. | | CTO open. WC 203 selected. LSA 228 in WC 203. | CTO will move to MOH 204. Elevate to stick-up. ZMS will stop CTO if TD 116 or LSA 228 is too low. | THA/CTO in MOH 204. |
| 16. | Pipe Handler | Close CTO BUT: Adjust/verify correct CTO elevation, Continue CTO sequence. | Visual/ CCTV | CTO in MOH 204. | CTO BUT will close. CTO stabbing guide will close. | CTO BUT to Closed state. CTO SG to Closed state. |
| 17. | Pipe Handler | Close MUST for soft stabbing (optional): Adjust CTO elevation and TDA 202 elevation if required. Continue CTO sequence. | Visual/ CCTV | CTO in WC 203. | MUST will close. MUST will take some load if closed prior to stabbing casing (soft stab). | MUST to Closed state. |
| 18. | Driller | Stab casing: Lower TDA 202 to stab casing (soft stab). Open CTO stabbing guide (e.g., for better view). | Visual/ CCTV | CTO in WC 203 with stabbing guide closed. | Weight transferred to MUST per casing data input. | CTO SG to Open state. TDA 202 weight indicator. |
| 19. | Pipe Handler | Open and retract LSA 228: Open and retract LSA 228 when casing has entered stabbing guide. | Visual/ CCTV | CTO stabbing guide closed. | | LSA 228 to Open status. |
| 20. | Pipe Handler | CTO spin-in and MU: Verify casing is stabbed in box. Continue CTO sequence. Accept or reject MU. | Visual/ CCTV | Casing stabbed in stick-up. TDA 202 unloaded, elevator below TJ to permit spinning. | CTO will spin-in and MU automatically per casing data settings. If Accept: Open spinner, guide, and clamps. Return to park position. If not accepted: Evaluate break-out, spin-out, and new attempt. | Casing connected state. |
| 21. | Pipe Handler | Lower casing double into MOH 204 (if applicable): Verify connection is made-up. Hoist TDA 202 to pick up weight. Open ITC 236 guide and clamps. Lower casing double to correct stick-up. Stop at selected stick-up (e.g., about one meter). Close ITC 236 guide and clamps. Lower TDA 202 to transfer weight to ITC 236. Open TDA 202 and retract from stick-up. | Visual/ CCTV | CTO has completed MU sequence with accepted MU. | | TDA 202/LSA 228 close/open status. TDA 202 load. LTC 244/ITC 236 status. |

TABLE 13C-continued

| Casing Stand Building Operation | | | | | | |
|---|---|---|---|---|---|---|
| | Operator 195 | Operation | Line of Sight | Equipment precondition | Equipment Functionality | HMI |
| 22. | Pipe Handler | Repeat steps 10-20 for third single (if applicable). | | | | |
| 23. | Pipe Handler | Move casing stand to THP 207:<br>LTC 244 extends to casing stand in MOH 204 position and close guide.<br>Hoist TDA 202 to pick up weight.<br>Open ITC 236 guide and clamps.<br>Retract ITC 236 head.<br>TDA 202 will lift casing stand from MOH 204 and stop with pin end above THP doper 209.<br>TDA 202 and LTC 244 move casing stand to above THP 207.<br>UTC 242 extends to casing stand and closes.<br>TDA 202 opens and retracts from casing stand. | Visual/ CCTV | RN 151 has completed MU sequence with correct torque.<br>Complete casing stand in MOH 204. | | Weight transfer. |
| 24. | Pipe Handler | Set back casing stand:<br>TBR 254 and SGA 262 move to THP 207 and close guide and clamps on casing stand.<br>UTC 242 and LTC 244 open and retract.<br>TBR 254 and SGA 262 set back casing stand to selected position in FIB 166. | Visual/ CCTV | UTC 242 and LTC 244 closed on casing stand in THP 207.<br>TDA 202 retracted from casing stand in THP 207. | | TBR 254/SGA 262 status.<br>TBR 254 load. |
| 25. | Pipe Handler | TBR 254 and SGA 262 move to THP 207:<br>Open TBR 254 and SGA 262 in FIB 166.<br>Move toward THP 207/next casing stand.<br>Continue step 1. | | UTC 242/LTC 244 closed on casing stand. | TBR 254 clamp and guide and SGA 262 guide will open.<br>TBR 254 will hoist before it retracts out of FIB 166. | TBR 254 clamp and guide and SGA 262 guide to Open state. |

For tripping-in casing stands without the CRT, an operator 195 on the rig floor 114 may verify that various pieces of equipment are properly shut down and locked out, and then perhaps perform other preparations such as the examples set forth below in Table 14A.

TABLE 14A

| Preparations for Tripping-In Casing Stands Without CRT | | |
|---|---|---|
| Equipment | Responsible | Verifications |
| FIB 166<br>Setback 164 | Operator 195 on rig floor 114. | Casing stands (111) exist in FIB 166 slots per HMI/tally.<br>Fingers are closed.<br>Travel path is unobstructed. |
| TBR 254<br>SGA 262 | Operator 195 on rig floor 114. | Travel path is unobstructed.<br>Gripper inserts/dies are clean, not worn. |
| LTC 244<br>ITC 236<br>UTC 242 | Operator 195 on rig floor 114. | Travel path is unobstructed.<br>Gripper inserts/dies are clean, not worn. |

TABLE 14A-continued

| Preparations for Tripping-In Casing Stands Without CRT | | |
|---|---|---|
| Equipment | Responsible | Verifications |
| LSA 228 | Operator 195 on rig floor 114. | Travel path is unobstructed. |
| TDA 202 | Operator 195 on rig floor 114. | Travel path is unobstructed. Correct inserts in TDA 202 elevator/grippers. |
| CTO THA-CTO (primary) THT-CTO (backup) | Operator 195 on rig floor 114. | CTO is rigged up in THA (or THT). Correct adaptors and stabbing guide funnel is installed. Dies are correct, clean, and not worn. Travel path is unobstructed. |
| Slips 161 | Operator 195 on rig floor 114; and/or "Driller" 195 at workstation 452. | Correct inserts/dies. Inserts/dies are clean, not worn. |
| TD 116 | Operator 195 on rig floor; and/or "Driller" 195 at workstation 452. | Correct inserts/dies in elevator 129. Correct saver sub status. Travel path is unobstructed. |
| DW 119 | Operator 195 on rig floor; and/or "Driller" 195 at workstation 452. | Checked. |

The well construction system 100, 200 can then be set-up for the non-CRT casing stand trip-in sequence. Examples of such set-up may be as set forth below in Table 14B.

TABLE 14B

| Set-Up for Tripping-In Casing Stands Without CRT | | | |
|---|---|---|---|
| Equipment | Responsible | Set-Up | HMI |
| Pipe handling: TBR 254, SGA 262, UTC 242, LTC 244, THP 207, TDA 202, LSA 228, THA-CTO | Pipe Handler | Verify operator 195 on rig floor 114 completed pre-checks and deactivated emergency stop for all pipe handling equipment.<br>Open Construction Program screen on touchscreen 522, 524.<br>Select Trip In Casing mode.<br>Select setup wizard to open pop-up on front screen 532, 534, 536. Verify settings:<br>Select casing type and verify casing data (size, weight, MU loss, torque settings, etc.).<br>Select CTO to use.<br>Stick-up target.<br>Select "activate all machines" to startup and prepare all machines. | Verify Setback screen.<br>Construction Program setup wizard.<br>After startup: Check for green light in Construction Program status header on front screen 532, 534, 536. |
| TD 116, DW 119, MP 144, Trip tank | Driller | Verify operator 195 on rig floor 114 completed pre-checks and deactivated emergency stop for all pipe handling equipment.<br>Open Construction Program screen on touchscreen 522, 524.<br>Select Trip In Casing mode.<br>Select setup wizard to open pop-up on front screen 532, 534, 536. Verify settings:<br>Stick-up target.<br>Set DW 119 upper/lower stops.<br>Set maximum lowering speed.<br>Set minimum slack off weight.<br>Trip tank 1/2/auto.<br>Trip tank low/high levels.<br>Active tanks selected and lined up.<br>Set alarm limits for gain/loss.<br>Select MP 144 for filling casing.<br>MP 144 liner size setting and pump efficiency.<br>Set number of strokes for filling casing stand (selected MP 144 will stop after set number of strokes).<br>Select "activate all machines" to startup and prepare all machines. | Verify Setback screen.<br>Construction Program setup wizard.<br>After startup: Check for green light in Construction Program status header on front screen 532, 534, 536. |

TABLE 14B-continued

Set-Up for Tripping-In Casing Stands Without CRT

| Equipment | Responsible | Set-Up | HMI |
|---|---|---|---|
| TD 116 | Driller | Verify operator 195 on rig floor 114 completed pre-checks.<br>Activate TD 116 from touchscreen 522, 524.<br>Select Operation screen on touchscreen 522, 524. | Verify operator screen, system status/alarms. |
| DW 119 | Driller | Activate DW 119 from touchscreen 522, 524. | Verify operator screen, system status/alarms. |
| All machines | Driller | Verify all relevant machines are enabled in zone management system and tubular interlock system. | Verify operator screen, system status/alarms. |

After such preparations and set-up, the operator 195 may vacate the rig floor 114, and the equipment may be configured to be ready for remote control (e.g., by deactivating emergency stops). The sequence for non-CRT tripping-in casing stands may start with the top drive 116 in lower position at WC 203, with the slips 161 closed around a casing stick-up of about one meter. Another casing stand 111 may be in the TDA 202/LSA 228, lifted from THP 207 to stick-up level above the MOH 204, with the TDA 202 elevator facing the top drive 116. The THP 207, UTC 242, and LTC 244 may be open and retracted. The TBR 254 and SGA 262 may be empty (e.g., on the way to pick up a new casing stand from the FIB 166). Example steps of the non-CRT tripping-in casing stand sequence may be as set forth below in Table 14C.

TABLE 14C

Tripping-In Casing Stands Withou CRT Operation

| | Operator 195 | Operation | Line of Sight | Equipment precondition | Equipment Functionality | HMI |
|---|---|---|---|---|---|---|
| 1. | Driller | Open TD 116 elevator 129:<br>Verify slips 161 are closed.<br>Open elevator 129. | Visual/ CCTV | Slips 161 must be closed before opening elevator 129. | Elevator 129 Open is not selectable if slips 161 are not closed, | TD 116 elevator 129 to Open state. |
| 1.1. | Pipe Handler | TBR 254 and SGA 262 pick up new casing stand:<br>Move TBR 254 and SGA 262 to selected finger/slot in FIB 166.<br>Close TBR 254 and SGA 262 guides and clamp on stand. | Visual/ CCTV | TBR 254 and SGA 262 grip/guide open.<br>Selected FIB 166 position "valid." | TBR 254 will move into FIB 166 elevated above open latches.<br>Adjustments available.<br>TBR 254 and SGA 262 grip/guide will Close. | TBR 254 and SGA 262 grip/ guide to Closed state. |
| 2. | Driller | Retract and move TD 116 to latching height:<br>Verify elevator 129 is open.<br>Retract TD 116 to clear TJ.<br>Hoist TD 116 elevator 129 to stand latch height (upper stop or calculated stop point). | Visual/ CCTV | TD 116 pipe handler position facing TDA 202. | | DW 119 Upper Stop setting. |
| 2.1. | Pipe Handler | TDA 202 move stand to WC 203:<br>Continue lifting TDA 202 and extend to WC 203 (above stick-up).<br>LSA 228 guide to WC 203 when pin end above rig floor. | Visual/ CCTV | TD 116 retracted. | Tilt towards WC 203.<br>TDA 202 dope top box if preselected (automatic). | TDA 202 Load indication. |
| 2.2. | Pipe Handler | Move THA/CTO to WC 203:<br>Verify stand is located in WC 203 and LSA 228 is above CTO working area.<br>Start CTO sequence to move THT to WC 203. | | CTO open.<br>WC 203 selected.<br>LSA 228 in WC 203. | CTO will move to WC 203.<br>Elevate to stick-up.<br>ZMS will prevent CTO start if TD 116 or LSA 228 is too low. | THA/CTO in WC 203. |

TABLE 14C-continued

Tripping-In Casing Stands Withou CRT Operation

| | Operator 195 | Operation | Line of Sight | Equipment precondition | Equipment Functionality | HMI |
|---|---|---|---|---|---|---|
| | | Optional: Move THT/ CTO to WC 203 when TD 116 is above THA, if selected. | | | | |
| 2.3. | Pipe Handler | Close CTO BUT: Adjust/verify correct CTO elevation. Continue CTO sequence. | Visual/ CCTV | CTO in WC 203. | Close CTO BUT. Close stabbing guide. | CTO BUT to Closed state. CTO SG to Closed state. |
| 2.4. | Pipe Handler | Close MUST for soft stabbing (optional): Adjust CTO elevation and TD 116 elevation if required. Continue CTO sequence. | Visual/ CCTV | CTO in WC 203. | Close MUST. MUST will take some load if closed prior to stabbing the casing. | MUST to Closed state. |
| 2.5. | Driller | Stab casing: Lower TD 116 to stab casing (soft stab). Open CTO stabbing guide. | Visual/ CCTV | TD 116 link tilt float. CTO in WC 203 with stabbing guide closed. | Weight transferred to MUST per casing data input. | CTO SG to Open state. |
| 2.6. | Pipe Handler | Open and retract LSA 228: Open and retract LSA 228 when casing has entered stabbing guide. | Visual/ CCTV | CTO stabbing guide closed. | | LSA 228 Open status. |
| 2.7. | Pipe Handler | CTO spin-in and MU: Verify casing is stabbed the box. Continue CTO sequence. Accept or reject MU. | Visual/ CCTV | Stand stabbed in stick-up (TD 116 unloaded, elevator 129 below TJ to permit spinning). | CTO will spin-in and MU automatically per casing data settings. If Accept: Open spinner, guide, and clamps, then return to park position. | Casing Connected state. |
| 2.8. | Pipe Handler | TBR 254 and SGA 262 move stand to THP 207: Open FIB 166 latches for selected row. Verify latches open (visual/CCTV). TBR 254 lift stand and move out of FIB 166 to THP 207. FIB 166 latches will close as stand moves out of FIB 166. Set down stand on THP 207. | Visual/ CCTV | THP 207 empty. UTC 242/LTC 244 open. Correct pipe detected in TBR 254 and SGA 262. | TBR 254 cannot open with weight. TBR 254 grip open when unloaded, FIB 166 latches will not open with TBR 254 head in low position. | Indicate open latches. TBR 254 load indication, unload. |
| 2.9. | Pipe Handler | UTC 242 and LTC 244 extend to THP 207 and close: UTC 242 and LTC 244 extend to THP 207. UTC 242 and LTC 244 close. | Visual/ CCTV | TBR 254 and SGA 262 with stand in THP 207. | UTC 242 and LTC 244 extend and close. | UTC 242 and LTC 244 to Closed state. |
| 2.10. | Pipe Handler | TBR 254 and SGA 262 open and move toward FIB 166: Open TBR 254 clamps and guide and SGA 262 guide. Move toward FIB 166/ next stand. Continue step 1.1 | | UTC 242/LTC 244 closed on stand. | | TBR 254 and SGA 262 to Open state. |
| 3. | Driller | Extend TD 116 and latch elevator 129: Extend TD 116 to WC 203. Latch elevator 129 (automatic close on impact). | Visual/ CCTV | TDA 202 below TJ. | | Elevator 129 Closed state. Indicate TD 116 in WC 203. |

TABLE 14C-continued

Tripping-In Casing Stands Withou CRT Operation

| | Operator 195 | Operation | Line of Sight | Equipment precondition | Equipment Functionality | HMI |
|---|---|---|---|---|---|---|
| 3.1. | Pipe Handler | TDA 202 open and move to THP 207: Verify TD 116 elevator 129 is closed. Open elevator 129. Retract to vertical link. Rotate and lower to stand in THP 207. | Visual/ CCTV | Elevator 129 closed. | TDA 202 will retract from WC 203, rotate, and lower until elevator (e.g., gripper 169) faces toward THP 207. | TDA 202 elevator Open state. TDA 202 position animation. |
| 4. | Driller | Open slips 161: Open slips 161 (command). Hoist to take weight and open slips 161. | Visual | TD 116 elevator 129 must be closed. CTO has completed MU sequence with accepted connection. | | Slips 161 to Open state. DW 119 load. |
| 5. | Driller | Lower casing string in wellbore 102: Verify slips 161 are open before lowering casing string. Open IBOP and start MP 144 to fill casing, if selected. (Extend filling tool, if installed). | Visual | Slips 161 open. | MP 144 will stop after set number of strokes, if selected. | Settings: DW 119 lowering speed and minimum slack-off weight. IBOP open. MP 144 running. |
| 5.1. | Pipe Handler | TDA 202 and LSA 228 extend to stand in THP 207: Tilt out/extend TDA 202 elevator until contact with stand in THP 207 below TJ. | Visual/ CCTV | TDA 202 elevator must be open. LSA 228 guide funnel must be open. | TDA 202 tilt out/ extend elevator until contact with stand in THP 207. | |
| 5.2. | Pipe Handler | TDA 202 and LSA 228 latch onto stand in THP 207: Close TDA 202 elevator. Close LSA 228 guide funnel. | Visual/ CCTV | TDA 202 elevator must be in THP 207 position. | | TDA 202 elevator to Closed state. LSA 228 guide to Closed state. |
| 5.3. | Pipe Handler | UTC 242 and LTC 244 open and retract. | Visual/ CCTV | TDA 202 elevator must be closed. | UTC 242 and LTC 244 open and retract. | UTC 242 and LTC 244 to Open state. UTC 242 and LTC 244 position animation. |
| 5.4. | Pipe Handler | TDA 202 move stand to rig floor: TDA 202 lift stand guided by the LSA 228 (e.g., about nine meters) to rig floor 114 standby position. Continue step 2.2 | Visual/ CCTV | UTC 242 or LTC 244 open. | TDA 202 hoist, tilt to vertical, rotate 180 degrees to face TD 116. TDA 202 dope top box if preselected (automatic). | TDA 202 Load indication. TDA 202 position animation. |
| 6. | Driller | Set slips 161: Set slips 161 at correct stick-up height. Set off weight. | Visual | Stick-up at correct height. | | Slips 116 to Closed state. DW 119 load indicator. Tally update. |
| 7. | Driller | Check trip tank or active volume, gain/loss: Trip tank or active gain/loss. Repeat all steps for next stand. | Visual | Slips 161 closed. | Trip tank gain/loss is determined and displayed. | Trip Sheet/ Volume control. |

Different combinations of the aspects described above may also be utilized for running large-diameter casing (LDC) from the CW 131 with the top drive 116 and CRT. For example, LDC may have an outer diameter of about 13.375 inches (about 34 centimeters) or larger. Preparations for such operation may include the examples set forth below in Table 15A.

TABLE 15A

Preparations for Running LDC from CW with TD and CRT

| Equipment | Responsible | Verifications |
|---|---|---|
| CW 131 | Operator 195 on rig floor 114. | Travel path is unobstructed.<br>Casings are laid out correct with aft end in line with skate 133 for correct loading.<br>Prepare to pick up casing. |
| CTO: THT + CBU | Operator 195 on rig floor 114. | Casing backup tong (CBU) is rigged up in THT.<br>CBU adjusted for casing size.<br>Dies are correct, clean, and not worn.<br>Travel path is unobstructed. |
| LSA 228 | Operator 195 on rig floor 114. | Travel path is unobstructed. |
| Slips 161 Rotary Table | Operator 195 on rig floor 114. | Correct inserts in slips 161.<br>Dies are clean and not worn.<br>Rotary table rotation lock activated. |
| TD 116 | Operator 195 on rig floor 114. | Correct pick-up elevator 129.<br>Check elevator link extension chains.<br>Operator screen, system status.<br>Travel path is unobstructed.<br>CRT installed and tested. |
| DW 119 | Operator 195 on rig floor 114. | Checked. |
| Tubulars 111 | Operator 195 on rig floor 114. | Tubulars 111 to be laid out on CW 131.<br>Tubulars 111 to be cleaned and doped, protectors removed (other implementations may be used for casing with protectors).<br>Casings measured, marked, and tally updated. |

The well construction system 100, 200 can then be set-up for the operation. Examples of such set-up may be as set forth below in Table 8B.

TABLE 15B

Set-Up for Running LDC from CW with TD and CRT

| Equipment | Responsible | Set-Up | HMI |
|---|---|---|---|
| Pipe handling: LSA 228, CBU, CW 131 | Pipe Handler | Verify operator 195 on rig floor 114 completed pre-checks and deactivated emergency stop for all pipe handling equipment.<br>Open Construction Program screen on touchscreen 522, 524.<br>Select Running 13 3/8" Casing from CW with TD and CRT mode.<br>Select setup wizard to open pop-up on front screen 532, 534, 536. Verify settings:<br>Select casing size.<br>Select CBU to use.<br>Stick-up target.<br>Select "activate all machines" to startup and prepare all machines. | Verify Setback screen.<br>Construction Program setup wizard.<br>After startup: Check for green light in Construction Program status header on front screen 532, 534, 536. |
| TD 116, DW 119, MP 144 | Driller | Verify operator 195 on rig floor 114 completed pre-checks and deactivated emergency stop for all pipe handling equipment.<br>Open Construction Program screen on touchscreen 522, 524.<br>Select Running 13 3/8" Casing from CW with TD and CRT mode.<br>Select setup wizard to open pop-up on front screen 532, 534, 536. Verify settings:<br>Stick-up target.<br>Set TD elevator link length.<br>Set DW 119 upper/lower stops.<br>Set maximum lowering speed. | Verify Setback screen.<br>Construction Program setup wizard.<br>After startup: Check for green light in Construction Program status header on front screen 532, 534, 536. |

TABLE 15B-continued

| Set-Up for Running LDC from CW with TD and CRT | | | |
|---|---|---|---|
| Equipment | Responsible | Set-Up | HMI |
| | | Set minimum slack off weight.<br>Trip tank 1/2/auto.<br>Trip tank low/high levels.<br>Verify active tanks are selected and lined up.<br>Select MP 144 (to fill casing, optional).<br>Verify MP 144 pressure limit setting.<br>Assign pumps to master slider.<br>Set number of strokes and SPM to fill casing (optional).<br>Set ramp-up parameters.<br>Verify correct elevator setting (manual/remote).<br>Select "activate all machines" to startup and prepare all machines. | |
| TD 116 | Driller | Verify operator 195 on rig floor 114 completed pre-checks.<br>Activate TD 116 from touchscreen 522, 524.<br>Verify correct elevator 129 setting (manual/remote).<br>Select Operation screen on touchscreen 522, 524. | Verify operator screen, system status/alarms. |
| DW 119 | Driller | Activate DW 119 from touchscreen 522, 524.<br>Set maximum lowering speed.<br>Set minimum slack off weight. | Verify operator screen, system status/alarms. |
| Slips 161, Rotary table | Driller | Verify correct setting for slips 161 (manual/remote). | Verify operator screen, system status/alarms. |
| All machines | Driller | Verify all relevant machines are enabled in zone management system and tubular interlock system. | |
| Tubulars 111 | Pipe Handler | All tubulars 111 are registered. | |

After such preparations and set-up, the operator 195 may vacate the rig floor 114, and the equipment may be configured to be ready for remote control (e.g., by deactivating emergency stops). An example of this sequence may start with a casing stick-up (e.g., about 1.5 meters) at WC 203, with the slips 161 closed and the CRT engaged. Casing may be laid out on the CW 131 casing side (e.g., Driller's side), having been cleaned, doped, and tallied, and with protectors removed. The catwalk ramp 149 may be loaded with casing. The TDA 202 may be parked outside the collision area (e.g., top of the mast), and the LSA 228 may be ready. Example steps of the sequence may be as set forth below in Table 15C.

TABLE 15C

| Sequence for Running LDC from CW with TD and CRT | | | | | | |
|---|---|---|---|---|---|---|
| | Operator 195 | Operation | Line of Sight | Equipment precondition | Equipment Functionality | HMI |
| 1. | Driller | Release CRT from stick-up:<br>Verify slips 161 are closed and links/ elevator tilted towards CW 131.<br>Release CRT from stick-up.<br>Hoist TD 116 to CW 131 pick-up position (above casing). | Visual/ CCTV | Slips 161 must be closed before releasing CRT. | | CRT to Disconnect state. |
| 1.1. | Pipe Handler | Push casing to rig floor 114 pick-up position:<br>Verify TD elevator 129 is above CW 131 pick-up position.<br>Activate CW 131 sequence to move casing to CW 131 pick-up position. | Visual/ CCTV | | Skate 133 will move forward a set distance. | CW 131 to CW 131 pick-up position. |

TABLE 15C-continued

Sequence for Running LDC from CW with TD and CRT

| | Operator 195 | Operation | Line of Sight | Equipment precondition | Equipment Functionality | HMI |
|---|---|---|---|---|---|---|
| 2. | Driller | Latch pick-up elevator 129: Extend links above casing. Lower TD 116 to latch elevator 129. Engage safety pin (manual). | Visual | CW 131 in pick-up position. | | |
| 3. | Driller | TD 116 hoist casing from CW 131: Hoist TD 116 to pick up casing from CW 131. Activate link tilt float or move elevator 129 to vertical position. | Visual | TD elevator 129 closed, Link tilt float: Elevator 129 in WC 203 above RN 151 working area. | Hoisting will stop prior to lifting casing out of CW 131 without guiding. | |
| 3.1. | Pipe Handler | LSA 228 extend to guide casing above CW 131: Move LSA 228 to preset position to receive casing above CW 131. Before casing lower end leaves CW 131, close LSA 228 funnel. | Visual/ CCTV | TD 116 above LSA 228 operating area. | | LSA 228 funnel to Closed state. |
| 3.2. | Pipe Handler | Move THT/CBU to WC 203: Verify TD 116 hoisted above CBU working area. Start CBU sequence to move THT/CBU to WC 203. | | CBU open. | CBU will move to WC 203. Elevate to stick up. ZMS will prevent CBU start if TD 116 is too low. | CBU in WC 203. |
| 3.3. | Pipe Handler | LSA 228 tail in casing to WC 203: TD continues hoisting. LSA 228 tail in casing towards WC 203 when pin end is above stick-up. LSA 228 centralizer will close when casing is close to WC 203. | Visual | Casing bottom clear of CW 131 and elevated above stick-up. LSA 228 funnel close. | | LSA 228 centralizer to Closed state. |
| 3.4. | Pipe Handler | Guide casing single with CBU in WC 203: Verify casing single located in WC 203. Continue CBU sequence. | Visual/ CCTV | CBU in WC 203. LSA 228 in WC 203. | Close CBU BUT. Close stabbing guide. | CBU BUT to Closed state. CBU guide to Closed state. |
| 3.5. | Pipe Handler | Stab casing: Lower TD 116 to stab casing in stick-up. Continue lowering to stab CRT. | Visual/ CCTV | TD 116 in WC 203. CBU in WC 203 with stabbing guide closed. | | |
| 3.6. | Pipe Handler | Open and retract LSA 228: Open and retract LSA 228 when casing has entered stabbing guide. | Visual/ CCTV | CTO stabbing guide closed. | | LSA 228 Open status. |
| 3.7. | Pipe Handler | CW 131 retract to loading position: Verify casing pin end is clear of ramp 149. Move CW 131 toward FT loading position. | Visual/ CCTV | | Skate 133 will move to loading position. Ramp 149 will tilt to loading position. | CW 131 animation. |
| 4. | Driller | Stab CRT, spin-in, and MU: Verify casing is stabbed and elevator is unloaded (elevator sliding down). | Visual/ CCTV | Casing single stabbed in stick-up (TD elevator 129 below TJ to permit spinning). CBU slips back up. | TD 116/CRT will automatically spin-in and MU. | CBU closed for backup. Casing Connected state. CRT Engaged state. |

TABLE 15C-continued

Sequence for Running LDC from CW with TD and CRT

| | Operator 195 | Operation | Line of Sight | Equipment precondition | Equipment Functionality | HMI |
|---|---|---|---|---|---|---|
| | | Verify CBU closed for backup. (Optional: or slips 161 closed for backup). Stab and engage (lock) CRT. Spin-in and MU casing connection. | | | | |
| 4.1. | Pipe Handler | Open CBU and move to parked position: Verify casing has been made-up. Continue CBU backup sequence. | | Casing connected. CRT connected. | Open CBU BUT and move THT to parked position. | CBU open. CBU parked. |
| 5. | Driller | Open slips 161: Open slips 161 (command). Hoist to take up weight and open slips 161. | Visual | TD 116/CRT has completed MU sequence with correct torque (CRT connected). | | Slips 161 to Open state. DW 119 load. |
| 6. | Driller | Run-in-Hole: Verify slips 161 are open before lowering casing string into wellbore 102. Optional: Fill casing, if selected. Open IBOP. Start MP 144 (casing fill mode). Close IBOP. | Visual | Slips 161 open. Optional: MP 144 ready. | Optional: The selected MP 144 will pump a set number of strokes at set rate with selected MP 144 and stop. | MP 144 SPM, total strokes, and pressure. |
| 6.1. | Pipe Handler | Load next casing onto ramp 149: Use loading fingers to load another casing into ramp 149. | Visual/ CCTV | Casing ready in loading position. CW 131 in loading position. | | |
| 7. | Driller | Open pick-up elevator and tilt out: When elevator is close to rig floor 114, an operator 195 removes safety pin and opens elevator. When the operator is out of the area, tilt links out and continue lowering. | Visual | | | |
| 7.1. | Pipe Handler | Run ramp 149 to rig floor: Verify casing is loaded in ramp 149. Move ramp 149 toward pipe pick-up position. | Visual/ CCTV | Casing loaded onto ramp 149. | Ramp 149 will tilt to rig floor 114 tubular position. Skate 133 will move toward rig floor 114. Skate 133 will stop with casing box inside ramp 149. | CW 131 animated. |
| 8. | Driller | Set slips161: Set slips 161 at correct stick-up height. Set off weight. | Visual | Stick-up at correct height. | | Slips 161 to Closed state. DW 119 load indicator. |
| 9. | Driller | Check gain/loss: Check trip tank gain/ loss or active gain/loss depending on selected operation. | Visual | | Trip tank or active tank gain/loss is determined and displayed. | Volume control. |
| 10. | | Repeat sequence for next casing. | | | | |

For tripping-out drill collar stands, an operator 195 on the rig floor 114 may verify that various pieces of equipment are properly shut down and locked out, and then perhaps perform other preparations such as the examples set forth above in Table 11A. The well construction system 100, 200 can then be set-up for the drill collar stand trip-out sequence. Examples of such set-up may be as set forth below in Table 16A.

TABLE 16A

| Set-Up for Tripping-Out Drill Collar Stands | | | |
|---|---|---|---|
| Equipment | Responsible | Set-Up | HMI |
| Pipe handling: TBR 254, SGA 262, UTC 242, LTC 244, THP 207, LSA 228, RN 151 | Driller/ Pipe Handler | Verify operator 195 on rig floor 114 completed pre-checks and deactivated emergency stop for all pipe handling equipment.<br>Open Construction Program screen on touchscreen 522, 524.<br>Select Tripping mode.<br>Select setup wizard to open pop-up on front screen 532, 534, 536. Verify settings:<br>Select slot, direction for setting back drill collar stands.<br>Select pipe type.<br>Select RN 151 to use.<br>RN 151 MU torque.<br>Select pin/box doping.<br>Stick-up target.<br>Select "activate all machines" to startup and prepare all machines. | Verify Setback screen.<br>Construction Program setup wizard.<br>After startup: Check for green light in Construction Program status header on front screen 532, 534, 536. |
| TD 116, DW 119, MP 144, Trip tank | Driller | Verify operator 195 on rig floor 114 completed pre-checks and deactivated emergency stop for all pipe handling equipment.<br>Open Construction Program screen on touchscreen 522, 524.<br>Select Tripping DC mode.<br>Select setup wizard to open pop-up on front screen 532, 534, 536. Verify settings:<br>Stick-up target.<br>Set DW 119 upper/lower stops.<br>Set maximum lowering speed.<br>Set minimum slack off weight.<br>Trip tank 1/2/auto.<br>Trip tank low/high levels.<br>Select "activate all machines" to startup and prepare all machines. | Verify Setback screen.<br>Construction Program setup wizard.<br>After startup: Check for green light in Construction Program status header on front screen 532, 534, 536. |
| TD 116 | Driller | Verify operator 195 on rig floor 114 completed pre-checks.<br>Activate TD 116 from touchscreen 522, 524.<br>Select Operation screen on touchscreen 522, 524. | Verify operator screen, system status/alarms. |
| DW 119 | Driller | Activate DW 119 from touchscreen 522, 524. | Verify operator screen, system status/alarms. |
| All machines | Driller | Verify all relevant machines are enabled in zone management system and tubular interlock system. | Verify operator screen, system status/alarms. |

After such preparations and set-up, the operator 195 may vacate the rig floor 114, and the equipment may be configured to be ready for remote control (e.g., by deactivating emergency stops). The sequence for tripping-out drill collar stands may start with a drill collar stand 111 stick-up at WC 203, with the top drive 116 elevator 129 closed on the stick-up and the slips 161 closed. The UTC 242 and LTC 244 may be closed on another drill collar stand 111 in the THP 207, with washing and doping of the pin already completed. The TDA 202 may be parked outside the collision area, and the LSA 228, TBR 254, and SGA 262 may each be empty. Example steps of the drill collar stand tripping-out sequence may be as set forth below in Table 16B.

TABLE 16B

| Tripping-Out Drill Collar Stands Operation | | | | | | |
|---|---|---|---|---|---|---|
| | Operator 195 | Operation | Line of Sight | Equipment precondition | Equipment Functionality | HMI |
| 1. | Driller | Open slips 161 and hoist drill string 120:<br>Verify TD elevator 129 is closed under TJ.<br>Open slips 161.<br>Hoist to take weight and verify slips 161 open. | Visual/ CCTV | Elevator 129 must be closed before opening slips 161. | Slips 161 Open is not selectable if elevator 129 is not closed.<br>Slips 161 Open command is reset after a set time if slips 161 are not opened. | Slips 161 to Open state.<br>Settings: DW 119 hoisting speed and maximum overpull. |

TABLE 16B-continued

Tripping-Out Drill Collar Stands Operation

| | Operator 195 | Operation | Line of Sight | Equipment precondition | Equipment Functionality | HMI |
|---|---|---|---|---|---|---|
| 1.1. | Pipe Handler | TBR 254 and SGA 262 will pick up stand from THP 207: Move TBR 254 and SGA 262 to THP 207. Close guides and clamp on stand. | Visual/ CCTV | TBR 254 and SGA 262 grip/guide open. | TBR 254 and SGA 262 grip/guide will close automatically. | TBR 254 and SGA 262 grip/ guide to Closed states. |
| 1.2. | Pipe Handler | UTC 242 and LTC 244 open and retract: UTC 242 and LTC 244 open guides. UTC 242 and LTC 244 retract from THP 207. | Visual/ CCTV | TBR 254 and SGA 262 closed on stand in THP 207. | UTC 242 and LTC 244 open and retract. | UTC 242 and LTC 244 to Open state-retracted. |
| 1.3. | Pipe Handler | TBR 254 and SGA 262 move toward FIB 166 with stand: Lift stand from THP 207. Move to selected position in FIB 166. | Visual/ CCTV | Valid FIB 166 position selected. | TBR 254 and SGA 262 will follow predefined path. FIB 166 latches will open when stand is outside selected FIB 166 row. FIB 166 latches will close prior to setting down the stand. Set down stand on selected position. | TBR 254 load. FIB 166 latches to Open state. FIB 166 latches to Closed state. |
| 1.4. | Pipe Handler | Move RN 151 to WC 203: Verify TD 116 is hoisted above RN 151 working area. Start RN 151 break-out sequence to move RN 151 to WC 203. | Visual/ CCTV | RN tongs open. WC 203 selected. | RN 151 will move to WC 203. Elevate RN 151 to stick-up. RN 151 will stop/wait outside WC 203 area if TD 116 is moving. | TJ (stick-up) assist indication. |
| 1.5. | Pipe Handler | LSA 228 move to WC 203: LSA 228 move to WC 203. | Visual/ CCTV | | LSA 228 will stop/ wait outside WC 203 area if TD 116 is moving. | |
| 2. | Driller | Set slips 161: Verify required stick-up height. Set slips 161 (command). Set off weight. | Visual/ CCTV | | | DW 119 Upper stop setting. |
| 2.1. | Pipe Handler | RN 151 break-out and spin-out: Verify slips 161 closed and weight set off. Adjust RN 151 elevation if required. Continue RN 151 sequence. Note: Spin-out carefully. Manual mode available. | CCTV | Slips 161 closed. | Break-out and spin-out. Double break-out available if required. Open RN 151 spinner, guide, and clamps. Return RN 151 to park position. | RN 151 indication. Stand not connected. |
| 2.2. | Pipe Handler | LSA 228 guide close: Verify LSA 228 in WC 203 and slips 161 closed, Close LSA 228 guide funnel. | Visual/ CCTV | Slips 161 closed. | LSA 228 will not close in WC 203 if slips 161 are not closed. | LSA 228 in WC 203. LSA 228 guide funnel to Closed state. |
| 3. | Driller | Hoist stand from stick-up: Verify RN 151 is finished and open and LSA 228 is closed. Option: If second RN 151 is used, first RN 151 should be retracted. Hoist stand above stick-up. | Visual/ CCTV | RN finished spin-out, BUT open. LSA 228 funnel closed, | The stand is lifted carefully. Lifting is stopped if stand catches on threads in TJ. | |

TABLE 16B-continued

Tripping-Out Drill Collar Stands Operation

| | Operator 195 | Operation | Line of Sight | Equipment precondition | Equipment Functionality | HMI |
|---|---|---|---|---|---|---|
| 3.1. | Pipe Handler | LSA 228 guides stand to THP 207: Verify pin above stick-up. LSA 228 guides stand toward THP 207. UTC 242 and LTC 244 extend to DCH. | Visual/ CCTV | RN 151 open. Optional: Second RN 151 open and retracted. | | Animated positions. |
| 4. | Driller | Lower stand to THP 207: Verify stand (pin end) is outside rig floor 114. Lower stand to THP 207 guided by LSA 228. Tilt links out toward UTC 242. | Visual/ CCTV | | TD 116 will stop with elevator 129 above UTC 242. | |
| 4.1. | Pipe Handler | TD and LSA 228 move stand to DCH: TD 116 and LSA 228 move toward DCH. LTC 244 closes when stand is close to DCH. Set down stand on DCH. TD links tilted out toward UTC 242. UTC 242 closes when stand is inside guide. LSA 228 opens and retracts. | Visual/ CCTV | UTC 242 open. LSA 228 guide funnel closed. UTC 242 open in DCH. LTC 244 closes when stand is below LTC 244. | DW 119 will slow down above DCH. UTC 242 closes when stand is inside UTC 242. LTC 244 is extended and closed. | UTC 242 animated in DCH. LSA 228 extend. LTC 244 to Closed state. UTC 242 to Closed state. LSA 228 open. |
| 5. | Driller | Open TD elevator 129, lower to stick-up: Verify UTC 242 and LTC 244 are closed. Open elevator 129. Tilt links vertical (float). Lower TD 116 to stick-up. | Visual/ CCTV | UTC 242 closed. | | Elevator 129 to Open state. |
| 5.1. | Pipe Handler | UTC 242 and LTC 244 tilt stand to vertical position: UTC 242 and LTC 244 extend to tilt stand toward WC 203. Wash and dope pin, if preselected. | Visual/ CCTV | TD elevator 129 open. | UTC 242 and LTC 244 will stop in vertical position. | UTC 242 and LTC 244 Closed. UTC 242 and LCS to DCH. Doper animated. |
| 6. | Driller | Extend TD 116 and latch elevator 129: Extend TD 116 to WC 203. Latch elevator 129 (automatic close on impact). | Visual | RN 151 retracted. | | Elevator 129 Closed state. Indicate TD 116 in WC 203. |
| 7. | Driller | Check trip tank volume, gain/loss: Trip tank gain/loss. Repeat all steps for next tubular. Continue on step 1. | Visual | | Trip tank gain/loss is determined and displayed. | Trip Sheet/ Volume control. |
| 7.1. | Pipe Handler | TBR 254 and SGA 262 move to THP 207: Open TBR 254 and SGA 262 in FIB 166. Move toward THP 207/next stand. Continue step 1.1. | Visual/ CCTV | UTC 242 and LTC 244 closed on stand. | TBR 254 clamp and guide and SGA 262 guide will open. TBR 254 will hoist before it retracts out of FIB 166. | TBR 254 clamp and guide and SGA 262 guide to Open states. |

The zone management system (ZMS) mentioned in the sequences above define a zone for each physical component of the IWCS for which collisions are to be avoided. The zone is a three-dimensional space defined according to a coordinate system common of the IWCS. Each zone pertains to one or more different pieces of equipment, including those structures or components that are stationary as part of the IWCS. The zone is attached to the equipment and travels with the equipment. The size of the zone may change (expand or shrink) depending on the transport speed of the related equipment, or the transport speed of surrounding equipment. Some machinery and equipment is complex enough to warrant using multiple zones within the machinery, and the ZMS maintains information pertaining to the zones of the different subcomponents. The ZMS monitors the zones to prevent collisions.

FIG. 24 depicts a component 1140 that is a subject of the ZMS. The component 1140 can be any component of the IWCS. The component 1140 has a zone 1141 that at least partially envelops the component 1140. The zone 1141 may be larger than the component 1140 such that a buffer zone is created between the extremities of the component 1140 and the zone 1141 to further help avoid collisions between components. A database 1142 stores characteristics of the components tracked by the ZMS. The database 1142 may store information related to position, size, shape, weight, motion path, tolerance, impact sensitivity, reference point, center of mass 1143, and attachment points. A processing system 1144 of the ZMS may execute the logic and calculations. The processing system 1144 may be an instance of the processing system 1000 shown in FIG. 23.

The position of the component 1140 can be expressed in terms of coordinates relative to one or more coordinate systems. Each coordinate system can be an x-y-z system, a polar coordinate system, or another type of coordinate system. The coordinate system can be centered on any arbitrary point, such as a north-west extreme of the rig floor 114 (FIG. 1) or the intersection of the well center and the rig floor 114, among other examples. The position of the component 1140 is monitored and continuously compared against the position of other relevant components of the IWCS. The position information of a component, in conjunction with the size, and/or shape information of the component, may be used to describe the equipment and its associated zone in the three-dimensional space of the coordinate system in relation to other components of the IWCS. The ZMS system can detect when a collision between two or more components is imminent and, consequently, issue a warning or take action to prevent the collision.

The component sizes are stored by the database 1142 to help calculate the zones 1141. The database 1142 may be at least a portion of an instance of the processing system 1000 shown in FIG. 23. The database 1142 can store the sizes of the components 1140 in terms of coordinates at various extremities of the component 1140. If the component 1140 has a generally cubic shape, the size can be described by the edges and the orientation of the cube or other coordinate system. If the shape of the component 1140 is more complex, more coordinates can be used to define size and shape. The size and/or shape information of each component 1140 is used to define the corresponding size and/or shape of the associated zones 1141. The zone 1141 may fully envelop the physical component 1140, or may encompass just a part of the physical component 1140 that may collide with other components 1140. The size of the zone 1141 may also expand in a direction aligned with movement of that component 1140, and/or in a direction of another approaching component 1140. The extent of this expansion may depend on the speed of the moving component(s) 1140.

The database 1142 also tracks the weight of the components 1140, which the ZMS may use to determine how much force is required to move or stop motion of a component 1140. The weight of a component 1140 may be known, such as when entered during sequence set-up, while in other cases the IWCS may comprise sensors configured to determine the weight of the component 140. For example, if the component 1140 is the top drive 116 connected to the drill string 120, the weight of the component 1140 varies depending on the length and other parameters of the drill string 120. The sensors may perform weight measurements to determine weight as needed.

The positions of the various components 1140 of the IWCS varies from time to time. The motion path of each component 1140 can also be stored by the database 1142. The motion path of a component 1140 could be a complete path, such as when a component 1140 could travel from one position to another position. Alternatively, the motion path of the component 1140 could be just the direction in which the component 1140 may travel, with no defined end point. The database 1142 can store a routine path of motion for the components 1140. For example, an iron roughneck 151 has a movement path between retracted and expanded positions. The trajectory of the path can be known ahead of time. The ZMS processing system 1144 can be informed of a proposed motion path for a given component 1140, and can calculate whether the component 1140 can make the proposed movement at the proposed time without intersecting with a zone of another component of the IWCS. If so, the ZMS processing system 1144 approves the movement. Alternatively, when the component 1140 is commanded to move in a particular direction, the zone 1141 associated with the component 1140 may be expanded in the direction of the intended movement. The extent of the zone 1141 expansion may depend on the speed of the associated component 1140. With the expanded zone 1141 for a component 1140, the ZMS processing system 1144, may calculate whether the expanded zone 1141 could intersect with a zone 1141 of another component 1140 of the IWCS. If not, the ZMS processing system 1144 approves the movement. In addition, when a component 1140 is commanded to move in a particular direction, the zones 1141 associated with surrounding components 1140 that may come in contact with the moving component 1140 may be expanded in the direction of the incoming component 1140. The extent of the zone 1141 expansion may depend on the speed of the incoming component 1140. The ZMS processing system 1144 may perform similar calculations to evaluate whether a zone 1141 intersection may occur and react accordingly. The movement of the components 1140 can be under the direction and control of the Construction Program, so actions controlled by the Construction Program may be subject to the approval of the ZMS processing system 1144 to prevent collisions between components 1140.

The movement of one or more portable components may be unscheduled. A portable component is an object that is not part of the IWCS equipment, but may be present during the operation. For example, a human operator 195 on the rig floor 114 may be a portable object. The ZMS processing system 1144 is equipped to detect and monitor unscheduled movement of the portable components. For example, the various cameras, sensors, and other measuring equipment described above can be used to identify the portable component and detect its movement. The ZMS processing system 1144 can establish a zone associated with the portable component, evaluate its risk for colliding with surrounding equipment, and issue a warning and/or take action to prevent a collision. The ZMS processing system 1144 may move other components 1140 out of the way, or may stop the movement of other components 1140, to avoid a collision. The ZMS processing system 1144 may also calculate an expected damage for a given collision, and may include logic to permit the ZMS processing system 1144 to determine a course of action under a given set of circumstances. For example, if the top drive 116 is moving down toward the rig floor 114 when the ZMS processing system 1144 detects an operator 195 walking toward well center, the ZMS processing system 1144 may immediately establish a zone 1141 around the operator 195 and evaluate whether this zone 1141 would intersect with the zone 1141 associated with the top drive 116. Depending on safety policy established for the operation, the ZMS processing system 1144 may take a number of measures to avoid collision between the top drive 116 and the operator 195, such as triggering an alarm, slowing movement of the top drive 116, and/or emergency stop of top drive 116, among other examples.

The database 1142 can store information relating to a tolerance for a given component 1140. The tolerance can be defined as a distance from the edge of the physical structure of the component 1140 and the corresponding edge of the defined zone 1141. The nature of the component 1140 and the environment in which it is being used can factor into determining the tolerance. Generally, the faster the speed of the component 1140, the larger the tolerance in the direction of the movement. Alternatively, the faster the speed of the incoming component 1140, the larger the tolerance in the direction of the incoming component 1140. It is also possible that the more sensitive the component 1140, the larger the tolerance can be. The constraints of the environment may also determine what the tolerance is. For example, if the component 1140 is to be installed into predefined space where it is next to another component, then the tolerance can be adjusted accordingly so as not to trigger an alarm or corrective action when installed in the desired location. The tolerance may also be altered during movement, such that when a given component 1140 is stationary, the tolerance can be smaller, and when the component 1140 is moving, the tolerance (and, thus, the zone 1141) can be temporarily enlarged.

Various components are made of different materials and some are more delicate than others. The nature of the component's resistance to collision can be factored into the calculation of the zone 1141. The notion of impact sensitivity may be more than physical impact, and can include chemical, thermal, vibrational, and electromagnetic contact. Thus, the zone 1141 of a component 1140 can be enlarged or reduced according to the collision, checmical, thermal, vibrational, electromagnetic, and other sensitivity of the component 1140.

The components 1140 each generally have a physical body, and to properly address the location of the component 1140 and its proximity to other components, the component 1140 can be given a reference point and the dimensions of the component 1140 can be defined with reference to the reference point. The reference point can be arbitrarily chosen, or it can have some importance. For example, the reference point can coincide with the center of mass 1143, an important corner, an edge, or another significant point on the component 1140. If a component 1140 is routinely rotated, the reference point and geometry of the component 1140 can be updated as it is rotated during service. The zone 1141 pertaining to the component can also be updated accordingly. Some components 1140 have are attachment points, such as hooks, rails, skids, eyelets, bolt patterns, or other physical connection points. This information can also be stored in the database 1142 to permit handling of the components. In the event of an impending collision, information on where an attachment point is located may prove useful and can determine what course of action is taken to prevent or mitigate a collision. Another type of attachment point are ports, such as valves, electrical outlets/ports, etc. Knowing the location and existence of these attachment points and ports can also prove useful and can determine the actions taken by the systems and methods of the present disclosure.

Different priorities may be associated with different components 1140. Each component 1140 can be given a priority relative to other components, and if there are two competing movement proposals, the higher priority can be given the green light and the lesser priority components will have to wait or find another movement path. The higher priority component can be referred to as the commanding component and the lesser component can be referred to as the lesser component or the subservient component.

A rig control system according to the present disclosure (which may be similar or identical to system 800 shown in FIG. 22) may comprise a communication network (e.g., ring network 900 from FIG. 22), a control workstation connected directly to the communication network (e.g., control workstation(s) 850 and/or 852 from FIG. 22), a plurality of control devices that are each connected directly to the communication network, at least some (maybe each) of which control devices may comprise or be a computer (PC or IPC) and/or a programmable logic controller (PLC) (e.g., PLCs 901, 911, 921, 931, 941, 951, 961, 971, 981, 991 from FIG. 22), a plurality of local control networks (e.g., subsystem network rings 909, 919, 929, 939, 949, 959, 969, 979, 989, 999 from FIG. 22) that are each connected to the communication network via a corresponding one of the plurality of control devices, and a plurality of local control devices, at least some (and maybe each) of which may comprise or be a computer (PC or IPC) and/or a programmable logic controller (PLC) (e.g., devices 902-905, 912-915, 922-925, 932-935, 942-945, 952-955, 962-965, 972-975, 982-984, 992-995 from FIG. 22) and each of which is connected (e.g., directly) to a corresponding one of the plurality of local control networks (in which case each is connected indirectly to the larger communication network). The communication network may comprise or be a single ring, star, or daisy-chain network, and/or may be fiberoptic. Each of the plurality of control devices may perform, be caused to perform, sense, measure, monitor, log, and/or the like an action (e.g., a mechanical, software, or other action) of a surface or downhole component (or group thereof), subsystem (or group thereof), and/or system (or group thereof). By virtue of their connection through the communication network, each of the plurality of control devices may directly or indirectly communicate with each other of the plurality of control devices. In an advantageous embodiment, the communication network is configured such that the plurality of control devices (and/or the plurality of local control devices) may (and, in some embodiments, do) perform substantially all control logic involved in direct operation of an array of individual tools/equipment and/or individual subsystems controlled by the rig control system, whereas the control workstations, e.g., via user-input data comprising, consisting essentially of, or being operating parameters and/or multi-tool/multi-subsystem tasks, substantially exchange data comprising, being, and/or derived from the user-input data with the plurality of control devices (and/or, through the plurality of local control networks, with the plurality of local control devices, and thus ultimately with various tools/equipment/subsystems controlled by the rig control system.

In this or another embodiment, or as a stand-alone embodiment, an analysis-while-drilling (AWD) control system according to the present disclosure (which may be similar or identical to system 800 shown in FIG. 22) may be operable to display and/or utilize a plurality of drilling-related parameters that can be and/or have been input by a user and/or that can be and/or have been calculated by one or more algorithms (e.g., based on parameters that can be or have been input by a user). The AWD control system may utilize as input data drilling-related parameters involving well configuration, drill string (including BHA) configuration, drilling-related sensor data/parameters (e.g., mud pit level sensors, standpipe pressure sensors, mud flow sensors, and the like), and drilling equipment data/parameters (e.g., directly from the corresponding equipment, such as drill string revolutions per minute (RPM), make-up torque, mud pump SPM, and the like). The AWD control system may provide output data that can be delivered to and/or used by workstation(s) display(s) (e.g., including the AWD display), a historical logging system (e.g., which may be comprised within and/or accessible via a remote computing resource environment such as environment 206 from FIGS. 3 and 4), a mud logging system (e.g., which may be comprised within and/or accessible via a remote computing resource environment such as environment 206 from FIGS. 3 and 4), etc. The AWD control system output data may comprise: drilling operation warnings and alarms, a kick calculator and kill sheet; sensor data and sensor data calculations for storage in a historical trending/logging system, dynamic tracking of data/parameters related to/indicative of a predetermined set of operating parameters, parameters and/or other information indicative of well configuration, and/or parameters and/or other information indicative of drill string (e.g., including BHA) configuration. The predetermined set of operating parameters may include, but may not necessarily be limited to: well depth/shape; bit depth; stands in hole; sectioned mud volumes; drill string volume, displacement, and weight; mud tank volumes, including active tank selection and loss/gain calculation information; trip tank difference volume; trip tank accumulated volume; mud pump total stroke counters (individual stroke count is tracked by/on behalf of each mud pump); mud pump SPM total; setting of mud pump liner capacities and efficiencies; mud flow into hole, individual and total; annular mud velocity per section; mud volume per section; total strokes per section; strokes to go per section; total minutes per section; minutes to go per section; mud return flow; bit runtime and revolutions; WOB; ROP; hook load; and standpipe pressure; inter alia.

The AWD system is operable for delivering high-quality calculations for real-time monitoring and alarming of complex drilling and tripping parameters. Input from following sources may the basis for AWD calculations: well and drill string configuration; and drilling parameter sensors, as mud pit level sensors, standpipe pressure sensors, and mud flow sensors; directly from the drilling equipment, such as drill string RPM, make-up torque, and mud pump SPM. The AWD system may output results to workstation displays (e.g., an AWD display screen viewable by the operator on a control workstation display), a historical logging system, and a mud logger system. The AWD system may have direct access to all necessary sensor signals, and may permit further understanding and comprehension by the operator.

The AWD system may provide determination and/or confirmation of: well and drill string configuration; dynamic tracking of well and bit depth; stands in well; dynamic calculation of sectioned mud volumes, drill string volume, displacements, and weight; mud tank volumes, including active tank selection and loss/gain calculation; trip tank difference volume; trip tank accumulated volume; mud pump total stroke counters (individual count may be performed by the individual mud pumps); total mud pump strokes per minute; settings of mud pump liner capacities and efficiencies; mud flow into hole, individual and total; dynamic calculation of annular mud velocity per section; dynamic calculation of mud volume per section; dynamic calculation of total strokes per section; dynamic calculation of strokes to go per section; dynamic calculation of total minutes per section; dynamic calculation of minutes to go per section; mud return flow; bit runtime and revolutions; WOB; ROP; hookload; standpipe pressure; casing pressure; cement pressure; kick calculator and kill sheet (e.g., following the "Drillers Method")' sensors and calculations for storage in historical trending system; and operation warnings and alarms.

The AWD system may contain specific WITS (Well Site Information Transfer Standard) computations and triggers used to populate serial communication utilizing the WITS0 protocol. The AWD system may calculate data for the WITS records "RECORD1—General Time-based" and "RECORD11—Mud Tank Volumes—Time-based." The WITS record "RECORD19—Hole and Drill String" may be used for configuration.

The AWD system may calculate mud active volume from the levels measured by the mud pit level instrumentation. The level sensors may be wired to the AWD system, or the AWD system may receive the level sensor data from the drilling fluid control system. Active tanks may be selected by the operator to be included as a part of the active volume. Any tank combination is possible for active volume. Once selected, the tank is automatically added to the active volume. All calculations involving active volume will be updated with the new value. The AWD screen may indicate the status of which tanks contribute into the mud active volume determination, which may always be visible to the operator.

The AWD system calculates data for the mud balance volume indicator showing loss/gain volume with an arrow for increasing/decreasing trend. System loss/gain is calculated as variation in active volume from a reset value.

The AWD system calculates bit and well depth automatically by use of hoist position, hook load, and slips status. Each time the bit moves in the well, or the well is being lengthened, the well and bit depths are automatically calculated by the AWD system. The update is dependent on a certain weight of the drill string, i.e., the ability to measure hook load. In cases when the weight of the drill string is too low to obtain a reliable signal, it is possible to manually decide when the bit depth should be updated. The bit and well depth calculator also includes an automatic Stands In Hole counter based on an input average stand length.

The AWD system may have two options for depth calculations: "slips" for depth calculation active when the slips are not set; and "hookload" for depth calculation when load is in the elevator.

The AWD system may include individual SPM and stroke counters for each mud pump. In addition, there may be multiple (e.g., four) independent total strokes counters and total SPM for the active mud pumps. The operator may select which pumps to count into the active mud pumps for total counters.

The AWD system may include monitoring of the mud flow pumped into the drill string, as well as mud return flow. Calculation of flow in depends on configuration of liner capacity and efficiency factor set for the individual mud pumps. By use of these data and SPM, the AWD system may calculate the mud flow in per pump, in addition to total flow pumped into the well.

The mud return flow may be read directly from a mud return sensor, which an operator may choese via a sensor-select pop-up menu.

The ROP may be calculated as a result of well or bit depth increase over time. The operator may select whether the ROP calculation will be done from bit depth or well depth.

The WOB may be calculated as variation in hook load from a reset value.

The AWD system may include counters for bit revolutions and runtime. These counters may depend on top drive RPM and calculated mud flow in. Updating the counters may be done when the bit is on bottom.

The AWD system may display a well configuration used to configure well and drill string parameters, as well as to give a summarized view of the current configurations being used.

The well design entered in the AWD system includes number of well sections, as well as well diameter and planned length for each section. The choke and kill line design entered in the AWD system may include choke line ID, choke line joint ID, choke line joint fraction, choke line length, kill line ID, kill line joint ID, kill line joint fraction, and kill line length. The drill string design entered in the AWD system may include dimensions and length of each drill string section, including number of drill string sections, planned length, drill string capacity, drill string steel displacement, drill string closed displacement, average length of tubular tool joint, average length of stand, and number of tool joints per stand, among other examples.

The kick calculator may be used if the well kicks and the well must be shut in and circulated out to regain control over the well. The kick calculator does not start any equipment, sequences, or processes, and may be used at any time or point of the well. Inputs for the kick calculator may include measured depth, true vertical depth, measured shoe depth (e.g., second-lowest well section), vertical shoe depth, original mud weight, leak off test mud weight, leak off test pressure, shut in casing pressure, shut in drill pipe pressure, kick gain volume, kill pump selection, kill pump capacity (e.g., calculated from mud pumps configuration), kill pump speed, slow circulation rate pressure, safety margin, and selected choke/kill line to use, among other examples. The kick calculator may also use previously entered and/or measured parameters as string and well properties, riser dimensions, and kill and choke line properties. The volumes, shoe, and pump data may be gathered from the mud pumps and well configuration settings. The kick calculator may output initial circulation pressure, interim circulation pressure, final circulation pressure, kill mud weight, maximum mud weight, pressure drop per 100 strokes, gradient of influx, height of influx, surface to bit strokes and minutes, bit to shoe strokes and minutes, shoe to bop strokes and minutes, bop to choke strokes and minutes, and total circulation strokes and minutes, among other examples.

The AWD system may determine the trip tank difference via a comparison between expected drill string displacement tripped into the well and actual volume measured in the trip tank. Drill string displacement may depend on the drill string configuration and bit depth.

The AWD system may determine the trip tank accumulated volume as the total volume of mud during tripping in or out. The accumulator may be frozen when filling or draining to make it possible to fill or empty the trip tank without reflecting the accumulated value.

The AWD display screen may dynamically show the configured and drilled well and drill string graphically. The AWD display screen may also dynamically show mud volumes, strokes, and velocity for the different well sections. The AWD system may also track the mud front depth, which may be displayed textually (e.g., numerically) and graphically on the well animation. The AWD display screen may contain a graphical display of the well configuration and well section depths, a graphical display of the shoe, an animation of drilled well relative to well configuration, an animation of the drill string in the well, the mud front tracking (e.g., mud front depth value and graphical display), annular velocity per well section, open hole volume, and dynamic determination of total strokes and minutes, strokes and minutes to go, and volume for surface to bit, bit to shoe, bit to BOP, and bit to surface, well circulation, and full circulation, among other examples. The AWS display screen may also display other AWD parameters already determined by the AWD System, such as drill string displacement—open end, drill string displacement—closed end, drill string weight, stands in the well, active volume, mud flow in, bit revolutions, and bit runtime, among other examples. The AWD display screen may also summarize the configured well section lengths, and may display the depth of each section in addition to graphically indicating the shoe depth. If the actual well depth exceeds the configured well depth, the length of the deepest well section may automatically be updated so that volume, time, and stroke calculations are correct. Well and drill string animation may also be updated to reflect exceeded well depth.

When a well configuration is input to the AWD system, the well may be filled with a first color, and as drilling progresses, the well animation may correspondingly be filled with a second color according to the calculated well depth. The drill string may be graphically displayed with the second color or a third color in the configured well. Depth of the drill string will indicate the bit depth.

The mud front tracking position may be calculated in relation to the mud pump total strokes counter and the drill string and well configurations. It may be possible to track the mud front from the surface or the bit. When the operator selects to start tracking the mud front from the surface, and a selected total strokes counter is set to zero, a graphical symbol may indicate the mud front position moving from the surface towards the bit inside the drill string while mud is pumped into the well. When the stroke counter exceeds the number of strokes for surface to bit, another graphical symbol may indicate the mud front position in the annular volume going from bottom to surface. When the mud front indication reaches the surface, it may stay on the surface until the selected total stroke counter is reset. When the operator selects to start tracking the mud front from the bit (or bottom), and the selected total strokes counter is set to zero, a graphical symbol may indicate the mud front position in the annular volume starting from the bit and moving towards the surface. When the mud front indication reaches the surface, it may stay on the surface until the selected total stroke counter is reset. In addition to the graphical display of the mud front depth, there may also be a numerical display showing the depth. For example, the value may be a positive value if the mud front is moving towards the bit inside the drill string or towards surface in the annular volume.

The AWD system may calculate and display annular velocity with a numerical display for each of the well sections. If the drill string has several outer diameters inside the same well sections, the velocity calculated may be the average in the specific well section.

The AWD system may calculate the open hole volume according to the well configuration at current well depth.

The AWD system may dynamically calculate volume, total strokes, total minutes and strokes, and minutes to go for one or more of: surface to bit (drill string volume); bit to shoe (annular volume from bit to shoe); bit to surface (total annular volume); well circulation (drill string+annular volume); and full circulation (drill string+annular volume+active volume). The strokes and minutes to go may be calculated from the last reset of the selected total strokes counter. If the operator selected to start tracking from surface, strokes and minutes to go may be calculated starting from counting strokes from surface. If the operator selected to start tracking from bottom, strokes and minutes to go may be calculated starting from bit position. The surface to bit strokes and time to go may be be set to zero when the operator selects to start tracking from bottom.

Volume calculations may be related to the well and drill string configurations and the calculated bit depth. Strokes calculations may depend on calculated volumes and active mud pump capacity settings. Minutes to go calculations may depend on calculated volumes, active mud pump capacity settings, and mud pump total SPM.

A control system according to one or more aspects of the present disclosure (which may be similar or identical to system 800 shown in FIG. 22) may be operable to monitor and at least partially (e.g., completely) control drilling operations of a drilling rig and one or more of the following modules: drill pipe tripping in (with and/or without drill collar stand); drill pipe tripping out (with and/or without drill collar stand); drill pipe connecting; drill pipe stand-building (offline); drill pipe laydown standing (offline); casing stand-building; casing tripping in; stand breakdown; running casing from catwalk; picking up singles from catwalk; laying down singles from well center to catwalk; back-reaming; wet tripping; normal drilling shut-down; and emergency drilling shut-down (based on alarm conditions). One such example module involves running 13-⅜" casing from catwalk using top drive and casing running tool. This module sequence may start with top drive in lower position, casing running tool engaged, closed slips (e.g., approximately 1.5 meters stick up), catwalk machine feeding table loaded with (cleaned) tubulars, catwalk machine ramp loaded with casing (e.g., on its way up), tubular delivery arm parked in/near top of mast, and lower stabilizing arm ready. The module sequence may then include: (i) releasing casing running tool from stick up and hoisting top drive to pick up position; (ii) latching elevator; (iii) top drive/lower stabilizing arm hoisting the casing to well center and catwalk machine being moved to loading position; (iv) stabbing the casing; (v) loading another (e.g., the next) casing on catwalk machine ramp; (vi) running catwalk to drill floor; (vii) engaging casing running tool and making-up casing connection; (viii) opening backup tong and retracting tong handling trolley; (ix) lowering casing string and opening elevator; (x) tilting out elevator link(s) and setting slips; and (xi) optionally repeating some or all of these steps for additional (e.g., the next) casing(s), as desired.

A drilling system according to one or more aspects of the present disclosure (which may be similar or identical to system 800 shown in FIG. 22) may comprise at least partially (e.g., completely) automated control of equipment comprising, consisting essentially of, or consisting of each of: drawworks; top drive; iron roughneck; mud bucket; cathead(s); mousehole; mud system comprising mud pumps; catwalk; fingerboard; vertical pipe handler; CCTV system; riser tension system; top-mounted compensator; and optionally bottom hole assembly (BHA).

A control system according to one or more aspects of the present disclosure (which may be similar or identical to system 800 shown in FIG. 22) may be operable for controlling drilling operations in which automated tripping in and/or automated tripping out modules may be advantageously more efficient than manual tripping in and/or tripping out modules for an average human working crew. The control system may effectuate one, some, or all of the following: an automated average tripping in and/or tripping out speed [in stands/hour] that is at least 5% (e.g., at least 6%, at least 7%, at least 8%, at least 9%, or at least 10%) better/more than an average tripping in and/or tripping out speed of an average human working crew; an automated standard deviation from average tripping in and/or tripping out speed that is at least 50% (e.g., at least 55%, at least 60%, at least 65%, at least 70%, at least 75%, or at least 80%) better/lower than a standard deviation from an average tripping in and/or tripping out speed of an average human working crew; an automated average tripping in and/or tripping out slip-to-slip connection time [in seconds] that is at least 4% (e.g., at least 5%, at least 6%, or at least 7%) better/lower than an average tripping in and/or tripping out slip-to-slip connection time of an average human working crew; and an automated standard deviation from average tripping in and/or tripping out slip-to-slip connection time that is at least 50% (e.g., at least 55%, at least 60%, at least 65%, at least 70%, at least 75%, or at least 80%) better/lower than a standard deviation from an average tripping in and/or tripping out slip-to-slip connection time of an average human working crew.

A control system according to one or more aspects of the present disclosure (which may be similar or identical to system 800 shown in FIG. 22) may be operable for controlling drilling operations in which collisions are prevented between: (a) drawworks and one or more of iron roughneck, tong-handling trolley, tong-handling arm, catwalk, tubular delivery arm, lower stabilizing arm, and upper tubular constraint; (b) top drive and one or more of iron roughneck, tong-handling trolley, tong-handling arm, catwalk, tubular delivery arm, lower stabilizing arm, and upper tubular constraint; (c) iron roughneck and one or more of drawworks, top drive, catwalk, tubular delivery arm, lower stabilizing arm, intermediate tubular constraint, rotary table, power slips, well center connection, and mousehole connection; (d) tong-handling trolley and one or more of drawworks, top drive, catwalk, tubular delivery arm, lower stabilizing arm, rotary table, power slips, and well center connection; (e) tong-handling arm and one or more of drawworks, top drive, catwalk, tubular delivery arm, lower stabilizing arm, intermediate tubular constraint, rotary table, power slips, well center connection, and mousehole connection; (f) catwalk and one or more of drawworks, top drive, iron roughneck, tong-handling trolley, tong-handling arm, tubular delivery arm, lower stabilizing arm, pipes around stand hand-off position, and pipes by mousehole; (g) tubular delivery arm and one or more of drawworks, top drive, iron roughneck, tong-handling trolley, tong-handling arm, catwalk, lower stabilizing arm, transfer bridge rackers, upper tubular constraint, intermediate tubular constraint, lower tubular constraint, setback guide arm(s), stand hand-off position, rotary table, and power slips; (h) lower stabilizing arm and one or more of drawworks, top drive, iron roughneck, tong-handling trolley, tong-handling arm, catwalk, tubular delivery arm, and intermediate tubular constraint; (i) transfer bridge rackers and one or more of tubular delivery arm, upper tubular constraint, lower tubular constraint, setback guide arm(s), stand hand-off position, and fingerboard;

(j) upper tubular constraint and one or more of drawworks, top drive, tubular delivery arm, transfer bridge rackers, lower tubular constraint, and setback guide arm(s); (k) intermediate tubular constraint and one or more of iron roughneck, tong-handling arm, tubular delivery arm, lower stabilizing arm, and mousehole connection; (l) setback guide arm(s) and one or more of tubular delivery arm, lower stabilizing arm, transfer bridge rackers, upper tubular constraint, and lower tubular constraint; (m) setback guide arms; (n) fingerboard and transfer bridge rackers; (o) lower tubular constraint and one or more of tubular delivery arm, lower stabilizing arm, transfer bridge rackers, upper stabilizing arm, and setback guide arm(s); (p) stand hand-off position and one or both of tubular delivery arm and transfer bridge rackers; and/or (q) rotary table/power slips and one or more of drawworks, top drive, iron roughneck, tong-handling trolley, tong-handling arm, tubular delivery alarm, lower stabilizing arm, and well center connection.

A control system according to one or more aspects of the present disclosure (which may be similar or identical to system 800 shown in FIG. 22) may be operable for controlling drilling operations in which a level of automation for various drilling operations can be selected by: generating a control screen facilitating selection of automation level; and facilitating selection of full (i.e., substantially complete) automation, semi-automation (e.g., confirmation by driller/operator to start a specific operational sequence, automating a first portion of a larger operational sequence such as waiting for a driller/operator to authorize completion and/or a second portion of the larger operational sequence, or the like), or manual control (e.g., via a joystick).

A control system according to one or more aspects of the present disclosure (which may be similar or identical to system 800 shown in FIG. 22) may be operable for controlling drilling operations and may comprise a customizable display screen on which a control screen is generated and which control screen may be operable to facilitate selection of scale and/or limits for indicator graphs (e.g., pie chart(s), linear bar graph(s), spider graph(s), and/or the like, as well as combinations thereof) that may graphically represent one or more aspects of the drilling operations. The selection of scale and/or limits may include, but are not necessarily limited to, minimum and maximum graph values; warning value limits; and graph scale.

A control system according to one or more aspects of the present disclosure (which may be similar or identical to system 800 shown in FIG. 22) may be operable for controlling drilling operations and may comprise a display of software objects (e.g., symbols, icons, buttons, and/or the like) that: may be displayed on a monitor or touchscreen; may be indicative of equipment/tool/device status via changing color, localized background color, adjacent or localized background symbol (e.g., check or X), flashing color, filled/unfilled object, and/or the like; may show operational status (e.g., high value, open, closed, running, idle, error, and/or the like); may show communication status (e.g., feedback error, communication error, and/or the like); may show control status (e.g., auto, manual, local, and/or the like); and may be displayed in association with displayed numerical values; inter alia.

A control system according to one or more aspects of the present disclosure (which may be similar or identical to system 800 shown in FIG. 22) may comprise an AWD display screen showing one, some, or all of the following information: (a) graphic display of well configuration and hole section depths; (b) graphic display of shoe; (c) animation of planned vs. actual well; (d) animation of drill string in well; (e) value and graphic display of mud front tracking/depth; (f) annular velocity per section; (g) open hole volume; (h) dynamic calculation of total strokes and minutes, strokes and minutes to go, and volume for at least the following: (i) Surface To Bit; (ii) Bit To Shoe; (iii) Bit To BOP; (iv) Bit To Surface; (v) Well Circulation; (vi) Full Circulation; (j) drill string displacement, open end and closed end; (k) drill string weight; (l) stands in hole; (m) active volume; (n) mud flow in; (o) bit revolutions; and (p) bit runtime.

A control system according to one or more aspects of the present disclosure (which may be similar or identical to system 800 shown in FIG. 22) may comprise an alarm system that can assist equipment operators/resource producers to operate equipment (e.g., drilling equipment) in an efficient and safe manner. The alarm system may be operable to: draw operator attention to alarms by use of colors, symbols, flashing, sounds, and other notations with distinct meaning; present descriptive and easy to understand alarm texts; use alarm priority with distinct meaning; logically group alarms; and keep an alarm rate as low as possible. The alarm system may additionally or alternatively utilize screen objects/symbols that are indicative of equipment or device and that may show status via changing color, localized background color, adjacent or localized background symbol, flashing color, filled or unfilled object, and/or the like. The alarm system may additionally or alternatively be configured: such that the driller/operator responds to all alarms; for intuitive navigation and alarm acknowledgment; to automatically log each alarm and alarm state change; and for high system availability and robustness.

A method of at least partially automating drilling operations according to one or more aspects of the present disclosure, which may be employed using one, some, or all of the (control) systems described herein, can comprise utilizing data indicative of operation or capability of a first piece of drilling equipment as an input parameter for controlling operation of a second piece of drilling equipment, wherein impact of the data indicative of the operation/capability of the first piece of drilling equipment is either not intuitively linked to or is counterintuitive to operation/capability of the second piece of drilling equipment. For example, an output parameter involving a piece of drilling equipment A may be used as an input parameter for operation of a piece of drilling equipment B, and an output parameter (e.g., similar to or different from the input parameter) involving the piece of drilling equipment B may be used as an input parameter for operation of a piece of drilling equipment C. In this example, one or more effects of operation/capability of a parameter involving the piece of equipment A is either not intuitively linked to or is counterintuitive in its applicability to the operation/capability of the piece of equipment C. In this example, the "piece of drilling equipment B" may represent a single piece of drilling equipment or a series of pieces of drilling equipment, an output parameter of each of which serves as an input parameter for the next piece of drilling equipment throughout the series (notably, it may be, although it need not be, the same output and/or input parameter throughout the series of drilling equipment).

In view of the entirety of the present disclosure, including the figures and the claims, a person having ordinary skill in the art will readily recognize that the present disclosure introduces an apparatus comprising an integrated well construction system (IWCS) operable for constructing a well via integrated control of a plurality of integrated control devices that collectively control a plurality of integrated subsystems of the IWCS, wherein the IWCS comprises: an IWCS communication network; the integrated control devices, each directly connected with the IWCS communication network; the integrated subsystems; and a control workstation directly connected with the IWCS communication network and operable to control each of the integrated control devices to thereby control the integrated subsystems.

Each integrated control device may control a corresponding one of the integrated subsystems.

The IWCS communication network may be a single, fiberoptic, ring-topology network.

The integrated subsystems may include at least: a rig control subsystem comprising a drawworks, a top drive, an iron roughneck, automated slips, and automated pipe handling equipment; a fluid circulation subsystem comprising a drilling fluid pump and drilling fluid reconditioning equipment; a managed pressure drilling control subsystem; a choke pressure control subsystem; a well pressure control subsystem; and a closed-circuit television subsystem.

Each subsystem may comprise: a subsystem network directly connected with the integrated control device of that subsystem; and a plurality of subsystem components each directly connected with the subsystem network. The subsystem components may each control, perform, sense, measure, and/or monitor an aspect of well construction performed in association with the subsystem comprising that subsystem component.

The control workstation may comprise a processor and a memory storing a construction program that, when executed by the processor, controls each integrated control device at least partially in response to data received from at least one other one of the integrated control devices.

The control workstation may comprise a processor and a memory storing a construction program that, when executed by the processor, controls each integrated control device during each of a plurality of predetermined operational sequences. The plurality of predetermined operational sequences may comprise: picking up single tubulars; making drilling connections; building tubular stands; tripping-in drill collar stands; tripping-out drill collar stands; tripping-out wet; backreaming; moving single tubulars from a well center to a catwalk using a top drive; moving tubular stands from the well center to the catwalk; moving casing from the catwalk to the well center using a casing tong; moving casing from the catwalk to the well center using a tubular delivery arm and a casing running tool; moving large diameter casing from the catwalk to the well center using the top drive and the casing running tool; building casing stands; and tripping-in casing stands without using the casing running tool. The construction program, when executed by the processor, may control the top drive, a drawworks, automated slips, a top drive elevator, an iron roughneck, a drilling fluid pumping system, the catwalk, an automated racker, an automated fingerboard, and the tubular delivery arm, via control of the integrated control devices, during performance of the predetermined operational sequences. The construction program may be configurable by a human operator to permit the operator to select human interaction levels during performance of the predetermined operational sequences. The construction program may be configurable by a human operator to permit the operator to select levels of automation of the IWCS during performance of the predetermined operational sequences. The construction program may be configurable by a human operator to permit the operator to select which machines of the IWCS will be controlled by the construction program during performance of each predetermined operational sequence. The construction program may be configurable by human operators to permit the operators to select which machines of the IWCS will be controlled by the construction program, and to select which machines of the IWCS will be supervised by which operator, during performance of each predetermined operational sequence. The construction program may be configurable by human operators to permit the operators to select which steps of each predetermined operational sequence will be performed and/or confirmed manually, and by which operator.

The IWCS may be operable for constructing a well without operation of other components not controlled by, monitored by, or otherwise in communication with any of the integrated control devices.

The IWCS may be operable for constructing a well without operation of other components not controlled by any of the integrated control devices.

The present disclosure also introduces an apparatus comprising a control workstation directly connected with a communication network and operable to control each of a plurality of integrated control devices each directly connected with the communication network, wherein each integrated control device controls a corresponding component of an integrated well construction system, whereby control of the integrated control devices, via operations of the control workstation, controls the integrated well construction system.

The integrated well construction system may be operable, via operations of the control workstation, for constructing a well exclusive of any component not controlled by any of the integrated control devices.

The present disclosure also introduces a computer program product comprising a tangible, computer-readable, non-transitory medium having instructions stored thereon for: automatically controlling a plurality of integrated control devices that control integrated subsystems of an integrated well construction system (IWCS) to perform combinations of a plurality of predetermined operational sequences for constructing a well; receiving, via operation of a control workstation by a human operator, a selection of one of the operational sequences to be performed by the IWCS; receiving, via operation of the control workstation by the human operator, settings for first machines of the IWCS to be operated during the selected operational sequence; and in response to receiving a single commencement input via operation of the control workstation by the human operator, automatically starting and controlling the first machines and second machines of the IWCS to perform the selected operational sequence using the received settings.

The automatic start and control of the first and second machines may perform the selected operational sequence without further human action.

The present disclosure also introduces a method comprising operating an integrated well construction system (IWCS) comprising a fiberoptic ring network, wherein the fiberoptic ring network comprises a plurality of nodes comprising: programmable logic controllers (PLCs) of individual pieces of machinery forming the IWCS; video feed; drilling operator control; high-level supervisory control; and combinations thereof.

The IWCS machinery PLCs may comprise: a drilling fluid pumping system PLC; a top drive PLC; a drawworks PLC; an automated slips PLC; an iron roughneck PLC; a catwalk PLC; an automated racker PLC; an automated fingerboard PLC; and a tubular delivery arm PLC.

The fiberoptic ring network may exchange data between the PLCs for coordinated control of the machinery.

The fiberoptic ring network may exchange data between one or more of the PLCs and the drilling operator for manual or semi-automatic control of the IWCS.

The fiberoptic ring network may exchange data between one or more of the PLCs and a supervisory controller for automatic and optimized control of the IWCS.

The present disclosure also introduces an apparatus comprising: a communication network; a plurality of integrated control devices each directly connected with the communication network, wherein each integrated control device controls a corresponding component of an integrated well construction system, and wherein the integrated well construction system is operable for constructing a well without other components not controlled by any of the integrated control devices; and a control workstation directly connected with the communication network and operable to control each of the integrated control devices to thereby control the integrated well construction system.

The present disclosure also introduces an apparatus comprising: a communication network; a plurality of integrated control devices each directly connected with the communication network, wherein each integrated control device controls a corresponding one of a plurality of integrated well construction components, and wherein the integrated well construction components are collectively operable for constructing a well exclusive of any component not controlled by any of the integrated control devices; and a control workstation directly connected with the communication network and operable to control each of the integrated control devices to thereby control the integrated well construction system.

The present disclosure also introduces an apparatus comprising: a communication network; a plurality of integrated control devices each directly connected with the communication network, wherein each integrated control device controls a corresponding one of a plurality of integrated well construction components, and wherein the integrated well construction components form an integrated well construction system operable for constructing a well without any other components; and a control workstation directly connected with the communication network and operable to control each of the integrated control devices to thereby control the integrated well construction system.

The present disclosure also introduces a method comprising causing a well construction system to perform a well construction operation, whereby data associated with the well construction operation is automatically collected and analyzed in real-time to determine a plurality of parameters based on the data, and wherein at least some of the determined parameters are used for controlling the well construction operation.

The data may be selected from: human operator inputs; equipment control, feedback, and interlock signals; surface sensor signals; and downhole sensor signals.

The well construction system may comprise a processing system comprising a processor and a memory having instructions recorded thereon for, when executed by the processor: automatically determining the parameters; and automatically controlling at least a portion of the well construction operation based at least partially on the determined parameters.

The well construction system may comprise a processing system comprising a processor and a memory having instructions recorded thereon for, when executed by the processor: automatically determining the parameters; and automatically displaying at least some of the determined parameters to a human operator in substantially real-time. The method may further comprise at least partially controlling, by the human operator, at least a portion of the well construction operation based at least partially on the displayed parameters. The displaying may comprise numbers, pictures, animations, or combinations thereof.

The determined parameters may comprise one or more of drilling fluid active volume, drilling fluid loss and/or gain, bit depth, wellbore depth, hook load weight and friction, drilling fluid pump strokes, drilling fluid stroke rate, rate of penetration, weight on bit, bit revolutions, bit runtime, well configuration, drill string configuration, choke configuration, kill line configuration, kick calculator, trip tank volume, trip tank difference determinations, and trip tank accumulated volume.

One of the determined parameters may be a kick determination based on: measured depth; true vertical depth; measured shoe depth; vertical shoe depth; original drilling fluid weight; leak off test drilling fluid weight; leak off test pressure; shut in casing pressure; shut in drill pipe pressure; kick gain volume; kill pump selection; kill pump capacity; kill pump speed; slow circulation rate pressure; safety margin; and selected choke/kill line.

The present disclosure also introduces a method comprising causing a well construction system to perform a well construction operation, whereby data associated with the well construction operation is automatically collected and analyzed in real-time to determine a plurality of parameters based on the data, and wherein at least some of the determined parameters each provide a basis for triggering at least one real-time well construction operation alarm.

The data may be selected from: human operator inputs; equipment control, feedback, and interlock signals; surface sensor signals; and downhole sensor signals.

The at least one real-time alarm may be a plurality of alarms comprising: high trip tank volume; low trip tank volume; high active drilling fluid volume; low active drilling fluid volume; high drilling fluid loss; low drilling fluid loss; high drilling fluid gain; low drilling fluid gain; high drilling fluid flow return; low drilling fluid flow return; high standpipe pressure; low standpipe pressure; drilling fluid pumping system total stroke rate; and drilling fluid pumping system total strokes.

The well construction system may comprise a processing system comprising a processor and a memory having instructions recorded thereon for, when executed by the processor: automatically determining the parameters; and automatically triggering the at least one real-time alarm based on at least one of the determined parameters.

The determined parameters may comprise one or more of drilling fluid active volume, drilling fluid loss and/or gain, bit depth, wellbore depth, hook load weight and friction, drilling fluid pump strokes, drilling fluid stroke rate, rate of penetration, weight on bit, bit revolutions, bit runtime, well configuration, drill string configuration, choke configuration, kill line configuration, kick calculator, trip tank volume, trip tank difference determinations, and trip tank accumulated volume.

The present disclosure also introduces an apparatus comprising an analysis-while-drilling (AWD) control system utilized in conjunction with a well construction system during a well construction operation, wherein inputs for the AWD control system comprise: intended configuration of a well being constructed by the well construction system during the well construction operation; configuration of a drill string being used by the well construction system during the well construction operation; signals from drilling parameter sensors; and drilling equipment parameters. Outputs from the AWD control system comprise real-time determination of: depth and trajectory of the well; bit depth; number of drill string tubulars and/or stands in the well; drill string volume, displacements, and weight; drilling fluid tank volumes and tank selections; drilling fluid loss and/or gain; trip tank difference volume; trip tank accumulated volume; total and/or per-section strokes and/or strokes-to-go of drilling fluid pumping system; total stroke rate of drilling fluid pumping system; drilling fluid pumping system liner capacities and efficiencies; individual and total drilling fluid flow into the well; annular drilling fluid velocity; total and/or per-section drilling fluid volumes; total minutes and/or minutes-to-go per section; drilling fluid return flow; bit runtime and revolutions; weight-on-bit; rate of penetration; hook load; and standpipe pressure. The outputs from the AWD control system may further comprise a kick calculator and a kill sheet. The outputs from the AWD control system may further comprise sensors and calculations for storage in a historian associated with the well construction system. The outputs from the AWD control system may further comprise well construction operation warnings and alarms.

The drilling parameter sensors may comprise drilling fluid tank level sensors, standpipe pressure sensors, cement manifold pressure sensors, and drilling fluid flow sensors.

The drilling equipment parameters may comprise drill string revolutions per minute, make-up torque, hoist position, hook load, slips status, average stand length, average tubular length, liner capacities and efficiencies of individual drilling fluid system pumps, top drive revolutions per minute, choke like parameters, kill line parameters, number of drill string sections, drill string capacity, drill string steel displacement, and drill string closed displacement.

The present disclosure also introduces an apparatus comprising a control workstation directly connected with a communication network and operable to control each of a plurality of control devices each directly connected with the communication network, wherein each control device controls a corresponding component of an integrated well construction system, whereby control of the control devices, via operations of the control workstation, controls the integrated well construction system, wherein the control workstation comprises a display, a processor, and a memory storing: a construction program that, when executed by the processor, controls each control device; and an analysis-while-drilling (AWD) program. Inputs for the AWD system comprise: intended configuration of a well being constructed by the well construction system during the well construction operation; configuration of a drill string being used by the well construction system during the well construction operation; signals from drilling parameter sensors; and drilling equipment parameters. When executed by the processor, the AWD program generates in real-time, and displays in real-time in an AWD screen on the display, one or more of: a graphic display of the intended configuration and/or an actual configuration of the well, including depths; a graphic display of a shoe in the well; an animation of the intended and actual configurations of the well; an animation of the drill string in the well; value textual and/or graphic display of drilling fluid front tracking and/or depth; annular velocity per section; open hole volume; total strokes and minutes, strokes and minutes-to-go, and volume for one or more of: surface to bit; bit to shoe; bit to blow-out preventer; bit to surface; well circulation; full circulation; drill string displacement, open end and closed end; drill string weight; number of tubulars in the well; active volume; drilling fluid flow into the well; bit revolutions; and bit runtime.

The present disclosure also introduces an apparatus comprising a control workstation for use with an integrated well construction system (IWCS), wherein the IWCS is operable for constructing a well via integrated control of a plurality of integrated control devices that collectively control a plurality of integrated subsystems of the IWCS, and wherein the control workstation comprises a human-machine interface (HMI) comprising a display, a touchscreen, a joystick, and a processing system comprising a processor and a memory having a construction program thereon that, when executed by the processor: presents a human operator of the control workstation with a setup wizard guiding the operator through entering operating parameters for one or more well construction machines of the integrated subsystems to perform a well construction sequence; and controls the integrated control devices, and thus the integrated subsystems, to perform the well construction sequence based on the entered operating parameters.

The well construction sequence may be selected from: picking up single tubulars; making drilling connections; building tubular stands; tripping-in drill collar stands; tripping-out drill collar stands; tripping-out wet; backreaming; moving single tubulars from a well center to a catwalk using a top drive; moving tubular stands from the well center to the catwalk; moving casing from the catwalk to the well center using a casing tong; moving casing from the catwalk to the well center using a tubular delivery arm and a casing running tool; moving large diameter casing from the catwalk to the well center using the top drive and the casing running tool; building casing stands; and tripping-in casing stands without using the casing running tool.

The entered operating parameters may be for one or more of a top drive, a drawworks, automated slips, a top drive elevator, an iron roughneck, a drilling fluid pumping system, a catwalk, an automated racker, an automated fingerboard, and a tubular delivery arm.

The entered operating parameters may comprise speed limitations of at least one of the well construction machines.

The entered operating parameters may comprise travel stops of at least one of the well construction machines.

The entered operating parameters may comprise maximum limitations of at least one of the well construction machines.

The entered operating parameters may comprise target settings of at least one of the well construction machines.

The entered operating parameters may comprise target settings of the well construction sequence.

The entered operating parameters may comprise automation levels. The automation levels may be selected from: automated control by the construction program; automated control by the construction program after confirmation by the human operator; and manual operation by the human operator.

The human operator may cause commencement of the well construction sequence by actuating a button on the touchscreen.

The human operator may cause commencement of the well construction sequence by actuating the joystick to ramp up the speed of the well construction machines.

The construction program may permit the human operator to take manual control of one or more of the well construction machines during the well construction sequence.

The construction program may permit the human operator to change an operating parameter of one or more of the well construction machines during the well construction sequence.

The well construction sequence may be a tripping-in or tripping-out sequence, which may be performed with an average stands-per-hour tripping-in or tripping-out speed that is at least five percent faster than attainable by an average human working crew not using the IWCS.

The well construction sequence may be a tripping-in or tripping-out sequence, which may be performed with a standard deviation from average tripping-in or tripping-out speed that is at least fifty percent lower than attainable by an average human working crew not using the IWCS.

The well construction sequence may be a tripping-in sequence, which may be performed with an average slips-to-slips connection time that is at least four percent faster than attainable by an average human working crew not using the IWCS.

The well construction sequence may be a tripping-in sequence, which may be performed with a standard deviation from average slips-to-slips connection time that is at least fifty percent lower than attainable by an average human working crew not using the IWCS.

The present disclosure also introduces an apparatus comprising an integrated well construction system (IWCS) operable for constructing a well via integrated control of a plurality of integrated control devices that collectively control a plurality of integrated subsystems of the IWCS, wherein the IWCS comprises a processing system comprising a processor and a memory having a construction program thereon that, when executed by the processor: controls each integrated control device, and thus each integrated subsystem, during each of a plurality of predetermined operational sequences; and prevents collisions between machines of the IWCS.

The IWCS machines prevented from colliding by the construction program may comprise: a drawworks; an iron roughneck; a tong-handling trolley; a tong-handling arm; a catwalk; a tubular delivery arm; a lower stabilizing arm; an upper tubular restraint; an intermediate tubular restraint; a lower tubular restraint; a top drive; a top drive elevator; a fingerboard; a transfer bridge racker; and a setback guide arm. The construction program may further prevent collisions between: the IWCS machines; tubulars being transported by any of the IWCS machines; tubulars sticking up out of the well; tubulars in a mousehole of the IWCS; and tubulars in a hand-off position of the IWCS. The construction program may prevent collisions between: a drawworks and one or more of a catwalk, an iron roughneck, a lower stabilizing arm, a tong-handling arm, a tong-handling trolley, a tubular delivery arm, and an upper tubular constraint; and/or a top drive and one or more of the iron roughneck, the tong-handling trolley, the tong-handling arm, the catwalk, the tubular delivery arm, the lower stabilizing arm, and the upper tubular constraint; and/or the iron roughneck and one or more of the drawworks, the top drive, the catwalk, the tubular delivery arm, the lower stabilizing arm, an intermediate tubular constraint, a rotary table, automated slips, a tubular sticking up out of the well, and a tubular sticking up out of a mousehole of the IWCS; and/or the tong-handling trolley and one or more of the drawworks, the top drive, the catwalk, the tubular delivery arm, the lower stabilizing arm, the rotary table, the automated slips, and a tubular sticking up out of the well; and/or the tong-handling arm and one or more of the drawworks, the top drive, the catwalk, the tubular delivery arm, the lower stabilizing arm, the intermediate tubular constraint, the rotary table, the automated slips, a tubular sticking up out of the well, and a tubular sticking up out of a mousehole; and/or the catwalk and one or more of the drawworks, the top drive, the iron roughneck, the tong-handling trolley, the tong-handling arm, the tubular delivery arm, the lower stabilizing arm, a tubular in a hand-off position of the IWCS, and a tubular sticking up out of a mousehole; and/or the tubular delivery arm and one or more of the drawworks, the top drive, the iron roughneck, the tong-handling trolley, the tong-handling arm, the catwalk, the lower stabilizing arm, a transfer bridge racker, the upper tubular constraint, the intermediate tubular constraint, a lower tubular constraint, a setback guide arm, a tubular in the hand-off position, the rotary table, and the automated slips; and/or the lower stabilizing arm and one or more of the drawworks, the top drive, the iron roughneck, the tong-handling trolley, the tong-handling arm, the catwalk, the tubular delivery arm, and the intermediate tubular constraint; and/or the transfer bridge racker and one or more of the tubular delivery arm, the upper tubular constraint, the lower tubular constraint, the setback guide arm, a tubular in the hand-off position, and a fingerboard; and/or the upper tubular constraint and one or more of the drawworks, the top drive, the tubular delivery arm, the transfer bridge rackes, the lower tubular constraint, and the setback guide arm; and/or the intermediate tubular constraint and one or more of the iron roughneck, the tong-handling arm, the tubular delivery arm, the lower stabilizing arm, and a tubular in the mousehole; and/or the setback guide arm and one or more of the tubular delivery arm, the lower stabilizing arm, the transfer bridge racker, the upper tubular constraint, and the lower tubular constraint; and/or the fingerboard and the transfer bridge racker; and/or the lower tubular constraint and one or more of the tubular delivery arm, the lower stabilizing arm, the transfer bridge racker, the upper stabilizing arm, and the setback guide arm; and/or a tubular in the hand-off position and one or both of the tubular delivery arm and the transfer bridge racker; and/or the automated slips and one or more of the drawworks, the top drive, the iron roughneck, the tong-handling trolley, the tong-handling arm, the tubular delivery arm, and the lower stabilizing arm.

The present disclosure also introduces a method comprising constructing a well utilizing each of a plurality of automatically controlled well construction machines, including: a drawworks; an iron roughneck; a tong-handling trolley; a tong-handling arm; a catwalk; a tubular delivery arm; a lower stabilizing arm; an upper tubular restraint; an intermediate tubular restraint; a lower tubular restraint; a top drive; a top drive elevator; a fingerboard; a transfer bridge racker; a setback guide arm; a mousehole; a mousehole; a drilling fluid pumping system; and a drilling fluid reconditioning system.

The present disclosure also introduces a system operable to completely control each of a plurality of predetermined operational sequences of a well construction operation, wherein the sequences include: picking up single tubulars; making drilling connections; building tubular stands; tripping-in drill collar stands; tripping-out drill collar stands; tripping-out wet; backreaming; moving single tubulars from a well center to a catwalk using a top drive; moving tubular stands from the well center to the catwalk; moving casing from the catwalk to the well center using a casing tong; moving casing from the catwalk to the well center using a tubular delivery arm and a casing running tool; moving large diameter casing from the catwalk to the well center using the top drive and the casing running tool; building casing stands; and tripping-in casing stands without using the casing running tool.

The present disclosure also introduces a control system for controlling drilling operations in which a level of automation for various operations can be selected. It may generate a control screen facilitating selection of level of automation. It may facilitate selection of full automation, semi-automation (e.g., confirmation by driller to start a specific sequence), or manual control (e.g., via a joystick).

The present disclosure also introduces a control system for controlling drilling operations comprising: a customizable display; a control screen facilitating selection of scale and limits for indicator graphs (e.g., circular bar graph, linear bar graph); customizable selections including minimum and maximum graph values, warning value limits, and scale.

The present disclosure also introduces a control system for controlling drilling operations, including a display of software objects (symbols, icons, buttons, etc.) that: are displayed on a monitor or touchscreen; are indicative of equipment or device status via changing color, localized background color, adjacent or localized background symbol (e.g., check or X), flashing color, filled or unfilled object, etc.; show operational status (e.g., high value, open, closed, running, idle, error, etc.); show communication status (e.g., feedback error, communication error, etc.); show control status (e.g., auto, manual, local, etc.); and/or can be displayed in association with displayed numerical values.

The present disclosure also introduces a rig control system comprising a communication network. The communication network may be a single ring, star, or daisy-chain network. The communication network may be fiberoptic. The rig control system also comprises a control workstation connected directly to the network. The rig control system also comprises multiple different control devices. Each control device may perform, cause the performance of, sense, measure, monitor, and/or log a mechanical, software, or other action of a mechanical, software, or other surface or downhole component (or group thereof), subsystem (or group thereof), or system (or group thereof). Each control device may be connected directly to the communication network. Each control device may communicate (directly or indirectly) with each other control device. Each control device may act at least partially in response to, or act at least partially based on, or otherwise use data from at least one other control device. For example, each control device may have an input from (the control device(s) of) another rig component (or group thereof), rig subsystem (or group thereof), or rig system (or group thereof). Each control device may be a computer (PC or IPC) or a PLC. The rig control system may also comprise multiple local control networks. Each local control network may be connected with the communication network, such as via a corresponding one of the control devices. The rig control system may also comprise multiple local control devices. Each local control device may be connected directly with a corresponding local control network. Each local control device may be a computer (PC or IPC) or a PLC. The control devices connected directly to the communication network may perform all control logic, and the control workstation may be (at least mostly) a data exchange.

The present disclosure also introduces an alarm system that helps operators to operate equipment and processes in an efficient and safe manner. The alarm system may utilize screen objects/symbols that: are indicative of equipment or device; show status via changing color, localized background color, adjacent or localized background symbol, flashing color, filled or unfilled object, etc.; are designed to draw operator attention to alarms by use of colors, symbols, flashing, sounds, and other notations with distinct meaning, present descriptive and easy to understand alarm texts, use alarm priority with distinct meaning, logically group alarms, keep the alarm rate as low as possible, ensure operators responds to all alarms, permit intuitive navigation and alarm acknowledgement, permit logging all alarms and alarm state changes, and provide high system availability and robustness.

The present disclosure also introduces an analysis-while-drilling (AWD) control system that is operable to show a large number of drilling related parameters determined by sophisticated algorithms. The AWD inputs may include: well configuration; drill string (including BHA) configuration; drilling parameter sensors (e.g., mud pit level sensors, standpipe pressure sensors, mud flow sensors); and drilling equipment parameters (e.g., directly from the equipment, such as drill string RPM, make-up torque, mud pump SPM). The AWD outputs may be delivered to and/or used by: workstation(s) display(s), including an AWD display; a historical logging system; and/or a mud logger system. The AWD outputs may include well configuration, drill string (including BHA) configuration, and dynamic tracking of: the well; bit depth; stands in hole; sectioned mud volumes; drill string volume, displacements, and weight; mud tank volumes, including active tank selection and loss/gain calculation; trip tank difference volume; trip tank accumulated volume; mud pump total stroke counters (individual count may be done in mud pumps); mud pump SPM total; mud pump liner capacities and efficiencies; mud flow into hole, individual and total; annular mud velocity per section; mud volume per section; total strokes per section; strokes to go per section; total minutes per section; minutes to go per section; mud return flow; bit runtime and revolutions; WOB; ROP; hook load; and standpipe pressure. The AWD outputs may also include: kick calculator and kill sheet; sensors and calculations for storage in historical trending system; drilling operation warnings and alarms.

The present disclosure also introduces an AWD display screen showing: graphic display of well configuration and hole section depths; graphic display of shoe; animation of planned vs. actual well; animation of drill string in well; value and graphic display of mud front tracking/depth; annular velocity per section; open hole volume; dynamic calculation of total strokes and minutes, strokes and minutes to go, and volume for Surface To Bit, Bit To Shoe, Bit To BOP, Bit To Surface, Well Circulation, Full Circulation, drill string displacement (open end and closed end), drill string weight, stands in hole, active volume, mud flow in, bit revolutions, and bit runtime.

The present disclosure also introduces automated tripping-in (or tripping-out) resulting in: an automated average tripping-in speed (e.g., in stands/hour) that is at least 5% faster than an average human working crew; and/or an automated standard deviation from average tripping-in speed that is at least 50% lower than for an average human working crew; and/or an automated average tripping-in slip-to-slip connection time that is at least 4% faster than an average human working crew; and/or an automated standard deviation from average tripping-in slip-to-slip connection time that is at least 50% lower than for an average human working crew.

The present disclosure also introduces a method of automating drilling operations that requires entry of at least a given group of input parameters and requires ability to exercise automated control over at least a given group of equipment related to drilling operations.

The present disclosure also introduces a control system for controlling drilling operations in which a level of automation for various operations can be selected. It may generate a control screen facilitating selection of level of automation. It may facilitate selection of full automation, semi-automation (e.g., confirmation by driller to start a specific sequence), or manual control (e.g., via a joystick).

The present disclosure also introduces a control system for controlling drilling operations comprising: a customizable display; a control screen facilitating selection of scale and limits for indicator graphs (e.g., circular bar graph, linear bar graph); and customizable selections, including: minimum and maximum graph values, warning value limits, and scale.

The present disclosure also introduces a control system for controlling drilling operations, including a display of software objects (symbols, icons, buttons, etc.) that: are displayed on a monitor or touchscreen; are indicative of equipment or device status via changing color, localized background color, adjacent or localized background symbol (e.g., check or X), flashing color, filled or unfilled object, etc.; show operational status (e.g., high value, open, closed, running, idle, error, etc.); show communication status (e.g., feedback error, communication error, etc.); show control status (e.g., auto, manual, local, etc.); and/or can be displayed in association with displayed numerical values.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same purposes and/or achieving the same advantages of the embodiments introduced herein. A person having ordinary skill in the art should also realize that such equivalent constructions do not depart from the scope of the present disclosure, and that they may make various changes, substitutions and alterations herein without departing from the spirit and scope of the present disclosure.

The Abstract at the end of this disclosure is provided to permit the reader to quickly ascertain the nature of the technical disclosure. It is submitted with the understanding that it will not be used to interpret or limit the scope or meaning of the claims.

What is claimed is:

1. An apparatus comprising:

a control workstation for use with an integrated well construction system (IWCS), wherein the IWCS is operable for constructing a well via integrated control of a plurality of integrated control devices that collectively control a plurality of integrated subsystems of the IWCS, wherein the plurality of integrated subsystems comprises a top drive, a drawworks, automated slips, a top drive elevator, an iron roughneck, a drilling fluid pumping system, a catwalk, an automated racker, an automated fingerboard, and a tubular delivery arm, and wherein the control workstation comprises:

one or more sensors configured to monitor the plurality of integrated subsystems to obtain sensor feedback; and a human-machine interface (HMI) comprising a display, one or more input devices, and a processing system, wherein the one or more input devices comprise a keyboard, a mouse, a touchscreen, a joystick, or any combination thereof, and wherein the processing system comprises a processor and a memory having a construction program thereon that, when executed by the processor:

displays the sensor feedback from the one or more sensors;

receives operating parameters for one or more well construction machines of the plurality of integrated subsystems to perform a well construction sequence via the one or more input devices, wherein the operating parameters comprise automation levels and are for each of the plurality of integrated subsystems, and wherein the automation levels are selected based on automated control by the construction program, automated control by the construction program after confirmation by a human operator, or manual operation by the human operator; and sends one or more control signals to the plurality of integrated control devices to cause the plurality of integrated subsystems to perform the well construction sequence based on the operating parameters and the sensor feedback, wherein the well construction sequence is selected from at least one of:

picking up single tubulars;

making drilling connections;

building tubular stands;

tripping-in drill collar stands;

tripping-out drill collar stands;

tripping-out wet;

backreaming;

moving single tubulars from a well center to a catwalk using a top drive;

moving tubular stands from the well center to the catwalk;

moving casing from the catwalk to the well center using a casing tong;

moving casing from the catwalk to the well center using a tubular delivery arm and a casing running tool;

moving large diameter casing from the catwalk to the well center using the top drive and the casing running tool; building casing stands; or tripping-in casing stands without using the casing running tool.

2. The apparatus of claim 1 wherein the operating parameters comprise speed limitations of at least one of the one or more well construction machines.

3. The apparatus of claim 1 wherein the operating parameters comprise travel stops of at least one of the one or more well construction machines.

4. The apparatus of claim 1 wherein the operating parameters comprise maximum limitations of at least one of the one or more well construction machines.

5. The apparatus of claim 1 wherein the operating parameters comprise target settings of at least one of the one or more well construction machines.

6. The apparatus of claim 1 wherein the operating parameters comprise target settings of the well construction sequence.

7. The apparatus of claim 1 wherein the human operator causes commencement of the well construction sequence by actuating a button on the touchscreen.

8. The apparatus of claim 1 wherein the human operator causes commencement of the well construction sequence by actuating the one or more input devices to ramp up a speed of the one or more well construction machines.

9. The apparatus of claim 1 wherein the construction program permits the human operator to take manual control of the one or more of the well construction machines during the well construction sequence.

10. The apparatus of claim 1 wherein the construction program permits the human operator to change an operating parameter of the one or more of the well construction machines during the well construction sequence.

11. The apparatus of claim 1, wherein the plurality of integrated subsystems further comprises a drilling fluid recondition system, a fingerboard, a lower stabilizing arm, a lower tubular restraint, a mousehole, a setback guide arm, a tong-handling arm, a tong-handling trolley, a top drive, a transfer bridge racker, an intermediate tubular restraint, and an upper tubular restraint, wherein the operating parameters are for two or more of the catwalk, the drawworks, the drilling fluid pumping system, the drilling fluid recondition system, the fingerboard, the lower stabilizing arm, the lower tubular restraint, the mousehole, the setback guide arm, the tong-handling arm, the tong-handling trolley, the top drive, the top drive elevator, the transfer bridge racker, the tubular delivery arm, the automated fingerboard, the automated racker, the intermediate tubular restraint, the iron roughneck, the upper tubular restraint, and the automated slips.

12. The apparatus of claim 1 wherein the operating parameters comprise:
- speed limitations of at least one of the well construction machines;
- travel stops of at least one of the well construction machines;
- maximum limitations of at least one of the well construction machines;
- target settings of at least one of the well construction machines;
- target settings of the well construction sequence; and
- selected automation levels.

13. The apparatus of claim 12 wherein the selected automation levels are selected responsive to human operator interaction with the HMI and comprise one or more of:
- the automated control by the construction program;
- the automated control by the construction program after the confirmation by the human operator; and
- the manual operation by the human operator.

14. The apparatus of claim 13 wherein commencement of the well construction sequence can be caused by the human operator by either or both of:
- actuating a button on the touchscreen; and
- actuating the joystick to ramp up a speed of the well construction machines.

15. The apparatus of claim 14 wherein the construction program permits the human operator to:
- take manual control of the one or more of the well construction machines during the well construction sequence; and
- change an operating parameter of the one or more of the well construction machines during the well construction sequence.

16. The apparatus of claim 1, wherein the HMI generates a control screen renderable to the display for selection of the automation levels, wherein the selected automation levels for the operating parameters comprise at least one instance of the automated control by the construction program after confirmation by the human operator, and wherein the confirmation by the human operator is receivable via the HMI.

17. An apparatus comprising:

a control workstation for use with an integrated well construction system (IWCS), wherein the IWCS is operable for constructing a well via integrated control of a plurality of integrated control devices that collectively control a plurality of integrated subsystems of the IWCS, wherein the plurality of integrated subsystems comprises a top drive, a drawworks, automated slips, a top drive elevator, an iron roughneck, a drilling fluid pumping system, a catwalk, an automated racker, an automated fingerboard, and a tubular delivery arm, and wherein the control workstation comprises:
- one or more sensors configured to monitor the plurality of integrated subsystems to obtain sensor feedback; and
- a human-machine interface (HMI), wherein the HMI:
  - is configured to generate a control screen renderable to a display for selection of one or more automation levels for one or more operating parameters, wherein the selected one or more automation levels comprise at least one instance of automated control by a construction program, at least one instance of confirmation by a human operator, and at least one instance of manual operation by the human operator, wherein the display of the HMI renders monitoring information associated with the at least one instance of automated control by the construction program, wherein the confirmation by the human operator is receivable via the HMI, and wherein the manual operation by the human operator is performable at least in part via the human operator interacting with the HMI; and
  - comprises the display, one or more input devices, and a processing system, wherein the one or more input devices comprise a keyboard, a mouse, a touchscreen, a joystick, or any combination thereof, and wherein the processing system comprises a processor and a memory having the construction program thereon that, when executed by the processor:
    - displays the sensor feedback from the one or more sensors;
    - receives operating parameters for one or more well construction machines of the plurality of integrated subsystems to perform a well construction sequence via the one or more input devices, wherein the operating parameters comprise automation levels and are for each of the plurality of integrated subsystems, and wherein the automation levels are selected based on automated control by the construction program, automated control by the construction program after confirmation by the human operator, or manual operation by the human operator; and
    - send one or more control signals to the plurality of integrated control devices to cause the plurality of integrated subsystems to perform the well construction sequence based on the operating parameters and the sensor feedback, wherein the well construction sequence is selected from a plurality of wellbore construction operations.

* * * * *